United States Patent
Hering et al.

(10) Patent No.: US 12,448,437 B2
(45) Date of Patent: Oct. 21, 2025

(54) TRANSPLANT TOLERANCE INDUCTION WITH CARBODIIMIDE TREATED TOLERIZING VACCINE

(71) Applicant: Regents of the University of Minnesota, Minneapolis, MN (US)

(72) Inventors: Bernhard J. Hering, Minneapolis, MN (US); Sabarinathan Ramachandran, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1164 days.

(21) Appl. No.: 17/229,534

(22) Filed: Apr. 13, 2021

(65) Prior Publication Data

US 2022/0112280 A1    Apr. 14, 2022

Related U.S. Application Data

(63) Continuation of application No. PCT/US2019/057097, filed on Oct. 19, 2019.

(60) Provisional application No. 62/902,091, filed on Sep. 18, 2019, provisional application No. 62/748,115, filed on Oct. 19, 2018.

(51) Int. Cl.
| | |
|---|---|
| *A61P 37/06* | (2006.01) |
| *A61K 31/436* | (2006.01) |
| *A61K 40/10* | (2025.01) |
| *A61K 40/13* | (2025.01) |
| *A61K 40/24* | (2025.01) |
| *A61K 40/41* | (2025.01) |
| *C07K 16/24* | (2006.01) |
| *C07K 16/28* | (2006.01) |
| *A61K 40/50* | (2025.01) |

(52) U.S. Cl.
CPC .......... *C07K 16/241* (2013.01); *A61K 31/436* (2013.01); *A61K 40/10* (2025.01); *A61K 40/13* (2025.01); *A61K 40/24* (2025.01); *A61K 40/418* (2025.01); *A61P 37/06* (2018.01); *C07K 16/2866* (2013.01); *C07K 16/2878* (2013.01); *A61K 40/50* (2025.01); *A61K 2239/31* (2023.05); *A61K 2239/38* (2023.05)

(58) Field of Classification Search
None
See application file for complete search history.

(56) References Cited

U.S. PATENT DOCUMENTS

| | | |
|---|---|---|
| 2005/0202098 A1 | 9/2005 | Mevorach |
| 2011/0064709 A1 | 3/2011 | Miller |

FOREIGN PATENT DOCUMENTS

| | | |
|---|---|---|
| WO | 2016094679 A1 | 6/2016 |
| WO | WO2017/218714 | * 12/2017 |

OTHER PUBLICATIONS

Wu et al., (Bone Marrow Transplantation (2002) 29, 949-956) (Year: 2002).*
Shen et al., (Journal of the American Society of Nephrology, 2009, 20(5), pp. 1032-1040) (Year: 2009).*
Blair et al. (The Journal of experimental medicine, 2000, 191(4), pp. 651-660) (Year: 2000).*
Luo et al., (PNAS, 2008, 105(38), pp. 14527-14532 (Year: 2008).*
Luo, X. et al., "Dendritic cells with TGF-beta1 differentiate naïve CD4+CD25-T cells into islet-protective Foxp3+ regulatory T cells," PNAS, 104:2821-2826 (2007).
Luo, X., et al., "ECDI-fixed allogeneic splenocytes induce donor-specific tolerance for long-term survival of islet transplants via two distinct mechanisms," PNAS, 105:14527-14532 (2008).
Miller et al., "Antigen-specific tolerance strategies for the prevention and treatment of autoimmune disease," Nat Rev Innnunol, 7:665-677 (2007).
Miller, S. D., et al., "The induction of cell-mediated immunity and tolerance with protein antigens coupled to syngeneic lymphoid cells," J Exp Med, 149:758-773 (1979).
Mohanakumar, T., et al., "A significant role for histocompatibility in human islet transplantation," Transplantation, 82: 180-187 (2006).
Moreau, T., et al., "Transient increase in symptoms associated with cytokine release in patients with multiple sclerosis," Brain, 119:225-237 (1996).
Muthukumar, T. et al., "Messenger RNA for FOXP3 in the urine of renal-allograft recipients," N Engl J Med., 353:2342-2351 (2005).
Nakanishi, Y. et al., "CD8(+) T lymphocyte mobilization to virus-infected tissue requires CD4( +) T-cell help," Nature, 462:510-513 (2009).
Nakayama, M., et al., "Prime role for an insulin epitope in the development of type 1 diabetes in NOD mice," Nature, 435:220-223 (2005).
Nir, T., et al., "Recovery from diabetes in mice by beta cell regeneration," J Clin Invest, 117:2553-2561 (2007).
Ochando, J.C., et al., "Alloantigen-presenting plasmacytoid dendritic cells mediate tolerance to vascularized grafts," Nat Innnunol., 7:652-662 (2006).
Perruche, S., et al., "CD3-specific antibody-induced immune tolerance involves transforming growth factor-beta from phagocytes digesting apoptotic T cells," Nat Med., 14:528-535 (2008).
Peterson, J. D., et al., "Split tolerance of Th1 and Th2 cells in tolerance to Theiler's murine encephalomyelitis virus," Eur J Immunol, 23:46-55 (1993).
Pianta, S, et al., "Amniotic membrane mesenchymal cells-derived factors skew T cell polarization toward Treg and downregulate Th1 and Th17 cells subsets" Stem Cell Rev Rep. Jun. 2015;11(3):394-407. doi: 10.1007/s12015-014-9558-4. PMID: 25348066.
Podojil, J. R., et al., "Therapeutic blockade of T-cell antigen receptor signal transduction and costimulation in autoinnnune disease," Adv Exp Med Biol., 640:234-251 (2008).

(Continued)

*Primary Examiner* — Meera Natarajan
(74) *Attorney, Agent, or Firm* — Greenberg Traurig, LLP

(57) ABSTRACT

The present disclosure is related to compositions and systems for inducing immune tolerance for transplanted cells, organ, or tissues in a transplant recipient. Also provided herein are methods of making and methods of administering tolerizing vaccines/regimen or preparatory regimens.

21 Claims, 17 Drawing Sheets

Specification includes a Sequence Listing.

(56) References Cited

OTHER PUBLICATIONS

Quezada, S. A., et al., "Tumor-reactive CD4(+) T cells develop cytotoxic activity and eradicate large established melanoma after transfer into lymphopenic hosts," J. Exp. Med., 207:637-650 (2010).
Ranheim, E. A., et al., "Activated T cells induce expression ofB7/BBI on normal or leukemic B cells through a CD40-dependent signal," J Exp Med, 177:925-935 (1993).
Ridge, J. P., et al., "A conditioned dendritic cell can be a temporal bridge between a CD4+ T-helper and a T-killer cell," Nature, 393:474-478 (1998).
Roopenian, D., et al., "The immunogenomics of minor histocompatibility antigens," Immunol. Rev., 190:86-94 (2002).
Ryan, E. A., et al. "Five-year follow-up after clinical islet transplantation," Diabetes 54:2060-2069 (2005).
Scandling , J. D., et al. "Tolerance and chimerism after renal and hematopoietic-cell transplantation," N Engl J Med 358:362-368 (2008).
Schneider, T. M., et al., "Development of suppressor lymphocytes during acute rejection of rat cardiac allografts and preservation of suppression by anti-IL-2-receptor monoclonal antibody," Transplantation, 42:191-196 (1986).
Semiletova, N.V., et al., "Class I MHC allochimeric presentation of composite immunogenic and self epitopes induces tolerance to genetically diverse rat strains" Cell Immunol. Jul. 2007;248(1):48-58. doi: 10.1016/j.cellimm.2007.04.008. Epub Oct. 23, 2007.
Shaprio, A. M. J., et al. "International trial of the Edmonton protocol for islet transplantation.," N Engl J Med 355:1318-1330 (2006).
Shepherd, D. M., et al., "Disruption of CD154:CD40 blocks generation of allograft immunity without affecting APC activation," J Immunol., 163:2470-2477 (1999).
Simpson, E., et al., "The male-specific histocompatibility antigen, H—Y: a history of transplantation, immune response genes, sex determination and expression cloning," Annu Rev Immunol., 15:39-61(1997).
Singh, A., et al. Long-term tolerance of islet allografts in nonhuman primates induced by apoptotic donor leukocytes. Nat Commun. Aug. 2, 2019;10(1):3495. doi: 10.1038/s41467-019-11338-y. PMID: 31375697.
Smith, C. E., et al., "Differential induction of IgE-mediated anaphylaxis after soluble vs. cell-bound tolerogenic peptide therapy of autoimmune encephalomyelitis," PNAS, 102:9595-9600 (2005).
Sotomayor, E. M., et al., "Conversion of tumor-specific CD4+ T-cell tolerance to T-cell priming through in vivo ligation of CD40," Nat Med, 5:780-787 (1999).
Su, K. et al., "Efficient Culture of Human Naive and Memory B Cells for Use as APCs" J Immunol. Nov. 15, 2016;197(10):4163-4176. doi: 10.4049/jimmunol.1502193. Epub Oct. 10, 2016. PMID: 27815447.
Sun et al. "CD4+ T cells are required for the maintenance, not programming, of memory CDS+ T cells after acute infection," Nat Immunol, 5:927-933 (2004).
Tan, L. J., et al., "Regulation of the effector stages of experimental autoimmune encephalomyelitis via neuroantigen-specific tolerance induction. II. Fine specificity of effector T cell inhibition," J Immunol 148:2748-2755 (1992).
Teshima, T., et al., "Acute graft-versus-host disease does not require alloantigen expression on host epithelium," Nat. Med., 8:575-581 (2002).
Turley, D. M., et al., "Peripheral tolerance induction using ethylenecarbodiimide-fixed APCs uses both direct and indirect mechanisms of antigen presentation for prevention of experimental autoimmune encephalomyelitis," J Immunol 178:2212-2220 (2007).
Valujskikh, A., et al., "Cross-primed CDS(+) T cells mediate graft rejection via a distinct effector pathway," Nat. Innnunol., 3:844-851 (2002).
Vanderlugt, C. L., et al. "Pathologic role and temporal appearance of newly emerging autoepitopes in relapsing experimental autoimmune encephalomyelitis," J Immunol 164:670-678 (2000).

Vandervegt, F. P., et al., "Induction of long-term H—Y-specific tolerance in female mice given male lymphoid cells while transiently depleted of CD4+ or CDS+ T cells," J. Exp. Med., 177:1587-1592 (1993).
Williams, M. A., et al., "Effector and memory CTL differentiation," Annu Rev Immunol, 25:171-192 (2007).
Williams, M. A., et al., "Interleukin-2 signals during priming are required for secondary expansion of CDS+ memory T cells," Nature, 441:890-893 (2006).
Xia, G., et al., "Ex vivo-expanded natural CD4+CD25+ regulatory T cells synergize with host T-cell depletion to promote long-term survival of allografts," Am J Transplant, 8:298-306 (2008).
Zang, W., et al., "Inhibition of the alloimmune response through the generation of regulatory T cells by a MHC class II-derived peptide" J Immunol. Dec. 1, 2008;181(11):7499-506. doi: 10.4049/jimmunol.181.11.7499.
Zelenika, D., et al., "Rejection of H-Y disparate skin grafts by monospecific CD4+ Thi and Th2 cells: no requirement for CDS+ T cells or B cells," J. Immunol., 161: 1868-1874 (1998).
Zijlstra, M., et al., "Skin graft rejection by beta 2-microglobulin-deficient mice," J. Exp. Med., 175:885-893 (1992).
Amrani, A., et al., "CD 154-dependent priming of diabetogenic CD4(+) T cells dissociated from activation of antigen-presenting cells," 2002, Immunity, 16:719-732.
Banchereau, et al., "Functional CD40 antigen on B cells, dendritic cells and fibroblasts," Adv Exp Med Biol, 378:79-83 (1995).
Bennett, S. R. M., et al., "Induction of a CDS+ cytotoxic T lymphocyte response by cross-priming requires cognate CD4+ T cell help," J Exp Med, 186:65-70 (1997).
Benveniste, E. N., et al., "Role of macrophages/microglia in multiple sclerosis and experimental allergic encephalomyelitis," J. Mo!. Med., 75:165-173 (1997).
Bluestone, J. A., "Regulatory T-cell therapy: Is it ready for the clinic," Nat Rev Immunol, 5:343-349 (2005).
Boehm, U., et al., "Cellular responses to interferon-gamma," Annu. Rev. Immunol., 15:749-795 (1997).
Buller, R. M. L., et al., "Induction of cytotoxic T-cell responses in vivo in the absence of CD4 helper cells," Nature, 328:77-79 (1987).
Bushell, A., et al., "Transplantation tolerance induced by antigen pretreatment and depleting anti-CD4 antibody depends on CD4+ T cell regulation during the induction phase of the response," 1995, Eur J Immunol., 25:2643-2649.
Busker, et al., "Induction of allograft tolerance to the H—Y antigen in adult C57BL/6 mice: differential effects on delayed-type hypersensitivity and cytolytic T-lymphocyte activity", 1990, Cell Immunol, 125:225-234.
Campbell, P. M., et al., "High risk of sensitization after failed islet transplantation," Am J Transplant, 7:2311-2317 (2007).
Castellino, F., et al., "Cooperation between CD4+ and CDS+ T cells: when, where, and how," Annu Rev Immunol, 24:519-540 (2006).
Cencic, R., "Protospacer adjacent motif (PAM)-distal sequences engage CRISPR Cas9 DNA target cleavage", PLoS One. Oct. 2, 2014;9(10):e109213. doi: 10.1371/journal.pone.0109213.
Chai et al., "Transplantation tolerance induced by intranasal administration of HY peptides," Blood, 103:3951-3959 (2004).
Cook, C. H., et al., "Spontaneous renal allograft acceptance associated with "regulatory" dendritic cells and IDO," J Immunol., 180:3103-3112 (2008).
Croft, M., "The role of TNF superfamily members in T-cell function and diseases," Nat. Rev. Immunol., 9:271-285 (2009).
Eagar et al., "CTLA-4 regulates expansion and differentiation of Th1 cells following induction of peripheral T cell tolerance," J Immunol 172:7442-7450 (2004).
Eager, T. N., et al., "The role of CTLA-4 in induction and maintenance of peripheral T cell tolerance," Eur. J. Immunol., 32:972-981 (2002).
Elgueta, R., et al., "Molecular mechanism and function of CD40/CD40L engagement in the immune system," Immunol. Rev, 229:152-172 (2009).
Elliott et al., "Ethylcarbodiimide as an agent for induction of specific transplant tolerance," Transplantation 58:966-968 (1994).

(56) References Cited

OTHER PUBLICATIONS

Ferguson, T. A., et al., "Uptake of apoptotic antigen-coupled cells by lymphoid dendritic cells and cross-priming of CDS(+) T cells produce active immune unresponsiveness," J. Immunol., 168:5589-5595 (2002).
Fife et al. "Insulin-induced remission in new-onset NOD mice is maintained by the PD-1-PD-LI pathway," J Exp Med203:2737-2747 (2006).
Fischbein, M. P., et al., "CD40 signaling replaces CD4+ lymphocytes and its blocking prevents chronic rejection of heart transplants," J Immunol, 165:7316-7322 (2000).
French, R. R., et al., "CD40 antibody evokes a cytotoxic T-cell response that eradicates lymphoma and bypasses T-cell help, " Nat Med, 5: 548-5 53 (1999).
Getts, M. T., et al., "Differential outcome of tolerance induction in naïve versus activated Theiler's virus epitope-specific CDS+ cytotoxic T cells," J. Virol, 81 :6584-6593 (2007).
Gonsette, R. E., "Compared benefit of approved and experimental immunosuppressive therapeutic approaches in multiple sclerosis," Expert Opin Pharmacother., 8:1103-1116 (2007).
Greenwald, R. J., et al., "The B7 family revisited," Annu Rev. Immunol., 23:515-548 (2005).
Gurung, P., et al., "Activation-induced CD154 expression abrogates tolerance induced by apoptotic cells," J. Immunol., 183:6114-6123 (2009).
Hahn, S., et al., "Mechanism and biological significance of CD4-mediated cytotoxicity," Immunol. Rev., 146:57-79 (1995).
Heppner, F. L., et al., "Experimental autoimmune encephalomyelitis repressed by microglial paralysis," Nat. Med., 11: 146-152 (2005).
Hyder, A., et al., "Effect of the immunosuppressive regime of Edmonton protocol on the long-term in vitro insulin secretion from islets of two different species and age categories," Toxicol in Vitro, 19:541-546 (2005).
International Search Report and Written Opinion issued Feb. 4, 2020 in Application No. PCT/US2019/057097.
James, E., et al., "HY peptides modulate transplantation responses to skin allografts," Int Immunol, 14:1333-1342 (2002).
Janeway, Jr. C. A., et al., "Innate immune recognition," Annu Rev Immunol, 20:197-216 (2002).
Jenkins, M. K., et al., "Allogeneic non-T spleen cells restore the responsiveness of normal T cell clones stimulated with antigen and chemically modified antigen-presenting cells.," J Immunol., 140:3324-3330 (1988).
Jenkins, M. K., et al., "Antigen presentation by chemically modified splenocytes induces antigen-specific T cell unresponsiveness in vitro and in vivo," J Exp Med, 165:302-319 (1987).

Joffre, O., et al., "Prevention of acute and chronic allograft rejection with CD4+CD25+Foxp3+ regulatory T lymphocytes," Nat Med., 14:88-92 (2008).
Johnson, S., et al., "Selected Toll-like receptor ligands and viruses promote helper-independent cytotoxic T cell briming by upregulating CD40L on dendritic cells," Immunity, 30:218-227 (2009).
Kaneko, K., et al., "Alloantigen presentation by ethylcarbodiimidetreated dendritic cells induces T cell hyporesponsiveness, and prolongs organ graft survival," Clin Immunol 108:190-198 (2003).
Kawai, T, et al. "HLA-mismatched renal transplantation without maintenance immunosuppression," N Engl J Med 358:353-361 (2008).
Kazama, et al., "Induction of immunological tolerance by apoptotic cells requires caspase-dependent oxidation of high-mobility group box-1 protein," Immunity, 29:21-32 (2008).
Kennedy, M. K., et al. "Inhibition of murine relapsing experimental autoimmune encephalomyelitis by immune tolerance to proteolipid protein and its encephalitogenic peptides," J Immunol 144:909-915 (1990).
Koenen, H. J. P. M., et al., "Antigen-specific regulatory T-cell subsets in transplantation tolerance regulatory T-cell subset quality reduces the need for quantity," Hum Immunol., 67:665-675 (2006).
Kohm, A. P., et al., "Cutting edge: CD4+CD25+ regulatory T cells suppress antigen-specific autoreactive immune responses and central nervous system inflammation during active experimental autoimmune encephalomyelitis," J Immunol, 169:4712-4716 (2002).
Kohm, A. P., et al., "Treatment with nonmitogenic anti-CD3 monoclonal antibody induces CD4+ T cell unresponsiveness and functional reversal of established experimental autoimmune encephalomyelitis," J Immunol., 174:4525-4534 (2005).
Lagaaij, E. L., et al., "Blood transfusion induced changes in cell-mediated lympholysis: to immunize or not to immunize" J Immunol. Nov. 15, 1991;147(10):3348-52.
Lechler, R. I., et al. "Organ transplantation—how much of the promise has been realized?," Nat Med, 11:605-613 (2005).
Lin, C. Y., et al., "Dominant transplantation tolerance impairs CDS+ T cell function but not expansion," Nat. Immunol., 3: 1208-1213 (2002).
Lineberry, N. B., et al., "Cutting edge: The transmembrane E3 ligase GRAIL ubiquitinates the costimulatory molecule CD40 ligand during the induction of T cell anergy," J. Immunol., 181:1622-1626 (2008).
Lobo, P. I., et al., "Development of anti-human leukocyte antigen class 1 antibodies following allogeneic islet cell transplantation," Transplant Proc., 37:3438-3440 (2005).
Long, E. T., et al., "Regulatory T cells-a journey from rodents to the clinic," Front Biosci, 12:4042-4049 (2007).

\* cited by examiner

Use of Positive and Negative Vaccines

E.g., inactivated virus with adjuvant injected under the skin (positive vaccine) → Immunity Inactivated donor cells *without* adjuvant injected *intravenously* *(negative vaccine)* → Tolerance

FIG. 1

| Slide | A | B | C | D | E | F1 | F2 |
|---|---|---|---|---|---|---|---|
| #1 | 6 | 0 | 0 | 0 | 0 | 0 | 0 |
| #2 | 3 | 2 | 0 | 0 | 0 | 0 | 0 |
| #3 | 1 | 3 | 0 | 0 | 0 | 0 | 0 |
| #4 | 7 | 10 | 1 | 0 | 0 | 0 | 0 |
| #5 | 6 | 3 | 0 | 0 | 0 | 0 | 0 |
| #6 | 10 | 2 | 0 | 0 | 0 | 0 | 0 |
| #7 | 4 | 2 | 0 | 0 | 0 | 0 | 0 |
| #8 | 6 | 2 | 0 | 0 | 0 | 0 | 0 |
| #9 | 6 | 4 | 0 | 0 | 0 | 0 | 0 |
| #10 | 3 | 3 | 0 | 0 | 0 | 0 | 0 |
| Totals | 52 | 31 | 1 | 0 | 0 | 0 | 0 |

Key to Table
A = Normal islet
B = Mild lymphocytic infiltrate surrounding islet
C = Moderate lymphocytic infiltrates with infiltration
D = Marked infiltrates with extensive loss of islet cells
E = Obliteration of islet with lymphocytic ± other inflammatory cell infiltrates as noted
F1 = Partial islet cell loss with fibrosis; no/minimal inflammation
F2 = Complete islet cell loss with fibrosis; no/minimal inflammation

FIG. 10A

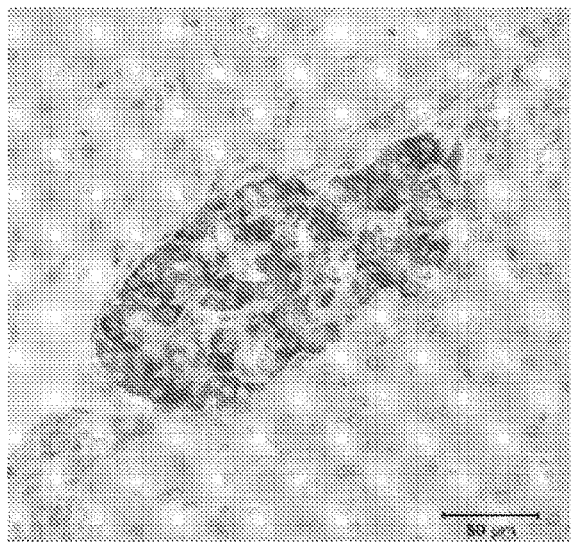

FIG. 10B

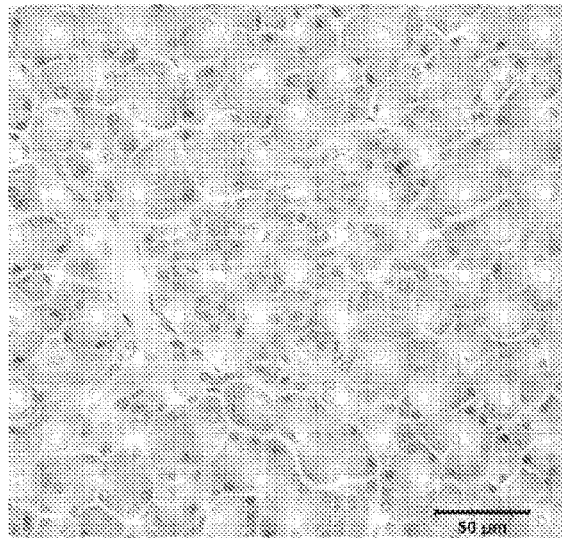

FIG. 10C

| Slide | A | B | C | D | E | F1 | F2 |
|-------|----|---|---|---|---|----|----|
| #1 | 4 | 0 | 0 | 0 | 0 | 0 | 0 |
| #2 | 1 | 0 | 0 | 0 | 0 | 0 | 0 |
| #3 | 8 | 0 | 0 | 0 | 0 | 0 | 0 |
| #4 | 7 | 0 | 0 | 0 | 0 | 0 | 0 |
| #5 | 3 | 0 | 0 | 0 | 0 | 0 | 0 |
| #6 | 7 | 0 | 0 | 0 | 0 | 0 | 0 |
| #7 | 9 | 1 | 0 | 0 | 0 | 0 | 0 |
| #8 | 3 | 1 | 0 | 0 | 0 | 0 | 0 |
| #9 | 4 | 0 | 0 | 0 | 0 | 0 | 0 |
| #10 | 0 | 0 | 0 | 0 | 0 | 0 | 0 |
| Totals | 46 | 2 | 0 | 0 | 0 | 0 | 0 |

Key to Table
A = Normal islet
B = Mild lymphocytic infiltrate surrounding islet
C = Moderate lymphocytic infiltrates with infiltration
D = Marked infiltrates with extensive loss of islet cells
E = Obliteration of islet with lymphocytic = other inflammatory cell infiltrates as noted
F1 = Partial islet cell loss with fibrosis; no/minimal inflammation
F2 = Complete islet cell loss with fibrosis; no/minimal inflammation

FIG. 12

```
                        SEQUENCE LISTING

<160> NUMBER OF SEQ ID NOS: 47

<210> SEQ ID NO 1
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Leu Ser Ser Pro Leu Ala Leu Ala Gly Asp Thr Arg Pro Arg Phe
1               5                   10                  15

<210> SEQ ID NO 2
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Val Leu Thr Val Thr Leu Met Val Leu Ser Ser Pro Leu Ala Leu
1               5                   10                  15

<210> SEQ ID NO 3
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Trp Thr Phe Gln Thr Leu Val Met Leu Glu Thr Val Pro Arg Ser
1               5                   10                  15

<210> SEQ ID NO 4
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Gln His His Asn Leu Leu Val Cys Ser Val Ser Gly Phe Tyr Pro
1               5                   10                  15

<210> SEQ ID NO 5
<211> LENGTH: 15
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 5

Asn Val Arg Phe Asp Ser Asp Val Gly Glu Phe Arg Ala Val Thr
1               5                   10                  15

<210> SEQ ID NO 6
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Cys Arg His Asn Tyr Gly Val Val Glu Ser Phe Thr Val Gln Arg
1               5                   10                  15

<210> SEQ ID NO 7
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Thr Ser Pro Leu Thr Val Glu Trp Arg Ala Arg Ser Glu Ser Ala
1               5                   10                  15

<210> SEQ ID NO 8
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Phe Asn Gly Thr Glu Arg Val Arg Tyr Leu Asp Arg Tyr Phe His
1               5                   10                  15

<210> SEQ ID NO 9
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Leu Val Cys Ser Val Ser Gly Phe Tyr Pro Gly Ser Ile Glu Val
1               5                   10                  15

<210> SEQ ID NO 10
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Gly Leu Phe Ile Tyr Phe Arg Asn Gln Lys Gly His Ser Gly Leu
1               5                   10                  15
```

```
<210> SEQ ID NO 11
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Leu Ser Ser Pro Leu Ala Leu Ala Gly Asp Thr Arg Pro Arg Phe
1               5                   10                  15

<210> SEQ ID NO 12
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Ala Leu Thr Val Thr Leu Met Val Leu Ser Ser Pro Leu Ala Leu
1               5                   10                  15

<210> SEQ ID NO 13
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Leu Gln His His Asn Leu Leu Val Cys Ser Val Ser Gly Phe Tyr
1               5                   10                  15

<210> SEQ ID NO 14
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Gln Thr Leu Val Met Leu Glu Thr Val Pro Gln Ser Gly Glu Val
1               5                   10                  15

<210> SEQ ID NO 15
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Thr Ser Pro Leu Thr Val Glu Trp Arg Ala Arg Ser Glu Ser Ala
1               5                   10                  15

<210> SEQ ID NO 16
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16
```

His Asn Gln Glu Glu Leu Val Arg Phe Asp Ser Asp Val Gly Glu
1               5                   10                  15

<210> SEQ ID NO 17
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Gly Ala Gly Leu Phe Ile Tyr Phe Arg Asn Gln Lys Gly Pro Ser
1               5                   10                  15

<210> SEQ ID NO 18
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Phe Phe Asn Gly Thr Glu Arg Val Arg Phe Leu Glu Arg Tyr Phe
1               5                   10                  15

<210> SEQ ID NO 19
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Trp Asn Ser Gln Lys Asp Ile Leu Glu Gln Lys Arg Ala Gln Val
1               5                   10                  15

<210> SEQ ID NO 20
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Ala Leu Thr Val Thr Leu Met Val Leu Ser Ser Pro Leu Ala Leu
1               5                   10                  15

<210> SEQ ID NO 21
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Gln Thr Leu Val Met Leu Glu Thr Val Pro Arg Ser Gly Glu Val
1               5                   10                  15

<210> SEQ ID NO 22
<211> LENGTH: 15
<212> TYPE: PRT
<213> ORGANISM: Artificial Sequence

```
<220> FEATURE:
<223> OTHER INFORMATION: Description of Artificial Sequence: Synthetic
      peptide

<400> SEQUENCE: 22

Ala Gly Leu Phe Ile Tyr Phe Arg Asn Gln Lys Gly His Ser Gly
1               5                   10                  15

<210> SEQ ID NO 23
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Phe Tyr His Gln Glu Glu Tyr Val Arg Phe Asp Ser Asp Val Gly
1               5                   10                  15

<210> SEQ ID NO 24
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Gly Gly Phe Val Leu Gly Leu Leu Phe Leu Gly Ala Gly Leu Phe
1               5                   10                  15

<210> SEQ ID NO 25
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Arg His Asn Tyr Gly Val Gly Glu Ser Phe Thr Val Gln Arg Arg
1               5                   10                  15

<210> SEQ ID NO 26
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Ile Tyr Phe Arg Asn Gln Lys Gly His Ser Gly Leu Gln Pro Thr
1               5                   10                  15

<210> SEQ ID NO 27
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Glu Tyr Val Arg Phe Asp Ser Asp Val Gly Glu Tyr Arg Ala Val
1               5                   10                  15
```

```
<210> SEQ ID NO 28
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Leu Ser Ser Pro Leu Ala Leu Ala Gly Asp Thr Arg Pro Arg Phe
1               5                   10                  15

<210> SEQ ID NO 29
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Ala Leu Thr Val Thr Leu Met Val Leu Ser Ser Pro Leu Ala Leu
1               5                   10                  15

<210> SEQ ID NO 30
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Gln Lys Asp Ile Leu Glu Asp Gln Arg Ala Ser Val Asp Thr Phe
1               5                   10                  15

<210> SEQ ID NO 31
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 31

Leu Gln His His Thr Leu Leu Val Cys Ser Val Asn Gly Phe Tyr
1               5                   10                  15

<210> SEQ ID NO 32
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

Gln Thr Leu Val Met Leu Glu Thr Val Pro Gln Ser Gly Glu Val
1               5                   10                  15

<210> SEQ ID NO 33
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 33

Thr Ser Pro Leu Thr Val Glu Trp Arg Ala Arg Ser Glu Ser Ala
1               5                   10                  15

<210> SEQ ID NO 34
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 34

Gly Ala Gly Leu Phe Ile Tyr Phe Arg Asn Gln Lys Gly His Ser
1               5                   10                  15

<210> SEQ ID NO 35
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 35

Leu Ser Ser Pro Leu Ala Leu Ala Gly Asp Thr Arg Pro Arg Phe
1               5                   10                  15

<210> SEQ ID NO 36
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

Ala Leu Thr Val Thr Leu Met Val Leu Ser Ser Pro Leu Ala Leu
1               5                   10                  15

<210> SEQ ID NO 37
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Leu Gln His His Asn Leu Leu Val Cys Ser Val Ser Gly Phe Tyr
1               5                   10                  15

<210> SEQ ID NO 38
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

Gln Thr Leu Val Met Leu Glu Thr Val Pro Gln Ser Gly Glu Val
1               5                   10                  15

<210> SEQ ID NO 39
<211> LENGTH: 15
<212> TYPE: PRT
```

-continued

```
<213> ORGANISM: Artificial Sequence
<220> FEATURE:
<223> OTHER INFORMATION: Description of Artificial Sequence: Synthetic
      peptide

<400> SEQUENCE: 39

Thr Ser Pro Leu Thr Val Glu Trp Arg Ala Arg Ser Glu Ser Ala
1               5                   10                  15

<210> SEQ ID NO 40
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 40

His Asn Gln Glu Glu Leu Val Arg Phe Asp Ser Asp Val Gly Glu
1               5                   10                  15

<210> SEQ ID NO 41
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 41

Gly Ala Gly Leu Phe Ile Tyr Phe Arg Asn Gln Lys Gly Pro Ser
1               5                   10                  15

<210> SEQ ID NO 42
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 42

Phe Phe Asn Gly Thr Glu Arg Val Arg Phe Leu Glu Arg Tyr Phe
1               5                   10                  15

<210> SEQ ID NO 43
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 43

Trp Asn Ser Gln Lys Asp Ile Leu Glu Gln Lys Arg Ala Gln Val
1               5                   10                  15

<210> SEQ ID NO 44
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 44

Thr Arg Pro Arg Phe Leu Glu Gln Ala Lys Ser Glu Cys His Phe
1               5                   10                  15
```

```
<210> SEQ ID NO 45
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 45
cgcctagaga agaggctgtg                                                   20

<210> SEQ ID NO 46
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 46
ctgctgtggc tgtggtgtag                                                   20

<210> SEQ ID NO 47
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Thr Gln Phe Val Arg Phe Asp Ser Asp Ala Ala Ser Gln Arg Met
1               5                   10                  15
```

TRANSPLANT TOLERANCE INDUCTION WITH CARBODIIMIDE TREATED TOLERIZING VACCINE

CROSS REFERENCE

This application is a continuation of International Application No. PCT/US2019/057097, filed Oct. 19, 2019, which claims the benefit of U.S. Provisional Patent Application No. 62/748,115, filed Oct. 19, 2018, and U.S. Provisional Patent Application No. 62/902,091, filed Sep. 18, 2019, each of which is incorporated herein by reference in its entirety.

STATEMENT REGARDING FEDERALLY SPONSORED RESEARCH

This invention was made with government support under grant U01AI102463 awarded by the National Institutes of Health (NIH). The government has certain rights in the invention.

SEQUENCE LISTING

The instant application contains a Sequence Listing which has been submitted electronically in ASCII format and is hereby incorporated by reference in its entirety. Said ASCII copy, created on Apr. 13, 2021, is named 199830716301_SL.txt and is 13,208 bytes in size.

BACKGROUND OF THE DISCLOSURE

Transplantation has become the most effective treatment option for patients with end-stage organ failure. Current immunosuppressive treatments are effective in preventing acute rejection of transplanted organs and cells; however, their significant morbidity and their lack of efficacy in preventing chronic rejection present a serious unmet medical need in a growing population of chronically immunosuppressed transplant recipients. Xenotransplantation of organs, tissues, and cells from suitable porcine donors would overcome the donor shortage associated with allotransplantation but would, as in allotransplantation, subject the recipients to increased risk of developing infections, malignancies, diabetes, cardiovascular complications, nephrotoxicity, and other morbidities associated with chronic immunosuppression. Inducing immune tolerance to allografts and xenografts would overcome the need for maintenance immunosuppression and extend the longevity of graft survival by eliminating graft loss due to chronic rejection; thereby greatly improving patient satisfaction, outcomes, and cost utility of transplantation.

INCORPORATION BY REFERENCE

All publications, patents, and patent applications mentioned in this specification are herein incorporated by reference to the same extent as if each individual publication, patent, or patent application was specifically and individually indicated to be incorporated by reference. Absent any indication otherwise, publications, patents, and patent applications mentioned in this specification are incorporated herein by reference in their entireties.

SUMMARY OF THE DISCLOSURE

In some aspects, disclosed herein is a preparatory regimen for allotransplantation or xenotransplantation, comprising: (a) apoptotic donor leukocytes fixed in a crosslinking agent; (b) an mTOR inhibitor; (c) an anti-tumor necrosis factor agent or an anti-tumor necrosis factor receptor agent; (d) an anti-interleukin 6 agent or an anti-interleukin 6 receptor agent; and (e) an anti-CD40 agent or an anti-CD40 ligand agent; wherein the preparatory regimen is for administration to a recipient of a transplant cell, tissue, or organ.

In some embodiments, the preparatory regimen further comprises instructions for administration of (a), (b), (c), (d), and (e) to the recipient. In some embodiments, (a), (b), (c), (d), and (e) are administered to the recipient between about 10 days before and about 30 days after the allotransplantation or xenotransplantation. In some embodiments, at least one of (a), (b), (c), (d), and (e) are administered to the recipient at least 1, 2, 3, 4, 5, 6, 7, 8, 9, or 10 days before the allotransplantation or xenotransplantation. In some embodiments, at least one of (a), (b), (c), (d), and (e) are administered to the recipient at least 1, 2, 3, 4, 5, 6, 7, 8, 9, 10, 11, 12, 13, 14, 15, 15, 17, 18, 19, 20, 21, 22, 23, 24, or 25 days before the allotransplantation or xenotransplantation. In some embodiments, at least one of (a), (b), (c), (d), and (e) are administered to the recipient subcutaneously, intravenously, intradermally, intraperitoneally, orally, intramuscularly, intracerebroventricularly, intranasally, intracranially, intracelially, intracerebellarly, intrathecally, or transdermally, or topically. In some embodiments, (a), (b), (c), (d), and (e) are administered intravenously. In some embodiments, the mTOR inhibitor is rapamycin. In some embodiments, a target trough level of the mTOR inhibitor in the recipient is about 5-12 ng per mL. In some embodiments, the anti-tumor necrosis factor agent is an anti-tumor necrosis factor antibody or antigen-binding fragment thereof. In some embodiments, the anti-tumor necrosis factor agent comprises a tumor necrosis factor binding domain of a tumor necrosis factor receptor. In some embodiments, the anti-tumor necrosis factor agent is etanercept. In some embodiments, the anti-tumor necrosis factor agent or the anti-tumor necrosis factor receptor agent is administered to the recipient at a dose of between about 0.1 mg/kg and about 10 mg/kg. In some embodiments, the anti-tumor necrosis factor agent or the anti-tumor necrosis factor receptor agent is administered to the recipient at a dose of between about 0.5 mg/kg and about 1 mg/kg. In some embodiments, the anti-interleukin 6 receptor agent is an antagonistic anti-interleukin 6 receptor antibody or antigen-binding fragment thereof. In some embodiments, the anti-interleukin 6 receptor agent is tocilizumab. In some embodiments, the anti-interleukin 6 agent or the anti-interleukin 6 receptor agent is administered to the recipient at a dose of between about 1 mg/kg and about 100 mg/kg. In some embodiments, the anti-interleukin 6 agent or the anti-interleukin 6 receptor agent is administered to the recipient at a dose of about 10 mg/kg. In some embodiments, the anti-CD40 agent or the anti-CD40 ligand agent is an antagonistic anti-CD40 antibody or antigen-binding fragment thereof. In some embodiments, the anti-CD40 agent or the anti-CD40 ligand agent is 2C10 or 2C10R4. In some embodiments, the anti-CD40 agent or the anti-CD40 ligand agent is administered to the recipient at a dose of between about 1 mg/kg and 100 mg/kg. In some embodiments, the anti-CD40 agent or the anti-CD40 ligand agent is administered to the recipient at a dose of about 50 mg/kg. In some embodiments, administering the preparatory regimen to the recipient provides long term tolerance to the transplant cell, tissue, or organ. In some embodiments, the apoptotic leukocytes are mammalian leukocytes. In some embodiments, the apoptotic leukocytes are pig leukocytes. In some embodiments, the apoptotic leukocytes are human leukocytes. In some embodiments, the apoptotic leukocytes are from a cadaveric donor, a brain dead donor, a non-hear beating donor, or a living donor. In some embodiments, the apoptotic leukocytes are ex vivo expanded leukocytes. In some embodiments, the apoptotic leukocytes are isolated from a spleen, or peripheral blood. In some embodiments, the apoptotic leukocytes comprise B-lymphocytes. In some embodiments, the apoptotic leukocytes comprise cells that have been differentiated from stem cells or induced pluripotent stem cells ex vivo. In some embodiments, the stem cells are derived from a donor of the transplant cell, tissue, or organ. In some embodiments, the transplant cell, tissue, or organ is a kidney, liver, heart, lung, pancreas, islet cell, small bowel, bone marrow, hematopoietic stem cell, embryonic stem cell-derived islet beta cell, induced pluripotent stem cell-derived islet beta cell, embryonic stem cell-derived islet, induced pluripotent stem cell-derived islet, a stem cell derived cell, tissue or organ, or a combination thereof. In some embodiments, the recipient and a donor of the transplant cell, tissue, or organ are MHC class I mismatched. In some embodiments, the recipient and a donor of the transplant cell, tissue, or organ are MHC class II mismatched. In some embodiments, the recipient and a donor of the transplant cell, tissue, or organ are haploidentical. In some embodiments, the recipient and a donor of the transplant cell, tissue, or organ are matched for at least one MHC class II allele. In some embodiments, the recipient and a donor of the transplant cell, tissue, or organ are matched for at least one MHC class I A allele, MHC class I B allele, MHC class II DR allele, MHC class II DQ allele, or MHC class II DP allele. In some embodiments, the recipient and a donor of the transplant cell, tissue, or organ are matched for at least MHC class II DR allele that is MHC class II DRB allele. In some embodiments, the apoptotic leukocytes and the recipient are matched for at least one of MHC class I A allele, MHC class I B allele, MHC class II DR allele, MHC class II DQ allele, or MHC class II DP allele. In some embodiments, the apoptotic leucocytes and recipient are matched for the MHC class II DR allele that is MHC class II DRB allele. In some embodiments, the apoptotic leucocytes and the recipient are completely mismatched. In some embodiments, the apoptotic leucocytes and the transplant are matched for at least one MHC class I A allele, MHC class I B allele, MHC class II DR allele, MHC class II DQ allele, or MHC class II DP allele. In some embodiments, the apoptotic leucocytes and the transplant are haploidentical. In some embodiments, the apoptotic leucocytes are from the donor of the transplant. In some embodiments, the apoptotic leucocytes are derived from the differentiation of stem cell from the donor of the transplant cell, tissue, or organ. In some embodiments, the apoptotic leucocytes comprise conjugated on its surface one or more peptides derived from a MHC class II molecule of the recipient. In some embodiments, the one or more peptides derived from the MHC class II molecule comprise peptides derived from a DR β-chain, a DQ β-chain, or a DP β-chain, or a combination thereof. In some embodiments, the one or more peptides derived from the MHC class II molecule comprise an entire α1 or α2 domain of DR, DP, or DQ. In some embodiments, the one or more peptides derived from the MHC class II molecule comprise an entire β1 or β2 domain of DR, DP, or DQ. In some embodiments, the MHC class II molecule is encoded by HLA-DRB1*03 or HLA-DRB1*04 allele of the recipient. In some embodiments, the one or more peptides derived from the MHC class II molecule comprise a sequence from a hypervariable region. In some embodiments, the one or more peptides derived from the MHC class II molecule are at least 10 amino acids in length. In some embodiments, the one or more peptides derived from the MHC class II molecule are about 10 to 30 amino acids in length. In some embodiments, the one or more peptides derived from the MHC class II molecule are synthesized or recombinant. In some embodiments, the apoptotic leukocytes are derived from the recipient or derived upon differentiation of stem cells from the recipient, and wherein the apoptotic leukocytes comprise one or more peptides derived from a MHC class I molecule conjugated to its surface. In some embodiments, the MHC class I molecule is expressed in the donor of the transplant. In some embodiments, the MHC class I molecule is HLA-A1, HLA-A3, HLA-B7, or HLAB8. In some embodiments, the MHC class I molecule is encoded by HLA-A*02, 24, 01 or HLA-B*35, 44, 51. In some embodiments, the one or more peptides are conjugated to the surface of the apoptotic leukocytes by treatment with the crosslinking agent. In some embodiments, the crosslinking agent comprises a carbodiimide. In some embodiments, the carbodiimide comprises 1-ethyl-3-(3-dimethylaminopropyl)-carbodiimide (ECDI); N,N'-diisopropylcarbodiimide (DIC); N,N'-dicyclohexylcarbodiimide (DCC); or a combination thereof. In some embodiments, the crosslinking agent comprises 1-ethyl-3-(3-dimethylaminopropyl)-carbodiimide (ECDI). In some embodiments, the crosslinking agent does not comprise a carbodiimide. In some embodiments, the crosslinking agent comprises genipin, acrylic aldehyde, diformyl, osmium tetroxide, a diimidoester, mercuric chloride, zinc sulphate, zinc chloride, trinitrophenol (picric acid), potassium dichromate, ethanol, methanol, acetone, acetic acid, or a combination thereof. In some embodiments, the diimidoester comprises cyanuric chloride, diisocyanate, diethylpyrocarbonate (DEPC), a maleimide, benzoquinone, or a combination thereof. In some embodiments, the apoptotic leukocytes have been fixed for a predetermined amount of time. In some embodiments, the predetermined time is at least about 10 minutes, 20 minutes, 30 minutes, 40 minutes, 50 minutes, 60 minutes, 75, minutes, 90 minutes, 120 minutes, 150 minutes, 180 minutes, 210 minutes, or 240 minutes. In some embodiments, the apoptotic leukocytes have further been contacted with an amount of one or more immunomodulatory molecules. In some embodiments, the amount of one or more immunomodulatory molecules is sufficient to modify a function of antigen-presenting cells in the recipient. In some embodiments, the one or more immunomodulatory molecules comprise IFN-γ, an NF-kB inhibitor, vitamin D3, siCD40, cobalt protoporphyrin, insulin B9-23, all or a portion of a cluster of differentiation protein, or a combination thereof. In some embodiments, the NF-kB inhibitor is curcumin, triptolide, Bay-117085, or a combination thereof. In some embodiments, the (a), (b), (c), (d), and (e) are administered separately, or simultaneously.

Disclosed herein, in some aspects, is a tolerizing regimen for post-transplant stabilization of a recipient of an allotransplant or xenotransplant, comprising: apoptotic leukocytes modulated with a carbodiimide crosslinking agent, wherein the apoptotic leukocytes are expanded in presence of one or more of IL-2, IL-4, IL-21, BAFF, and CD40L prior to contacting with the crosslinking agent; an mTOR inhibitor; an anti-tumor necrosis factor agent or an anti-tumor necrosis factor receptor agent; an anti-interleukin 6 agent or an anti-interleukin 6 receptor agent; and an anti-CD40 agent or an anti-CD40 ligand agent; wherein the tolerizing regimen is for administration to a recipient of a transplant cell, tissue, or organ.

In some embodiments, the tolerizing regimen of claim 74, wherein the apoptotic leukocytes are expanded at least about 3 fold, 5 fold, 10 fold, 50 fold, 100 fold, 150 fold, 200 fold or 250 fold relative to the starting population prior to contacting with the crosslinking agent. In some embodiments, the (a), (b), (c), (d), and (e) are administered separately, or simultaneously.

Disclosed herein, in some aspects, is a preparatory regimen for transplanting a cell, tissue or organ transplant to a recipient, comprising: apoptotic leukocytes fixed in a crosslinking agent, wherein the apoptotic leukocytes comprise conjugated on its surface; one or more peptides derived from a MHC class II molecule of the recipient, or one or more peptides derived from a MHC class I molecule of a donor of the cell, tissue or organ transplant, wherein the preparatory regimen is for administration to the recipient.

In some embodiments, the preparatory regimen further comprises administering one or more agents for short-term immunosuppression of the transplant recipient. In some embodiments, the one or more agents for short term immunosuppression comprise an mTOR inhibitor, an anti-tumor necrosis factor agent or an anti-tumor necrosis factor receptor agent, an anti-interleukin 6 agent or an anti-interleukin 6 receptor agent, an anti-CD40 agent or an anti-CD40 ligand agent, or a combination thereof. In some embodiments, the preparatory regimen further comprises instructions for administration of the one or more agents for short term immunosuppression to the transplant recipient. In some embodiments, the one or more peptides derived from the MHC class II molecule comprise peptides derived from a DR β-chain, a DQ β-chain, or a DP β-chain, or a combination thereof. In some embodiments, the one or more peptides derived from the MHC class II molecule comprise an entire β1 or β2 domain of DR. In some embodiments, the MHC class II molecule is encoded by HLA-DRB1*03 or HLA-DRB1*04 allele of the recipient. In some embodiments, the one or more peptides derived from the MHC class II molecule comprise an entire α1 or α2 domain of DR, DP, or DQ. In some embodiments, the one or more peptides derived from the MHC class II molecule comprise an entire β1 or β2 domain of DQ. In some embodiments, the one or more peptides derived from the MHC class II molecule comprise a sequence from a hypervariable region. In some embodiments, the one or more peptides derived from the MHC class II molecule are at least 10 amino acids in length. In some embodiments, the one or more peptides derived from the MHC class II molecule are about 10 to 30 amino acids in length. In some embodiments, the one or more peptides derived from the MHC class II molecule are synthesized or recombinant. In some embodiments, the apoptotic leukocytes fixed in a crosslinking agent comprising one or more peptides derived from the MHC class II molecule of the recipient, wherein the apoptotic leukocyte is MHC class II matched to the donor and MHC class II mismatched to the recipient. In some embodiments, the MHC class I molecule is expressed in the donor of the transplant. In some embodiments, the MHC class I molecule is HLA-A1, HLA-A3, HLA-B7, or HLAB8. In some embodiments, the MHC class I molecule is encoded by HLA-A*02, 24, 01 or HLA-B*35, 44, 51. In some embodiments, the apoptotic leukocytes fixed in a crosslinking agent comprising one or more peptides derived from the MHC class I molecule of the donor, wherein the apoptotic leukocyte is MHC class I matched or MHC class II matched or both to the recipient. In some embodiments, the one or more peptides are conjugated to the surface of the apoptotic leukocytes by treatment with the crosslinking agent. In some embodiments, the crosslinking agent comprises a carbodiimide. In some embodiments, the carbodiimide comprises 1-ethyl-3-(3-dimethylaminopropyl)-carbodiimide (ECDI); N,N'-diisopropylcarbodiimide (DIC); N,N'-dicyclohexylcarbodiimide (DCC); or a combination thereof. In some embodiments, the crosslinking agent comprises 1-ethyl-3-(3-dimethylaminopropyl)-carbodiimide (ECDI). In some embodiments, the crosslinking agent does not comprise a carbodiimide. In some embodiments, the crosslinking agent comprises genipin, acrylic aldehyde, diformyl, osmium tetroxide, a diimidoester, mercuric chloride, zinc sulphate, zinc chloride, trinitrophenol (picric acid), potassium dichromate, ethanol, methanol, acetone, acetic acid, or a combination thereof. In some embodiments, the diimidoester comprises cyanuric chloride, diisocyanate, diethylpyrocarbonate (DEPC), a maleimide, benzoquinone, or a combination thereof. In some embodiments, the apoptotic leukocytes have been fixed for a predetermined amount of time. In some embodiments, the predetermined time is at least about 10 minutes, 20 minutes, 30 minutes, 40 minutes, 50 minutes, 60 minutes, 75, minutes, 90 minutes, 120 minutes, 150 minutes, 180 minutes, 210 minutes, or 240 minutes. In some embodiments, the apoptotic leukocytes have further been contacted with an amount of one or more immunomodulatory molecules.

Disclosed herein, in some aspects, is a method of inducing tolerance to a cell, tissue or organ transplant in a recipient, the method comprising; administering to the recipient an effective amount of a composition comprising; (a) apoptotic leukocytes fixed in a crosslinking agent, (b) an mTOR inhibitor, (c) an anti-tumor necrosis factor agent or an anti-tumor necrosis factor receptor agent, (d) an anti-interleukin 6 agent or an anti-interleukin 6 receptor agent, and (e) an anti-CD40 agent or an anti-CD40 ligand agent.

In some embodiments, the apoptotic leukocytes and the recipient are matched for at least one MHC class II allele with the recipient. In some embodiments, the apoptotic leukocytes and the recipient are MHC mismatched. In some embodiments, the apoptotic leukocytes comprise one or more peptides derived from a MHC class II molecule of the recipient, wherein the one or more peptides are conjugated on the surface of the apoptotic leukocytes. In some embodiments, the apoptotic leukocytes comprise cells that have been differentiated from stem cells ex vivo, wherein the stem cells are derived from a donor of the cell, tissue, or organ transplant. In some embodiments, the apoptotic leukocytes are MHC matched to the recipient. In some embodiments, the apoptotic leukocytes comprise one or more peptides derived from a MHC class I molecule of a donor of the cell, tissue or organ transplant, wherein the one or more peptides are conjugated on the surface to the apoptotic leukocytes. In some embodiments, the apoptotic leukocytes comprise cells that have been differentiated from stem cells ex vivo, wherein the stem cells are derived from the recipient of the cell, tissue, or organ transplant. In some embodiments, the method further comprises transplanting the cell, tissue or organ transplant. In some embodiments, the transplanting is performed at least 1, 2, 3, 4, 5, 6, 7, 8, 9, 10, 11, 12, 13, 14, 15, or more days after administering the composition. In some embodiments, the method further comprises administering at least one booster dose of the composition. In some embodiments, the booster dose is administered at least 1, 2, 3, 4, 5, 6, 7, 8, 9, 10, 12, 14, 15, 17, 20, 21, or 24 days after the transplanting. In some embodiments, the tolerance is for a period of at least one month. In some embodiments, the tolerance is for a period of at least 100 days. In some embodiments, the tolerance is for a period of at least one year.

Disclosed herein, in some aspects, is a method of inducing tolerance to a cell, tissue or organ transplant in a recipient, the method comprising; administering to the recipient an effective amount of a composition comprising apoptotic leukocytes fixed in a crosslinking agent, wherein the apoptotic leukocytes comprise conjugated on its surface, one or more peptides derived from a MHC class II molecule of the recipient, or one or more peptides derived from a MHC class I molecule of a donor of the cell, tissue or organ transplant.

In some embodiments, the tolerance is in an absence of immunosuppressive therapy after day 50 post-transplant. In some embodiments, the tolerance is in an absence of a booster regimen.

Disclosed herein, in some aspects is a method for inhibiting an immune response to a cell, tissue or organ transplant in a recipient, the method comprising; administering to the recipient an effective amount of (a) apoptotic leukocytes fixed in a crosslinking agent (b) an mTOR inhibitor; (c) an anti-tumor necrosis factor agent or an anti-tumor necrosis factor receptor agent; (d) an anti-interleukin 6 agent or an anti-interleukin 6 receptor agent; and (e) an anti-CD40 agent or an anti-CD40 ligand agent.

Disclosed herein, in some aspects, is a method of for inhibiting an immune response to a cell, tissue or organ transplant in a recipient, the method comprising; administering to the recipient an effective amount of a composition comprising apoptotic leukocytes fixed in a crosslinking agent, wherein the apoptotic leukocytes comprise conjugated on its surface; one or more peptides derived from a MHC class II molecule of the recipient, or one or more peptides derived from a MHC class I molecule of a donor of the cell, tissue or organ transplant.

In some embodiments, the immune response comprises B-cell activation, T-cell proliferation, B-cell proliferation, macrophage activation, cytokine production, or a combination thereof.

Disclosed herein, in some aspects, is a method of post-transplant immune tolerizing a subject comprising administering to the subject: (a) apoptotic leukocytes modulated with a carbodiimide crosslinking agent, wherein the leukocytes are expanded in presence of one or more of IL-2, IL-4, IL-21, BAFF, and CD40L prior to contacting with the crosslinking agent; (b) an mTOR inhibitor; (c) an anti-tumor necrosis factor agent or an anti-tumor necrosis factor receptor agent; (d) an anti-interleukin 6 agent or an anti-interleukin 6 receptor agent; and € an anti-CD40 agent or an anti-CD40 ligand agent.

In some embodiments, the apoptotic leukocytes are isolated from peripheral blood. In some embodiments, the apoptotic leukocytes are enriched for B cells by negative selection. In some embodiments, the apoptotic leukocytes are expanded at least 200 fold relative to a starting population prior to the modulating with the carbodiimide crosslinking agent.

Disclosed herein, in some aspects, is a kit for transplantation of a cell, tissue or organ transplant in a recipient comprising; (a) a first container comprising a first composition comprising apoptotic leukocytes fixed in a crosslinking agent, (b) a second container comprising a second composition comprising an mTOR inhibitor, (c) a third container comprising a third composition comprising an anti-tumor necrosis factor agent or an anti-tumor necrosis factor receptor agent, (d) a fourth container comprising a fourth composition comprising an anti-interleukin 6 agent or an anti-interleukin 6 receptor agent; and (e) a fifth container comprising a fifth composition comprising an anti-CD40 agent or a anti-CD40 ligand agent.

Disclosed herein, in some aspects, is a kit for transplantation of a cell, tissue or organ transplant in a recipient comprising; a first container comprising a first composition comprising apoptotic leukocytes fixed in a crosslinking agent, wherein the apoptotic leukocytes comprise conjugated on its surface, one or more peptides derived from a MHC class II molecule of the recipient, or one or more peptides derived from a MHC class I molecule of a donor of the cell, tissue or organ transplant.

In some embodiments, the kit further comprises the cell, tissue or organ transplant.

Disclosed herein, in some aspects, is a transplant kit comprising a preparatory regimen and a tolerizing regimen: the preparatory regimen comprising: apoptotic leukocytes fixed in a crosslinking agent; an mTOR inhibitor; an anti-tumor necrosis factor agent or an anti-tumor necrosis factor receptor agent; an anti-interleukin 6 agent or an anti-interleukin 6 receptor agent; and an anti-CD40 agent or an anti-CD40 ligand agent; the tolerizing regimen comprising: apoptotic leukocytes modulated with a carbodiimide crosslinking agent, wherein the leukocytes are expanded in presence of one or more of IL-2, IL-4, IL-21, BAFF, and CD40L prior to contacting with the crosslinking agent; an mTOR inhibitor; an anti-tumor necrosis factor agent or an anti-tumor necrosis factor receptor agent; an anti-interleukin 6 agent or an anti-interleukin 6 receptor agent; and an anti-CD40 agent or an anti-CD40 ligand agent; wherein the preparatory regimen is administered to a subject prior to transplantation, and the tolerizing regimen is administered post-transplantation to the subject.

In some embodiments, the transplant kit further comprises a cell, tissue or organ transplant. In some embodiments, the apoptotic leukocytes of the tolerizing regimen are isolated from peripheral blood. In some embodiments, the apoptotic leukocytes of the tolerizing regimen are enriched for B cells by negative selection. In some embodiments, the apoptotic leukocytes of the tolerizing regimen are expanded at least 200 fold relative to a starting population prior to contacting with the crosslinking agent.

In one aspect, provided herein is a mammalian leukocyte for allograft, wherein said mammalian leukocyte is a cadaveric mammalian leukocyte, wherein said cadaveric mammalian leukocyte has been fixed in a carbodiimide.

In another aspect, the present disclosure provides a mammalian leukocyte for allograft, wherein said mammalian leukocyte is an ex vivo expanded mammalian leukocyte, wherein said ex vivo expanded mammalian leukocyte has been fixed in a carbodiimide.

In some embodiments, said ex vivo expanded mammalian leukocyte is from a living donor. In some embodiments, said living donor is a human. In some embodiments, said cadaveric mammalian leukocyte is from a population of leukocytes expanded ex vivo. In some embodiments, said cadaveric mammalian leukocyte is from a non-heart beating donor. In some embodiments, said cadaveric mammalian leukocyte is from a brain-dead donor. In some embodiments, said mammalian leukocyte is a human leukocyte. In some embodiments, said mammalian leukocyte is isolated from a spleen. In some embodiments, said mammalian leukocyte is a B cell. In some embodiments, said mammalian leukocyte has been fixed for a predetermined amount of time. In some embodiments, said predetermined time is at least about 1 minute, 5 minutes, 10 minutes, 20 minutes, 30 minutes, 40 minutes, 50 minutes, 60 minutes, 75, minutes, 90 minutes, 120 minutes, 150 minutes, 180 minutes, 210 minutes or 240 minutes.

In some embodiments, of the above aspects, said mammalian leukocyte has further been contacted with an amount of one or more immunomodulatory molecules. In some embodiments, said amount is sufficient to trigger apoptotic death of donor-reactive cells when subsequently exposed to 37° C. for 4 hrs. In some embodiments, the one or more immunomodulatory molecules comprise IFN-γ, an NF-kB inhibitor, vitamin D3, siCD40, cobalt protoporphyrin, insulin B9-23, α1-antitrypsin, all or a portion of a cluster of differentiation protein, a gp39 antagonist, or a combination thereof. In some embodiments, said NF-kB inhibitor that is curcumin, triptolide, Bay-117085, or a combination thereof. In some embodiments, said carbodiimide comprises 1-ethyl-3-(3-dimethylaminopropyl)-carbodiimide (ECDI); N,N'-diisopropylcarbodiimide (DIC); N,N'-dicyclohexylcarbodiimide (DCC); or a combination thereof. In some embodiments, said carbodiimide agent comprises 1-ethyl-3-(3-dimethylaminopropyl)-carbodiimide (ECDI).

In one aspect, provided herein is a method of inducing tolerance to a cell, tissue, or organ transplant, the method comprising administering to a subject a composition comprising an amount of said mammalian leukocytes disclosed above. In some embodiments, said cell or tissue transplant is from a donor of said mammalian leukocyte. In some embodiments, said cell or tissue transplant is from a donor that is MHC matched to a donor of said mammalian leukocyte. In some embodiments, said cell or tissue transplant is from a donor that is haploidentical to a donor of said mammalian leukocyte. In some embodiments, said cell or tissue transplant is from a donor that shares at least one MHC class I A allele, MHC class I B allele, MHC class II DR allele, or MHC class II DQ allele with the donor of said mammalian leukocyte. In some embodiments, said cell or tissue transplant is a kidney, liver, heart, lung, pancreas, islet cell, small bowel, bone marrow, hematopoietic stem cell, embryonic or induced pluripotent stem cell-derived islet beta cell, embryonic or induced pluripotent stem cell-derived islet, or a combination thereof.

In some embodiments, the method further comprises transplanting said cell or tissue transplant to said subject. In some embodiments, said transplanting is performed at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more days after administering said composition. In some embodiments, said transplanting is performed at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more days before administering said composition. In some embodiments, the method of the aspect disclosed above further comprises administering at least one booster dose of said composition. In some embodiments, the method comprises administering 1, 2, 3, 4, or 5 booster dose of said composition. In some embodiments, said booster dose is administered at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 days, or more after said transplanting. In some embodiments, said booster dose is administered at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 days, or more before said transplanting. In some embodiments, said booster dose comprises a lower amount of said mammalian leukocytes.

In one aspect provided herein is a preparatory regimen for transplantation comprising leukocytes fixed in a crosslinking agent, wherein said leukocytes are treated with an agent that increases expression of anti-inflammatory cytokines in a recipient. In some embodiments, said anti-inflammatory cytokines comprise TGF-β, IL-10, IL-13, or a combination thereof. In some embodiments, said preparatory regimen provides long term tolerance in said recipient to a transplanted cell, tissue, or organ from a donor of said leukocytes. In some embodiments, said long term tolerance is for a period of at least one month. In some embodiments, said long term tolerance is in the absence of a booster regimen.

In some embodiments, said leukocytes are mammalian leukocytes. In some embodiments, said leukocytes are pig leukocytes. In some embodiments, said leukocytes are human leukocytes. In some embodiments, said leukocytes are cadaveric leukocytes. In some embodiments, said leukocytes are ex vivo expanded leukocytes. In some embodiments, said cadaveric leukocyte are from a non-heart beating donor. In some embodiments, said cadaveric leukocyte are from a brain-dead donor. In other embodiments, said ex vivo expanded leukocytes are from a living donor.

In some embodiments, said leukocytes are isolated from a spleen. In some embodiments, said leukocytes have been fixed for a predetermined amount of time. In some embodiments, said predetermined time is at least about 1 minute, 5 minutes, 10 minutes, 20 minutes, 30 minutes, 40 minutes, 50 minutes, 60 minutes, 75, minutes, 90 minutes, 120 minutes, 150 minutes, 180 minutes, 210 minutes or 240 minutes. In some embodiments, said agent comprises α1-antitrypsin. In some embodiments, said leukocytes have further been contacted with an amount of one or more immunomodulatory molecules. In some embodiments, said amount is sufficient to trigger apoptotic death of donor-reactive cells.

In some embodiments, the one or more immunomodulatory molecules comprise IFN-γ, an NF-kB inhibitor, vitamin D3, siCD40, cobalt protoporphyrin, insulin B9-23, all or a portion of a cluster of differentiation protein, or a combination thereof. In some embodiments, said NF-kB inhibitor that is curcumin, triptolide, Bay-117085, or a combination thereof. In some embodiments, said leukocytes are from a population of leukocytes isolated from a donor and expanded ex vivo. In some embodiments, said crosslinking agent comprises a carbodiimide, genipin, acrylic aldehyde, diformyl, osmium tetroxide, a diimidoester, mercuric chloride, zinc sulphate, zinc chloride, trinitrophenol (picric acid), potassium dichromate, ethanol, methanol, acetone, acetic acid, or a combination thereof.

In some embodiments, the preparatory regimen comprising diimidoester that comprises cyanuric chloride, diisocyanate, diethylpyrocarbonate (DEPC), a maleimide, benzoquinone, or a combination thereof. In some embodiments, the preparatory regimen comprising said carbodiimide that comprises 1-ethyl-3-(3-dimethylaminopropyl)-carbodiimide (ECDI); N,N'-diisopropylcarbodiimide (DIC); N,N'-dicyclohexylcarbodiimide (DCC); or a combination thereof. In some embodiments, said carbodiimide that is 1-ethyl-3-(3-dimethylaminopropyl)-carbodiimide (ECDI). In some embodiments, said leukocytes comprise B-lymphocytes. In some embodiments, said B-lymphocytes are from a living donor.

BRIEF DESCRIPTION OF THE DRAWINGS

The features of the present disclosure are set forth with particularity in the appended claims. A better understanding of the features and advantages of the present disclosure can be obtained by reference to the following detailed description that sets forth illustrative embodiments, in which the principles of the disclosure are utilized, and the accompanying drawings of which:

FIG. 1 illustrates positive and tolerizing and preparatory vaccines and regimen (alternatively referred as a negative vaccine). In certain embodiments of the present disclosure, a tolerizing or preparatory vaccine or regimen, or components therefrom can be provided as part of a preparatory regimen described herein.

FIG. 9A shows that a monkey that received preparatory and tolerizing regimen comprising apoptotic leukocytes as described herein, became normoglycemic immediately post-transplant and remained so, even after discontinuation of immunosuppression and exogenous insulin on day 21 post-transplant. Preprandial and postprandial BG are shown by lines, and daily insulin by bars. The graph demonstrates restoration of normoglycemia after intraportal transplant of 7-day-cultured islets (5547 IE/kg by DNA), and maintenance of normoglycemia despite discontinuation of insulin and immunosuppression at day +21 posttransplant. FIG. 9B shows that recipient's glycated hemoglobin (HbAlc) level became and remained normal posttransplant. FIG. 9C illustrates continued weight gain posttransplant. FIG. 9D shows that in a cohort C monkey, strongly positive posttransplant fasting and random serum C-peptide levels and their increase after stimulation throughout the 1-year follow-up confirmed stable islet allograft function. FIG. 9E shows that in that recipient, stable posttransplant blood glucose disappearance rates (Kg) after IV challenge with glucose were observed that were comparable with the pre-STZ rate. FIG. 9F shows the C-peptide levels derived from matching tests showed substantial increases of >1 ng/mL throughout the posttransplant course.

FIGS. 10A-10C show histopathologic analysis of a liver from an animal that received preparatory and tolerizing regimen comprising apoptotic leukocytes as described herein and exhibited stable normoglycemia. FIG. 10A shows that histopathologic analysis revealed numerous intact islets, with no or minimal periislet infiltration. The transplanted, intrahepatic islets showed strongly positive staining for insulin (FIG. 10B); the absence of insulin-positive islet beta cells in the native pancreas at necropsy (FIG. 10C) indicated that posttransplant normoglycemia reflected graft function and was not due to remission after STZ-induced diabetes.

FIG. 11A provides pre- and postprandial blood glucose (solid and dashed lines, respectively) and daily insulin (bars). FIG. 11B demonstrates positive and stable C-peptide levels (fasted, random, and mixed meal-stimulated) throughout follow-up. FIG. 11C shows restoration of near-normal HbA1c levels throughout follow-up. FIG. 11D shows continued weight gain posttransplant, indicating that posttransplant euglycemia is not due to a malabsorptive state. FIG. 11E shows blood glucose before and after IV infusion of 0.5 g glucose kg–1 (IVGTT) and Kg levels before and after diabetes induction and posttransplant. FIG. 11F shows Acute C-peptide response to IV glucose (0.5 g kg–1).

FIG. 12 shows that at necropsy, histopathology confirmed rejection-free islet allograft survival in a monkey that exhibited continued islet allograft function for >2 years after discontinuation of immunosuppression. The monkey received a preparatory regimen of the disclosure.

FIG. 13A shows pre- and postprandial blood glucose levels (solid and dashed lines, respectively) and daily insulin (bars). Postprandial instability was apparent starting day 133 post-transplant with an upward trend, suggestive of allograft loss due to rejection. FIG. 13B shows C-peptide levels (fasted, random, and mixed meal-stimulated) became positive posttransplant and basal levels remained at approximately 1 ng mL-1 through day 161 posttransplant. FIG. 13C shows restoration of near-normal HbA1c levels, then increased levels beginning around day 140 with a continued upward trend. FIG. 13D shows continued weight gain posttransplant, indicating that posttransplant euglycemia is not due to a malabsorptive state. FIG. 13E shows blood glucose levels before and after IV infusion of 0.5 g glucose kg-1 (IVGTT) and Kg levels before and after diabetes induction and post-transplant. FIG. 13F shows acute C-peptide responses to IV glucose (0.5 g kg-1).

FIG. 14A shows the percentage of CD4+ T effector memory (TEM) cells in the peripheral blood lymphocytes (PBLs) measured longitudinally before and at 3, 6, and 12 months posttransplant in recipients from Cohorts B (n=7) and C (n=5). FIG. 14B shows the percentage of CD4+ TEM cells in PBLs, liver mononuclear cells (LMNCs), and lymph nodes (LNs) at termination in recipients from Cohorts B (n=3-7) and C (n=2-5). FIG. 14C shows the fold change in proliferation (compared to pretransplant levels; naive) of carboxyfluorescein diacetate succinimidyl ester (CFSE)-labeled CD4+ T cells in Cohorts B and C in response to irradiated donor PBLs before and at the indicated intervals posttransplant in a 6-day mixed lymphocyte reaction (MLR). FIG. 14D shows the percentage of circulating CD8+ TEM cells in PBLs from Cohorts B (n=7) and C (n=5). FIG. 14E shows the percentage of CD8+ TEM cells in PBLs, LMNCs, and LNs at termination in recipients from cohorts B (n=3-7) and C (n=3-5). FIG. 14F shows the fold change in proliferation (compared to pretransplant levels; naive) of CFSE-labeled CD8+ T cells in Cohorts B and C in response to irradiated donor PBLs before and at the indicated intervals posttransplant in a 6-day MLR.

FIG. 16A demonstrates percentages of circulating natural suppressor (NS) cells. FIG. 16B demonstrates percentages of circulating Treg cells. FIG. 16C demonstrates percentages of circulating Breg cells. FIG. 16D demonstrates percentages of Breg cells in peripheral blood, liver, and lymph nodes at sacrifice.

FIG. 17A shows a gating strategy for identification of MDSC. Singlets were gated first to eliminate doublets and dead cells were excluded. Based on CD33+ and CDT1b+ coexpression, MDSCs were identified in gated CD14+ cells within the Lin–HLA-DR– population and with Lin depicting CD3–CD20– cells. Representative FACS profiles from one Cohort B (upper) and one Cohort C (lower) monkeys are shown. FIG. 17B shows a significant increase in percentage of circulating MDSC among Cohort C monkeys compared to Cohort B monkeys. FIG. 17C shows the fold-change in MFI of circulating HLA-DR+ CD1 b+ dendritic cells. FIG. 17D shows the fold-change in MFI of circulating HLA-DR+ CD14+ monocytes. FIG. 17E shows the fold-change in MFI of circulating HLA-DR+CD20+ B cells.

DETAILED DESCRIPTION OF THE DISCLOSURE

Figure 2:
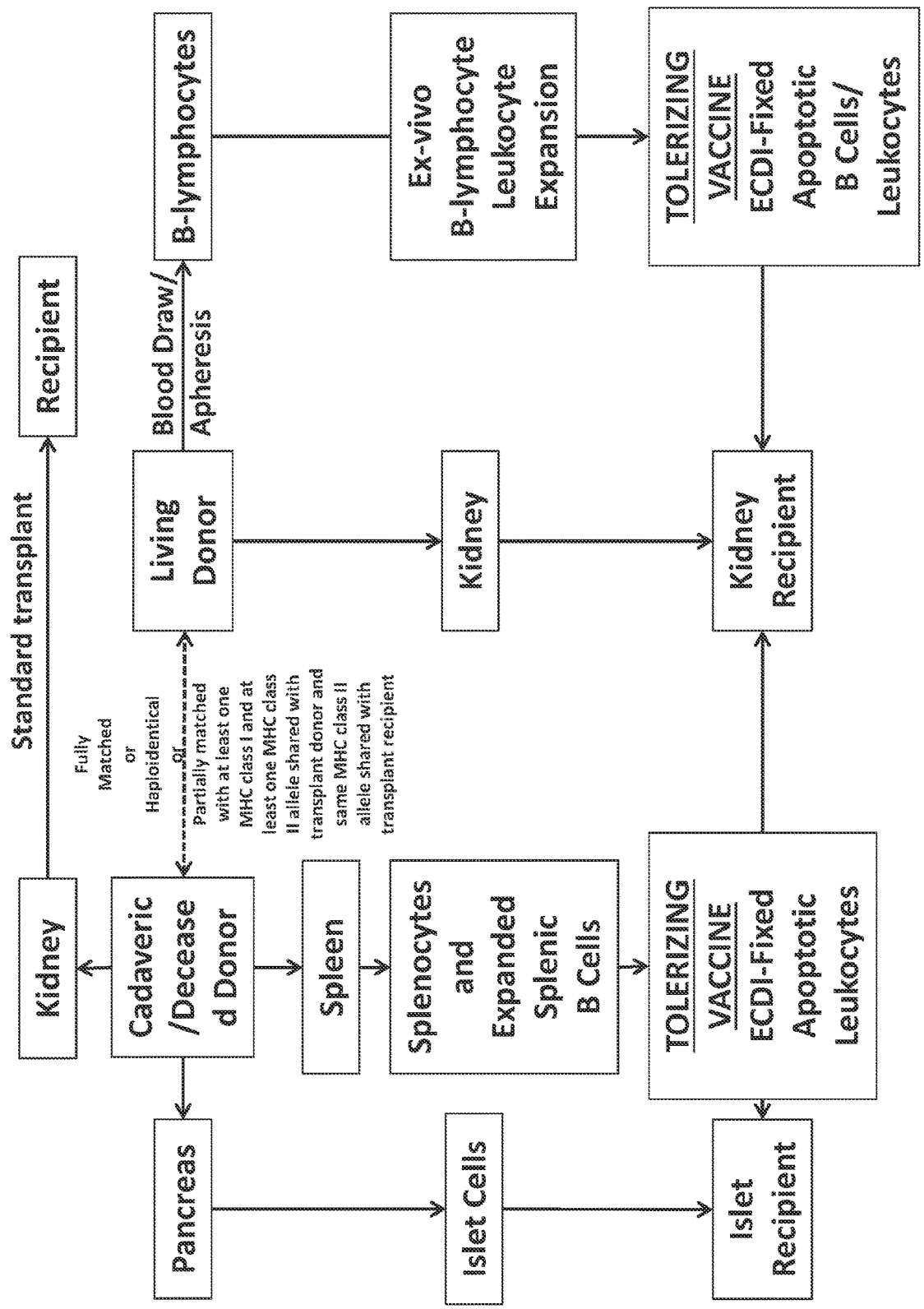
FIG. 2 is a schematic overview of protocols for tolerance induction in donor transplantation wherein the donor can be a living donor or a cadaveric donor, for instance a deceased donor.

The following discussion of the present disclosure has been presented for purposes of illustration and description. The following is not intended to limit the invention to the form or forms disclosed herein. Although the description of the present disclosure has included description of one or more embodiments and certain variations and modifications, other variations and modifications are within the scope of the present disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The section headings used herein are for organizational purposes only and are not to be construed as limiting the subject matter described.

Although various features of the disclosure may be described in the context of a single embodiment, the features can also be provided separately or in any suitable combination. Conversely, although the disclosure may be described herein in the context of separate embodiments for clarity, various aspects and embodiments can be implemented in a single embodiment.

The practice of some embodiments disclosed herein employ, unless otherwise indicated, conventional techniques of immunology, biochemistry, chemistry, molecular biology, microbiology, cell biology, genomics and recombinant DNA, which are within the skill of the art. See for example Sambrook and Green, Molecular Cloning: A Laboratory Manual, 4th Edition (2012); the series Current Protocols in Molecular Biology (F. M. Ausubel, et al. eds.); the series Methods In Enzymology (Academic Press, Inc.), PCR 2: A Practical Approach (M. J. MacPherson, B. D. Hames and G. R. Taylor eds. (1995)), Harlow and Lane, eds. (1988) Antibodies, A Laboratory Manual, and Culture of Animal Cells: A Manual of Basic Technique and Specialized Applications, 6th Edition (R. I. Freshney, ed. (2010)).

Definitions

The following definitions supplement those in the art and are directed to the current application and are not to be imputed to any related or unrelated case, e.g., to any commonly owned patent or application. Although any methods and materials similar or equivalent to those described herein can be used in the practice for testing of the present disclosure, the preferred materials and methods are described herein. Accordingly, the terminology used herein is for the purpose of describing particular embodiments only, and is not intended to be limiting.

In this application, the use of the singular includes the plural unless specifically stated otherwise. It must be noted that, as used in the specification, the singular forms "a," "an" and "the" include plural referents unless the context clearly dictates otherwise. Furthermore, use of the term "including" as well as other forms, such as "include", "includes," and "included," is not limiting.

The terms "and/or" and "any combination thereof" and their grammatical equivalents as used herein, can be used interchangeably. These terms can convey that any combination is specifically contemplated. Solely for illustrative purposes, the following phrases "A, B, and/or C" or "A, B, C, or any combination thereof" can mean "A individually; B individually; C individually; A and B; B and C; A and C; and A, B, and C."

The term "or" can be used conjunctively or disjunctively, unless the context specifically refers to a disjunctive use.

The term "about" or "approximately" means within an acceptable error range for the particular value as determined by one of ordinary skill in the art, which can depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. It is contemplated that any embodiment discussed in this specification can be implemented with respect to any method or composition of the invention, and vice versa. Furthermore, compositions of the invention can be used to achieve methods of the invention.

Reference in the specification to "some embodiments," "an embodiment," "one embodiment" or "other embodiments" means that a particular feature, structure, or characteristic described in connection with the embodiments is included in at least some embodiments, but not necessarily all embodiments, of the inventions.

The term "transplant" and its grammatical equivalents as used herein encompasses any procedure that involves transplantation, implantation, or infusion of cells, tissues, or organs from a donor into a recipient. Non-limiting exemplary types of transplant include autotransplant, autograft, allotransplant, allograft, isotransplant, isograft, xenotransplant, xenograft, and split graft, and domino transplant. In an embodiment, the term "split graft" encompasses any procedure that involves the transplantation of cells, organs, tissues, or even particular proteins from a donor is split into more than one recipient.

The term "autotransplantation", "autotransplant", "autograft" or grammatical equivalents as used herein encompasses any procedure that involves the transplantation of organs, tissues, cells or even particular proteins, or expression products from one part of the body to another in the same subject. In an embodiment, the subject is a member of a Laurasiatheria super order. In an embodiment, the subject is an ungulate for instance a pig, giraffe, camel, deer or bovine. In an embodiment, the subject is a human or non-human primate. The autologous tissue (also called autogenous, autogeneic, or autogenic tissue) transplanted by such a procedure is called an autograft or autotransplant.

The term "allotransplantation", "allotransplant", "allograft" or their grammatical equivalents as used herein encompasses any procedure that involves transplantation, implantation, or infusion of cells, tissues, or organs into a recipient, where the recipient and donor are the same species. In an embodiment, the recipient and/or donor are a member of a Laurasiatheria super order. In an embodiment, the recipient and/or donor are ungulates for instance pig, giraffe, camel, deer or bovine. In an embodiment, the cells, tissues, or organs described herein are transplanted into humans or non-human primates. Allotransplantation includes but is not limited to vascularized allotransplant, partially vascularized allotransplant, unvascularized allotransplant, allodressings, allobandages, and allostructures. In some cases, an allotransplant is an isograft or isotransplant in which organs or tissues are transplanted from a donor to a genetically identical recipient (such as an identical twin).

The term "xenotransplantation", "xenotransplant", "xenograft" or its grammatical equivalents as used herein encompasses any procedure that involves transplantation, implantation, or infusion of cells, tissues, or organs into a recipient, where the recipient and donor are different species. In an embodiment, the recipient and/or donor are a member of a Laurasiatheria super order. In an embodiment, the recipient and/or donor is an ungulate, for instance a pig, giraffe, camel, deer or bovine. In an embodiment, the donor is a pig, and the recipient is a human or non-human primate. In an embodiment, the cells, tissues, or organs described herein are transplanted into humans or non-human primates. Xenotransplantation includes but is not limited to vascularized xenotransplant, partially vascularized xenotransplant, unvascularized xenotransplant, xenodressings, xenobandages, and nanostructures.

The term "transplant rejection" and its grammatical equivalents as used herein can refer to a process or processes by which an immune response of an organ transplant recipient mounts a reaction against the transplanted material (e.g., cells, tissues, and/or organs) sufficient to impair or destroy the function of the transplanted material.

The term "hyperacute rejection" and its grammatical equivalents as used herein can refer to rejection of a transplanted material or tissue occurring or beginning within the first 24 hours after transplantation. For example, hyperacute rejection can encompass but is not limited to "acute humoral rejection" and "antibody-mediated rejection".

The term "antibody" as used herein includes IgG (including IgG1, IgG2, IgG3, and IgG4), IgA (including IgA1 and IgA2), IgD, IgE, or IgM, and IgY, and is meant to include whole antibodies, including single-chain whole antibodies, and antigen-binding (Fab) fragments thereof. Antigen-binding antibody fragments include, but are not limited to, Fab, Fab' and F(ab')$_2$, Fd (consisting of VH and CH1), single-chain variable fragment (scFv), single-chain antibodies, disulfide-linked variable fragment (dsFv) and fragments comprising either a VL or VH domain. The antibodies can be from any animal origin. Antigen-binding antibody fragments, including single-chain antibodies, can comprise the variable region(s) alone or in combination with the entire or partial of the following: hinge region, CH1, CH2, and CH3 domains. Also included are any combinations of variable region(s) and hinge region, CH1, CH2, and CH3 domains. Antibodies can be monoclonal, polyclonal, chimeric, humanized, and human monoclonal and polyclonal antibodies.

"Improving," "enhancing," "bettering," and its grammatical equivalents as used herein can mean any improvement recognized by one of skill in the art. For example, improving transplantation can mean lessening hyperacute rejection, which can encompass a decrease, lessening, or diminishing of an undesirable effect or symptom.

The term "islet", "islet cells", "islet equivalent", "islet-like cells", "pancreatic islets," "native islet cells," "non-native islet cells", "islet like cell clusters" and their grammatical equivalents as used herein refers to endocrine (e.g., hormone-producing) cells present in the pancreas of an organism, or cells that mimic one or more function of cells present in the pancreas of an organism. For example, islet cells can comprise different types of cells, including, but not limited to, pancreatic α cells, pancreatic β cells, pancreatic δ cells, pancreatic F cells, and/or pancreatic E cells. Islet cells can also refer to a group of cells, cell clusters, or the like, including cells cultured in vitro. In some embodiments, islet cells are extracted from an islet donor and implanted or transplanted at a predetermined site of an islet recipient for differentiation, expansion, and vascularization to form a therapeutic dose of β-cell mass by methods, systems, and/or reagents described herein. In an embodiment, the predetermined site is a renal subcapsular space of the islet recipient. In some embodiments, islet cells extracted from the donor are implanted or transplanted to the recipient under the cover of transient immunosuppression. The islets of Langerhans are the regions of the pancreas that contain the endocrine (e.g., hormone-producing) cells (e.g., beta cells). In some embodiments, provided herein are neonatal islet cluster (NICC) or neonatal porcine islet (NPI) comprising pancreas lineage cells (e.g., beta-like cells or a cell population comprising beta-like cells) isolated from a donor by methods, systems, and/or reagents described herein. In some embodiments, NICCs or NPIs are extracted from an islet donor and implanted or transplanted at a predetermined site of an islet recipient for differentiation, expansion, and vascularization to form a therapeutic dose of β-cell mass by methods, systems, and/or reagents described herein. In an embodiment, the predetermined site is a renal subcapsular space of the islet recipient. In some embodiments, NICCs or NPIs extracted from the donor are implanted or transplanted to the recipient under the cover of transient immunosuppression. In some embodiments islet cells can be stem cell-derived islet cells, induced pluripotent stem cell-derived islet cells, transdifferentiated, or surrogate islet cells. A "donor" is meant to include any mammalian organism, human or non-human, that can serve as a source of donor tissue or cells for transplantation and/or for inducing donor cell tolerance. Non-human mammals include, but are not limited to, ungulates, such as an even-toed ungulate (e.g., pigs, peccaries, hippopotamuses, camels, llamas, chevrotains (mouse deer), deer, giraffes, pronghorn, antelopes, goat-antelopes (which include sheep, goats and others), or cattle) or an odd-toed ungulate (e.g., horse, tapirs, and rhinoceroses), a non-human primate (e.g., a monkey, or a chimpanzee), a Canidae (e.g., a dog) or a cat. A non-human animal can be a member of the Laurasiatheria superorder. The donor can be a living donor or a cadaveric donor. In some cases, the donor is a living donor. In some cases, the donor is a cadaveric donor. The cadaveric donor may be, for example, a brain dead, heart beating donor (BDD). The cadaveric donor may be, for example, a non-heart beating donor (NHBD). Whether the donor is a living donor or a cadaveric donor (e.g., a BDD or NHBD), the donor can be from any animal, for example, a human or non-human animal. The donor can be in any stage of development, including, but not limited to fetal, perinatal, neonatal, pre-weaning, post-weaning, juvenile, young adult, or adult. A donor of cells used in the preparation of a tolerizing vaccine or preparatory regimen can be fully or partially MHC (major histocompatibility complex) matched to a transplant donor (e.g., a donor of cells, tissues, or organs used for transplantation). In some cases, the partially matched donor is haploidentical to the transplant donor. In some cases, the partially matched donor shares one or more MHC alleles with a transplant donor. For example, the partially matched donor can share one or more of a MHC class I A allele, a MHC class I B allele, a MHC class I C allele, a MHC class II DR allele, a MHC class II DQ allele, a MHC class II DP allele, or a combination thereof with a transplant donor. In some cases, the partially matched donor can share one or more of a MHC class I A allele, a MHC class I B allele, a MHC class II DR allele, a MHC class II DQ allele, a MHC class II DP allele, or a combination thereof with a transplant donor. The partially matched donor can share one DR allele with the transplant donors.

A "recipient" can be a human or non-human animal that can receive, is receiving, or has received a transplant graft, a tolerizing vaccine, a preparatory regimen for transplantation, and/or other compositions provided in the present disclosure. A recipient can also be in need of a transplant graft, a tolerizing vaccine, a preparatory regimen for transplantation, and/or other compositions provided herein. In some cases, the recipient can be a human or non-human animal that can receive, is receiving, or has received a transplant graft. In some cases, the recipient can be a human or non-human animal that can receive, is receiving, or has received the presently described tolerizing vaccine or preparatory regimen for transplantation.

The term "non-human animal" and its grammatical equivalents as used herein includes all animal species other than humans, including non-human mammals, which can be a native animal or a genetically modified non-human animal. A non-human mammal includes, an ungulate, such as an even-toed ungulate (e.g., pigs, peccaries, hippopotamuses, camels, llamas, chevrotains (mouse deer), deer, giraffes, pronghorn, antelopes, goat-antelopes (which include sheep, goats and others), or cattle) or an odd-toed ungulate (e.g., horse, tapirs, and rhinoceroses), a non-human primate (e.g., a monkey, or a chimpanzee), a Canidae (e.g., a dog) or a cat. A non-human animal can be a member of the Laurasiatheria superorder. The Laurasiatheria superorder can include a group of mammals as described in Waddell et al., Towards Resolving the Interordinal Relationships of Placental Mammals. Systematic Biology 48 (1): 1-5 (1999). Members of the Laurasiatheria superorder can include Eulipotyphla (hedgehogs, shrews, and moles), Perissodactyla (rhinoceroses, horses, and tapirs), Carnivora (carnivores), Cetartiodactyla (artiodactyls and cetaceans), Chiroptera (bats), and Pholidota (pangolins). A member of Laurasiatheria superorder can be an ungulate described herein, e.g., an odd-toed ungulate or even-toed ungulate. An ungulate can be a pig. A member can be a member of Carnivora, such as a cat, or a dog. In some cases, a member of the Laurasiatheria superorder can be a pig.

The term "porcine", "porcine animal", "pig" and "swine" and its grammatical equivalents as used herein can refer to an animal in the genus Sus, within the Suidae family of even-toed ungulates. For example, a pig can be a wild pig, a domestic pig, a mini pig, a *Sus scrofa* pig, a *Sus scrofa domesticus* pig, or inbred pigs.

The term "fetal animal" and its grammatical equivalents can refer to any unborn offspring of an animal. In some cases, pancreatic cell or tissue are isolated from 6 weeks old embryonic pig for transplantation. The term "perinatal animal" and its grammatical equivalents can refer to an animal immediately before or after birth. For example, a perinatal period can start from 20th to 28th week of gestation and ends 1 to 4 weeks after birth. The term "neonatal animal" and its grammatical equivalents can refer to any new born animals. For example, a neonatal animal can be an animal within a month of birth. The term "pre-weaning non-human animal" and its grammatical equivalents can refer to any animal before being withdrawn from the mother's milk. The term "juvenile animal" and its grammatical equivalents can refer to any animal before becoming a young adult animal. For example, a juvenile stage of pigs can refer to any pigs of 2 years of age or younger.

The term "genetically modified", "genetically engineered", "transgenic", "genetic modification" and its grammatical equivalents as used herein refer to having one or more alterations of a nucleic acid, e.g., the nucleic acid within an organism's genome. For example, genetic modification can refer to alterations, additions, and/or deletion of genes. A genetically modified cell can also refer to a cell with an added, deleted and/or altered gene. A genetically modified cell can be from a genetically modified non-human animal. A genetically engineered cell from a genetically engineered non-human animal can be a cell isolated from such genetically engineered non-human animal. A genetically modified cell from a genetically modified non-human animal can be a cell originated from such genetically modified non-human animal. A genetically engineered cell or a genetically engineered animal can comprise a transgene, or other foreign DNA, added or incorporated, or an endogenous gene modified, including, targeted, recombined, interrupted, deleted, disrupted, replaced, suppressed, enhanced, or otherwise altered, to mediate a genotypic or phenotypic effect in at least one cell of the animal, and typically into at least one germ line cell of the animal.

The term "transgene" and its grammatical equivalents as used herein can refer to a gene or genetic material that can be transferred into an organism. For example, a transgene can be a stretch or segment of DNA containing a gene that is introduced into an organism. The gene or genetic material can be from a different species. The gene or genetic material can be synthetic. When a transgene is transferred into an organism, the organism can then be referred to as a transgenic organism. A transgene can retain its ability to produce RNA or polypeptides (e.g., proteins) in a transgenic organism. A transgene can comprise a polynucleotide encoding a protein or a fragment (e.g., a functional fragment) thereof. The polynucleotide of a transgene can be an exogenous polynucleotide. A fragment (e.g., a functional fragment) of a protein can comprise at least or at least about 5%, 10%, 20%, 30%, 40%, 50%, 60%, 70%, 80%, 90%, 95%, or 99% of the amino acid sequence of the protein. A fragment of a protein can be a functional fragment of the protein. A functional fragment of a protein can retain part or all of the function of the protein. An exogenous polypeptide can encode an exogenous protein or a functional fragment thereof.

The term "exogenous nucleic acid sequence", "exogenous polynucleotide" and its grammatical equivalents as used herein can refer to a gene or genetic material that was transferred into a cell or animal that originated outside of the cell or animal. An exogenous nucleic acid sequence can by synthetically produced. An exogenous nucleic acid sequence can be from a different species, or a different member of the same species. An exogenous nucleic acid sequence can be another copy of an endogenous nucleic acid sequence.

The term "gene knock-out" or "knock-out" can refer to any genetic modification that reduces the expression of the gene being "knocked out." Reduced expression can include no expression. The genetic modification can include a genomic disruption.

The term "disrupting" and its grammatical equivalents as used herein can refer to a process of altering a gene, e.g., by deletion, insertion, mutation, rearrangement, or any combination thereof. For example, a gene can be disrupted by knockout. Disrupting a gene can be partially reducing or completely suppressing expression (e.g., mRNA and/or protein expression) of the gene. Disrupting can also include inhibitory technology, such as shRNA, siRNA, microRNA, dominant negative, or any other means to inhibit functionality or expression of a gene or protein.

The term "gene editing" and its grammatical equivalents as used herein can refer to genetic engineering in which one or more nucleotides are inserted, replaced, or removed from a genome. For example, gene editing can be performed using a nuclease (e.g., a natural-existing nuclease or an artificially engineered nuclease).

As used herein, the term "guide RNA" and its grammatical equivalents can refer to an RNA which can be specific for a target DNA and can form a complex with Cas protein. An RNA/Cas complex can assist in "guiding" Cas protein to a target DNA.

The term "condition" and its grammatical equivalents as used herein can refer to a disease, event, or change in health status.

The term "diabetes" and its grammatical equivalents as used herein can refer to is a disease characterized by high blood sugar levels over a prolonged period. For example, the term "diabetes" and its grammatical equivalents as used herein can refer to all or any type of diabetes, including, but not limited to, type 1, type 2, type 3c (pancreatogenic diabetes including cystic fibrosis-related, and surgical, and hemochromatosis-related), gestational diabetes, and monogenic diabetes (HNF1A-MODY, GCK-MODY 2, etc.), and other forms of mitochondrial diabetes. In some cases, diabetes can be a form of hereditary diabetes.

The term "phenotype" and its grammatical equivalents as used herein can refer to a composite of an organism's observable characteristics or traits, such as its morphology, development, biochemical or physiological properties, phenology, behavior, and products of behavior. Depending on the context, the term "phenotype" can sometimes refer to a composite of a population's observable characteristics or traits.

Some numerical values disclosed throughout are referred to as, for example, "X is at least or at least about 100; or 200 [or any numerical number]." This numerical value includes the number itself and all of the following:
  i) X is at least 100;
  ii) X is at least 200;
  iii) X is at least about 100; and
  iv) X is at least about 200.

All these different combinations are contemplated by the numerical values disclosed throughout. All disclosed numerical values should be interpreted in this manner, whether it refers to an administration of a therapeutic agent or referring to days, months, years, weight, dosage amounts, etc., unless otherwise specifically indicated to the contrary.

The ranges disclosed throughout are sometimes referred to as, for example, "X is administered on or on about day 1 to 2; or 2 to 3 [or any numerical range]." This range includes the numbers themselves (e.g., the endpoints of the range) and all of the following:
  i) X being administered on between day 1 and day 2;
  ii) X being administered on between day 2 and day 3;
  iii) X being administered on between about day 1 and day 2;
  iv) X being administered on between about day 2 and day 3;
  v) X being administered on between day 1 and about day 2;
  vi) X being administered on between day 2 and about day 3;
  vii) X being administered on between about day 1 and about day 2; and
  viii) X being administered on between about day 2 and about day 3.

All these different combinations are contemplated by the ranges disclosed throughout. All disclosed ranges should be interpreted in this manner, whether it refers to an administration of a therapeutic agent or referring to days, months, years, weight, dosage amounts, etc., unless otherwise specifically indicated to the contrary.

Transplant Immunomodulation

Described herein are compositions, systems, and methods for inducing graft tolerance. In particular, the present disclosure relates to administering a tolerizing vaccine or a preparatory regimen before, during, and/or after administration of donor transplant cells, tissue(s), or organ(s). The tolerizing vaccine or preparatory regimen can induce tolerance to the allograft or xenograft in the graft recipient.

An organ, tissue, or cell can be differentiated from stem cells, grown de novo, or isolated from an animal (e.g., a human or non-human animal) and can be transplanted into a recipient in need of a transplant from the same species (an allotransplant) or a different species (a xenotransplant). The donor of the organ, tissue, or cell can be referred to herein as a transplant donor. The transplanted organ, tissue, or cell can be referred to herein as a transplant or a graft.

The donor of transplant or graft can be any animal, including human and non-human animals. In some cases the donor is a human. In some cases, the transplant donor is a non-human animal. The transplant donor (e.g., a non-human animal donor) can be genetically modified, for example, to reduce or eliminate the likelihood that the transplant or graft can be recognized by the recipient's immune system, or to reduce the immune response by the recipient's immune system upon recognizing the transplant or graft.

The donor of a transplant or graft can be a living donor or a cadaveric donor. In some cases, the transplant donor is a living donor. In some cases, the transplant donor is a cadaveric donor. The cadaveric donor may be a brain dead, heart beating donor (BDD). Alternatively, the cadaveric donor may be a non-heart beating donor (NHBD). Whether the transplant donor is a living donor or a cadaveric donor (e.g., a BDD or NHBD), the donor can be from any animal, for example, a human or non-human animal.

The donor of a transplant or graft can be at any age or stage of development. For example, the transplant donor can be a fetal, perinatal, neonatal, pre-weaning, post-weaning, juvenile, young adult, or adult human or animal.

Transplants or grafts can be used to treat diseases or disorders in recipients in need thereof. Suitable diseases that can be treated are any in which an organ, tissue, or cell of a recipient is defective or injured, and the recipient can be treated by transplantation of an organ, tissue, or cell (e.g., a kidney, heart, lung, liver, vein, skin, endocrine pancreas, pancreatic islet cell, or a combination thereof). In some cases, the transplant comprises a kidney, liver, heart, lung, pancreas, endocrine pancreas, islet cell, small bowel, bone marrow, hematopoietic stem cell, embryonic or induced pluripotent stem cell-derived cells such as islet beta cells or hepatocytes, embryonic or induced pluripotent stem cell-derived islet, embryonic or induced pluripotent stem cell-derived hepatocyte, or a combination thereof.

Transplant/Graft Rejection

Transplant/graft rejection can involve recognition of donor-specific antigens, for example, recognition of donor-specific antigens presented to T cells by host antigen presenting cells (indirect) or donor antigen presenting cells (direct). T cell activation in response to donor-specific antigens can lead to a pro-inflammatory response and transplant rejection.

Transplant/graft rejection can be prevented by methods that temper the immune response, including those described herein. A tolerizing vaccine or preparatory regimen of the disclosure can be used to prevent transplant rejection or delay rejection, for example, by reducing a pro-inflammatory immune response to the transplant, and/or enhancing a tolerance-promoting immune response. In some cases, a tolerizing vaccine or preparatory regimen of the disclosure can circumvent the need for long-term immunosuppression of the recipient.

Transplant rejection (e.g., T cell-mediated transplant rejection) can be prevented by chronic immunosuppression with one or more immunomodulatory molecules. However, immunosuppression is costly and associated with the risk of serious side effects. To circumvent the need for chronic immunosuppression, a multifaceted, T cell-targeted rejection prophylaxis was developed as described in WO 2016/094679; U.S. Pub. No. 20160165861); and WO 2017/218714, each of which is herein incorporated by reference in its entirety. In some embodiments, T cell-targeted rejection prophylaxis (i) utilizes genetically modified grafts lacking functional expression of MHC class I, thereby interfering with activation of CD8+ T cells with direct specificity and precluding cytolytic effector functions of these CD8+ T cells, (ii) interferes with B cell (and other APC)-mediated T cell priming, and memory generation of anti-donor T cells using induction immunotherapy comprising an antagonistic anti-CD40 mAb, a B-cell targeting agent (e.g., a B cell depleting biologic, for example, a biologic targeting CD20, CD19, or CD22, and/or a B cell modulating biologic, for example, a biologic targeting BAFF, BAFF/APRIL, CD40, IgG4, ICOS, IL-21, B7RP1), an mTOR inhibitor, a TNF-alpha inhibitor, a IL-6 inhibitor, a nitrogen mustard alkylating agent (e.g., cyclophosphamide), a complement C3 or C5 inhibitor, or a combination thereof, and/or (iii) depletes anti-donor T cells with indirect specificity via peritransplant infusions of apoptotic donor cell vaccines (i.e., tolerizing vaccines). In some cases, a B-cell targeting agent can be an anti-CD20 mAb, Rituximab, and/or a B cell depleting antibody.

In some embodiments, a method described herein to prevent transplantation rejection or prolong the time to transplantation rejection without or with minimal immunosuppressive drug use (e.g., one or more immunomodulatory molecules) involves using a genetically modified animal as a cell, organ, or tissue donor. The cells, organs, and/or tissues of the altered donor animal, e.g., a donor non-human animal, can be harvested and used in allografts or xenografts. Alternatively, a cell, organ, or tissue can be extracted from an animal, and used to generate a genetically-altered cell, organ or tissue. In some cases, primary cells can be extracted from an animal, and used to make genetically altered cells. In some cases, a cell, organ, or tissue derived from an animal (e.g., a cell line) can be used to create a genetically altered cell, organ, or tissue.

Transplant rejection can also be reduced or eliminated by inducing tolerance to a transplant or graft using a tolerizing vaccine or preparatory regimen.

Inducing Tolerance

Provided herein are methods and regimens of inducing tolerance to a cell, tissue, or organ transplant. As used herein, the term "tolerance" or "immune tolerance" refers to a state of unresponsiveness of the immune system to substances or tissues that have the capacity to elicit an immune response. The Compositions, the preparatory regimen or tolerizing regimen of the disclosure are useful for achieving tolerance or partial tolerance against the transplant upon transplantation of said transplant. As used herein, a "partial tolerance" is a partial immune tolerance results in a reduced or inhibited immune response. In some embodiments, provided herein are methods and regimens for inhibiting immune response and/or inhibiting occurrence or GVHD. As used herein, the term "immune response" includes T cell mediated and/or B cell mediated immune responses. Exemplary immune responses include T cell responses, e.g., cytokine production and cellular cytotoxicity, in addition, the term immune response includes immune responses that are indirectly effected by T cell activation, e.g., antibody production (humoral responses) and activation of cytokine responsive cells, e.g., macrophages. Immune cells involved in the immune response include lymphocytes, such as B cells and T cells (CD4+, CD8+, Th1 and Th2 cells); antigen presenting cells (e.g. professional antigen presenting cells such as dendritic cells); natural killer cells; myeloid cells, such as macrophages, eosinophils, mast cells, basophils, and granulocytes. For instance, immune responses are involved in transplant rejection, as well as in the concomitant physiological result of such immune responses, such as for example, interstitial fibrosis, chronic graft arteriosclerosis, or vasculitis.

Thus, subjects who are administered the apoptotic cells such as leukocytes and other compositions disclosed herein or preparatory regimen or tolerizing regimen in comparison relative to subjects who are not administered the apoptotic leukocytes and other compositions disclosed herein or preparatory regimen or tolerizing regimen, exhibit, for example: a) a decreased level of an immune response against the transplant (thought to be mediated at least in part by B cell mediated immune responses, more particularly donor-specific antibodies); b) a delay in the onset or progression of an immune response against the transplant; c) a reduced risk of the onset or progression of an immune response against the transplant; or d) an inhibition in occurrence or reduced risk of occurrence of GVHD.

As used herein, the term "preventing or reducing transplant rejection" is meant to encompass prevention or inhibition of immune transplant rejection, as well as delaying the onset or the progression of immune transplant rejection. The term is also meant to encompass prolonging survival of a transplant in a patient, or reversing failure of a transplant in a patient. Further, the term is meant to encompass ameliorating a symptom of an immune transplant rejection, including, for example, ameliorating an immunological complication associated with immune rejection, such as for example, interstitial fibrosis, chronic graft arteriosclerosis, or vasculitis. Accordingly, 'inducing tolerance" can refer can be change in the level of an immune cell (e.g., increase in number of tolerogenic APC, increase in number of Tregs, increase in number of Tr1 cells, decrease in CD4+, CD8+ and/or CD20+ cells), a change in level of immunomodulatory molecules (e.g., increase in IL-10 and TGF-$\beta$), or a combination thereof. In some embodiments, modulation of immune response can be suppression of immune response or immunosuppression. As used herein, the terms level, number, count and concentration can be used interchangeably.

The term "immunomodulatory molecule" as used herein refers to any molecule which is capable of effecting the proliferation or activation of the cells of a subject's immune system. Such molecules include, without limitation, prostaglandin E2 (PGE2), transforming growth factor-$\beta$ (TGF-$\beta$), indoleamine 2,3-dioxygenase (IDO), nitric oxide, hepatocyte growth factor (HGF), interleukin 6 (IL-6) and interleukin 10 (IL-10).

It will be appreciated by those skilled in the art that both a cell culture system and the immune system of a subject comprise basal levels of immune cells and immunomodulatory molecules. The phrases basal level and normal level can be used interchangeably. As used herein, the basal level of a type of immune cell, or a immunomodulatory molecule, refers to the average number of that cell type, or immunomodulatory molecule, present in a population of individuals under a certain reference state (e.g., in an healthy individual, before transplantation, before administration of the apoptotic cell such as leukocyte composition or preparatory regimen or tolerizing regimen disclosed herein, or before administration of a immunosuppressive therapy, or combination thereof) or the basal level of a type of immune cell, or an immunomodulatory molecule, refers to the average level of that cell type, or immunomodulatory molecule, present in a population of cells that is not-activated. Those skilled in the art are capable of determining a level of a particular immune cell in a population of such cells, or a in a biological sample. As used herein, the term "biological sample" has its general meaning in the art and refers to any sample which may be obtained from a subject (e.g., a recipient of a transplant) for the purpose of in vitro evaluation. A preferred biological sample is a blood sample (e.g. whole blood sample, serum sample, or plasma sample).

Methods to measure immune cells are well known in the art including methods based on identifying expression of specific surface marker proteins e.g., by flow cytometry. Level of immune cell can be measure, for example, by measuring proliferation by 3H-Thymidine Uptake, Bromodeoxyuridine Uptake (BrdU), ATP Luminescence, Fluorescent Dye Reduction (carboxyfluorescein succinimidyl ester (CFSE)-like dyes); cytokine measurement, for example, using Multi-Analyte ELISArray Kits, bead-based multiplex assay; measuring surface antigen expression, for example, by flow cytometry; measuring cell cytotoxicity, for example, by Two-Label Flow Cytometry, Calcein AM Dye Release, Luciferase Transduced Targets, or Annexin V. Methods to measure T-cell responses and B-cell responses are well known in the art, for example see Expert Rev. Vaccines 9(6), 595-600 (2010), mBio. 2015 July-August; 6(4).

The reference level or basal level of a cell or molecule can be a specific amount (e.g., a specific concentration) or it can encompass a range of amounts. Basal levels, or ranges, of immune cells and immunoregulatory molecules are known to those in the art. For example, in a healthy individual, the normal level of CD4+ T-cells present in human blood is 500-1500 cells/ml. Basal levels of cells can also be reported as a percentage of a total cell population.

Immune cell number and function, for example may be monitored by assays that detect immune cells by an activity such as cytokine production, proliferation, or cytotoxicity. For example, Lymphoproliferation Assay, which assays the ability of T cells to proliferate in response to an antigen can be used as an indicator of the presence of antigen-specific CD4+ helper T cells. Typically, the specimen of purified T cells or PBMCs is mixed with various dilutions of antigen or antigen in the presence of stimulator cells (irradiated autologous or HLA matched antigen-presenting cells). After 72-120 h, [3H]thymidine is added, and DNA synthesis (as a measure of proliferation) is quantified by using a gamma counter to measure the amount of radiolabeled thymidine incorporated into the DNA. A stimulation index can be calculated by dividing the number of cpm for the specimen by the number of counts per minute in a control. The proliferation assay can be used to compare T-cell responses before and after treatment with compositions of the present disclosure. Another example of assay that can be employed for detection of proliferation of immune cells (e.g., T-cell, B-cells) include use of intracellular fluorescent dye, 5,6-carboxyfluorescein diacetate succinimidyl ester (CFSE) in mixed lymphocyte reaction (CFSE-MLR) and determination of proliferating cells using flow cytometry. Another example of an assay that can be employed is detection of secreted cytokines by ELISA and ELISPOT Assays.

Cytokine secretion by immune cells in a subject (e.g., in response to a transplant) may be detected by measuring either bulk cytokine production (by an ELISA) or enumerating individual cytokine producing immune cells (by an ELISPOT assay). Macrophage activation can be determined, for example, by measuring levels of chemokines such as IL-8/CXCL8, IP-10/CXCL10, MIP-1 alpha/CCL3, MIP-1 beta/CCL4, and RANTES/CCL5, which are released as chemoattractants for neutrophils, immature dendritic cells, natural killer cells, and activated T cells. Levels of pro-inflammatory cytokines are released including IL-1 beta/IL-1F2, IL-6, and TNF-alpha or anti-inflammatory cytokines including IL-10, TGF-β can also be measured by assays well known in the art.

Provided herein are compositions, methods, and systems for inducing immune tolerance to a transplant or graft. The compositions, methods, and systems disclosed herein can comprise a tolerizing vaccine or a preparatory regimen comprising the tolerizing vaccine.

The benefits of transplantation are commonly diminished by the infectious, metabolic, and malignant burden of generalized, chronic immunosuppression. Chronic transplant rejection remains a challenge in achieving a long-term transplant success; however, use of long term immunosuppression (e.g., one or more immunomodulatory molecules) can be associated with significant risks, such as infections and drug toxicity. Compositions and methods of the disclosure can invoke long term tolerance to a transplant while avoiding long term immunosuppression. The induction of stable donor-specific immune tolerance can obviate the need for maintenance immunosuppression. Induction of transplant tolerance can improve outcomes of transplantation.

Induction of antigen-specific and stable tolerance to autoimmunity and allergy can be established via IV delivery of antigens cross-linked with 1-ethyl-3-(3-dimethylaminopropyl)-carbodiimide (ECDI) to the surface of syngeneic apoptotic cells such as leucocytes or mesenchymal stromal cells. In allotransplantation models, peri-transplantation IV infusion of ECDI-treated ADLs (apoptotic donor leukocytes) on days −7 and +1 can effectively and safely induce long-lasting tolerance to minor antigen-mismatched skin grafts, full MHC-mismatched islet allografts, and, when combined with short-term mTOR inhibitor (e.g., rapamycin, sirolimus, everolimus) also to heart allografts. IV infusion of ECDI-fixed apoptotic donor splenocytes are known to induce donor-specific tolerance to transplants such as islet and heart allografts. Donor ECDI-fixed splenocytes can undergo rapid apoptosis after IV infusion and can be quickly internalized by splenic dendritic cells (DC), which after uptake of apoptotic bodies are maturation arrested and selectively up-regulate negative, but not positive costimulatory molecules. Upon encountering such recipient DC, T cells with indirect allo-specificity can undergo rapid expansion followed by profound clonal contraction, with the remaining T cells sequestered in the spleen without trafficking to the graft or graft draining lymph nodes. Donor ECDI-fixed splenocytes not internalized by host phagocytes can weakly activate T cells with direct allo-specificity and render them resistant to subsequent stimulation (anergy). ECDI-fixed splenocytes can also induce/expand Treg and myeloid-derived suppressor cells (MDSC). Thus, mechanisms of graft protection in these models can involve deletion, anergy, and regulation of T cells of direct and indirect specificities. This antigen-specific tolerance strategy can prevent both priming of naïve T cells and also effectively control existing memory/effector CD4+ and CD8+ T cell responses.

Robust tolerance to allografts can be achieved without requiring same donor bone marrow or hematopoietic stem cell transplantation with the associated intense conditioning therapy by employing a negative vaccine strategy. An exemplary protocol can involve administering a first dose of ECDI-fixed ADLs preemptively to the quiescent immune system of the prospective recipient on e.g., day −7 relative to same-donor islet allo-transplantation on day 0 followed by a second dose of ADLs on e.g., day +1. Tolerance can be achieved and maintained for instance, for ≥1 year in non-sensitized recipients. ADL infusions added to short-term immunosuppression also change alloantigen-specific effector and regulatory immunity in hosts in a profound way.

In an exemplary embodiment, a tolerizing vaccine or preparatory regimen of the disclosure can comprise administering apoptotic donor leukocytes to a recipient, and short term immunosuppression comprising any one or more of: (i) an mTOR inhibitor, (ii) an anti-tumor necrosis factor agent or an anti-tumor necrosis factor receptor agent, (iii) an anti-interleukin 6 agent or an anti-interleukin 6 receptor agent, and (iv) an anti-CD40 agent or an anti-CD40 ligand agent. The short-term administration of these agents along with apoptotic donor leukocytes as disclosed herein can promote long-term tolerance to a transplanted cell, organ, or tissue despite not administering long term maintenance immunosuppression to the recipient.

In an exemplary embodiment, the short term immunosuppression comprises administering an mTOR inhibitor, an anti-tumor necrosis factor agent, an anti-interleukin 6 receptor agent, and an anti-CD40 agent. The short-term administration of these agents along with apoptotic donor leukocytes as disclosed herein can promote long-term tolerance to a transplanted cell, organ, or tissue despite not administering long term maintenance immunosuppression to the recipient.

In an exemplary embodiment, the short term immunosuppression comprises administering an mTOR inhibitor, a soluble tumor necrosis factor receptor, an anti-interleukin 6 receptor antibody, and an antagonistic anti-CD40 antibody. The short-term administration of these agents along with apoptotic donor leukocytes as disclosed herein can promote long-term tolerance to a transplanted cell, organ, or tissue despite not administering long term maintenance immunosuppression to the recipient.

Ex Vivo Expansion of Leukocytes

To translate a tolerance induction strategy of the disclosure to the clinical setting of living donor allotransplantation (e.g., kidney or islet allotransplantation), a clinically applicable source of leukocytes, eg donor leukocytes or stem cell derived/differentiated leukocytes can be identified that is effective in inducing donor-specific tolerance to the prospective allograft, e.g., in short-term immunosuppressed recipients. Retrieving a living donor's spleen as a source of donor leukocytes can compromise the donor's ability to thwart infection, therefore alternative sources of donor leukocytes may be preferred. For example, B lymphocytes can be taken from the donor in one or more blood draws and/or apheresis procedures and optionally expanded ex vivo, or a separate cell donor can be identified that is a suitable match or partial match to the transplant donor.

In some cases, separate donors can be used for the tolerogenic leukocytes and the allograft. For example, splenocytes from a cadaveric donor who is fully matched or partially matched (e.g., haploidentical) with the prospective living transplant donor are a clinically viable source of tolerogenic leukocytes. Upon availability of a matched, partially matched, or haploidentical spleen, a tolerization protocol can be initiated with the infusion of splenocytes on e.g., day −7 followed by the living donor transplant (e.g., a kidney transplant) on e.g., day 0 and the infusion of ex vivo expanded splenic B cells on e.g., on day +1. Tolerance induction enabled by the peri-transplantation infusion of splenocytes and/or expanded splenic B cells prepared from cadaveric donors who share one MHC class I and II haplotype with the living donor can depend on linked suppression. Regulatory cells with specificity for these self-antigens can be activated and expanded by the infusion of ADLs with a shared haplotype and can extend their influence to suppress rejection directed to the mismatched living donor antigens because these are presented along with the shared antigens on the same host antigen-presenting T cell; a phenomenon termed linked suppression.

For use in human allotransplant recipients, e.g., day −7 vaccine can be prepared from the cadaveric donor spleen and infused the same day into the prospective islet transplant recipient. This is possible in the setting of islet transplantation because isolated islets can be kept in culture for e.g., 7 days prior to transplantation. The day +1 vaccine can be based on ex vivo expanded B cells that are derived from an aliquot of the cadaveric donor spleen. For use in porcine-to-human xenotransplant, either kidney, neonatal porcine islet, or composite kidney-islet xenografts, apoptotic donor leukocytes can be derived from the graft donor, if available in sufficient numbers, or from clonal porcine donors, and expanded ex vivo if necessary.

Cells (e.g., leukocytes) used in preparing a tolerizing vaccine/regimen or preparatory regimen can be expanded ex vivo. In some cases, leukocyte cells can be expanded in vitro in the presence of one or more reagents for a predetermined amount of time prior to use as a tolerizing vaccine. For instance, the cells can be contacted with at least one cytokine for about 5, 10, 15, 20, 25, 30, 35, 40, 45, 50, 55, 60, 65, 70, 75, 80, 85, 90, 95, 100, 105, 110, 115, 120, 125, 130, 135, 140, 145, 160, 165, 170, 175, 180, 190, 200, 210, 220, 230, 240, 250, 260, 270, 280, 390, or 300 hours. In some cases, the cells can be contacted with at least one cytokine for about 10, 11, 12, 13, 14, 15, 16, 17, 18, 19, 20, 21, 22, 23, 24, 25, 26, 27, 28, 29, 30, or more days. In some cases, the cells can be contacted with at least one cytokine for about 1 to 2, 2 to 3, 3 to 4, 1 to 4, 1 to 3, or 2 to 4 weeks. In some cases, the cytokine is one or more interleukin. In some cases, the interleukin (IL) is at least one of IL-2, IL-4, IL-21, BAFF, multimer CD40L, IL-10, IL-12, and IL-15. In some cases, the cells are contacted with IL-2, IL-4, IL-21, BAFF, and multimer CD40L.

Leukocytes used in a tolerizing vaccine/regimen or preparatory regimen can comprise at least or at least about 10%, e.g., 25%, CD19 positive, CD20 positive, or CD21 positive MHC Class II positive B cells. For example, donor splenocytes can comprise at least or at least about 10%, 15%, 20%, 25%, 30%, 35% 40%, 45%, 50%, 55%, 60%, 65%, 70%, 75%, or 80% CD19, CD20, and/or CD21 positive MHC Class II positive B cells, e.g., about, at least, or at least about 10 to 20; 20 to 30; 30 to 40; 40 to 50; 50 to 60%, or 60 to 70%. In some cases, splenic B cells or leukocytes used in a tolerizing vaccine/regimen or preparatory regimen can comprise at least or at least about 60%, e.g., 90%, CD19, CD20, or CD21 positive MHC Class II positive B cells. For example, splenic B cells or leukocytes used in a tolerizing vaccine/regimen or preparatory regimen can comprise can comprise about, at least, or at least about 60%, 65%, 70%, 75%, 80%, 85%, 90% or 95% CD19, CD20, or CD21 positive MHC Class II positive B cells e.g., at least or at least about 60 to 70; 70 to 80; 80 to 90; or 90 to 95%. In some cases, donor splenocytes or leukocytes used in a tolerizing vaccine/regimen or preparatory regimen can comprise from or from about 50% to 100%, e.g., from or from about 60% to 100% or 80% to 100%, CD19, CD20, or CD21 positive MHC Class II positive B cells. In some embodiments the MHC class II is swine leukocyte antigen (SLA) Class II. In some embodiments the MHC class II is human leukocyte antigen (HLA) Class II.

In some cases, a tolerizing vaccine or preparatory regimen comprises cells from a living donor. For example, the cells can be peripheral blood leukocytes (e.g., peripheral blood B cells). The peripheral blood leukocytes can be obtained by one or more blood draws, apheresis, or any other method. The peripheral blood leukocytes can be enriched for B cells. The peripheral blood leukocytes can be used directly, or expanded ex vivo. The tolerizing vaccine or preparatory regimen can comprise directly isolated leukocytes, ex vivo expanded leukocytes, or a combination thereof. In some cases, an initial dose of a tolerizing vaccine can comprise directly isolated peripheral blood leukocytes (e.g., B cells), while subsequent doses can comprise ex vivo expanded peripheral blood leukocytes (e.g., B cells).

In some cases, a tolerizing vaccine/regimen or preparatory regimen comprises cells from a cadaveric donor. The cadaveric donor may be a brain dead, heart beating donor (BDD). Alternatively, the cadaveric donor may be a non-heart beating donor (NHBD). The donor can be from any animal, for example, a human or non-human animal. For example, the cells can be cadaveric leukocytes obtained from a spleen (e.g., splenocytes, splenic B cells), a liver, peripheral blood (including peripheral blood B cells), a lymph node, a thymus, bone marrow, or any combination thereof. In some cases, the tolerizing vaccine/regimen or preparatory regimen comprises splenic leukocytes (e.g., splenic B cells), peripheral blood leukocytes (e.g., peripheral blood B cells), or a combination thereof. The leukocytes can be used directly or expanded ex vivo. In some cases, an initial dose of a tolerizing vaccine can comprise directly isolated peripheral blood leukocytes (e.g., peripheral blood B cells), splenic leukocytes (e.g., splenic B cells), or a combination thereof; while subsequent doses can comprise ex vivo expanded peripheral blood leukocytes (e.g., peripheral blood B cells), splenic leukocytes (e.g., splenic B cells), or a combination thereof.

Cells for the preparation of a tolerizing vaccine/regimen or preparatory regimen can be stem cells, or differentiated cell types produced from stem cells (e.g., leukocytes). The stem cells can be embryonic stem cells, adult stem cells, or induced stem cells. The stem cells can be totipotent stem cells, pluripotent stem cells, or multipotent stem cells. In some cases, the stem cells are not capable of developing into a fully developed animal (e.g., a human animal). In some cases, the stem cells are induced pluripotent stem cells (iPSCs). In some cases, the stem cells can be obtained by mobilizing stem cells from the bone marrow to peripheral blood with a mobilization agent, e.g., granulocyte colony-stimulating factor (G-CSF), granulocyte macrophage colony-stimulating factor (GM-CSF), mozobil, or a combination thereof.

A donor of cells used in the preparation of a tolerizing vaccine or preparatory regimen can be fully or partially MHC (major histocompatibility complex) matched to a transplant donor (e.g., a donor of cells, tissues, or organs used for transplantation). In some cases, the partially matched donor is haploidentical to the transplant donor. In some cases, the partially matched donor shares one or more MHC alleles with a transplant donor. For example, the partially matched donor can share one or more of a MHC class I A allele, a MHC class I B allele, a MHC class I C allele, a MHC class II DR allele, a MHC class II DQ allele, a MHC class II DP allele, or a combination thereof with a transplant donor. In some cases, the one or more shared MHC alleles does not comprise MHC class I C. The partially matched donor can share one DR allele with the transplant donor.

In some cases, the partially matched donor of cells used in preparation of a tolerizing vaccine or preparatory regimen can share at least one MHC class I allele (e.g., MHC class I A allele, MHC class I B allele, MHC class I C allele) and at least one MHC class II allele (e.g., MHC class II DR allele MHC class II DQ allele, MHC class II DP) allele with a transplant donor. In some cases, the one or more shared MHC alleles does not include MHC class I C. In some cases, the partially matched donor of cells used in preparation of a tolerizing vaccine or preparatory regimen can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with a transplant donor, and at least one MHC class II allele (e.g., MHC class II DR allele, MHC class II DQ allele, MHC class II DP allele) with the transplant recipient, wherein the MHC class II allele shared with the transplant donor and transplant recipient is the same MHC class II allele. In some cases, the one or more shared MHC alleles does not include MHC class I C.

In some cases, a donor of cells can be partially or fully MHC mismatched to a transplant donor or transplant recipient. For example, in some cases, peptides derived from an MHC molecule that match the transplant donor and/or recipient can be conjugated to the ex vivo expanded donor cells as disclosed herein.

Tolerizing Vaccines/Regimen

Traditionally, a vaccine is a biological preparation that provides active acquired immunity to a particular disease in a host. A traditional vaccine can contain an agent that resembles a disease-causing pathogen, and can be made from a weakened or killed form of the pathogen, its toxins, or one of its surface proteins. The agent stimulates the host's immune system to recognize the agent as a threat, destroy it, and to further recognize and destroy any of the pathogens associated with that agent that it can encounter in the future. For example, injecting an inactivated virus with adjuvant under the skin can lead to temporary or permanent immunity to the active and/or virulent version of the virus. This can be referred to as a positive vaccine (FIG. 1).

However, inactivated cells or apoptotic cells that are injected or infused intravenously can result in immune tolerance to cells with similar cellular markers or antigens (e.g., transplanted donor cells). This can be referred to as a tolerizing vaccine (also referred to as a negative vaccine) (FIG. 1). In some embodiments, the inactivated cells or apoptotic cells can be injected or infused without an adjuvant or additional agent (e.g., one or more immunomodulatory molecules). In some embodiments, the inactive cells or apoptotic cells can be injected with an additional agent (e.g., one or more immunomodulatory molecules). In some cases, the additional agent enhances the tolerogenic properties of the tolerizing vaccine by inhibiting activation and/or maturation of antigen presenting cells.

Sources of Cells for a Tolerizing Vaccine/Regimen or Preparatory Regimen

Cells for the preparation of a tolerizing vaccine or preparatory regimen can be obtained from any source, including animals, cells lines, and/or lab-generated cells. For example, the cells can be obtained from a human or non-human animal. In another example, the cells can be from a cell line (e.g., a human or non-human cell line). In some cases, the cells are human cells. In other cases, the cells are non-human cells. In some cases, the cells are of a non-human primate. In some cases, the cells are of a member of the Laurasiatheria superorder. In some cases, the cells are of an ungulate, for instance a camelid or a pig. In some cases, the cells are of a pig. In some cases, the cells are from the same species as the transplant donor. In some cases, the cells are from the same species as the transplant recipient. In some cases, the cells are from the same species as the transplant donor and the transplant recipient. In some cases, the cells are from a different species than the transplant donor. In some cases, the cells are from a different species than the transplant recipient. In some cases, the cells are from a different species than the transplant donor and the transplant recipient.

Cells for the preparation of a tolerizing vaccine or preparatory regimen can be obtained from living donors or cadaveric donors. In some cases, the donor is a living donor. In some cases, the donor is a cadaveric donor. The cadaveric donor may be, for example, a brain dead, heart beating donor (BDD). The cadaveric donor may be, for example, a non-heart beating donor (NHBD). Whether the donor is a living donor or a cadaveric donor (e.g., a BDD or NHBD), the donor can be from any animal, for example, a human or non-human animal. In some cases, cells for the preparation of a tolerizing vaccine can be from the same donor as a graft or transplant. In some cases, cells for the preparation of a tolerizing vaccine can be from a different donor than the graft or transplant.

Cells for the preparation of a tolerizing vaccine or preparatory regimen can be obtained from a donor animal of any age or stage of development. For example, the donor animal can be a fetal, perinatal, neonatal, pre-weaning, post-weaning, juvenile, young adult, or adult animal. In some cases, non-human animals can be past weaning age. For example, donor animals can be at least or at least about six months old. In some cases, donor animals can be at least or at least about 18 months old. In some cases, cells for the preparation of a tolerizing vaccine or preparatory regimen can be obtained (for example, differentiated) from stem cells (e.g., embryonic stem cells, induced pluripotent stem cells, and/or mesenchymal stem cells).

The cells used to make a tolerizing vaccine or preparatory regimen can include one or more cells from tissues, organs, or bodily fluids. For example, the cells can be from tissues, organs, or bodily fluids including, but not limited to: brain, lung, liver, heart, spleen, pancreas, small intestine, large intestine, skeletal muscle, smooth muscle, skin, bones, adipose tissues, hairs, thyroid, trachea, gall bladder, kidney, ureter, bladder, aorta, vein, esophagus, diaphragm, stomach, rectum, adrenal glands, bronchi, ears, eyes, retina, genitals, hypothalamus, larynx, nose, tongue, spinal cord, or ureters, uterus, ovary, testis, blood, spinal fluid, lymph fluid, or a combination thereof.

The cells used to make a tolerizing vaccine or preparatory regimen can include one or more types of cells. For example, the cells can include, but are not limited to: trichocytes, keratinocytes, gonadotropes, corticotropes, thyrotropes, somatotropes, lactotrophs, chromaffin cells, parafollicular cells, glomus cells melanocytes, nevus cells, Merkel cells, odontoblasts, cementoblasts corneal keratocytes, retina Muller cells, retinal pigment epithelium cells, neurons, glias (e.g., oligodendrocyte astrocytes), ependymocytes, pinealocytes, pneumocytes (e.g., type I pneumocytes, and type II pneumocytes), clara cells, goblet cells, G cells, D cells, ECL cells, gastric chief cells, parietal cells, foveolar cells, K cells, D cells, I cells, goblet cells, paneth cells, enterocytes, microfold cells, hepatocytes, hepatic stellate cells (e.g., Kupffer cells from mesoderm), cholecystocytes, centroacinar cells, pancreatic stellate cells, pancreatic α cells, pancreatic β cells, pancreatic δ cells, pancreatic F cells (e.g., PP cells), pancreatic ε cells, thyroid (e.g., follicular cells), parathyroid (e.g., parathyroid chief cells), oxyphil cells, urothelial cells, osteoblasts, osteocytes, chondroblasts, chondrocytes, fibroblasts, fibrocytes, myoblasts, myocytes, myosatellite cells, tendon cells, cardiac muscle cells, lipoblasts, adipocytes, interstitial cells of cajal, angioblasts, endothelial cells, mesangial cells (e.g., intraglomerular mesangial cells and extraglomerular mesangial cells), juxtaglomerular cells, macula densa cells, stromal cells, interstitial cells, telocytes simple epithelial cells, podocytes, kidney proximal tubule brush border cells, sertoli cells, leydig cells, granulosa cells, peg cells, germ cells, spermatozoon ovums, lymphocytes, myeloid cells, endothelial progenitor cells, endothelial stem cells, angioblasts, mesoangioblasts, pericyte mural cells, mesenchymal stromal cells, or splenocytes (e.g., T lymphocytes, B lymphocytes, dendritic cells, microphages, leukocytes). In some cases, the cells used to make a tolerizing vaccine or preparatory regimen comprise a cell type that expresses MHC class II. In some cases, the cells used to make a tolerizing vaccine or preparatory regimen comprise a cell type that does not expresses MHC class II.

A tolerizing vaccine or preparatory regimen can comprise leukocytes. Leukocytes can include, for example, neutrophils, eosinophils, basophils, lymphocytes, monocytes, or a combination thereof. Lymphocytes can include, for example, B lymphocytes (B cells), T lymphocytes (T cells), natural killer (NK) cells, or a combination thereof.

Leukocytes in a tolerizing vaccine or preparatory regimen can be obtained from any source, including, for example, a donor, a cell line, or a differentiated stem cell. Leukocytes obtained from a donor can include leukocytes obtained from a spleen (e.g., splenocytes, splenic B cells); a liver; peripheral blood (including peripheral blood B cells); a lymph node; a thymus; bone marrow; or any other organ, tissue, or bodily fluid; or any combination thereof. In some cases, the tolerizing vaccine or preparatory regimen comprises splenic B cells, peripheral blood B cells, or a combination thereof. In some cases, the tolerizing vaccine or preparatory regimen comprises cells mobilized from the bone marrow to peripheral blood with a mobilization agent, e.g., cells mobilized with granulocyte colony-stimulating factor (G-CSF), granulocyte macrophage colony-stimulating factor (GM-CSF), mozobil, or a combination thereof. The leukocytes in the tolerizing vaccine or preparatory regimen that are obtained from a donor can comprise primary cells, cells expanded ex vivo, or a combination thereof.

Genetically Modified Cells for a Tolerizing Vaccine or Preparatory Regimen

A donor of cells used in the preparation of a tolerizing vaccine or preparatory regimen can be genetically modified. Alternatively, or additionally, cells obtained from a donor can be genetically modified ex vivo. In some cases, cell lines are genetically modified to produce cells for use in a tolerizing vaccine or preparatory regimen. The genetically modified donors and/or cells can be produced using any method known in the art, including those described herein. Regardless of whether the genetically modified cells are isolated from a genetically modified animal, produced in culture, or a combination thereof, the genetically modified cells can be of any animal species, including human and non-human animals.

Genetically modified cells used in a tolerizing vaccine or preparatory regimen can comprise one or more genetic modifications that reduce or eliminate expression or a gene or gene product (e.g., a protein). The genetic modification(s) can be modifications to the gene whose expression is reduced or eliminated. Such genes can be referred to as disrupted genes. The genetic modification(s) can also be to areas of the genome separate from the gene whose expression is reduced or eliminated (for example, modification to a promoter, enhancer, silencer, transcription factor, etc.). The genetically modified cells used in the tolerizing vaccine or preparatory regimen can comprise, for example, 1, 2, 3, 4, 5, 6, 7, 8, 9, 10, 11, 12, 13, 14, 15, 16, 17, 18, 19, or 20, or more genes whose expression is reduced or eliminated by genetic modification.

Non-limiting examples of genes whose expression can be reduced or eliminated by genetic modification in the cells used in a tolerizing vaccine or preparatory regimen include, but are not limited to: alpha 1,3 galactosyltransferase (GGTA1); putative cytidine monophosphatase-N-acetyl-neuraminic acid hydroxylase-like protein (CMAH); β1,4 N-acetylgalactosaminyltransferase (B4GALNT2); a component of a major histocompatibility complex (MHC) I-specific enhanceosome (e.g., a NOD-like receptor family CARD domain containing 5 (NLRC5)); a transporter of an MHC I-binding peptide (e.g., transporter associated with antigen processing 1 (TAP1)); complement component 3 (C3); a CXC chemokine receptor 3 ligand (CXCL3); a CXC motif chemokine ligand10 (CXCL10) gene; MHC II transactivator (MHCIITA); a MHC class I polypeptide-related sequence A (MICA) gene; a MHC class I polypeptide-related sequence B (MICB) gene; a natural killer (NK) group 2D ligand (NKG2DL); a tumor necrosis factor receptor (TNF-R); a pig endogenous retrovirus (PERV); B2M, PD-1, PD-L1 or any combination thereof.

In some cases, the genetically modified cells used in a tolerizing vaccine can comprise disruptions in one or more genes comprising GGTA1, CMAH, B4GALNT2, B2M, NLRC5 or any combination thereof. For example, the genetically modified cells used to make a tolerizing vaccine or preparatory regimen can have disrupted GGTA1 only, or disrupted CMAH only, or disrupted B4GALNT2, B2M or NLRC5 only. The genetically modified cells used to make a tolerizing vaccine or preparatory regimen can also have disrupted GGTA1 and CMAH, disrupted GGTA1 and B4GALNT2, or disrupted CMAH and B4GALNT2, or disrupted NLRC5 and B2M. The genetically modified cells used to make a tolerizing vaccine or preparatory regimen can have disrupted GGTA1, CMAH, and B4GALNT2. Without wishing to be bound by any particular theory, such disruptions can minimize or eliminate cell-mediated immunity, antibody-mediated immunity, antibody-dependent cell-mediated immunity, and/or cell-dependent antibody-mediated immunity to organ, tissue, cell, and cell line grafts (e.g., xenografts or allografts comprising the same genetic modification(s) as the cells used in the tolerizing vaccine).

Genetically modified cells used in a tolerizing vaccine or preparatory regimen can comprise, or further comprise, one or more genetic modifications that increase expression of one or more genes or gene products. The increased expression can be from zero expression, e.g., the increased expression can be of a gene or gene product that is not normally expressed in the cell without genetic modification. The increased expression can be compared to a threshold level, e.g., a level normally expressed in the cell without genetic modification. The genetic modification(s) can comprise one or more exogenous polynucleotides encoding a polypeptide (e.g., an endogenous or exogenous polypeptide).

Non-limiting examples of exogenous polynucleotides include, but are not limited to, polynucleotides encoding one or more of an MHC I formation suppressor (e.g., an infected cell protein 47 (ICP47)); a regulator of complement activation (e.g., CD46, CD55, or CD59); an inhibitory ligand for NK cells; a B7 family member (e.g., a programmed death ligand such as PD-L1 or PD-L2); a serine protease inhibitor (e.g., Spi9); a galectin; an interleukin (e.g., IL-37); a CD40: CD40L blocking agent (e.g., a CD40 antagonist polypeptide, an anti-CD40 ligand polypeptide); a Fas ligand (FasL); any functional fragment thereof; or any combination thereof. In some embodiments, an inhibitory ligand for NK cells is a human leukocyte antigen (HLA), such as human leukocyte antigen E (HLA-E), human leukocyte antigen G (HLA-G), β-2-microglobulin (B2M) or any combination thereof. In some embodiments, the HLA-G is HLA-G1, HLA-G2, HLA-G3, HLA-G4, HLA-G5, HLA-G6, HLA-G7, or any combination thereof. In some cases, galectins is galectin-1, galectin-2, galectin-3, galectin-4, galectin-5, galectin-6, galectin-7, galectin-8, galectin-9, galectin-10, galectin-11, galectin-12, galectin-13, galectin-14, or galectin-15. For example, a galectin can be galectin-9.

Generating Cells for a Tolerizing Vaccine or Preparatory Regimen

A tolerizing vaccine or preparatory regimen can comprise apoptotic cells, non-apoptotic cells, or a combination thereof. In some cases, a tolerizing vaccine or preparatory regimen comprises non-apoptotic cells. In some cases, a tolerizing vaccine or preparatory regimen comprises both apoptotic cells and non-apoptotic cells. In some cases, a tolerizing vaccine or preparatory regimen comprises apoptotic cells.

The term "anergy" can refer to the absence of a normal immune response to a particular antigen (e.g., the absence of a pro-inflammatory response). The term "T cell anergy" can refer to a tolerance mechanism in which the immune cells (e.g., T cells) are intrinsically functionally inactivated following an antigen encounter, but remain alive for an extended period of time in a hyporesponsive state. The present disclosure is not limited to any particular mechanism. Without being bound by theory, apoptotic cells can be picked up by host antigen presenting cells (e.g., in the spleen) and presented to host immune cells (e.g., T cells) in a non-immunogenic fashion that leads to induction of anergy in the immune cells (e.g., T cells). For example, apoptotic cells in a tolerizing vaccine (e.g., ECDI-treated splenocytes, leukocytes, or mesenchymal stromal cells, which can fix the cell surface and inactivate many surface molecules) can fail to stimulate activation and/or proliferation of antigen-specific normal T cell clones. Without wishing to be bound by theory, the apoptotic cells in a tolerizing vaccine can fail to provide a co-stimulatory signal to T cells. As a result, the apoptotic cells can induce a state of long-term unresponsiveness termed anergy. In some embodiments, tolerance induced by infusion of a tolerizing vaccine or preparatory regimen may be dependent on synergistic effects between an intact programmed death 1 receptor-programmed death ligand 1 signaling pathway and CD4+CD25+Foxp3+ regulatory T cells.

Cells for a tolerizing vaccine or preparatory regimen can be made apoptotic a number of different ways. For example, the cells can be contacted with a chemical (e.g., a fixative or cross-linking agent, a cellular damaging agent, or a combination thereof), to make some or all of the cells apoptotic. In another example, the cells can be irradiated (e.g., with ultraviolet radiation, gamma radiation, etc.) to make some or all of the cells apoptotic.

Cells for a tolerizing vaccine or preparatory regimen can be contacted with a chemical, such as a fixative or cross-linking agent. The contacting can make some or all of the cells apoptotic. Suitable fixatives or cross-linking agents include, but are not limited to: an amine-to-amine cross-linker, a sulfhydryl-to-sulfhydryl crosslinker, an amine-to-sulfhydryl crosslinker, an in vivo crosslinker, a sulfhydryl-to-carbohydrate crosslinker, a photoreactive crosslinker, a chemoselective ligation crosslinking agent, a carboxyl-toamine crosslinker, a carbodiimide, genipin, acrylic aldehyde, diformyl, osmium tetroxide, a diimidoester, mercuric chloride, zinc sulphate, zinc chloride, trinitrophenol (picric acid), potassium dichromate, ethanol, methanol, acetone, acetic acid, or a combination thereof.

Cells for a tolerizing vaccine or preparatory regimen can be contacted with a carbodiimide, or a carbodiimide derivative. Treatment with a carbodiimide can chemically crosslink free amine and carboxyl groups, and can effectively induce apoptosis in cells, organs, and/or tissues. The contacting can be for a predetermined amount of time. The contacting can make some or all of the cells apoptotic. The carbodiimide can comprise ethylcarbodiimide; ethylene carbodiimide; N,N'-diisopropylcarbodiimide (DIC); N,N'-dicyclohexylcarbodiimide (DCC); 1-ethyl-3-(3-dimethylaminopropyl)-carbodiimide (EDCI, EDC, ECDI, or EDAC); or a combination thereof. In some cases, the carbodiimide comprises ethylcarbodiimide. In some cases, the carbodiimide comprises ethylene carbodiimide. In some cases, the carbodiimide comprises N,N'-diisopropylcarbodiimide (DIC). In some cases, the carbodiimide comprises N,N'-dicyclohexylcarbodiimide (DCC). In some cases, the carbodiimide comprises 1-ethyl-3-(3-dimethylaminopropyl)-carbodiimide (EDCI, EDC, ECDI, or EDAC). In some cases, the tolerizing vaccine comprises cells treated with EDCI derivatives and/or functionalized EDCI.

Cells for a tolerizing vaccine or preparatory regimen can be contacted with a diimidoester. The contacting can be for a pre-determined time. The contacting can make some or all of the cells apoptotic. The diimidoester can comprise cyanuric chloride; diisocyanate; diethylpyrocarbonate (DEPC) or diethyl dicarbonate; a maleimide; benzoquinone; or a combination thereof.

Cells for a tolerizing vaccine or preparatory regimen can be contacted with an amine-to-amine crosslinker. The contacting can be for a pre-determined time. The contacting can make some or all of the cells apoptotic. In some cases, the amine-to-amine-crosslinker comprises disuccinimidyl glutarate (DSG); disuccinimidyl suberate (DSS); bis(sulfosuccinimidyl)suberate (BS3); tris-(succinimidyl) aminotriacetate (TSAT); BS(PEG)5; BS(PEG)9; dithiobis (succinimidyl propionate) (DSP); 3,3'-dithiobis (sulfosuccinimidyl propionate) (DTSSP); disuccinimidyl tartrate (DST); bis(2-(succinimidooxycarbonyloxy)ethyl) sulfone (BSOCOES); ethylene glycol bis(succinimidyl succinate) (EGS); sulfo-EGS; or any combination thereof. In some cases, the amine-to-amine crosslinker comprises an imidoester, such as dimethyl adipimidate (DMA); dimethyl pimelimidate (DMP); dimethyl suberimidate (DMS); dimethyl 3,3'-dithiobispropionimidate (DTBP); or any combination thereof. In some cases, the amine-to-amine crosslinker comprises a difluoro, such as 1,5-difluoro-2,4-dinitrobenzene (DFDNB).

Cells for a tolerizing vaccine or preparatory regimen can be contacted with a sulfhydryl-to-sulfhydryl crosslinker. The contacting can be for a pre-determined time. The contacting can make some or all of the cells apoptotic. In some cases, the sulfhydryl-to-sulfhydryl crosslinker comprises a maleimide, such as bismaleimidoethane (BMOE); 1,4-bismaleimidobutane (BMB); bismaleimidohexane (BMH); tris(2-maleimidoethyl)amine (TMEA); BM(PEG)2 (such as 1,8-bismaleimido-diethyleneglycol); BM(PEG)3 (such as 1,11-bismaleimido-triethyleneglycol), dithiobismaleimidoethane (DTME); or any combination thereof.

Cells for a tolerizing vaccine or preparatory regimen can be contacted with an amine-to-sulfhydryl crosslinker. The contacting can be for a pre-determined time. The contacting can make some or all of the cells apoptotic. In some cases, the amine-to-sulfhydryl crosslinker comprises a NHS-haloacetyl crosslinker, a NHS-maleimide, a NHS-pyridyldithiol crosslinker, a sulfosuccinimidyl 4-(N-maleimidomethyl)cyclohexane-1-carboxylate (SMCC) crosslinker, or any combination thereof. The NHS-haloacetyl crosslinkers can comprise succinimidyl iodoacetate (SIA); succinimidyl 3-(bromoacetamido)propionate (SBAP); succinimidyl (4-iodoacetyl)aminobenzoate (SIAB); sulfo-SIAB; or a combination thereof. The NHS-maleimide can comprise N-α-maleimidoacet-oxysuccinimide ester (AMAS); N-β-maleimidopropyl-oxysuccinimide ester (BMPS); N-γ-maleimidobutyryl-oxysuccinimide ester (GMBS); sulfo-GMBS; m-maleimidobenzoyl-N-hydrosuccinimide ester (MBS); sulfo-MBS; SMCC; sulfo-SMCC; N-ε-malemido-caproyl-oxysuccinimide ester (EMCS); sulfo-EMCS; succinimidyl 4-(p-maleimidophenyl)butyrate (SMPB); sulfo-SMPB; succinimidyl 6-((beta-maleimidopropionamido)hexanoate) (SMPH); sulfosuccinimidyl 4-(N-maleimidomethyl)cyclohexane-1-carboxy-(6-amidocaproate) (LC-SMCC); N-κ-maleimidoundecanoyl-oxysulfosuccinimide ester (sulfo-KMUS); or a combination thereof. The NHS-pyridyldithiol crosslinker can comprise succinimidyl 3-(2-pyridyldithio)propionate (SPDP), succinimidyl 6-(3(2-pyridyldithio)propionamido)hexanoate (LC-SPDP), sulfo-LC-SPDP, or 4-succinimidyloxycarbonyl-alpha-methyl-α(2-pyridyldithio)tolune (SMPT).

Cells for a tolerizing vaccine or preparatory regimen can be contacted with a sulfhydryl-to-carbohydrate crosslinker. The contacting can be for a pre-determined time. The contacting can make some or all of the cells apoptotic. In some cases, the sulfhydryl-to-carbohydrate crosslinker comprises (N-β-maleimidopropionic acid hydrazide (BMPH), N-ε-maleimidocaproic acid hydrazide (EMCH), 4-(4-N-maleimidophenyl)butyric acid hydrazide (MPBH), N-κ-maleimidoundecanoic acid hydrazide (KMUH), 3-(2-pyridyldithio)propionyl hydrazide (PDPH), or any combination thereof.

In some cases, the carboxyl-to-amine crosslinker is dicyclohexylcarbodiimide (DCC), 1-ethyl-3-(3-dimethylaminopropyl)-carbodiimide (EDCI, EDC, or EDAC), N-hydroxysuccinimide (NHS), sulfo-NHS, or any combination thereof.

Cells for a tolerizing vaccine or preparatory regimen can be contacted with a photoreactive crosslinker. The contacting can be for a pre-determined time. The contacting can make some or all of the cells apoptotic. In some cases, the photoreactive crosslinker comprises a NHS ester/aryl azide, a NHS ester/diazirine, or a combination thereof. The NHS ester/aryl azide can comprise N-5-azido-2-nitrobenzoyloxysuccinimide (ANB-NOS), sulfo-SANPAH, or a combination thereof. The NHS ester/diazirine can comprise SDA (NHS-diazirine/succinimidyl 4,4'-azipentanoate), sulfo-SDA, LC-SDA (NHS-LC-diazirine/succinimidyl 6-(4,4'-azipentanamido)hexanoate), sulfo-LC-SDA, SDAD (NHS-SS-diazirine/succinimidyl 2-((4,4'-azipentanamido)ethyl)1,3'-dithiopropionate), sulfo-SDAD, or a combination thereof.

Cells for a tolerizing vaccine or preparatory regimen can be contacted with an in vivo crosslinker. The contacting can be for a pre-determined time. The contacting can make some or all of the cells apoptotic. The in vivo crosslinker can comprise BS3, DTSSP, sulfo-EGS, DSG, DSP, DSS, EGS, sulfo-SDA, sulfo-LC-SDA, sulfo-SDAD, SDA, LC-SDA, SDAD, NHS-ester diazirine, or any combination thereof.

In some cases, the cells for use in a tolerizing vaccine or preparatory regimen are treated with a cellular damaging agent or an apoptosis inducer. In some cases, the cellular damaging agent induces apoptosis in some or all of the contacted cells. Non-limiting exemplary cellular damaging agents include doxorubicin, staurosporine, etoposide, comptothecin, paclitaxel, vinblastine, or any combination thereof. Non-limiting exemplary apoptosis inducers include marinopyrrole A, maritoclax, (E)-3,4,5,4'-tetramethoxystilbene, 17-(Allylamino)-17-demethoxygeldanamycin, 2,4,3',5'-tetramethoxystilbene, 2OHOA, 6,8-bis(benzylthio)-octanoic acid, AT101, apoptolidin, FU 40A, ara-G hydrate, arylquin 1, BAD, BAM7, BAX activator molecule 7, BH3I-1, BID, BMS-906024, BV02, bendamustine, borrelidin, borrelidine, cyclopentanecarboxylic acid, NSC 216128, treponemycin, brassinin, brassinine, brefeldin A, ascotoxin, BFA, cyanein, decumbin, bufalin, CCF642, CCT007093, CD437, CHM-1 hydrate, 2-(2-fluorophenyl)-6,7-methylenedioxy-2-4-quinolone hydrate, NSC 656158, CIL-102, CP-31398, dihydrochloride hydrate, camalexin, 3-(Thiazol-2-yl)-1H-indole, camalexine, carboxyatractyloside, cepharanthine, cepharanthine, cinnabarinic acid, cirsiliol, combretastatin A4, costunolide, DBeQ, DIM-C-pPhtBu, DMXAA, DPBQ, enniatin A1, enniatin A, enniatin B1, enniatin B, erastin, eupatorin, FADD, fluticasone propionate, fosbretabulin disodium, GO-201 trifluoroacetate, gambogic acid, HA 14-1, HMBA, hexaminolevulinate (HAL), IMB5046, IMS2186, ikarugamycin, imiquimod, iniparib, kurarinone, LLP-3, lipocalin-2, lometrexol, MI-4F, ML 210, ML291, mollugin, muristerone A, NA-17, NID-1, NPC26, NSC59984, Nap-FF, neocarzinostatin, nifetepimine, nitidine chloride, nutlin-3, nutlin-3a, PKF118-310, PRIMA-1, PRT4165, pemetrexed, penta-O-galloyl-β-D-glucose hydrate, phenoxodiol, prodigiosin (PG), psoralidin, pterostilbene, raltitrexed, raptinal, ridaifen-B, rifabutin, roslin 2, s-p-bromobenzylglutathione cyclopentyl diester, SJ-17255, SMBA1, STF-62247, suprafenacine, syrosingopine, talniflumate, taurolidine, temoporfin, temozolomide, tetrazanbigen, thaxtomin A, thiocolchicine, tirapazamine, UCD38B, UMI-77, undecylprodigiosin, VK3-OCH3, vacquinol-1, violacein, vosaroxin, zerumbone, gAcrp30, gAcrp30/adipolean, or any combination thereof. Cells contacted with a cellular damaging agent or an apoptosis inducer may subsequently be contacted with a fixative or cross-linking agent.

Cells for a tolerizing vaccine or preparatory regimen can be made apoptotic by contacting the cells with a chemical (e.g., a fixative or cross-linking agent, a cellular damaging agent, or a combination thereof) for a predetermined amount of time. In some embodiments, the cells in the tolerizing vaccine or the preparatory regimen are made apoptotic by fixing for a predetermined amount time with the crosslinking agent (e.g., ECDI). In some cases, the predetermined amount of time is about 30 minutes, about 1 hour, about 2 hours, about 3 hours, about 4 hours, about 5 hours, about 6 hours, about 12 hours, about 18 hours, about 24 hours, about 36 hours, about 48 hours, about 60 hours, or about 72 hours. In some cases, the predetermined amount of time is less than an hour. In some cases, the predetermined time is at least about 1 minute, 5 minutes, 10 minutes, 20 minutes, 30 minutes, 40 minutes, 50 minutes, 60 minutes, 75, minutes, 90 minutes, 120 minutes, 150 minutes, 180 minutes, 210 minutes or 240 minutes. In some cases, the predetermined time is at most about 30 minutes, 40 minutes, 50 minutes, 60 minutes, 75 minutes, 90 minutes, 120 minutes, 150 minutes, 180 minutes, 210 minutes or 240 minutes. In some cases, the predetermined amount of time is about 1 minute to about 240 minutes, 1 minute to about 10 minutes, 10 minutes to about 240 minutes, about 10 minutes to about 180 minutes, about 10 minutes to about 120 minutes, about 10 minutes to about 90 minutes, about 10 minutes to about 60 minutes, about 10 minutes to about 30 minutes, about 30 minutes to about 240 minutes, about 30 minutes to about 180 minutes, about 30 minutes to about 120 minutes, about 30 minutes to about 90 minutes, about 30 minutes to about 60 minutes, about 50 minutes to about 240 minutes, about 50 minutes to about 180 minutes, about 50 minutes to about 120 minutes, about 50 minutes to about 90 minutes, about 50 minutes to about 60 minutes, about 10 minutes to about 20 minutes, about 20 minutes to about 30 minutes, about 30 minutes to about 40 minutes, about 40 minutes to about 50 minutes, about 50 minutes to about 60 minutes, about 60 minutes to about 60 minutes, about 70 minutes to about 70 minutes, about 70 minutes to about 80 minutes, about 80 minutes to about 90 minutes, about 90 minutes to about 100 minutes, about 100 minutes to about 110 minutes, about 110 minutes to about 120 minutes, about 10 minutes to about 30 minutes, about 30 minutes to about 50 minutes, about 50 minutes to about 70 minutes, about 70 minutes to about 90 minutes, about 90 minutes to about 110 minutes, about 110 minutes to about 130 minutes, about 130 minutes to about 150 minutes, about 150 minutes to about 170 minutes, about 170 minutes to about 190 minutes, about 190 minutes to about 210 minutes, about 210 minutes to about 240 minutes, up to about 30 minutes, about 30 minutes to about 60 minutes, about 60 minutes to about 90 minutes, about 90 minutes to about 120 minutes, or about 120 minutes to about 150 minutes.

The contacting can be at any temperature. In some cases the contacting is performed on ice (e.g., at 4° C.). In other cases, the contacting is performed at room temperature. In some cases, the contacting is performed at a temperature of at least about 0° C., 2° C., 4° C., 8° C., 15° C., 20° C., 25, 30° C., 35° C., or 37° C. In some cases, the contacting is performed at a temperature of at most about 4° C., 8° C., 15° C., 20° C., 25, 30° C., 35° C., 37° C., or 40° C. In some cases, the contacting is performed at a temperature of about 0° C. to about 37° C., about 0° C. to about 25° C., about 0° C. to about 15° C., about 0° C. to about 10° C., about 0° C. to about 8° C., about 0° C. to about 6° C., about 0° C. to about 4° C., about 0° C. to about 2° C., about 2° C. to about 10° C., about 2° C. to about 8° C., about 2° C. to about 6° C., about 4° C. to about 25° C., about 4° C. to about 10° C., about 15° C. to about 37° C., about 15° C. to about 25° C., about 20° C. to about 40° C., about 20° C. to about 37° C., or about 20° C. to about 30° C.

Cells in a tolerizing vaccine or preparatory regimen can aggregate as a result of the method of making some or all of the cells apoptotic. For example, cells can aggregate after contacting with a chemical, such as a fixative or crosslinking agent. The predetermined amount of time that the cells are contacted with the chemical can be selected to minimize the amount of aggregation in the tolerizing vaccine or preparatory regimen. In some cases, aggregates can be removed, for example, by washing and/or filtration.

In some cases, a tolerizing vaccine or preparatory regimen can comprise from or from about 0.01 to 10 aggregates, per μl. For example, the tolerizing vaccine or preparatory regimen can comprise from or from about 0.01 to 1, 0.1 to 1, 0.25 to 1, 0.5 to 1, 1 to 5; or 1 to 10 aggregate per μl. The tolerizing vaccine or preparatory regimen can comprise less than about 0.1, 0.5, 0.75, 1, 5, or 10 aggregates per μL.

In some cases, the tolerizing vaccine or preparatory regimen can comprise less than 5 aggregates per μL. For example, the tolerizing vaccine or preparatory regimen can comprise less than about: 5, 4, 3, 2, 1.9, 1.8, 1.7, 1.6, 1.5, 1.4, 1.3, 1.2, 1.1, 1, 0.9, 0.8, 0.7, 0.6, 0.5, 0.4, 0.3, 0.2, 0.1, 0.05, or 0.01 aggregates per μL.

In some case, the tolerizing vaccine or preparatory regimen comprises 1 or fewer aggregates per μL. For example, the tolerizing vaccine or preparatory regimen can comprise about 0.01, about 0.05, about 0.1, about 0.2, about 0.3, about 0.4, about 0.5 about 0.6, about 0.7, about 0.8, about 0.9, or about 1.0 aggregates per μL.

The tolerizing vaccine or preparatory regimen can include from or from about 0.010% to 10%, e.g., from or from about 0.01% to 2%, necrotic cells. For example, cells of a tolerizing vaccine or preparatory regimen can comprise from or from about 0.01% to 10%; 0.01% to 7.5%, 0.01% to 5%; 0.01% to 2.5%; or 0.01% to 1% necrotic cells. In some embodiments, the cells of a tolerizing vaccine or preparatory regimen of the disclosure can comprise at most about 0.01%, 0.1%, 1%, 2%, 3%, 4%, 5%, 6%, 7%, 8%, 9%, or 10% necrotic cells.

Molecules Conjugated on Surface of Apoptotic Leukocytes
Immunomodulatory Molecules Cells (e.g., leukocytes) for a tolerizing vaccine or preparatory regimen can be treated with a fixative or crosslinking agent (e.g., a carbodiimide such as ECDI) in the presence of one or more immunomodulatory molecules. The one or more immunomodulatory molecules can comprise all or a portion of: IFN-γ, an NF-kB inhibitor, vitamin D3, siCD40, anti-CD40 antibody, cobalt protoporphyrin, insulin B9-23, α1-antitrypsin, a cluster of differentiation protein, a gp39 antagonist, α1-antitrypsin, CD47, PD-L1, PD-L2, CTLA-4, rapamycin, compstatin, abatacept, ipilimumab, or a combination thereof. The NF-kB inhibitor can comprise dehydroxymethylepoxyquinomicin (DHMEQ), curcumin, triptolide, Bay-117085, or a combination thereof. The cluster of differentiation protein can comprise CD4, CD46, CD47, CD55, CD59, or a portion thereof, or a combination thereof.

In some embodiments, the one or more immunomodulatory molecules can comprise all or a portion of a calcineurin inhibitor (e.g., cyclosporine or tacrolimus), a costimulatory signal blockade, an IL-2 signaling inhibitor (e.g., daclizumab or basiliximab), a cell cycle blocker (e.g., mycophenolate mofetil (MMF) or azathioprine), a T cell recirculation inhibitor (e.g., FTY720 or another sphingosine 1-phosphate (S1P) receptor agonist), a nitrogen mustard alkylating agent (e.g., cyclophosphamide), a complement C3 or C5 inhibitor, or any combination thereof.

In some embodiments, the immunomodulatory molecules can target T cell receptor (TCR), CD3e, FK506-binding protein 12 (FKBP12), cytotoxic T lymphocyte associated protein 4 (CTLA-4), programmed cell death protein 1 (PD-1, e.g., pembrolizumab), programmed death ligand 1 (PD-L1, e.g., MPDL3280A), CD40L (CD154), CD40, inducible costimulatory (ICOS), IL-2, TNF-α (e.g., infliximab), IL-6 or IL-6R (e.g., tocilizumab, actemra, clazakizumab, ALD518, siltuximab, elsilimomab, sirukumab, sarilumab, olokizumab), IL-7, CD2, CD20, CD52, α-4 integrin, mTOR (e.g., rapamycin or everolimus), DNA synthesis, molecules in pro-inflammatory pathways (e.g., cytokines, α1-antitrypsin, NFkB), or any combination thereof.

Cells (e.g., leukocytes) for tolerizing vaccine or preparatory regimen can be treated with a fixative or crosslinking agent (e.g., a carbodiimide such as ECDI) in the presence of an agent that increases expression of anti-inflammatory cytokines in a recipient. The anti-inflammatory cytokines may include, for example, TGF-β, IL-10, IL-13, or a combination thereof. In some cases, the agent that increases expression of anti-inflammatory cytokines in the recipient comprises α1-antitrypsin.

In some cases where ADLs are administered to a transplant recipient multiple times, ADLs from all the doses can all be conjugated with the same immunomodulatory molecules, agents that increases expression of anti-inflammatory cytokines, and/or antigens or epitopes. In some cases where ADLs are administered to a transplant recipient multiple times, ADLs from one or more doses can be conjugated with a first set of immunomodulatory molecules, agents that increases expression of anti-inflammatory cytokines, and/or antigens or epitopes, and ADLs from other dose(s) can be conjugated with a different set of immunomodulatory molecules, agents that increases expression of anti-inflammatory cytokines, and/or antigens or epitopes. In some cases where ADLs are administered to a transplant recipient multiple times, ADLs from one or more doses can be conjugated with a set of immunomodulatory molecules, agents that increases expression of anti-inflammatory cytokines, and/or antigens or epitopes, and ADLs from other dose(s) can lack any conjugated immunomodulatory molecules, agents that increases expression of anti-inflammatory cytokines, and/or antigens or epitopes.

Peptides, Antigens and Epitopes

In one aspect, the present disclosure provides preparatory regimen and/or tolerizing vaccines and regimen comprising apoptotic cells such as leucocytes or mesenchymal stromal cells comprising one or more peptides derived from a MHC class II molecule. In some embodiments, the apoptotic cells further comprise one or more peptides derived from a MHC class I molecule.

As such, the sequences of amino acid residues in the peptide can be substantially similar or functionally comparable to a polypeptide sequence in the MHC molecule. Thus, "a peptide derived from a MHC class II molecule" refers to a peptide that has a sequence "from a region in an MHC class II molecule" (e.g., the hypervariable region), and is a peptide that has a sequence 70%, 75%, 80%, 85%, 90%, 91%, 92%, 93%, 94%, 95%, 96%, 97%, 97.5%, 98%, 98.5%, 99%, 99.5%, 99.9%, 99.95% or 100% identical to the naturally occurring MHC amino acid sequence of the region. In some embodiments, the peptide derived from a MHC class II molecule can comprise a sequence from 70%, 75%, 80%, 85%, 90%, 91%, 92%, 93%, 94%, 95%, 96%, 97%, 97.5%, 98%, 98.5%, 99%, 99.5%, 99.9%, 99.95% or 100% identical to the hypervariable region of the MHC class II molecule. Thus, "a peptide derived from a MHC class I molecule" refers to a peptide that has a sequence "from a region in an MHC class I molecule" (e.g., the hypervariable region), and is a peptide that has a sequence 70%, 75%, 80%, 85%, 90%, 91%, 92%, 93%, 94%, 95%, 96%, 97%, 97.5%, 98%, 98.5%, 99%, 99.5%, 99.9%, 99.95% or 100% identical to the naturally occurring MHC amino acid sequence of the region. In some embodiments, the peptide derived from a MHC class I molecule will comprise a sequence from the hypervariable region of the MHC class I molecule.

As used herein a "hypervariable region" of an MHC molecule is a region of the molecule in which polypeptides encoded by different alleles at the same locus have high sequence variability or polymorphism. The polymorphism is typically concentrated in the α1 and α2 domains of in Class I molecules and in the α1 and β1 domains of Class II molecules. The number of alleles and degree of polymorphism among alleles may vary at different loci. For instance, in HLA-DR molecules all the polymorphism is attributed to the β chain and the α chain is relatively invariant. For HLA-DQ, both the α and β chains are polymorphic.

The peptide of the present disclosure can be isolated peptides. The phrases "isolated" or "biologically pure" refer to material which is substantially or essentially free from components which normally accompany it as found in its native state. Thus, the peptides of this disclosure do not contain materials normally associated with their in situ environment, e.g., other surface proteins on antigen presenting cells. Even where a protein has been isolated to a homogenous or dominant band, there are trace contaminants in the range of 5-10% of native protein which co-purify with the desired protein. Isolated peptides of this disclosure do not contain such endogenous co-purified protein.

The term "residue" refers to an amino acid or amino acid mimetic incorporated in a oligopeptide by an amide bond or amide bond mimetic. Peptides suitable for use in the present disclosure can be obtained in a variety of ways. Conveniently, they can be synthesized by conventional techniques employing automatic synthesizers, such as the Beckman, Applied Biosystems, or other commonly available peptide synthesizers using well known protocols. They can also be synthesized manually using techniques well known in the art. See, e.g. Stewart and Young, Solid Phase Peptide Synthesis, (Rockford, Ill., Pierce), 2d Ed. (1984), which is incorporated herein by reference.

Alternatively or additionally, DNA sequences which encode the particular MHC molecule may be cloned and expressed to provide the peptide. Cells comprising a variety of MHC genes are readily available, for instance, they may be obtained from the American Type Culture Collection ("Catalogue of Cell Lines and Hybridomas," 6th edition (1988) Rockville, Md., U.S.A. Standard techniques can be used to screen cDNA libraries to identify sequences encoding the desired sequences (see, Sambrook et al., Molecular Cloning—A Laboratory Manual, Cold Spring Harbor Laboratory, Cold Spring Harbor, N.Y., 1989, which is incorporated herein by reference). Fusion proteins (those consisting of all or part of the amino acid sequences of two or more proteins) can be recombinantly produced. In addition, using in vitro mutagenesis techniques, unrelated proteins can be mutated to comprise the appropriate sequences.

MHC glycoproteins from a variety of natural sources are also conveniently isolated using standard protein purification techniques. Peptides can be purified by any of a variety of known techniques, including, for example, reverse phase high-performance liquid chromatography (HPLC), ion-exchange or immunoaffinity chromatography, separation be size, or electrophoresis (See, generally, Scopes, R., Protein Purification, Springer-Verlag, N.Y. (1982), which is incorporated herein by reference).

It is understood that the peptides of the present disclosure can be modified to provide a variety of desired attributes, e.g., improved pharmacological characteristics, while increasing or at least retaining substantially all of the biological activity of the unmodified peptide. For instance, the peptides can be modified by extending, decreasing the amino acid sequence of the peptide. Substitutions with different amino acids or amino acid mimetics can also be made.

In some embodiments, the peptides conjugated on the surface of apoptotic leukocytes are derived from a MHC molecule. The term "MHC molecule" refers to a molecule comprising Major Histocompatibility Complex (MHC) glycoprotein protein sequences. The term "MHC" as used herein will be understood to refer to the Major Histocompability Complex, which is defined as a set of gene loci specifying major histocompatibility complex glycoprotein antigens including the human leukocyte antigen (HLA). The term "HLA" as used herein will be understood to refer to Human Leukocyte Antigens, which is defined as the major histocompatibility antigens found in humans. As used herein, "HLA" is the human form of "MHC" and therefore can be used interchangeably. Examples of HLA proteins that can be utilized in accordance with the presently disclosed and claimed inventive concept(s) include, but are not limited to, an HLA class I α chain, an HLA class II α chain and an HLA class II β chain. Specific examples of HLA class II α and/or β proteins that may be utilized in accordance with the presently disclosed and claimed inventive concept(s) include, but are not limited to, those encoded at the following gene loci: HLA-DRA; HLA-DRB1; HLA-DRB3,4,5; HLA-DQA; HLA-DQB; HLA-DPA; and HLA-DPB.

In some embodiments, the peptides can be derived from a MHC class I molecule, or is a variant of such a peptide derived from a MHC class I molecule. In some embodiments, the peptide can be derived from a MHC class II molecule, or is a variant of a peptide derived from a MHC class II molecule. MHC molecules are heterodimeric glycoproteins expressed on cells of higher vertebrates and play a role in immune responses. In humans, these molecules are referred to as human leukocyte antigens (HLA). MHC glycoproteins are divided into two groups, class I and class II, which differ structurally and functionally from each other. In general, the major function of MHC molecules is to bind antigenic peptides and display them on the surface of cells. The glycoproteins encoded by the MHC have been extensively studied in both the human and murine systems and their nucleic acid and protein sequences are well known in the art. Many of the histocompatibility proteins have been isolated and characterized. For a general review of MHC glycoprotein structure and function, see Fundamental Immunology, 3d Ed., W. E. Paul, ed., (Ravens Press N.Y. 1993).

MHC class I molecules are expressed on almost all nucleated cells and are recognized by cytotoxic T lymphocytes, which then destroy the antigen-bearing cells. In mice, Class I molecules are encoded by the K, D and Qa regions of the MHC. Class II molecules are encoded by the I-A and I-E subregions. The isolated antigens encoded by the murine I-A and I-E subregions have been shown to consist of two noncovalently bonded peptide chains: an α chain of 32-38 kd and a β chain of 26-29 kd. A third, invariant, 31 kd peptide is noncovalently associated with these two peptides, but it is not polymorphic and does not appear to be a component of the antigens on the cell surface. The α and β chains of a number of allelic variants of the I-A region have been cloned and sequenced.

The human Class I proteins have also been studied (Bjorkman, P. J., et al., (1987) Nature 329:506-512). These are found to consist of a 44 kd subunit MHC class I heavy chain and a 12 kd β2-microglobulin subunit which is common to all antigenic specificities. Further work has resulted in a detailed picture of the 3-D structure of HLA-A2, a Class I human antigen.

Structurally, MHC class I molecules are heterodimers comprised of two noncovalently bound polypeptide chains, a larger "MHC class I heavy chain (α)" and a smaller "light" chain ((β-2-microglobulin). The polymorphic, polygenic heavy chain (45 kDa), is encoded within the MHC on chromosome six. Chromosome 6 has three loci, HLA-A, HLA-B, and HLA-C, the first two of which have a large number of alleles encoding MHC class I heavy chain alloantigens, HLA-A, HLA-B respectively. MHC class I heavy chain (α) (e.g., HLA-A, HLA-B and HLA-C) is subdivided into three extracellular domains (designated α1, α2, and α3), one intracellular domain, and one transmembrane domain. The two outermost extracellular domains, α1 and α2, together form the groove that binds antigenic peptide. Thus, interaction with the TCR occurs at this region of the protein. The 3rd extracellular domain of the molecule contains the recognition site for the CD8 protein on the CTL; this interaction serves to stabilize the contact between the T cell and the APC.

The invariant light chain (12 kDa), encoded outside the MHC on chromosome 15, consists of a single, extracellular polypeptide. The terms "MHC class I light chain", "β-2-microglobulin", and "β2 m" may be used interchangeably herein. Association of the class I heavy and light chains is required for expression of class I molecules on cell membranes. In this picture, the β2-microglobulin protein and 3 domain of the heavy chain are associated. Accordingly, MHC class I molecule as disclosed herein can refer to a MHC class I heterodimer, a MHC class I heavy chain (e.g., HLA-A, HLA-B, or HLA-C), a MHC class I light chain or portions thereof. In some embodiments, the peptide can be derived from a MHC class I heavy chain e.g., HLA-A, or HLA-B. In some embodiments, the entire MHC class I heavy chain can be used. In some embodiments, the MHC class I molecule can be domains of MHC class I heavy chain (α1, α2, or α3). In some embodiments, the peptide can comprise sequence from the α1, α2, or α3 region of the MHC class I heavy chain, or comprise a sequence 70%, 75%, 80%, 85%, 90%, 91%, 92%, 93%, 94%, 95%, 96%, 97%, 97.5%, 98%, 98.5%, 99%, 99.5%, 99.9%, 99.95% or 100% identical thereto. The α1 and α2 domains of the heavy chain comprise the hypervariable region which forms the antigen-binding sites to which the peptide is bound. In some embodiments, a peptide can be derived from a α1 or α2 domains of the MHC class I heavy chain. In some embodiments, the peptide derived from a MHC class I molecule can comprise sequence from a hypervariable region of a MHC class I molecule. In some embodiments, one or more peptides derived from a MHC class I is selected from Tables disclosed herein, or is 70%, 75%, 80%, 85%, 90%, 91%, 92%, 93%, 94%, 95%, 96%, 97%, 97.5%, 98%, 98.5%, 99%, 99.5%, 99.9%, 99.95% or 100% identical to a peptide disclosed in a Table herein.

Cells (e.g., leukocytes) for a tolerizing vaccine or preparatory regimen can be treated with a fixative or crosslinking agent (e.g., a carbodiimide such as ECDI) in the presence of one or more antigens and/or epitopes. The antigens and/or epitopes can comprise antigens and/or epitopes from a transplant donor, a transplant recipient, a third party, or a combination thereof. In some cases, the cells in the tolerizing vaccine or preparatory regimen are coupled to recipient antigens and/or epitopes. In some cases, the cells in the tolerizing vaccine or preparatory regimen are coupled to third party antigens and/or epitopes. In some cases, the cells in the tolerizing vaccine or preparatory regimen are coupled to transplant donor antigens and/or epitopes.

MHC class II molecules are expressed primarily on cells involved in initiating and sustaining immune responses, such as T lymphocytes, B lymphocytes, macrophages, and the like. MHC class II molecules are recognized by helper T lymphocytes and induce proliferation of helper T lymphocytes and amplification of the immune response to the particular antigenic peptide that is displayed. Engagement of the T cell receptor induces a series of molecular events characteristic of cell activation, such as, increase in tyrosine phosphorylation, Ca++ influx, PI turnover, synthesis of cytokines and cytokine receptors, and cell division (see, Altman et al., (1990) Adv. Immunol. 48:227-360. For a general discussion of how T cells recognize antigen see Grey, H. M., et al., Scientific American pp 56-64, (November, 1989). MHC class II glycoproteins, HLA-DR, HLA-DQ, and HLA-DP (encoded by alleles at the HLA-DR, DP, and DQ loci) have a domain structure, including antigen binding sites, similar to that of Class I. MHC class II molecules are heterodimers, consist of two nearly homologous subunits; α and β chains, both of which are encoded in the MHC. Accordingly, in some embodiments, the MHC class II molecule refers to a heterodimer of MHC class II α chain and MHC class II β chain (e.g., HLA-DQ, HLA-DR, HLA-DP). In some embodiments, the MHC class II molecule can be a subunit of the heterodimer. In some embodiments the MHC class II molecule can be MHC class II α chain (e.g., HLA-DPA, HLA-DQA, or HLA-DRA), or MHC class II β chain (e.g., HLA-DPB, HLA-DQB, or HLA-DRB), or domains thereof. In some embodiments, the MHC class II molecule is HLA-DRB.

The HLA-DRB is encoded by four gene loci in human (HLA-DRB1, HLA-DRB3, HLA-DRB4 and HLA-DRB4), however no more than 3 functional loci are present in a single individual, and no more than two on a single chromosome. In some embodiments, the MHC class II molecule that is HLA-DRB is encoded by HLA-DRB1, HLA-DRB3, HLA-DRB4 or HLA-DRB4 gene locus. In some embodiments, the MHC class II molecule is encoded by HLA-DRB1*03 or HLA-DRB1*04. The HLA-DRB1 locus is ubiquitous and encodes a very large number of functionally variable gene products (HLA-DR1 to HLA-DR17). The HLA-DRB3 locus encodes the HLA-DR52 specificity, is moderately variable and is variably associated with certain HLA-DRB1 types. The HLA-DRB4 locus encodes the HLA-DR53. In some embodiments, the MHC class II molecule that is HLA-DRB is selected from HLA-DR1, HLA-DR2, HLA-DR3, HLA-DR4, or HLA-DR5.

Each subunit in Class II molecules consist of globular domains, referred to as α1, α2, β1, and β2. All except the α1 domain are stabilized by intrachain disulfide bonds typical of molecules in the immunoglobulin superfamily. Each chain in a class II molecule contains two external domains: the 33-kDa α chain contains α1 and α2 external domains, while the 28-kDa β chain contains β1 and β2 external domains. The membrane-proximal α2 and β2 domains, like the membrane-proximal 3rd extracellular domain of class I heavy chain molecules, bear sequence homology to the immunoglobulin-fold domain structure. The membrane-distal domain of a class II molecule is composed of the α1 and β1 domains, which form an antigen-binding cleft for processed peptide antigen. Accordingly, the MHC class II molecule can be globular domain e.g., α1, α2, β1, or β2. The peptides derived from MHC class II molecule can comprise the entire subunit (a or 3 chain) or large portions thereof. For instance, the peptides can comprise an extracellular domain from an MHC class II subunit of about 90-100 residues (e.g., β1 and β2 or α1 and α2 of class II molecules), or can comprise a sequence 70%, 75%, 80%, 85%, 90%, 91%, 92%, 93%, 94%, 95%, 96%, 97%, 97.5%, 98%, 98.5%, 99%, 99.5%, 99.9%, 99.95% or 100% identical thereto. The N-terminal portions of the α and β chains, the α1 and β1 domains, contain hypervariable regions which are thought to comprise the majority of the antigen-binding sites (see, Brown et al., Nature 364:33-39 (1993)). Accordingly, the peptides derived from MHC class II molecule can comprise a sequence from hypervariable region of the MHC class II molecule (e.g., the α1 and β1 domains of the α and β chains subunits respectively) or a sequence 70%, 75%, 80%, 85%, 90%, 91%, 92%, 93%, 94%, 95%, 96%, 97%, 97.5%, 98%, 98.5%, 99%, 99.5%, 99.9%, 99.95% or 100% identical thereto.

In some embodiments the peptides are derived from hypervariable regions of the α or β chain of an MHC Class II molecule associated with the deleterious immune response. In this way, the ability of antigen presenting cells (APC) to present the target antigen (e.g., autoantigen or allergen) is inhibited.

Conjugating recipient-type MHC class II molecules to apoptotic cells, such as leukocytes or mesenchymal stromal cells, can enhance the tolerance-inducing efficacy of a preparatory regimen for allotransplantation or xenotransplantation in mammalian recipients (for example, transplant of islets, kidneys, or other cells, tissues, or organs, such as embryonic stem cell or induced pluripotent stem cell (iPS)-derived cells, tissues and organs). For example, for donor-recipient pairs that are partly or fully MHC class I and class II mismatched, conjugating recipient-type MHC class II molecules to ADLs can enhance ADL efficacy in inducing tolerance to a transplanted cell, tissue, or organ. Coupling one or more peptides derived from one (or more) of the transplant recipient's MHC class II molecules to the surface of fully mismatched ADLs can provide abundant amounts of recipient-type MHC class II peptides for presentation by recipient MHC class II molecules after uptake of ADLs (for example, by recipient spleen marginal zone antigen presenting cells or liver sinusoidal endothelial cells). Recognition of self MHC class II can promote tolerance in the recipient, for example, via regulatory T cell subsets.

An additional example of a means through which tolerance can be induced is via activation of thymus-derived CD4+ Tregs (tTregs). For example, in an experimental transplant studies in mice, the emergence of MHC class II peptide-specific tTregs and tolerance of MHC-II-matched allografts can be dependent on thymic expression of donor MHC class II-derived peptides. tTregs are selected through recognition of their own MHC class II peptides, presented by their own MHC class II molecules. A substantial fraction of self-peptides bound to and presented by MHC class II complexes are derived from MHC class II itself. Accordingly, many of the circulating (t)Tregs have specificity for self MHC class II peptides. When this complex is presented on the surface of activated effector T cells, it can serve as a potent activation signal for tTregs, leading to tTreg activation and thus promotion of immune tolerance.

One way that tTregs can be activated is by trogocytosis of MHC class II peptides, presented by MHC class II, to activated T cells. Trogocytosis involves the exchange of entire MHC class II molecules presenting MHC class II peptides. Trogocytosis of MHC class II complexes with bound self MHC class II (e.g., DRB) peptides to activated T cells can turn these T cells into potent activators of tTregs that have specificity for the same self MHC class II peptides. Therefore, if recipient-type MHC class II molecules presenting recipient MHC class II peptides are delivered to and presented by activated recipient T cells, this can serve as potent activation signals to tTregs. The activation of tTregs requires antigen specificity, but their regulatory function does not require antigen specificity. As such, activated tTregs can directly down-regulate anti-donor immunity, including donor-specific CD4+ and CD8+ T cells of direct and indirect specificities, and also down-regulate anti-donor immunity through expansion of other immune cell subsets with regulatory capabilities, including Tr1 cells.

Self MHC class II peptides (e.g., DRB peptides) bound to self MHC class II may also contribute to the induction of tolerance via LAG-3 receptor signaling. Self MHC class II peptides (e.g., DRB peptides) bound to the MHC class II complex they are derived from can stabilize the peptide: MHC class II conformation required for recognition by and signaling through LAG-3 receptors on T cells. LAG-3 is a TCR co-receptor that can distinguish stable from unstable peptide: MHC class II complexes. The specificity of the peptide bound to self MHC class II may thus regulate the specificity of the immune response via LAG-3. Therefore, LAG-3 expression and function is associated with tolerance induction. For example, co-expression of LAG3 and CD49b can be used to identify Tr1 cells, and blockade of LAG3 on Tr1 cells abrogates Tr1-induced tolerance. LAG3 is also transiently expressed on activated tTregs and at significantly lower levels on activated Teff cells, suggesting that LAG3 may be a reliable marker of cells with regulatory potential. Additionally, LAG3 crosslinking of MHC class II on DCs tolerizes DCs. Considering self-MHC class II peptides stabilize self-MHC class II that are presenting the peptides in a conformation associated with LAG-3 recognition, the delivery of abundant amounts of self MHC class II peptides (e.g., DRB peptides) may boost the presence of stable self-peptide MHC class II complexes on DCs, and thereby contribute to tolerance (e.g., via expansion of Tr1 cells). This is supported by data showing that apoptotic donor leukocytes that are matched at one MHC class II DRB allele promote tolerance in allotransplant recipients.

One or more peptides derived from one (or more) of the transplant recipient's MHC class II molecules (e.g., DR α-chain, DR β-chain, DQ α-chain, DQ β-chain, DP α-chain, or DP β-chain) can be conjugated to the surface of leukocytes or ADLs of a tolerizing vaccine or preparatory regimen. In some cases, the one or more peptides derived from the transplant recipient's MHC class II molecules comprise DR β-chain, DQ β-chain, DP β-chain, or a combination thereof. In some cases, the one or more peptides are from one or more of the transplant recipient's MHC class II DRB alleles. In some cases, the one or more peptides are from one or more of the transplant recipient's MHC class II DRA alleles. In some cases, the one or more peptides are from one or more of the transplant recipient's MHC class II DQA alleles. In some cases, the one or more peptides are from one or more of the transplant recipient's MHC class II DQB alleles. In some cases, the one or more peptides are from one or more of the transplant recipient's MHC class II DPA alleles. In some cases, the one or more peptides are from one or more of the transplant recipient's MHC class II DPB alleles.

The DR α-chain can be functionally monomorphic, thus in some embodiments peptides derived from the other MHC class II molecules are preferred for tolerance induction. In other embodiments, conjugating recipient-type MHC class II DRA molecules to apoptotic donor leukocytes (ADLs) can enhance the tolerance-inducing efficacy of a preparatory regimen. The DR α-chain can be functionally monomorphic, which may make it a convenient target for tolerance induction. In some cases, recipient-type MHC class II presenting peptides from the monomorphic DR alpha chain may serve as an activation signal to the subset of tTreg cells that are selected in the thymus for that cognate specificity. Any cell, such as any easily expandable T cell derived from a universal cell, can be conjugated with the same chain, domain, or peptide derived from the monomorphic DRA antigen and processed to generate ADLs that can be used for promoting tolerance to a transplant. This method can be broadly applicable to a range of transplant scenarios where the recipient is positive for the DRA antigen. For example, this method can be used to induce tolerance using a universal donor cell.

In some cases, the ADLs are fully MHC-mismatched to the transplant recipient. In some cases, the ADLs are partially MHC-matched to the transplant recipient (e.g., share one or more MHC class I or MHC class II antigens with the recipient). In some cases, the ADLs are haploidentical to the transplant recipient. In some cases, the ADLs are from the same donor as a transplant. In some cases, the ADLs are not from the same donor as a transplant.

The peptides derived from a recipient's MHC class II molecule may comprise an entire MHC class II molecule. The peptides derived from a recipient's MHC class II molecule may comprise an entire α chain of DR, DQ or DP. The peptides derived from a recipient's MHC class II molecule may comprise entire 1 chain of DR, DQ, or DP. The peptides derived from a recipient's MHC class II molecule may comprise entire α1 and/or α2 domains of DR, DQ or DP. The peptides derived from a recipient's MHC class II molecule may comprise entire 31 and/or 12 domains of DR, DQ, or DP. The peptides derived from a recipient's MHC class II molecule may comprise MHC-DR1, MHC-DR2, MHC-DR3, MHC-DR4, and/or MHC-DR5.

The peptides derived from a recipient's MHC class II molecule may comprise a fragment of an α1 and/or α2 domain of DR, DQ or DP. The peptides derived from a recipient's MHC class II molecule may comprise a fragment of a β1 and/or β2 domain of DR, DQ, or DP. The peptides derived from a recipient's MHC class II molecule may comprise a fragment of MHC-DR1, MHC-DR2, MHC-DR3, MHC-DR4, and/or MHC-DR5. The peptides derived from a recipient's MHC class II molecule may comprise a sequence from a hypervariable region. The peptides derived from a recipient's MHC class II molecule can comprise an in silico-identified high, medium, or low affinity peptides from the hypervariable region of the DRB molecule (e.g., a 10, 11, 12, 13, 14, 15, 16, 17, 18, 19, or 20 amino acid peptide). The peptides derived from a recipient's MHC class II molecule can comprise a variable region spanning the peptide binding region (e.g., about a 20, 25, 26, 27, 28, 29, 30, 31, 32, 33, 34, 35, or 40 amino acid peptide). The peptides derived from a recipient's MHC class II molecule can comprise dimeric peptides with cathepsin S cleavable linkers with varying affinity to the DRB binding grove. In some cases, the peptides derived from a recipient's MHC class II molecule do not include peptides from an alpha chain of DR, DQ or DP.

The peptides derived from a recipient's MHC class II molecule may be synthesized or recombinant. In some cases, the peptides derived from a recipient's MHC class II molecule may between about 10 and 30 amino acids in length. The peptides derived from a recipient's MHC class II molecule may be at least 10 to 30 amino acids in length. In some embodiments, the peptides derived from a recipient's MHC class II molecule can be at least about 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 125, 150, 275, 200, or 250 amino acids in length. In some embodiments, the peptides derived from a recipient's MHC class II molecule can be at most about 10, 11, 12, 13, 14, 15, 16, 17, 18, 19, 20, 21, 22, 23, 24, 25, 26, 27, 28, 29, 30, 40, 50, 60, 70, 80, 90, 100, 125, 150, 275, 200, or 250 amino acids in length. In some embodiments, the peptides derived from a recipient's MHC class II molecule can be about 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 125, 150, 275, 200, or 250 amino acids in length. In some embodiments, the peptides derived from a recipient's MHC class II molecule can be about 5-250, 10-250, 20-250, 30-250, 50-250, 100-250, 5-100, 10-100, 20-100, 30-100, 50-100, 5-50, 10-50, 20-50, 30-50, 5-30, 10-30, 15-30, or 20-30 amino acids in length.

In some cases, the peptides derived from a recipient's MHC class II molecule can have high affinity for binding to the peptide binding grooves of HLA DR3 and DR4 molecules, which are the most prevalent MHC class II alleles in patients with type 1 diabetes. Non-limiting examples of MHC class II DR3 and DR4 peptides that have high affinity for binding to MHC class II DR3 and MHC class II DR4 molecules in humans are presented in example 14 (tables 2-6).

In some cases, the cells in the tolerizing vaccine or preparatory regimen are coupled to HLA-G, HLA-E, or a combination thereof.

In some embodiments, a "cocktail" of peptides can be conjugated on the surface of the apoptotic leucocytes. In some embodiments, the apoptotic cells such as leucocytes can comprise one or more peptides derived from MHC class II molecule. In some embodiments, the apoptotic cells such as leucocytes can comprise, for example, at least 2, 3, 5, 7, 10, 15, 20, 30, 40, 50, 100 or more peptides derived from a MHC class II molecule. In some embodiments, the apoptotic leucocytes can comprise one or more peptides derived from a MHC class I molecule. In some embodiments, the apoptotic cells such as leucocytes can comprise, for example, at least 2, 3, 5, 7, 10, 15, 20, 30, 40, 50, 100 or more peptides derived from a MHC class I molecule. A mixture of more than one peptide derived from a MHC class II molecule, has the advantage of inducing increased immune tolerance response in the recipient. The increased tolerance can be, for example, through a mechanism called linked supersession. The mechanism of linked suppression will be known to an artisan skilled in the art. For instance, peptides comprising sequences from hypervariable regions of α and β chains may be used in combination. In certain embodiments, the size of a protein or polypeptide (wild-type or modified), may comprise, but is not limited to 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1750, 2000, 2250, 2500 amino molecules or greater, including any range or value derivable therein, or derivative thereof. In certain aspects, 5, 6, 7, 8, 9, 10, 12, 15, 20, 30 or more contiguous amino acids, including derivatives thereof, and fragments of an MHC molecule can be used. It is contemplated that peptides may be mutated by truncation, rendering them shorter than their corresponding wild-type form, but also they might be altered by fusing or conjugating a heterologous protein sequence with a particular function (e.g., for presentation as a protein complex, for enhanced immunogenicity, etc.).

The MHC class II molecule, MHC class I molecule and MHC status of a donor or a recipient can be determined, for example, by conventional methods of HLA-typing or tissue typing known in the arts. Non limiting examples of methods that can be employed include serological methods, cellular methods and DNA typing methods. Serology is used to identify the HLA proteins on the surface of cells. A complement dependent cytotoxicity test or microlymphocytotoxicity assay can be used for serological identification of MHC molecules. Peripheral blood lymphocytes (PBLs) express MHC class I antigens and are used for the serologic typing of HLA-A, HLA-B, and HLA-C. MHC class II typing is done with B lymphocytes isolated from PBLs because these cells express class II molecules. HLA typing is performed in multiwell plastic trays with each well containing a serum of known HLA specificity.

Lymphocytes are plated in the well and incubated, and complement (rabbit serum as a source) is added to mediate the lysis of antibody-bound lymphocytes (See. Terasaki Pi, Nature. 1964). Cellular assays such as the mixed lymphocyte culture (MLC) measure the differences in class II proteins between individuals. This may be accomplished in a number of ways, all of which are known to those skilled in the art, e.g., subtyping may be accomplished by mixed lymphocyte response (MLR) typing and by primed lymphocyte testing (PLT). Both methods are described in Weir and Blackwell, eds., Handbook of Experimental Immunology, which is incorporated herein by reference. It may also be accomplished by analyzing DNA restriction fragment length polymorphism (RFLP) using DNA probes that are specific for the MHC locus being examined. Methods for preparing probes for the MHC loci are known to those skilled in the art. See, e.g., Gregersen et al. (1986), Proc. Natl. Acad. Sci. USA 79:5966, which is incorporated herein by reference. High resolution identification of MHC molecules in a transplant and a recipient can be done by DNA typing methods. Different HLA alleles defined by DNA typing can specify HLA proteins which are indistinguishable using serologic typing. For example, an individual carrying the DRB1*040101 allele would have the same serologic type (DR4) as an individual carrying the DRB1*0412 allele. Thus, DRB1*040101 and DRB1*0412 are splits of the broad specificity DR4. These splits are identified by DNA typing.

Identification of MHC molecules can be accomplished by sequencing of genomic DNA of the locus, or cDNA to mRNA encoded within the locus. The DNA which is sequenced includes the section encoding the hypervariable regions of the MHC encoded polypeptide. Techniques for identifying specifically desired DNA with a probe, for amplification of the desired region are known in the art, and include, for example, the polymerase chain reaction (PCR) technique.

As an alternative method, polymorphic DNA sequences can be used as amplification primers, and in this case only alleles containing sequences complementary to these primers will anneal to the primers and amplification will proceed. This second strategy of DNA typing is called the sequence-specific primer (SSP) method, described for example, in Altaf et al World J Transplant. 2017, Erlich H. A. et al. Immunity, Vol. 14, 347-356, April, 2001, Dunckley H, Methods Mol Biol. 2012. US20090069190A1, US20110117553A1. One of skill in the art can determine the protein product once the gene sequence of MHC molecule is determined by DNA typing methods. In some embodiments, the DNA sequences can be used for recombinant synthesis of peptides of MHC class II molecule and MHC class I molecule.

Alternatively, or additionally, the cells can be treated with a fixative or crosslinking agent in the presence of biotin or streptavidin. In such cases, the one or more immunomodulatory molecules, agents that increases expression of anti-inflammatory cytokines, and/or antigens or epitopes can be coupled to streptavidin or biotin, and can be contacted with the cells following the contacting with the fixative or crosslinking agent. The one or more immunomodulatory molecules, agents that increases expression of anti-inflammatory cytokines, and/or antigens or epitopes can bind to the cells via streptavidin-biotin interaction.

An alternative strategy can comprise coupling one or more: immunomodulatory molecules; agents that increases expression of anti-inflammatory cytokines in a recipient; transplant donor antigens and/or epitopes, transplant recipient antigens and/or epitopes, and/or third party antigens and/or epitopes to nanoparticles such as polystyrene nanoparticles. Such nanoparticles can be administered with, or as part of, a tolerizing vaccine or preparatory regimen.

As used herein, the term "conjugate" or "conjugated to," and the like refer to molecular entities (e.g., peptides of the present disclosure and an apoptotic leucocyte) being linked together through covalent or non-covalent bonds. Conjugation may be accomplished by directly coupling the two molecular entities, e.g., creating an ester or amide from an hydroxyl group, amino group, and a carboxylic acid. Conjugation may be accomplished by indirectly coupling the two molecular entities, e.g., instituting a linking group such as a polyethylene glycol. Conjugation may be accomplished by modifying the molecular entities with chemical groups that react with one another, e.g., alkyne-functionalized entity with an azide-functionalized entity or the reduction of thiol groups on individual entities to form a disulfide bond. Conjugates such as ethylene carbodiimide (ECDI), hexamethylene diisocyanate, propyleneglycol di-glycidylether which contain 2 epoxy residues, and epichlorohydrin can be used for fixation of peptides or proteins to the apoptotic leucocyte surface. Reactive carboxyl groups on the surface of an apoptotic leukocyte can be joined to free amines (e.g., from Lys residues) on the peptide or protein, by reacting them with, for example, 1-ethyl-3-[3,9-dimethyl aminopropyl]carbodiimide hydrochloride (EDC) or N-hydroxysuccinimide ester (NHS). Similarly, the same chemistry may be used to conjugate free amines on the surface of an apoptotic leukocyte with free carboxyls (e.g., from the C-terminus, or from Asp or Glu residues) on the peptide or protein. Alternatively, free amine groups on the surface of an apoptotic leukocyte may be covalently bound to peptides and proteins, or peptide or protein fusion proteins, using sulfo-SIAB chemistry, essentially as described by Arano et al. (1991) Chem. 2:71-6. A great variety of means, well known in the art, may be used to conjugate the peptides to surface of apoptotic leucokocytes. These methods include any standard chemistry which do not destroy or severely limit the biological activity of the peptides and that of the apoptotic leucokocytes, and which allow for a sufficient number of peptides to be conjugated to the surface in an orientation which allows for inducing tolerance. In some embodiments the C-terminal regions of a peptide are conjugated. In other embodiments, the N-terminus of a peptide can be conjugated onto the surface of the apoptotic leucocyte.

Short Term Immunosuppression

A preparatory regimen or tolerizing vaccine of the disclosure can comprise administering one or more immunosuppression agents and/or anti-inflammatory agents to a transplant recipient, for example, administering one or more immunosuppression agents and/or anti-inflammatory agents in addition to apoptotic cells (such as apoptotic donor leukocytes or mesenchymal stromal cells).

In some cases, a preparatory regimen or tolerizing vaccine of the disclosure can comprise short term immunosuppression of a transplant recipient. In some cases, a tolerance in a transplant recipient to a transplanted cell, organ, or tissue can be maintained despite not administering long term or maintenance immunosuppression to the recipient.

Short term immunosuppression can comprise administering any immunosuppression agents and/or anti-inflammatory agents disclosed herein to a transplant recipient.

In some embodiments, a tolerizing vaccine or preparatory regimen of the disclosure can comprise administering apoptotic cells (e.g., apoptotic donor leukocytes or mesenchymal stromal cells) to a recipient, and short term immunosuppression comprising an mTOR inhibitor (e.g., rapamycin).

In an exemplary embodiment, a tolerizing vaccine or preparatory regimen of the disclosure can comprise administering apoptotic donor leukocytes to a recipient, and short term immunosuppression comprising any one or more of: (i) an mTOR inhibitor, (ii) an anti-tumor necrosis factor agent or an anti-tumor necrosis factor receptor agent, (iii) an anti-interleukin 6 agent or an anti-interleukin 6 receptor agent, and (iv) an anti-CD40 agent or an anti-CD40 ligand agent. The short-term administration of these agents along with apoptotic donor leukocytes as disclosed herein can promote long-term tolerance to a transplanted cell, organ, or tissue despite not administering long term maintenance immunosuppression to the recipient.

In an exemplary embodiment, the short term immunosuppression comprises administering an mTOR inhibitor, an anti-tumor necrosis factor agent, an anti-interleukin 6 receptor agent, and an anti-CD40 agent. The short-term administration of these agents along with apoptotic donor leukocytes as disclosed herein can promote long-term tolerance to a transplanted cell, organ, or tissue despite not administering long term maintenance immunosuppression to the recipient.

In an exemplary embodiment, the short term immunosuppression comprises administering an mTOR inhibitor, a soluble tumor necrosis factor receptor, an anti-interleukin 6 receptor antibody, and an antagonistic anti-CD40 antibody. The short-term administration of these agents along with apoptotic donor leukocytes as disclosed herein can promote long-term tolerance to a transplanted cell, organ, or tissue despite not administering long term maintenance immunosuppression to the recipient.

Non-limiting examples of mTOR inhibitors include rapamycin, sirolimus, and everolimus. In some cases, an mTOR inhibitor of the disclosure is rapamycin.

An anti-tumor necrosis factor agent or an anti-tumor necrosis factor receptor agent can comprise an anti-tumor necrosis factor antibody or antigen-binding fragment thereof, an antagonistic anti-tumor necrosis factor receptor antibody or antigen-binding fragment thereof, or a soluble a tumor necrosis factor binding domain of a tumor necrosis factor receptor (e.g., etanercept). Tumor necrosis factor can be TNF-alpha. In some cases, an anti-tumor necrosis factor agent or an anti-tumor necrosis factor receptor agent is a soluble a tumor necrosis factor binding domain of a tumor necrosis factor receptor (e.g., etanercept). Non-limiting examples of anti-tumor necrosis factor agents and anti-tumor necrosis factor receptor agents include etanercept, infliximab, adalimumab, certolizumab pegol, and golimumab.

An anti-interleukin 6 agent or an anti-interleukin 6 receptor agent can be an anti-interleukin 6 antibody, an antagonistic anti interleukin 6 receptor antibody, or an antigen binding fragment thereof. In some cases, an anti-interleukin 6 agent or an anti-interleukin 6 receptor agent of the disclosure is an antagonistic anti interleukin 6 receptor antibody (e.g., tocilizumab). Non-limiting examples of anti-interleukin 6 or anti-interleukin 6 receptor agents include tocilizumab, actemra, clazakizumab, ALD518, siltuximab, elsilimomab, sirukumab, sarilumab, and olokizumab.

An anti-CD40 agent or an anti-CD40 ligand agent can be, for example, an antagonistic anti-CD40 antibody, and antagonistic anti-CD40 ligand antibody, or an antigen binding fragmented thereof. An anti-CD40 agent or an anti-CD40 ligand agent can be an antagonistic anti-CD40 antibody or antigen-binding fragment thereof. Non-limiting examples of antagonistic anti-CD40 antibodies include 2C10, 2C10R4, ASKP1240, 4D11, bleselumab, BI-655064, HCD122, CFZ533, ch5D12, CDP7657, and FFP104. In some cases, the anti-CD40 agent is ASKP1240. An anti-CD40 agent or an anti-CD40 ligand agent can be an antagonistic anti-CD40 ligand antibody or antigen-binding fragment thereof. Non-limiting examples of antagonistic anti-CD40 ligand antibodies include BG9588, ruplizumab, toralizumab, IDEC-131, dapirolizumab, letolizumab, BMS-986004, V1B4920, and MED14920.

In some embodiments, short term immunosuppression comprises administering an mTOR inhibitor. In some embodiments, short term immunosuppression comprises administering an anti-tumor necrosis factor agent or an anti-tumor necrosis factor receptor agent. In some embodiments, short term immunosuppression comprises administering an anti-interleukin 6 agent or an anti-interleukin 6 receptor agent. In some embodiments, short term immunosuppression comprises administering an anti-CD40 agent or an anti-CD40 ligand agent.

In some embodiments, short term immunosuppression comprises administering (i) an mTOR inhibitor and (ii) an anti-tumor necrosis factor agent or an anti-tumor necrosis factor receptor agent. In some embodiments, short term immunosuppression comprises administering (i) an mTOR inhibitor, and (ii) an anti-interleukin 6 agent or an anti-interleukin 6 receptor agent. In some embodiments, short term immunosuppression comprises administering (i) an mTOR inhibitor, and (ii) an anti-CD40 agent or an anti-CD40 ligand agent. In some embodiments, short term immunosuppression comprises administering (i) an anti-tumor necrosis factor agent or an anti-tumor necrosis factor receptor agent, and (ii) an anti-interleukin 6 agent or an anti-interleukin 6 receptor agent. In some embodiments, short term immunosuppression comprises administering (i) an anti-tumor necrosis factor agent or an anti-tumor necrosis factor receptor agent, and (ii) an anti-CD40 agent or an anti-CD40 ligand agent. In some embodiments, short term immunosuppression comprises administering (i) an anti-interleukin 6 agent or an anti-interleukin 6 receptor agent, and (ii) an anti-CD40 agent or an anti-CD40 ligand agent.

In some embodiments, short term immunosuppression comprises administering (i) an mTOR inhibitor, (ii) an anti-tumor necrosis factor agent or an anti-tumor necrosis factor receptor agent, and (iii) an anti-interleukin 6 agent or an anti-interleukin 6 receptor agent. In some embodiments, short term immunosuppression comprises administering (i) an mTOR inhibitor, (ii) an anti-tumor necrosis factor agent or an anti-tumor necrosis factor receptor agent, and (iii) an anti-CD40 agent or an anti-CD40 ligand agent. In some embodiments, short term immunosuppression comprises administering (i) an mTOR inhibitor, (ii) an anti-interleukin 6 agent or an anti-interleukin 6 receptor agent, and (iii) an anti-CD40 agent or an anti-CD40 ligand agent. In some embodiments, short term immunosuppression comprises administering (i) an anti-tumor necrosis factor agent or an anti-tumor necrosis factor receptor agent, (ii) an anti-interleukin 6 agent or an anti-interleukin 6 receptor agent, and (iii) an anti-CD40 agent or an anti-CD40 ligand agent.

Short term immunosuppression can comprise administering one or more immunosuppression agents and/or anti-inflammatory agents of the disclosure for at most about 100 days after a transplant. Short term immunosuppression can comprise administering one or more immunosuppression agents and/or anti-inflammatory agents of the disclosure, for example, for at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days after a transplant. In some cases, short term immunosuppression can conclude within 28 days after a transplant. In some cases, short term immunosuppression can conclude about 21 days after a transplant.

In some embodiments, short term immunosuppression can begin prior to transplantation. For example, short term immunosuppression can commence about or at most about 1, 2, 3, 4, 5, 6, 7, 8, 9, 10, 11, 12, 13, 14, 15, 16, 17, 18, 19, 20, 21, 22, 23, 24, 25, 26, 25, 28, 29, 30, 35, or 50 days prior to a transplant. In some cases, short term immunosuppression can commence at most about 10 days prior to a transplant. In some cases, short term immunosuppression can commence about 7 days prior to a transplant.

The duration of short term immunosuppression (e.g., the length of time between administering a first dose and a final dose of an immunosuppression agents and/or anti-inflammatory agents can be about or at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days. In some cases, the duration of short term immunosuppression can be about or at most about 30 days. In some cases, the duration of short term immunosuppression can be about 28 days.

In some cases, short term immunosuppression comprises administering an mTOR inhibitor at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days after a transplant. In some cases, short term immunosuppression comprises administering an mTOR inhibitor at most about 21 days after a transplant.

In some cases, short term immunosuppression comprises administering an mTOR inhibitor beginning about or at most about 1, 2, 3, 4, 5, 6, 7, 8, 9, 10, 11, 12, 13, 14, 15, 16, 17, 18, 19, 20, 21, 22, 23, 24, 25, 26, 25, 28, 29, 30, 35, or 50 days prior to a transplant. In some cases, short term immunosuppression comprises administering an mTOR inhibitor beginning about or at most about 7 days prior to a transplant.

In some cases, short term immunosuppression comprises administering an mTOR inhibitor for a duration of about or at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days. In some cases, short term immunosuppression comprises administering an mTOR inhibitor for a duration of about or at most about 28 days.

An mTOR inhibitor can be administered for short term suppression on about, for example, any one or more of days −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 relative to transplant on day 0. In some cases, an mTOR inhibitor can be administered for short term suppression on about days −7 through day 21 relative to transplant on day 0.

In some cases, short term immunosuppression comprises administering an anti-tumor necrosis factor agent or an anti-tumor necrosis factor receptor agent at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days after a transplant. In some cases, short term immunosuppression comprises administering an anti-tumor necrosis factor agent or an anti-tumor necrosis factor receptor agent at most about 21 days after a transplant.

In some cases, short term immunosuppression comprises administering an anti-tumor necrosis factor agent or an anti-tumor necrosis factor receptor agent beginning about or at most about 1, 2, 3, 4, 5, 6, 7, 8, 9, 10, 11, 12, 13, 14, 15, 16, 17, 18, 19, 20, 21, 22, 23, 24, 25, 26, 25, 28, 29, 30, 35, or 50 days prior to a transplant. In some cases, short term immunosuppression comprises administering an anti-tumor necrosis factor agent or an anti-tumor necrosis factor receptor agent beginning about or at most about 7 days prior to a transplant.

In some cases, short term immunosuppression comprises administering an anti-tumor necrosis factor agent or an anti-tumor necrosis factor receptor agent for a duration of about or at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days. In some cases, short term immunosuppression comprises administering an anti-tumor necrosis factor agent or an anti-tumor necrosis factor receptor agent for a duration of about or at most about 28 days.

An anti-tumor necrosis factor agent or an anti-tumor necrosis factor receptor agent can be administered for short term suppression on about, for example, any one or more of days −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 relative to transplant on day 0. In some cases, an anti-tumor necrosis factor agent or an anti-tumor necrosis factor receptor agent can be administered for short term suppression on about days −7, 0, 3, 7, 10, 14, and 21 relative to transplant on day 0.

In some cases, short term immunosuppression comprises administering an anti-interleukin 6 agent or an anti-interleukin 6 receptor agent at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days after a transplant. In some cases, short term immunosuppression comprises administering an anti-interleukin 6 agent or an anti-interleukin 6 receptor agent at most about 21 days after a transplant.

In some cases, short term immunosuppression comprises administering an anti-interleukin 6 agent or an anti-interleukin 6 receptor agent beginning about or at most about 1, 2, 3, 4, 5, 6, 7, 8, 9, 10, 11, 12, 13, 14, 15, 16, 17, 18, 19, 20, 21, 22, 23, 24, 25, 26, 25, 28, 29, 30, 35, or 50 days prior to a transplant. In some cases, short term immunosuppression comprises administering an anti-interleukin 6 agent or an anti-interleukin 6 receptor agent beginning about or at most about 7 days prior to a transplant.

In some cases, short term immunosuppression comprises administering an anti-interleukin 6 agent or an anti-interleukin 6 receptor agent for a duration of about or at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days. In some cases, short term immunosuppression comprises administering an anti-interleukin 6 agent or an anti-interleukin 6 receptor agent for a duration of about or at most about 28 days.

An anti-interleukin 6 agent or an anti-interleukin 6 receptor agent can be administered for short term suppression on about, for example, any one or more of days −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 relative to transplant on day 0. In some cases, an anti-interleukin 6 agent or an anti-interleukin 6 receptor agent can be administered for short term suppression on about days −7, 0, 7, 14, and 21 relative to transplant on day 0.

In some cases, short term immunosuppression comprises administering an anti-CD40 agent or an anti-CD40 ligand agent at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days after a transplant. In some cases, short term immunosuppression comprises administering an anti-CD40 agent or an anti-CD40 ligand agent at most about 14 days after a transplant.

In some cases, short term immunosuppression comprises administering an anti-CD40 agent or an anti-CD40 ligand agent beginning about or at most about 1, 2, 3, 4, 5, 6, 7, 8, 9, 10, 11, 12, 13, 14, 15, 16, 17, 18, 19, 20, 21, 22, 23, 24, 25, 26, 25, 28, 29, 30, 35, or 50 days prior to a transplant. In some cases, short term immunosuppression comprises administering an anti-CD40 agent or an anti-CD40 ligand agent beginning about or at most about 8 days prior to a transplant.

In some cases, short term immunosuppression comprises administering an anti-CD40 agent or an anti-CD40 ligand agent for a duration of about or at most about 7, 8, 9, 10, 11, 12, 13, 14, 15, 16, 17, 18, 19, 20, 21, 22, 23, 24, 25, 26, 25, 28, 29, 30, 31, 32, 33, 34, 35, 40, 42, 49, 50, 55, 60, 70, 80, 90, or 100 days. In some cases, short term immunosuppression comprises administering an anti-CD40 agent or an anti-CD40 ligand agent for a duration of about or at most about 22 days.

An anti-CD40 agent or an anti-CD40 ligand agent can be administered for short term suppression on about, for example, any one or more of days −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 relative to transplant on day 0. In some cases, an anti-CD40 agent or an anti-CD40 ligand agent can be administered for short term suppression on about days −8, −1, 7, and 14 relative to transplant on day 0.

In some cases, short term immunosuppression can comprise administering one or more immunosuppression agents (e.g., immunomodulatory molecules). One or more than one immunosuppressive agents/drugs can be used together or sequentially. Immunosuppression agents include, but are not limited to, an anti-CD40 agent or anti-CD40L (CD154) agent (e.g., an anti-CD40 antibody), a B-cell targeting agent (e.g., B cell depleting biologics, for example, a biologic targeting CD20, CD19, or CD22, and/or B cell modulating biologics, for example, a biologic targeting BAFF, BAFF/APRIL, CD40, IgG4, ICOS, IL-21, B7RP1), an mTOR inhibitor, a TNF-alpha inhibitor, a IL-6 inhibitor, α1-antitrypsin, a nitrogen mustard alkylating agent (e.g., cyclophosphamide), a complement C3 or C5 inhibitor, IFN-γ, an NFκB inhibitor, vitamin D3, siCD40, cobalt protoporphyrin, insulin B9-23, a cluster of differentiation protein (e.g., CD46, CD55, or CD59), any combination thereof, or any fragment thereof. In some cases, the NFκB inhibitor is dehydroxymethylepoxyquinomicin (DHMEQ), curcumin, triptolide, Bay-117085, or a combination thereof. Non-limiting examples of B-cell targeting biologics include Rituximab, anti-CD20 antibody. Any of these additional immunosuppression agents can be given to the subject before and/or after transplant.

In some cases, an immunosuppression agent used for short term immunosuppression can be any one or more of MMF (mycophenolate mofetil (Cellcept)), ATG (anti-thymocyte globulin), anti-CD154 (CD40L), alemtuzumab (Campath), CTLA4-Ig (Abatacept/Orencia), belatacept (LEA29Y), daclizumab (Ze-napax), basiliximab (Simulect), infliximab (Remicade), cyclosporin, deoxyspergualin, soluble complement receptor 1, cobra venom factor, compstatin, anti C5 antibody (eculizumab/Soliris), methylprednisolone, FTY720, everolimus, anti-CD154-Ab, leflunomide, anti-IL-2R-Ab, anti-CXCR3 antibody, anti-ICOS antibody, anti-OX40 antibody, and anti-CD122 antibody, human anti-CD154 monoclonal antibody, CD40 antagonist, and CD40L (CD154) antagonist.

In some cases, an immunosuppression agent used for short term immunosuppression can target T cell receptor (TCR), CD3e, FK506-binding protein 12 (FKBP12), cytotoxic T lymphocyte associated protein 4 (CTLA-4), programmed cell death protein 1 (PD-1), programmed death ligand 1 (PD-L1), CD40L (CD154), CD40, inducible costimulatory (ICOS), IL-2, TNF-α, IL-6, IL-7, CD2, CD20, CD52, α-4 integrin, mTOR (mechanistic target of rapamycin, everolimus, serolimus), DNA synthesis, or any combination thereof.

In some cases, an immunosuppression agent used for short term immunosuppression can be a MHC/TCR interaction blockade, a nonselective depleting agent, calcineurin inhibitor, costimulatory signal blockade, cytokine blockade, lymphocyte depleting agent, cell adhesion inhibitor, IL-2 signaling inhibitor, cell cycle blocker, or any combination thereof. For example, the MHC/TCR interaction blockade can be anti-abTCR mAb T10B9. For example, the nonselective depleting agent can be anti-CD3 mAb (OKT3) or antithymocyte globulin (ATG). For example, the calcineurin inhibitor can be cyclosporine or tacrolimus. For example, the costimulatory signal blockade can be anti-CTLA-4 mAb, abatacept, ipilimumab, anti-PD-1 (such as pembrolizumab), anti-PD-L1 (such as MPDL3280A), anti-CD154 mAb, anti-CD40 mAb, or anti-ICOS mAb. For example, the cytokine blockade can be anti-CD25 mAb (such as daclizumab or basiliximab), anti-TNF (etanercept, infliximab, adalimumab, certolizumab pegol, and golimumab), anti-IL-6/IL-6R mAb (such as clazakizumab, ALD518, siltuximab, elsilimomab, sirukumab, olokizumab, sarilumab, tocilizumab, actemra), or anti-IL-7 mAb. For example, the lymphocyte depleting agent can be anti-CD2 mAb, fusion protein with IgG1 (such as alefacept), anti-CD20 mAb (such as rituximab), or anti-CD52 mAb (such as alemtuzumab). For example, the cell adhesion inhibitor can be anti-very large antigen 4 (VLA4) (such as natalizumab). For example, the IL-2 signaling inhibitor can be sirolimus (rapamycin) or everolimus. For example, the cell cycle blocker can be mycophenolate mofetil (MMF) or azathioprine.

Methods of Administration

Provided herein are methods of inducing tolerance to a cell, tissue, or organ transplant. The transplant can be a xenotransplant or an allotransplant. The methods can comprise administering to a subject a composition comprising a tolerizing vaccine or preparatory regimen. Administering can be by intravenous infusion. Administration of the tolerizing vaccine or preparatory regimen can result in long term tolerance to the cell, tissue, or organ transplant in the transplant recipient.

The tolerizing vaccine/regimen or the preparatory regimen disclosed herein can increase the duration of survival of a transplant (e.g., a xenograft or an allograft transplant) in a recipient for a period of at least one month, at least two months, at least three months, at least four months, at least five months, at least six months, at least 1 year, at least 2 years, at least 3 years, at least 4 years, at least 5 years, at least 6 years, at least 7 years, at least 8 years, at least 9 years, or at least 10 years. The tolerizing vaccine or the preparatory regimen disclosed herein can also reduce or eliminate need for immunosuppression following transplantation.

A xenograft or allograft transplant can be an organ, tissue, cell or cell line, including an organ, tissue, cell, or cell differentiated from a stem cell. Transplants and tolerizing vaccines can be from different donors, or the same donor. Transplants and tolerizing vaccines can be from different species, or the same species. In some cases, a xenograft transplant and a tolerizing vaccine can be from different donors that are substantially genetically identical.

One or more doses of a tolerizing vaccine/regimen or preparatory regimen can be administered to a transplant recipient. The one or more dose(s) of the tolerizing vaccine or preparatory regimen can be administered before and/or during and/or after the cell, tissue or organ is transplanted. The day of transplantation of the cell, tissue, or organ can be referred to as day 0. Preceding days relative to day 0 (the day the recipient receives the graft cell, tissue, or organ) can be referred to by negative numbers. For example, a tolerizing vaccine or preparatory regimen administered 7 days before the graft cell, tissue, or organ, can be designated as being administered on day −7. Similarly, days following the day the recipient receives the transplanted cell, organ, or tissue, can be referred to by positive numbers. For example, a tolerizing vaccine or preparatory regimen administered 7 days after the graft cell, tissue, or organ, can be designated as being administered on day 7 or day +7.

In some cases, a dose of a tolerizing vaccine/regimen or preparatory regimen is administered at least about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days prior to transplantation of the graft cell, tissue, or organ.

In some cases, a dose of a tolerizing vaccine/regimen or preparatory regimen is administered at most about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days prior to transplantation of the graft cell, tissue, or organ.

In some cases, a dose of a tolerizing vaccine or preparatory regimen is administered about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days prior to transplantation of the graft cell, tissue, or organ.

In some cases, a dose of a tolerizing vaccine/regimen or preparatory regimen is administered on the same day the recipient receives the graft cell, tissue, or organ (e.g., the dose is administered on day 0). A dose administered on day 0 can be administered concurrently with the graft cell, tissue, or organ, or within 24 hours of the graft cell, tissue, or organ. For example, the dose of the tolerizing vaccine or preparatory regimen can be administered at −23, −22, −21, −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, or 23 hours relative to the graft cell, tissue, or organ.

In some cases, a dose of a tolerizing vaccine/regimen or preparatory regimen is administered at least about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days after transplantation of the graft cell, tissue, or organ.

In some cases, a dose of a tolerizing vaccine/regimen or preparatory regimen is administered at most about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days after transplantation of the graft cell, tissue, or organ.

In some cases, a dose of a tolerizing vaccine or preparatory regimen is administered about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days after transplantation of the graft cell, tissue, or organ.

A preparatory regimen can comprise multiple doses of a tolerizing vaccine before, and/or during and/or after transplantation of a graft cell, tissue, or organ. The multiple doses can be referred to as comprising an initial dose and one or more booster doses. The initial dose can occur prior to or concurrently with the transplant of the graft cell tissue or organ. The booster dose(s), when administered, occur after the initial dose. Depending upon when the initial dose of the tolerizing vaccine is administered, one or more booster doses can be administered before, and/or concurrently with, and/or after transplant of the graft cell, tissue, or organ.

Subsequent (e.g., booster) dose(s) of a tolerizing vaccine/regimen can be administered in any interval of time following a preceding dose (e.g., an initial dose). For example, the subsequent dose can be administered about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 60 days, 90 days, 120 days, 150 days, or 180 days after the preceding dose. Depending upon when the initial dose is administered subsequent (booster) dose(s) can be administered before, concurrently with, or after transplantation of the graft cell, tissue, or organ. In some cases, the preparatory regimen comprises at least one dose of tolerizing vaccine prior to transplantation. In some cases, the preparatory regimen comprises at least two doses of tolerizing vaccine prior to transplantation (e.g., an initial dose and a booster dose). In some cases, the preparatory regimen comprises at least three doses of tolerizing vaccine prior to transplantation (e.g., an initial dose and two booster doses). In some cases, the preparatory regimen comprises an initial dose of tolerizing vaccine prior to transplantation and at least one dose of booster vaccine concurrently with or after transplantation of the graft cell, tissue, or organ.

In some cases, two doses of the tolerizing vaccine or preparatory regimen can be administered. The first dose can be administered, for example, on day −14, −10, −9, −8, −7, −6, −5, −4, −3, −2, −1, 0, 1, 2, 3, 4, 5, 6, or 7 relative to transplant of donor cells, organs, and/or tissues on day 0. The second dose can be administered, for example, on day −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, or 28 relative to transplant of donor cells, organs, and/or tissues on day 0. In some embodiments, the first dose is administered on day −8 and the second dose is administered on day −1. In some embodiments, the first dose is administered on day −8 and the second dose is administered on day 0. In some embodiments, the first dose is administered on day −8 and the second dose is administered on day 1. In some embodiments, the first dose is administered on day −7 and the second dose is administered on day −1. In some embodiments, the first dose is administered on day −7 and the second dose is administered on day 0. In some embodiments, the first dose is administered on day −7 and the second dose is administered on day 1. In some embodiments, the first dose is administered on day −12 and the second dose is administered on day −4. In some embodiments, the first dose is administered on day −11, −12, −13, or −14 and the second dose is administered on day −3, −4, −5, or −6.

In some cases, a second dose of the tolerizing vaccine/regimen (e.g., a booster vaccine) can be administered on day 100, day 90, day 80, day 70, day 60, day 50, day 40, day 30, day 29, day 28, day 27, day 26, day 25, day 24, day 23, day 22, day 21, day 20, day 19, day 18, day 17, day 16, day 15, day 14, day 13, day 12, day 11, day 10, day 9, day 8, day 7, day 6, day 5, day 4, day 3, day 2 or day 1, relative to transplant of donor cells, organs, and/or tissues on day 0. For example, the second dose of the tolerizing vaccine (e.g., a booster vaccine) can be administered 1 day after transplant of donor cells, organs, and/or tissues. In some cases, a second dose of a tolerizing vaccine is given concomitantly on day 0 with transplant donor cells, organs, and/or tissues. In some cases, a second dose of a tolerizing vaccine is not required.

In some cases, three doses of the tolerizing vaccine/regimen or preparatory regimen can be administered. The first dose can be administered, for example, on day −14, −10, −9, −8, −7, −6, −5, −4, −3, −2, −1, 0, 1, 2, 3, 4, 5, 6, or 7 relative to transplant of donor cells, organs, and/or tissues on day 0. The second dose can be administered, for example, on day −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, or 28 relative to transplant of donor cells, organs, and/or tissues on day 0. The third dose can be administered, for example, on day 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 120, 150, 180, 200, 250, 300, 350, or 365 relative to transplant of donor cells, organs, and/or tissues on day 0. In some embodiments, the first dose is administered on day −8, the second dose is administered on day 1, and the third dose is administered on day 7. In some embodiments, the first dose is administered on day −8, the second dose is administered on day 1, and the third dose is administered on day 14. In some embodiments, the first dose is administered on day −8, the second dose is administered on day 1, and the third dose is administered on day 21. In some embodiments, the first dose is administered on day −7, the second dose is administered on day 1, and the third dose is administered on day 7. In some embodiments, the first dose is administered on day −7, the second dose is administered on day 1, and the third dose is administered on day 14. In some embodiments, the first dose is administered on day −7, the second dose is administered on day 1, and the third dose is administered on day 21.

In some cases, a third dose of the tolerizing vaccine/regimen (e.g., a booster vaccine) can be administered on day 300, day 200, day 100, day 90, day 80, day 70, day 60, day 50, day 40, day 30, day 29, day 28, day 27, day 26, day 25, day 24, day 23, day 22, day 21, day 20, day 19, day 18, day 17, day 16, day 15, day 14, day 13, day 12, day 11, day 10, day 9, day 8, day 7, day 6, day 5, day 4, day 3, day 2 or day 1, relative to transplant of donor cells, organs, and/or tissues on day 0. For example, the tolerizing vaccine can be administered on or on about day 300 to 200; 200 to 100; 100 to 50; 50 to 40; 40 to 30; 30 to 20; 20 to 10; 10 to 5; or 7 to 1, relative to transplant of donor cells, organs, and/or tissues on day 0.

In some cases, a fourth dose of the tolerizing vaccine/regimen (e.g., a booster vaccine) can be administered on day 600, day 500, day 400, day 300, day 200, 100, day 90, day 80, day 70, day 60, day 50, day 40, day 30, day 29, day 28, day 27, day 26, day 25, day 24, day 23, day 22, day 21, day 20, day 19, day 18, day 17, day 16, day 15, day 14, day 13, day 12, day 11, day 10, day 9, day 8, day 7, day 6, day 5, day 4, day 3, day 2 or day 1, relative to transplant of donor cells, organs, and/or tissues on day 0. For example, the tolerizing vaccine can be administered on or on about day 600 to 500; 500 to 400; 400 to 300; 300 to 200; 200 to 100; 100 to 50; 50 to 40; 40 to 30; 30 to 20; 20 to 10; 10 to 5; 7 to 1, relative to transplant of donor cells, organs, and/or tissues on day 0.

In some cases, a fifth dose of the tolerizing vaccine (e.g., a booster vaccine) can be administered on day 1,000, day 900, day 800, day 700, day 600, day 500, day 400, day 300, day 200, 100, day 90, day 80, day 70, day 60, day 50, day 40, day 30, day 29, day 28, day 27, day 26, day 25, day 24, day 23, day 22, day 21, day 20, day 19, day 18, day 17, day 16, day 15, day 14, day 13, day 12, day 11, day 10, day 9, day 8, day 7, day 6, day 5, day 4, day 3, day 2 or day 1, relative to transplant of donor cells, organs, and/or tissues on day 0. For example, the tolerizing vaccine can be administered on or on about day 1,000 to 900; 900 to 800; 800 to 700; 700 to 600; 600 to 500; 500 to 400; 400 to 300; 300 to 200; 200 to 100; 100 to 50; 50 to 40; 40 to 30; 30 to 20; 20 to 10; 10 to 5; 7 to 1, relative to transplant of donor cells, organs, and/or tissues on day 0.

Administration of the tolerizing vaccine/regimen or preparatory regimen can result in long term tolerance to the cell, tissue, or organ transplant in the transplant recipient. In some cases, the long term tolerance is for a period of at least one month, at least two months, at least three months, at least four months, at least five months, at least six months, at least seven months, at least eight months, at least nine months, at least ten months, at least eleven months, at least twelve months, at least thirteen months, at least fourteen months, at least fifteen months, at least sixteen months, at least seventeen months, at least eighteen months, at least nineteen months, at least twenty months, at least twenty-one months, at least twenty-two months, at least twenty-three months, or at least twenty-four months. In some cases, the long term tolerance is for a period of at least 1 year, at least 2 years, at least 3 years, at least 4 years, at least 5 years, at least 6 years, at least 7 years, at least 8 years, at least 9 years, or at least 10 years. In some cases, the long term tolerance is achieved in the absence of a booster vaccine or booster regimen. In some cases, the long term tolerance is achieved with an administration of a booster vaccine or booster regimen in one or multiple doses. In some cases, one or more booster vaccine doses are administered on the day of, or at least 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 60 days, 65 days, 70 days, 75 days, 80 days, 85 days, 90 days, 95 days, 100 days, 105 days, 110 days, 115 days, 120 days, 125 days, 130 days, 135 days, 140 days, 145 days, 150 days, 155 days, 160 days, 165 days, 170 days 175 days, 180 days, 185 days, 190 days, 195 days, 200 days, 205 days, 210 days, 215 days, 220 days, 230 days or 240 days after the transplantation. In certain specific cases, one or more (for instance three) doses of a preparatory regimen is administered prior to transplantation, and one or more booster vaccine doses are provided 1, 7, 14, 21, 90, or up to 180 days after transplantation.

A dose of a tolerizing vaccine or preparatory regimen can vary based upon the weight of a recipient of a tolerizing vaccine. For example, the dose of the tolerizing vaccine or preparatory regimen can comprise about: $1\times10^1$ cells/kg, $1\times10^2$ cells/kg, $1\times10^3$ cells/kg, $1\times10^4$ cells/kg, $1\times10^5$ cells/kg, $1\times10^6$ cells/kg, $1\times10^7$ cells/kg, $1x\ 10'$ cells/kg, $1\times10^9$ cells/kg, $1\times10^{10}$ cells/kg, $1\times10^{11}$ cells/kg, $1\times10^{12}$ cells/kg, or more. In some cases, a dose of the tolerizing vaccine or preparatory regimen can comprises about: $1\times10^1$ to $1\times10^2$ cells/kg; $1\times10^2$ to $1\times10^3$ cells/kg; $1\times10^3$ to $1\times10^4$ cells/kg; $1\times10^4$ to $1\times10^5$ cells/kg; $1\times10^5$ to $1\times10^6$ cells/kg; $1\times10^6$ to $1\times10^7$ cells/kg; $1\times10^7$ to $1\times10'$ cells/kg; $1\times10^8$ to $1\times10^9$ cells/kg; $1\times10^9$ to $1\times10^{10}$ cells/kg, $1\times10^{10}$ to $1\times10^{11}$ cells/kg, $1\times10^{11}$ to $1\times10^{12}$ cells/kg. For example, a dose of the tolerizing vaccine or preparatory regimen for administration can be about $0.01\times10^9$ cells/kg, $0.02\times10^9$ cells/kg, $0.03\times10^9$ cells/kg, $0.04\times10^9$ cells/kg, $0.05\times10^9$ cells/kg, $0.06\times10^9$ cells/kg, $0.07\times10^9$ cells/kg, $0.08\times10^9$ cells/kg, $0.09\times10^9$ cells/kg, $0.1\times10^9$ cells/kg, $0.2\times10^9$ cells/kg, $0.21\times10^9$ cells/kg, $0.22\times10^9$ cells/kg, $0.23\times10^9$ cells/kg, $0.24\times10^9$ cells/kg, $0.25\times10^9$ cells/kg, $0.26\times10^9$ cells/kg, $0.27\times10^9$ cells/kg, $0.28\times10^9$ cells/kg, $0.29\times10^9$ cells/kg, $0.3\times10^9$ cells/kg, $0.4\times10^9$ cells/kg, $0.5\times10^9$ cells/kg, $0.6\times10^9$ cells/kg, $0.7\times10^9$ cells/kg, $0.8\times10^9$ cells/kg, $0.9\times10^9$ cells/kg, $1.0\times10^9$ cells/kg, $1.5\times10^9$ cells/kg, $2.0\times10^9$ cells/kg, $2.5\times10^9$ cells/kg, $3.0\times10^9$ cells/kg, $3.5\times10^9$ cells/kg, $4.0\times10^9$ cells/kg, $4.5\times10^9$ cells/kg, $5.0\times10^9$ cells/kg, $5.5\times10^9$ cells/kg, $6.0\times10^9$ cells/kg, $6.5\times10^9$ cells/kg, $7.0\times10^9$ cells/kg, $7.5\times10^9$ cells/kg, $8.0\times10^9$ cells/kg, $8.5\times10^9$ cells/kg, $9.0\times10^9$ cells/kg, $9.5\times10^9$ cells/kg, $10.0\times10^9$ cells/kg, or $25.0\times10^9$ cells/kg.

In some cases, a dose of the tolerizing vaccine or preparatory regimen can comprise at least about: $1\times10^4$ cells/kg, $5\times10^4$ cells/kg, $1\times10^5$ cells/kg, $5\times10^5$ cells/kg, $1\times10^6$ cells/kg, $5\times10^6$ cells/kg, $1\times10^7$ cells/kg, $5\times10^7$ cells/kg, $1\times10^8$ cells/kg, $2\times10^8$ cells/kg, $3\times10^8$ cells/kg, $4\times10^8$ cells/kg, $5\times10^8$ cells/kg, $6\times10^8$ cells/kg, $7\times10^8$ cells/kg, $8\times10^8$ cells/kg, $9\times10^8$ cells/kg, $1\times10^9$ cells/kg, $1\times10^{10}$ cells/kg, or more.

The methods herein can comprise administering at least or at least about $0.25\times10^9$ cells (e.g., apoptotic donor leukocytes (ADLs), such as ECDI-treated cells, e.g., ECDI-treated leukocytes, or apoptotic mesenchymal stromal cells) per kg recipient body weight. For example, at least or at least about $1\times10^7$, $1\times10^8$, $0.25\times10^9$, $0.50\times10^9$, $0.75\times10^9$, $1.00\times10^9$, $1.25\times10^9$, $1.50\times10^9$, $1.75\times10^9$ or $2\times10^9$ cells (e.g., ECDI-treated cells, e.g., ECDI-treated leukocytes) per kg recipient body weight ECDI-treated cells can be administered.

The cells can comprise leukocytes, e.g., splenocytes, peripheral blood mononuclear cells (PBMCs), stem-cell derived leukocytes, or a combination thereof. The splenocytes, PBMCs, stem-cell derived leukocytes, or the combination thereof can comprise B cells or B lymphocytes. The cells can comprise primary cells, cells expanded ex vivo, cells of a cell line, or a combination thereof. The cells can comprise mesenchymal stromal cells.

Cells of tolerizing vaccine/regimen or preparatory regimen for each dose of administration can be suspended in a volume suitable for transfusion. For example, the cells can be suspended in a volume of about: 0.1 ml, 0.2 ml, 0.3 ml, 0.4 ml, 0.5 ml, 0.6 ml, 0.7 ml, 0.8 ml, 0.9 ml, 1 ml, 2 ml, 3 ml, 4 ml, 5 ml, 6 ml, 7 ml, 8 ml, 9 ml, 10 ml, 11 ml, 12 ml, 13 ml, 14 ml, 15 ml, 16 ml, 17 ml, 18 ml, 19 ml, 20 ml, 21 ml, 22 ml, 23 ml, 24 ml, 25 ml, 26 ml, 27 ml, 28 ml, 29 ml, 30 ml, 31 ml, 32 ml, 33 ml, 34 ml, 35 ml, 36 ml, 37 ml, 38 ml, 39 ml, 40 ml, 41 ml, 42 ml, 43 ml, 44 ml, 45 ml, 46 ml, 47 ml, 48 ml, 49 ml, 50 ml, 60 ml, 70 ml, 80 ml, 90 ml, 100 ml, 200 ml, 300 ml, 400 ml, or 500 ml. For example, the cells of tolerizing vaccine or preparatory regimen for each dose of administration can be suspended in a volume of about: 0.1 ml to 1 ml; 1 ml to 10 ml; 10 ml to 50 ml; 50 ml to 100 ml; 100 ml to 200 ml; 200 ml to 300 ml; 300 ml to 400 ml; or 400 ml to 500 ml. For example, $75\times10^6$ cells of tolerizing vaccine or preparatory regimen can be suspended in a volume of 0.5 ml.

Tolerizing vaccines/regimen or preparatory regimens can be administered (e.g., by intravenous infusion) in a volume that varies depending upon the weight of the recipient. For example, the tolerizing vaccine or preparatory regimen can be given intravenously in a volume of at least or at least about 0.01 ml, 0.1 ml, 0.5 ml, 1 ml, 2 ml, 3 ml, 4 ml, 5 ml, 10 ml, 20 ml, 30 ml, 40 ml or 50 ml per kg recipient body weight, e.g., at least or at least about 0.01 to 0.1, 0.1 to 1, 1 to 2; 2 to 3; 3 to 4; 4 to 5; 1 to 5; 5 to 10; 10 to 20; 20 to 30; 30 to 40; or 40 to 50 ml per kg recipient body weight. In some cases, the tolerizing vaccine (e.g., comprising ECDI-treated cells) is given intravenously in a volume of about 7 ml per kg recipient body weight.

Booster doses of a tolerizing vaccine or preparatory regimen can comprise fewer cells than an initial dose of the tolerizing vaccine or preparatory regimen. For example, a booster or subsequent dose of the tolerizing vaccine or preparatory regimen can comprise about: 1%, 2%, 3%, 4%, 5%, 7.5%, 10%, 15%, 20%, 25%, 30%, 40%, 50%, 60%, or 75% fewer cells, or less than the initial or preceding dose of the tolerizing vaccine or preparatory regimen.

A cell of a tolerizing vaccine or a preparatory regimen can have a circulation half-life after it is administered to a subject. In some cases, a tolerizing vaccine or preparatory regimen described herein can have a circulation half-life of at least or at least about 0.1, 0.5, 1, 2, 3, 4, 5, 6, 7, 8, 9, 10, 12, 18, 24, 36, 48, 60, or 72 hours. For example, the circulation half-life of the tolerizing vaccine or preparatory regimen cells can be from or from about 0.1 to 0.5; 0.5 to 1.0; 1.0 to 2.0; 1.0 to 3.0; 1.0 to 4.0; 1.0 to 5.0; 5 to 10; 10 to 15; 15 to 24; 24 to 36; 36 to 48; 48 to 60; or 60 to 72 hours. In some cases, a tolerizing vaccine or preparatory regimen described herein can have a circulation half-life of at least or at least about 3 hours.

The cells of the tolerizing vaccine or preparatory regimen can be treated to enhance their circulation half-life. Such treatment can include coating the cell with a protein, e.g., CD47. The cell treated to enhance its circulation half-life can be a non-apoptotic cell. The cell treated to enhance its circulation half-life can be an apoptotic cell. Alternatively, the cell in a tolerizing vaccine or preparatory regimen can be genetically modified (e.g., insertion of a transgene such as CD47 in its genome) to enhance its circulation half-life. The cell genetically modified to enhance its circulation half-life can be a non-apoptotic cell. The cell genetically modified to enhance its circulation half-life can be an apoptotic cell.

The tolerizing vaccine or the preparatory regimen can be advantageous in transplantation, for example, in xenotransplantation or in allotransplantation, by tolerizing a graft recipient and preventing or delaying graft rejection. The tolerization or the preparatory regimen can be conferred to a graft recipient without the use of immunosuppressive therapies (e.g., one or more immunomodulatory molecules). However, in some cases, other immunosuppressive therapies can be used in combination with tolerizing vaccines to prevent, decrease, or delay transplantation rejection.

A tolerizing vaccine or preparatory regimen can be administered with or without an adjuvant (e.g., one or more immunomodulatory molecules). In some cases, the adjuvant enhances the tolerogenic properties of the tolerizing vaccine by inhibiting activation and maturation of antigen presenting cells.

In some embodiments, the immunomodulatory molecules can target T cell receptor (TCR), CD3e, FK506-binding protein 12 (FKBP12), cytotoxic T lymphocyte associated protein 4 (CTLA-4), programmed cell death protein 1 (PD-1), programmed death ligand 1 (PD-L1), CD40L (CD154), CD40, inducible costimulatory (ICOS), IL-2, TNF-α, IL-6, IL-7, CD2, CD20, CD52, α-4 integrin, mTOR, DNA synthesis, molecules in pro-inflammatory pathways (e.g., cytokines, α1-antitrypsin, NFkB, or any combination thereof. In some embodiments, the immunomodulatory molecule is an NFkB inhbitor (e.g., dehydroxymethylepoxyquinomicin (DHMEQ)). In some embodiments, the one or more immunomodulatory molecule can target B-cell, (e.g., B-cell depleting biologics, for example, a biologic targeting CD20, CD19, or CD22, and/or B-cell modulating biologic, for example, a biologic targeting BAFF, BAFF/APRIL, CD40, IgG4, ICOS, IL-21, B7RP1). In some cases, the B cell targeting biologic can be anti-CD20 mAb (such as rituximab) or other B-cell depleting antibody. In some embodiments, the immunomodulatory molecules can be a MHC/TCR interaction blockade, a nonselective depleting agent, calcineurin inhibitor, costimulatory signal blockade, cytokine blockade, B cell modulating agent, lymphocyte-depleting agent, cell adhesion inhibitor, IL-2 signaling inhibitor, cell cycle blocker, or any combination thereof. For example, the MHC/TCR interaction blockade can be anti-abTCR mAb T10B9. For example, the nonselective depleting agent can be anti-CD3 mAb (OKT3) or antithymocyte globulin (ATG). For example, the calcineurin inhibitor can be cyclosporine or tacrolimus. For example, the costimulatory signal blockade can be anti-CTLA-4 mAb, abatacept, ipilimumab, anti-PD-1 (such as pembrolizumab), anti-PD-L1 (such as MPDL3280A), anti-CD154 mAb, Fc-engineered anti-CD40L antibodies, anti-CD40 mAb, or anti-ICOS mAb. For example, the cytokine blockade can be anti-CD25 mAb (such as daclizumab or basiliximab), anti-TNF (etanercept, infliximab, adalimumab, certolizumab pegol, and golimumab), anti-IL-6/IL-6R mAb (such as tocilizumab, actemra, clazakizumab, ALD518, siltuximab, elsilimomab, sirukumab, sarilumab, olokizumab), or anti-IL-7 mAb. For example, the lymphocyte depleting agent can be anti-CD2 mAb, fusion protein with IgG1 (such as alefacept), anti-CD20 mAb (such as rituximab), or anti-CD52 mAb (such as alemtuzumab). For example, the cell adhesion inhibitor can be anti-very large antigen 4 (VLA4) (such as natalizumab). For example, the mTOR inhibitor can be sirolimus (rapamycin) or everolimus or any other mTOR inhibitor. For example, the cell cycle blocker can be mycophenolate mofetil (MMF) or azathioprine. In some embodiments, the immunomodulatory molecules can be T cell recirculation inhibitors (e.g., FTY720 and other sphingosine 1-phosphate (SIP) receptor agonists.

The tolerizing vaccine or preparatory regimen can be administered with or without one or more immunomodulatory molecules that inhibit T cell activation. The immunomodulatory molecules that inhibit T cell activation can be an anti-CD40 or anti-CD40L (CD154) agent. The anti-CD40 or anti-CD40L agent can be an antibody, for example, an antagonistic antibody. The anti-CD40 or anti-CD40L antibody can be a Fab' anti-CD40L monoclonal antibody fragment CDP7657. The anti-CD40 or anti-CD40L antibody can be a FcR-engineered, Fc silent anti-CD40L monoclonal domain antibody, a Fab' anti-CD40L antibody, or an otherwise Fc-engineered anti-CD40L antibody. The anti-CD40 or anti-CD40L agent can be 2C10, 2C10R4, ASKP1240, 4D11, bleselumab, BI-655064, HCD122, CFZ533, ch5D12, FFP104, CDP7657, BG9588, ruplizumab, toralizumab, IDEC-131, dapirolizumab, letolizumab, BMS-986004, V1B4920, or MED14920. The tolerizing vaccine or preparatory regimen can further be administered with one or more additional immunomodulatory molecules described herein; for example, with one or more of a B-cell targeting biologic (e.g., B cell depleting biologic, for example, a biologic targeting CD20, CD19, or CD22, and/or B cell modulating biologic, for example, a biologic targeting BAFF, BAFF/APRIL, CD40, IgG4, ICOS, IL-21, B7RP1), an mTOR inhibitor, a TNF-alpha inhibitor, a IL-6 inhibitor, α1-antitrypsin, a nitrogen mustard alkylating agent (e.g., cyclophosphamide), a complement C3 or C5 inhibitor, IFN-γ, an NFκB inhibitor, vitamin D3, siCD40, cobalt protoporphyrin, insulin B9-23, a cluster of differentiation protein (e.g., CD46, CD55, or CD59), any combination thereof, or any fragment thereof. In some cases, the NFκB inhibitor is curcumin, triptolide, Bay-117085, or a combination thereof. Non-limiting examples of B-cell targeting biologic include Rituximab, anti-CD20 antibody. In some cases an immunomodulatory molecule for administration as part of a preparatory regimen can be tailored for allotransplant or xenotransplant. For example, the tolerizing vaccine or a preparatory regimen is administered with a B-cell depleting antibody in xenotransplantation. For example, the tolerizing vaccine or a preparatory regimen is not required to be administered with a B-cell depleting antibody in allotransplantation.

The tolerizing vaccine/regimen or preparatory regimen can be administered with, or in addition to, one or more immunomodulatory molecules such as MMF (mycophenolate mofetil (Cellcept)), ATG (anti-thymocyte globulin), anti-CD154 (CD40L), alemtuzumab (Campath), B-cell targeting agent (e.g., B cell depleting biologics, for example, a biologic targeting CD20, CD19, or CD22, and/or B cell modulating biologic, for example, a biologic targeting BAFF, BAFF/APRIL, CD40, IgG4, ICOS, IL-21, B7RP1), anti-IL-6R antibody (sarilumab, tocilizumab, actemra), anti-IL-6 antibody (clazakizumab, ALD518, siltuximab, elsilimomab, sirukumab, olokizumab), CTLA4-Ig (Abatacept/ Orencia), belatacept (LEA29Y), sirolimus (Rapamune), tacrolimus (Prograf), daclizumab, basiliximab (Simulect), infliximab (Remicade), cyclosporin, deoxyspergualin, soluble complement receptor 1, cobra venom factor, compstatin, anti C5 antibody (eculizumab/Soliris), methylprednisolone, FTY720, everolimus, anti-CD154-Ab, leflunomide, anti-IL-2R-Ab, rapamycin, anti-CXCR3 antibody, anti-ICOS antibody, anti-OX40 antibody, and anti-CD122 antibody, human anti-CD154 monoclonal antibody, CD40 antagonist, and CD40L (CD154) antagonist. Non-limiting examples of B-cell targeting biologic include Rituximab, anti-CD20 antibody.

The tolerizing vaccine/regimen or preparatory regimen can be administered with, or in addition to, one or more immunosuppressive agents/drugs. For example, one or more immunosuppressive agents/drugs can be used for induction therapy or for maintenance therapy. The same or different drugs can be used during induction and maintenance stages. For example, daclizumab (Zenapax) is used for induction therapy and tacrolimus (Prograf) and an mTOR inhibitor (e.g., sirolimus, rapamycin, everolimus) is used for maintenance therapy. In another example, daclizumab (Zenapax) is used for induction therapy and low dose tacrolimus (Prograf) and low dose an mTOR inhibitor (e.g., sirolimus, rapamycin, everolimus) is used for maintenance therapy. Immunosuppression can also be achieved using non-drug regimens including, but not limited to, whole body irradiation, thymic irradiation, and full and/or partial splenectomy. These techniques can also be used in combination with one or more immunosuppressive drugs or agents.

Figure 4:
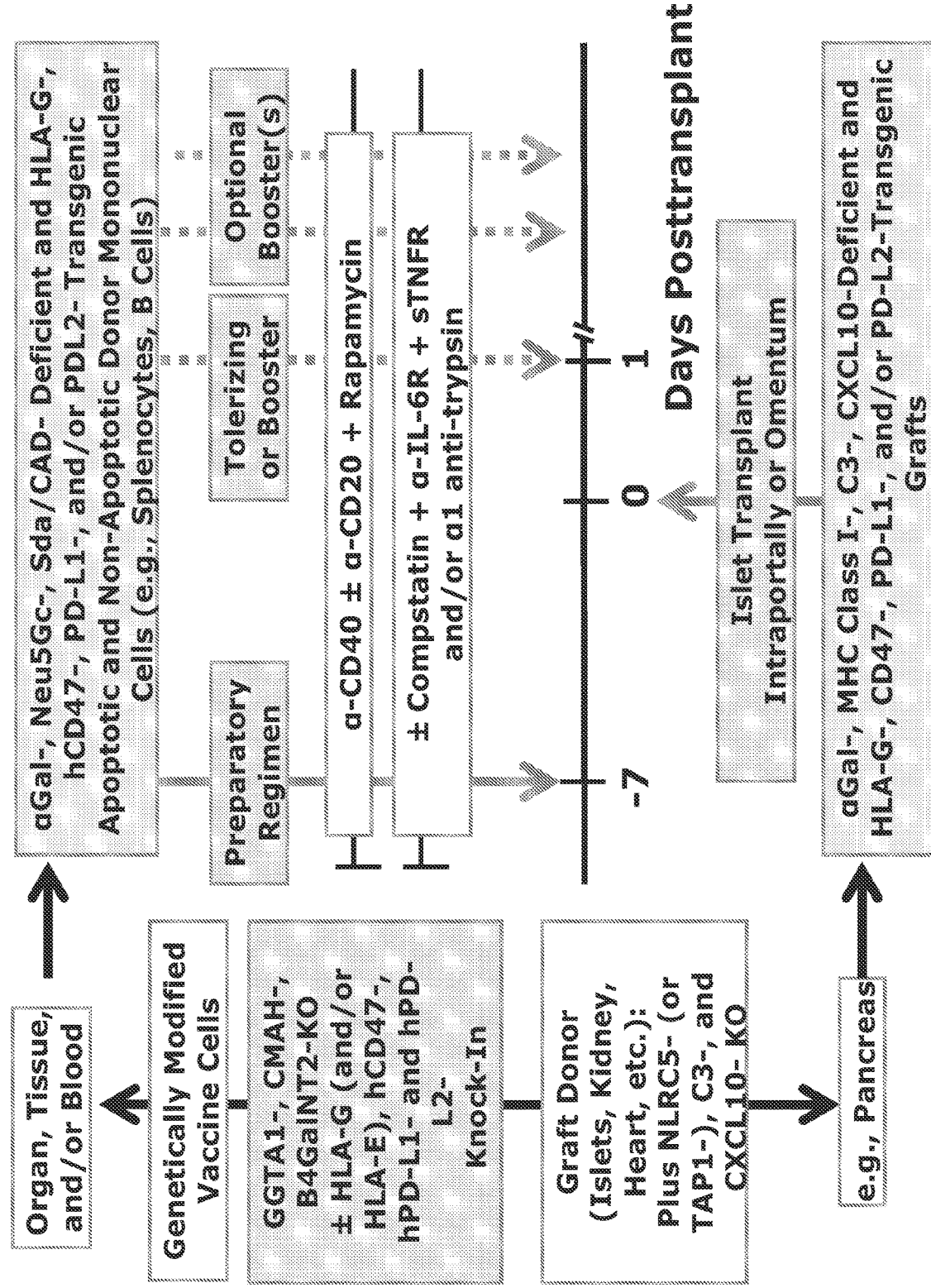
FIG. 4 shows an exemplary transplant regimen for inhibiting or minimizing rejection and/or extending the survival of transplants and grafts in a recipient optionally in the absence of chronic and generalized immunosuppression of the recipient. In certain embodiments, the regimen can include one or more of the following three components: i) transplant cell or tissue such as genetically engineered islets with deficient and/or reduced expression of αGal, NLRC5, B2M, MHC class I, complement C3, and/or CXCL10 and optionally transgenic expression of an HLA-G and/or HLA-E; ii) genetically engineered donor apoptotic and non-apoptotic mononuclear cells (e.g., a preparatory regimen or tolerizing regimen or vaccine comprising ECDI-fixed leukocytes such as ECDI-fixed splenocytes or ECDI-fixed B lymphocytes) with deficient and/or reduced expression of αGal, Neu5Gc, NLRC5, B2M, human PD-L1, human PD-L2 and/or Sda/CAD as well as optionally transgenic expression of HLA-G and/or HLA-E with or without human CD47 (e.g., the genetically engineered cells in a preparatory regimen or tolerizing vaccine); and iii) the administration of transient immunosuppression including for instance one or more components of a preparatory regimen described herein, such as but not limited to one or more of antagonistic anti-CD40 mAb antibody, Fc-engineered anti-CD40L antibodies, rapamycin, transient anti-inflammatory therapy including compstatin or compstatin derivatives (e.g., the compstatin derivative APL-2), anti-IL-6 receptor mAb, soluble TNF receptor, B-cell targeting strategies (e.g., B cell depleting biologic, for example, a biologic targeting CD20, CD19, or CD22, and/or B cell modulating biologic, for example, a biologic targeting BLyS, BAFF, BAFF/APRIL, CD40, IgG4, ICOS, IL-21, B7RP1), and/or α1-antitrypsin. Non-limiting examples of B-cell targeting biologics include Rituximab, anti-CD20 antibody.

In some embodiments, the tolerizing vaccine or preparatory regimen can be administered in conjunction with at least one anti-CD40/CD40L agent disclosed herein. In some embodiments, an anti-CD40/CD40L agent is a part of a preparatory regimen described herein administered prior to transplantation. In some cases, the tolerizing vaccine or preparatory regimen is administered simultaneously with, or before or after at least one anti-CD40/CD40L agent. In some embodiments, the tolerizing vaccine or preparatory regimen can also be administered with, or before or after one or more additional immunosuppression agents and/or concomitant CD40:CD40L blockade with anti-CD40 agent (e.g., antibody) and/or anti-CD40L (CD154) agent. The additional immunosuppression agent can be administered to a subject, e.g., to enhance the tolerogenic efficacy of a tolerizing vaccine in the subject. The additional immunosuppression agents can include an anti-CD40 agent or anti-CD40L (CD154) agent (e.g., an anti-CD40 antibody), a B-cell targeting agent (e.g., B cell depleting biologics, for example, a biologic targeting CD20, CD19, or CD22, and/or B cell modulating biologics, for example, a biologic targeting BAFF, BAFF/APRIL, CD40, IgG4, ICOS, IL-21, B7RP1), an mTOR inhibitor, a TNF-alpha inhibitor, a IL-6 inhibitor, α1-antitrypsin, a nitrogen mustard alkylating agent (e.g., cyclophosphamide), a complement C3 or C5 inhibitor, IFN-γ, an NFκB inhibitor, vitamin D3, siCD40, cobalt protoporphyrin, insulin B9-23, a cluster of differentiation protein (e.g., CD46, CD55, or CD59), any combination thereof, or any fragment thereof. In some cases, the NFκB inhibitor is dehydroxymethylepoxyquinomicin (DHMEQ), curcumin, triptolide, Bay-117085, or a combination thereof. Non-limiting examples of B-cell targeting biologics include Rituximab, anti-CD20 antibody. Any of these additional immunosuppression agents can be given to the subject before and/or after transplant (FIG. 4).

The additional immunosuppression agent can be administered before, after, and/or during the administration of a tolerizing vaccine or preparatory regimen. In some cases, the additional immunosuppression agent can be administered between day −100 and day 0, e.g., on day −90, day −80, day −70, day −60, day −50, day −40, day −30, day −20, day −15, day −14, day −13, day −12, day −11, day −10, day −9, day −8, day −7, day −6, day −5, day −4, day −3, day −2, day −1, or day 0 relative to the administration of a tolerizing vaccine or preparatory regimen. In some cases, the additional immunosuppression agent can be administered concomitantly with the tolerizing vaccine or preparatory regimen. In some cases, the additional immunosuppression agent can be administered on or on about day −100 to −50; −50 to −40; −40 to −30; −30 to −20; −20 to −10; −10 to −5; −10 to −1, −7 to −1, −10 to 0, or −7 to 0, relative to the administration of a tolerizing vaccine or preparatory regimen.

In some cases, the additional immunosuppression agent can be administered between day 0 and day 100, e.g., on day 100, day 90, day 80, day 70, day 60, day 50, day 40, day 30, day 28, day 21, day 20, day 15, day 14, day 13, day 12, day 11, day 10, day 9, day 8, day 7, day 6, day 5, day 4, day 3, day 2 or day 1 relative to the administration of a tolerizing vaccine or preparatory regimen. For example, the immunosuppression agent can be administered on or on about day 100 to 50, 50 to 40, 40 to 30, 30 to 20, 20 to 10, 10 to 5, 21 to 1, 14 to 1, 7 to 1, 21 to 0, 14 to 0, or 7 to 0 relative to the administration of a tolerizing vaccine or preparatory regimen.

In some cases, the additional immunosuppression agent can be administered between day 0 and day 300, e.g., on day 300, day 200, day 100, day 90, day 80, day 70, day 60, day 50, day 40, day 30, day 20, day 15, day 14, day 13, day 12, day 11, day 10, day 9, day 8, day 7, day 6, day 5, day 4, day 3, day 2 or day 1 relative to the administration of a tolerizing vaccine or preparatory regimen. For example, the immunosuppression agent can be administered on or on about day 300 to 200; 200 to 100; 100 to 50; 50 to 40; 40 to 30; 30 to 20; 20 to 10; 10 to 5; 7 to 1, relative to the administration of a tolerizing vaccine or preparatory regimen.

In some cases, the additional immunosuppression agent can be administered between day 0 and day 600, e.g., on day 600, day 500, day 400, day 300, day 200, day 100, day 90, day 80, day 70, day 60, day 50, day 40, day 30, day 20, day 15, day 14, day 13, day 12, day 11, day 10, day 9, day 8, day 7, day 6, day 5, day 4, day 3, day 2 or day 1 relative to the administration of a tolerizing vaccine or preparatory regimen. For example, the immunosuppression agent can be administered on or on about day 600 to 500; day 500 to 400; day 400 to 300; 300 to 200; 200 to 100; 100 to 50; 50 to 40; 40 to 30; 30 to 20; 20 to 10; 10 to 5; 7 to 1, relative to the administration of a tolerizing vaccine or preparatory regimen.

In some cases, the additional immunosuppression agent can be administered between day 0 and day 1,000, e.g., on day 1,000, day 900, day 800, day 700, day 600, day 500, day 400, day 300, day 200, day 100, day 90, day 80, day 70, day 60, day 50, day 40, day 30, day 20, day 15, day 14, day 13, day 12, day 11, day 10, day 9, day 8, day 7, day 6, day 5, day 4, day 3, day 2 or day 1 relative to the administration of a tolerizing vaccine or preparatory regimen. For example, the immunosuppression agent can be administered on or on about day 1,000 to 900; 900 to 800; 800 to 700; 700 to 600; 600 to 500; day 500 to 400; day 400 to 300; 300 to 200; 200 to 100; 100 to 50; 50 to 40; 40 to 30; 30 to 20; 20 to 10; 10 to 5; 7 to 1, relative to the administration of a tolerizing vaccine or preparatory regimen.

In some cases, the additional immunosuppression agent can be administered on the day when a tolerizing vaccine or preparatory regimen is administered. In other cases, the additional immunosuppression can be administered before and after the administration of the tolerizing vaccine or preparatory regimen. For example, cyclophosphamide can be administered on or on about day 3 after the administration of a tolerizing vaccine or preparatory regimen.

A tolerogenic efficacy regulator (e.g., cyclophosphamide) can be administered at dose from or from about 5 to 100 mg/kg/day. The unit "mg/kg/day" can refer to the number of milligrams of the tolerogenic efficacy regulator given per kilogram of the subject's body weight per day. In some cases, a tolerogenic efficacy regulator (e.g., cyclophosphamide) can be administered at a dose of from or from about 20 mg/kg/day to 100 mg/kg/day; 30 mg/kg/day to 90 mg/kg/day; 40 mg/kg/day to 80 mg/kg/day; 50 mg/kg/day to 70 mg/kg/day; 50 mg/kg/day to 60 mg/kg/day; or 40 mg/kg/day to 60 mg/kg/day.

The tolerizing vaccine or preparatory regimen can reduce the dose and/or duration of immunosuppression required to prevent or delay rejection of cells, organs, and/or tissues. The tolerizing vaccine or preparatory regimen can increase survival of cells, organs, and/or tissues without need for maintenance immunosuppression.

In some cases, a transplant recipient can require no immunosuppression after administration of the tolerizing vaccine or preparatory regimen.

The tolerizing vaccine or preparatory regimen can reduce the dose of immunosuppression required by at least or at least about 5%. For example, a tolerizing vaccine or preparatory regimen can reduce the required dose of an immunosuppressive agent by at least or at least about 5%, 10%, 20%, 30%, 40%, 50%, 60%, 65%, 70%, 75%, 80%, 85%, 90%, 95%, or 100%. For example, the tolerizing vaccine or preparatory regimen can reduce the required dose of an immunosuppressive agent by at least or at least about 5 to 10; 5 to 25; 25 to 50; 50 to 75; 75 to 85; 85 to 90; 90 to 95; or 95 to 100%. The term "reduce" and its grammatical equivalents as used herein can refer to using less immunosuppression compared to a required dose of immunosuppression when one or more cells, organs, and/or tissues is transplanted into a recipient (e.g., a human or a non-human animal). The term "reduce" can also refer to using less immunosuppressive drug(s) or agent(s) compared to a required dose of immunosuppressive drug(s) or agent(s) when one or more cells, organs, and/or tissues is transplanted into a recipient (e.g., a human or a non-human animal).

A recipient (e.g., a human or anon-human animal) can require a reduced dose of an immunosuppression agent for at least or at least about 1, 5, 7, 10, 14, 20, 21, 28, 30, 40, 50, 60, 70, 80, 90, 100, 200, 300, 400, 500, 600, 700, 900, or 1,000 days after transplantation, e.g., for at least or at least about 1 to 5; 5 to 10; 10 to 20; 20 to 30; 30 to 60; 60 to 100; 100 to 200; 200 to 300; 300 to 400; 400 to 500; 500 to 600; 600 to 700; 700 to 800; 800 to 900; 900 to 1,000 days. A recipient (e.g., a human or a non-human animal) can require a reduced dose of an immunosuppression agent for at least or at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or 36 months after transplantation, e.g., for at least or at least about 1 to 2; 2 to 3; 3 to 6; 6 to 9; 9 to 12; 12 to 18; 18 to 24; 24 to 30; 30 to 36 months after transplantation. A recipient (e.g., a human or a non-human animal) can require a reduced dose of an immunosuppression agent for at least or at least about 1, 2, 3, 4, 5, 6, 7, 8, 9, 10, 15, 20, 25, or 30 years after transplantation, e.g. for at least or at least about 1 to 2; 2 to 3; 3 to 4; 4 to 5; 1 to 5; 5 to 10; 10 to 15; 15 to 20; 20 to 25; 25 to 30 years after transplantation. In some cases, a recipient (e.g., a human or a non-human animal) can require a reduced dose of an immunosuppression agent for up to the lifetime of the recipient.

A recipient (e.g., a human or a non-human animal) can require no immunosuppression for at least or at least about 1, 5, 10, 20, 30, 40, 50, 60, 70, 80, 90, 100, 200, 300, 400, 500, 600, 700, 900, or 1,000 days after transplantation, e.g., for at least or at least about 1 to 5; 5 to 10; 10 to 20; 20 to 30; 30 to 60; 60 to 100; 100 to 200; 200 to 300; 300 to 400; 400 to 500; 500 to 600; 600 to 700; 700 to 800; 800 to 900; 900 to 1,000 days. A recipient (e.g., a human or a non-human animal) can require a reduced dose of an immunosuppression agent for at least or at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or 36 months after transplantation e.g., for at least or at least about 1 to 2; 2 to 3; 3 to 6; 6 to 9; 9 to 12; 12 to 18; 18 to 24; 24 to 30; 30 to 36 months after transplantation. A recipient (e.g., a human or a non-human animal) can require a reduced dose of an immunosuppression agent for at least or at least about 1, 2, 3, 4, 5, 6, 7, 8, 9, 10, 15, 20, 25, or 30 years after transplantation, e.g. for at least or at least about 1 to 2; 2 to 3; 3 to 4; 4 to 5; 1 to 5; 5 to 10; 10 to 15; 15 to 20; 20 to 25; 25 to 30 years after transplantation. In some cases, a recipient (e.g., a human or a non-human animal) can require no immunosuppression for up to the lifetime of the recipient.

Figure 3:
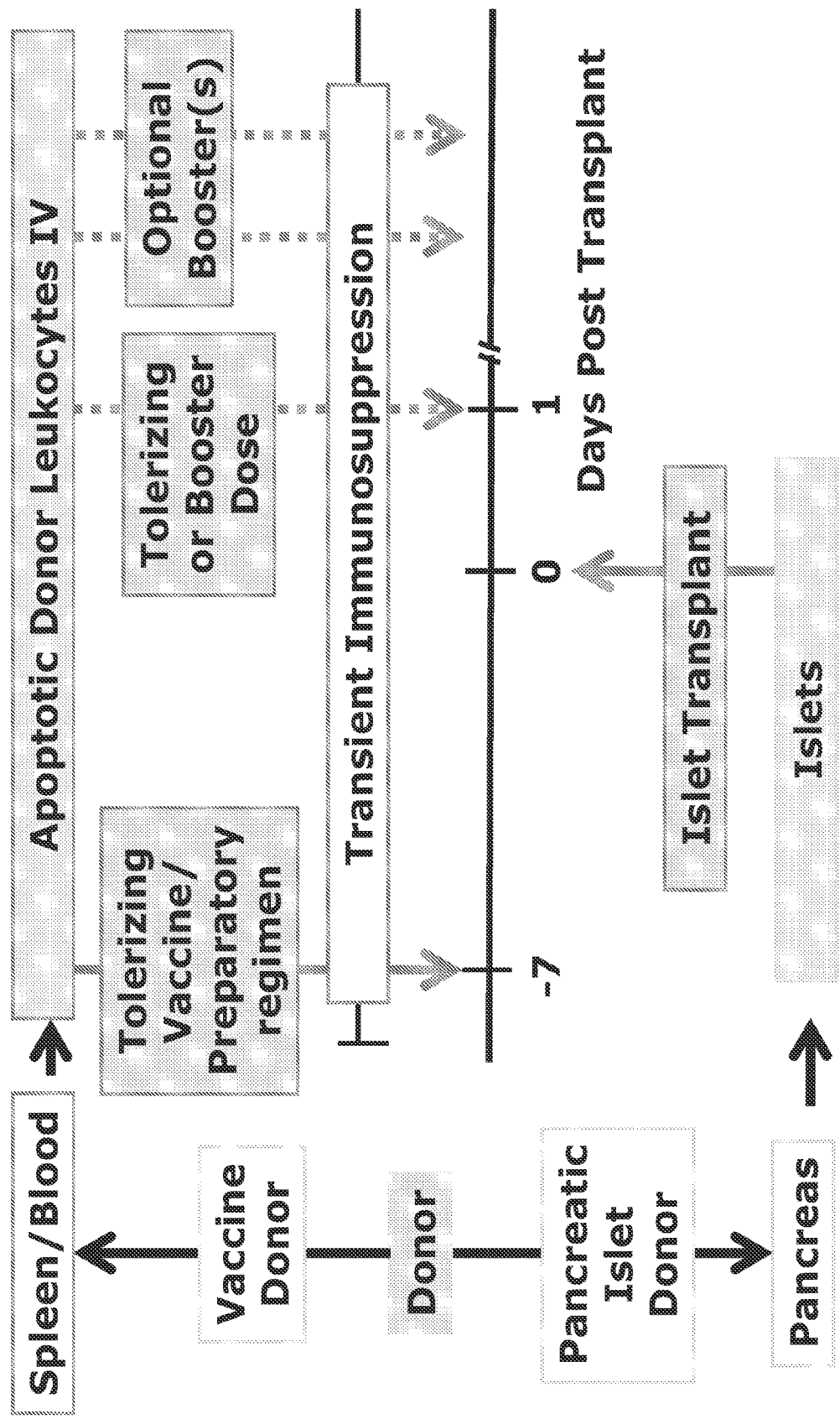
FIG. 3 demonstrates an exemplary approach to extending the survival of grafts in a subject with infusion of apoptotic donor leukocytes such as splenocytes for tolerizing or preparatory vaccination or regimen optionally under the cover of transient immunosuppression.

Non-limiting, exemplary approaches to extend the survival of transplanted grafts (e.g., allografts or xenografts) in a subject (e.g., a human or a non-human primate) are illustrated in FIG. 3 and FIG. 4. In some embodiments, the subject (graft recipient) receives an infusion (e.g., intravenous infusion) of apoptotic cells derived from the graft donor or a separate donor (e.g., tolerizing vaccination with apoptotic donor leukocytes (ADLs) under the cover of transient immunosuppression). In some cases, the same donor can provide an allograft or xenograft for transplantation (e.g., islets, kidney), as well as cells as a tolerizing vaccine (e.g., splenocytes, splenic B cells, peripheral blood leukocytes, peripheral blood B cells, apoptotic leukocytes, or a combination thereof).

The cells of a tolerizing vaccine or preparatory regimen can have the same genotype and/or phenotype as cells, organs, and/or tissues used in transplantation. Sometimes, the genotype and/or phenotype of a tolerizing vaccine or preparatory regimen and a transplant are different. The tolerizing vaccine or preparatory regimen used for a transplant recipient can comprise cells from the transplant graft donor. The tolerizing vaccine or preparatory regimen used for a transplant recipient can comprise cells that are genetically and/or phenotypically different from the transplant graft. In some cases, the tolerizing vaccine or preparatory regimen used for a transplant recipient can comprise cells from the transplant graft donor and cells that are genetically and/or phenotypically different from the transplant graft. The cells that are genetically and/or phenotypically different from the transplant graft can be from an animal of the same species of the transplant graft donor.

In some cases, the tolerizing vaccine or preparatory regimen comprising genetically modified cells can reduce, inhibit, or eliminate an immune response. For example, a genetic modification can decrease immune cell effector function, decrease immune cell proliferation, or decrease persistence and/or reduce expression of cytolytic effector molecules, such as Granzyme B and CD107alpha, in an immune cell. An immune cell can be a monocyte and/or macrophage. An immune cell can be a T cells and/or a B cell. In some cases, T cell-derived cytokines, such as IFN-γ, can activate macrophages via secretion of IFN-γ. In some cases, T cell activation is inhibited and may cause a macrophage to also be inhibited.

Tolerogenic potency of any of these tolerizing cell vaccines can be further optimized by coupling to the surface of cells one or more of the following: IFN-γ, NF-κB inhibitors (such as dehydroxymethylepoxyquinomicin (DHMEQ), curcumin, triptolide, Bay-117085), vitamin D3, cobalt protoporphyrin, insulin B9-23, or other immunomodulatory molecules disclosed herein that modify the function of host antigen-presenting cells and host lymphocytes.

The tolerizing vaccine or preparatory regimen can comprise apoptotic cells and can also be complemented by donor cells engineered to display on their surface molecules that trigger apoptotic death of donor-reactive cells, such as FasL, PD-L1, galectin-9, CD8alpha.

The tolerizing vaccine or preparatory regimen can comprise from or from about 0.001 to about 5.0, e.g., from or from about 0.001 to 1.0, endotoxin unit per kg bodyweight of a prospective recipient. For example, the tolerizing vaccine or preparatory regimen can comprise from or from about 0.01 to 5.0; 0.01 to 4.5; 0.01 to 4.0, 0.01 to 3.5; 0.01 to 3.0; 0.01 to 2.5; 0.01 to 2.0; 0.01 to 1.5; 0.01 to 1.0; 0.01 to 0.9; 0.01 to 0.8; 0.01 to 0.7; 0.01 to 0.6; 0.01 to 0.5; 0.01 to 0.4; 0.01 to 0.3; 0.01 to 0.2; or 0.01 to 0.1 endotoxin unit per kg bodyweight of a prospective recipient.

The tolerizing vaccine or preparatory regimen can trigger a release from or from about 0.001 pg/ml to 10.0 pg/ml, e.g., from or from about 0.001 pg/ml to 1.0 pg/ml, IL-1 beta when about 50,000 frozen to thawed human peripheral blood mononuclear cells are incubated with about 160,000 cells of the tolerizing vaccine (e.g., pig cells). For example, the tolerizing vaccine or preparatory regimen triggers a release of from or from about 0.001 to 10.0; 0.001 to 5.0; 0.001 to 1.0; 0.001 to 0.8; 0.001 to 0.2; or 0.001 to 0.1 pg/ml IL-1 beta when about 50,000 frozen to thawed human peripheral blood mononuclear cells are incubated with about 160,000 cell of the tolerizing vaccine (e.g., human cells or pig cells). The tolerizing vaccine or preparatory regimen can trigger a release of from or from about 0.001 to 2.0 pg/ml, e.g., from or from about 0.001 to 0.2 pg/ml, IL-6 when about 50,000 frozen to thawed human peripheral blood mononuclear cells are incubated with about 160,000 cells of the tolerizing vaccine (e.g., human cells or pig cells). For example, the tolerizing vaccine or preparatory regimen can trigger a release of from or from about 0.001 to 2.0; 0.001 to 1.0; 0.001 to 0.5; or 0.001 to 0.1 pg/ml IL-6 when about 50,000 frozen to thawed human peripheral blood mononuclear cells are incubated with about 160,000 cells of the tolerizing vaccine (e.g., human cells or pig cells).

The tolerizing vaccine or preparatory regimen can comprise more than or more than about 60%, e.g., more than or more than about 85%, Annexin V positive, apoptotic cells after a 4 hours or after about 4 hours post-release incubation at 37° C. For example, a tolerizing vaccine comprises more than 40%, 50%, 60%, 70%, 80%, 90%, or 99% Annexin V positive, apoptotic cells after about a 4 hour post-release incubation at 37° C.

Effective Amount

The compositions of the disclosure (e.g., apoptotic leucocytes) are administered in effective amounts. An "effective amount" is that amount of a composition that alone, or together with further doses, produces the desired response. In the case of transplantation, a desired response is inhibition of transplant rejection or increasing transplant survival. In the case of treating a particular disease, such as chronic kidney disease, inflammatory disease, autoimmune disease, cancer the desired response is inhibiting the progression of the disease. This may involve only slowing the progression of the disease temporarily, although more preferably, it involves halting the progression of the disease permanently. This can be monitored by routine methods.

Such amounts can depend, of course, on the particular condition being treated, the severity of the disorder, the activity of the specific compound, the route of administration, the rate of clearance of the composition, the duration of treatment, the drugs used in combination or coincident with the compositions, the age, body weight, sex, diet, and general health of the subject, and like factors well known in the medical arts and sciences. Various general considerations taken into account in determining the "therapeutically effective amount" are known to those of skill in the art and are described, e.g., in Gilman et al, eds., Goodman And Gilman's: The Pharmacological Bases of Therapeutics, 8th ed., Pergamon Press, 1990; and Remington's Pharmaceutical Sciences, 17th ed., Mack Publishing Co., Easton, Pa., 1990. These factors are well known to those of ordinary skill in the art and can be addressed with no more than routine experimentation. It is generally preferred that a maximum dose of the individual components or combinations thereof be used, that is, the highest safe dose according to sound medical judgment. The compositions used in the foregoing methods preferably are sterile and contain an effective amount of the active agents for producing the desired response in a unit of weight or volume suitable for administration to a patient.

The efficacy of the methods disclosed herein, comprising administering the compositions disclosed herein (e.g., apoptotic leucocytes) can be measured by various endpoints commonly used in evaluating graft survival or prevention or graft rejection, including but not limited to, a) a decreased level of an immune response against the transplant (thought to be mediated at least in part by B cell mediated immune responses, more particularly donor-specific antibodies) or a decreased occurrence of graft vs. host disease (GVHD); b) a delay in the onset or progression of an immune response against the transplant; c) a reduced risk of the onset or progression of an immune response against the transplant; d) increase in level of tolerogenic APCs; e) increase in level of Treg; f) increase in level of Tr1 cells, g) increase in level of anti-inflammatory cytokines such as IL-10, TGFβ, or h) a combination thereof.

In another embodiment, the methods described herein may significantly increase response rates in a group of human subjects undergoing transplantation with or without additional immunosuppression. Response rate is defined as the percentage of transplant recipients who responded to the treatment.

Inducing Tolerance for Autoimmune Diseases

Compositions, methods, kits, and systems provided herein can be utilized to prevent and/or treat an autoimmune disorder. The term "autoimmune disorder", "autoimmune disease", "autoimmune condition", and their grammatical equivalents as used herein can be used interchangeably. In some cases, the tolerance vaccine provided herein can be crosslinked to autoantigenic peptides, autoantigens, or other cellular carriers and used as a tolerance therapy for an autoimmune disorder. In some cases, the cellular carrier is an apoptotic cellular carrier. In some cases, the cellular carrier is a syngeneic apoptotic cellular carrier.

The tolerizing vaccine as described herein can be used with a cellular carrier (e.g., autoantigens, autoantigenic peptides, apoptotic cellular carriers) to induce antigen-specific T cell tolerance for treatment of an autoimmune condition. Without being bound by theory, the tolerizing vaccine with or without the carrier can be taken up, processed, and presented in a tolerogenic manner by host splenic antigen presenting cells, thereby inducing regulatory T cells, and the secretion of immune suppressive cytokines (e.g., IL-4, IL-10, IL-13, TGF-β).

Non-limiting examples of autoimmune disorders include inflammation, antiphospholipid syndrome, systemic lupus erythematosus, rheumatoid arthritis, autoimmune vasculitis, celiac disease, autoimmune thyroiditis, post-transfusion immunization, maternal-fetal incompatibility, transfusion reactions, immunological deficiency such IgA deficiency, common variable immunodeficiency, drug-induced lupus, diabetes mellitus, Type I diabetes, Type II diabetes, juvenile onset diabetes, juvenile rheumatoid arthritis, psoriatic arthritis, multiple sclerosis, immunodeficiency, allergies, asthma, psoriasis, atopic dermatitis, allergic contact dermatitis, chronic skin diseases, amyotrophic lateral sclerosis, chemotherapy-induced injury, graft-vs-host diseases, bone marrow transplant rejection, Ankylosing spondylitis, atopic eczema, Pemphigus, Behcet's disease, chronic fatigue syndrome fibromyalgia, chemotherapy-induced injury, myasthenia gravis, glomerulonephritis, allergic retinitis, systemic sclerosis, subacute cutaneous lupus erythematosus, cutaneous lupus erythematosus including chilblain lupus erythematosus, Sjogren's syndrome, autoimmune nephritis, autoimmune vasculitis, autoimmune hepatitis, autoimmune carditis, autoimmune encephalitis, autoimmune mediated hematological diseases, lc-SSc (limited cutaneous form of scleroderma), dc-SSc (diffused cutaneous form of scleroderma), autoimmune thyroiditis (AT), Grave's disease (GD), myasthenia gravis, multiple sclerosis (MS), ankylosing spondylitis. transplant rejection, immune aging, rheumatic/autoimmune diseases, mixed connective tissue disease, spondyloarthropathy, psoriasis, psoriatic arthritis, myositis, scleroderma, dermatomyositis, autoimmune vasculitis, mixed connective tissue disease, idiopathic thrombocytopenic purpura, Crohn's disease, human adjuvant disease, osteoarthritis, juvenile chronic arthritis, a spondyloarthropathy, an idiopathic inflammatory myopathy, systemic vasculitis, sarcoidosis, autoimmune hemolytic anemia, autoimmune thrombocytopenia, thyroiditis, immune-mediated renal disease, a demyelinating disease of the central or peripheral nervous system, idiopathic demyelinating polyneuropathy, Guillain-Barre syndrome, a chronic inflammatory demyelinating polyneuropathy, a hepatobiliary disease, infectious or autoimmune chronic active hepatitis, primary biliary cirrhosis, granulomatous hepatitis, sclerosing cholangitis, inflammatory bowel disease (including Crohn's disease (CD) and ulcerative colitis (UC)), gluten-sensitive enteropathy, Whipple's disease, an autoimmune or immune-mediated skin disease, a bullous skin disease, erythema multiforme, allergic rhinitis, atopic dermatitis, food hypersensitivity, urticaria, an immunologic disease of the lung, eosinophilic pneumonias, idiopathic pulmonary fibrosis, hypersensitivity pneumonitis, a transplantation associated disease, graft rejection or graft-versus-host-disease, psoriatic arthritis, psoriasis, dermatitis, polymyositis/dermatomyositis, toxic epidermal necrolysis, systemic scleroderma and sclerosis, responses associated with inflammatory bowel disease, Crohn's disease, ulcerative colitis, respiratory distress syndrome, adult respiratory distress syndrome (ARDS), meningitis, encephalitis, uveitis, colitis, glomerulonephritis, allergic conditions, eczema, asthma, conditions involving infiltration of T cells and chronic inflammatory responses, atherosclerosis, autoimmune myocarditis, leukocyte adhesion deficiency, allergic encephalomyelitis, immune responses associated with acute and delayed hypersensitivity mediated by cytokines and T-lymphocytes, tuberculosis, sarcoidosis, granulomatosis including Wegener's granulomatosis, agranulocytosis, vasculitis (including ANCA), aplastic anemia, Diamond Blackfan anemia, immune hemolytic anemia including autoimmune hemolytic anemia (AIHA), pernicious anemia, pure red cell aplasia (PRCA), Factor VIII deficiency, hemophilia A, autoimmune neutropenia, pancytopenia, leukopenia, diseases involving leukocyte diapedesis, central nervous system (CNS) inflammatory disorders, multiple organ injury syndrome, myasthenia gravis, antigen-antibody complex mediated diseases, anti-glomerular basement membrane disease, anti-phospholipid antibody syndrome, allergic neuritis, Bechet disease, Castleman's syndrome, Goodpasture's syndrome, Lambert-Eaton Myasthenic Syndrome, Reynaud's syndrome, Sjorgen's syndrome, Stevens-Johnson syndrome, pemphigoid bullous, pemphigus, autoimmune polyendocrinopathies, Reiter's disease, stiff-man syndrome, giant cell arteritis, immune complex nephritis, IgA nephropathy, IgM polyneuropathies or IgM mediated neuropathy, idiopathic thrombocytopenic purpura (ITP), thrombotic throbocytopenic purpura (TTP), autoimmune thrombocytopenia, autoimmune disease of the testis and ovary including autoimmune orchitis and oophoritis, primary hypothyroidism, autoimmune endocrine diseases including autoimmune thyroiditis, chronic thyroiditis (Hashimoto's Thyroiditis), subacute thyroiditis, idiopathic hypothyroidism, Addison's disease, Grave's disease, autoimmune polyglandular syndromes (or polyglandular endocrinopathy syndromes), Sheehan's syndrome, autoimmune hepatitis, lymphoid interstitial pneumonitis (HIV), bronchiolitis obliterans (non-transplant) vs NSIP, Guillain-Barre' Syndrome, large vessel vasculitis (including polymyalgia rheumatica and giant cell (Takayasu's) arteritis), medium vessel vasculitis (including Kawasaki's disease and polyarteritis nodosa), ankylosing spondylitis, Berger's disease (IgA nephropathy), rapidly progressive glomerulonephritis, primary biliary cirrhosis, Celiac sprue (gluten enteropathy), cryoglobulinemia, and amyotrophic lateral sclerosis (ALS). In some cases, the autoimmune disease is SLE, rheumatoid arthritis, or celiac's disease.

Pharmaceutical Compositions

Provided herein are kits and compositions comprising a tolerizing vaccine or preparatory regimen for administration in a subject. In some embodiments, the tolerizing vaccine or preparatory regimen or a component thereof (e.g., apoptotic donor leukocytes such as ECDI-fixed splenocytes, or mesenchymal stromal cells) is combined with a pharmaceutically acceptable carrier, diluent, or excipient. An excipient that can be used is saline. An excipient that can be used is phosphate buffered saline (PBS). The pharmaceutical compositions can be then used to treat patients in need of transplantation.

A composition of the disclosure can comprise buffers such as neutral buffered saline, phosphate buffered saline and the like; carbohydrates such as glucose, mannose, sucrose or dextrans; mannitol; proteins; polypeptides or amino acids such as glycine; antioxidants; chelating agents such as EDTA or glutathione; preservatives, or a combination thereof. Compositions of the present invention can be formulated for intravenous administration (e.g., intravenous injection or infusion). A composition of the disclosure can be a sterile liquid preparation, for example, an isotonic aqueous solution, suspension, emulsion, dispersion, or viscous composition.

A composition of the disclosure can be buffered to a selected pH. For example a composition of the disclosure can be buffered to a pH of approximately 5-9, 5-8, 5-7, 5-6, 6-9, 6-8, 6-7, 7-9, 7-8, 6.5-8.5, 6.5-8, 6.5-7.7, 6.5-7.6, 6.5-7.5, 6.5-7.4, 6.5-7.3, 6.5-7.2, 6.5-7, 7-7.7, 7-7.6, 7-7.5, 7-7.4, 7-7.3, 7-7.2, 7-7.1, 7.2-7.6, 7.2-7.5, 7.2-7.4, 7.3-7.7, 7.3-7.6, 7.3-7.5, 7.34-7.45, 7.0-7.2, 7.2-7.4, 7.3-7.5, 7.4-7.6, or 7.6-7.8. In addition, the composition can comprise a pH buffer, such as 0.1 mM-100 mM phosphate pH 6.0-9.0, 0.1-100 mM HEPES pH 6.0-9.0, 0.1 mM-100 mM bicarbonate pH 6.0-9.0, 0.1 mM-100 mM citrate pH 6.0-9.0, 0.1-100 mM acetate pH 4.0-8.0 or any combination thereof.

The composition can comprise electrolytes, such as 5 mM-400 mM NaCl, 0.5 mM-50 mM KCl, 0.05 mM-50 mM CaCl2, 0.05 mM-50 mM MgCl2, 0.05 mM-50 mM LiCl2, 0.05 mM-50 mM MnCl2, or any combination thereof.

The composition can comprise an anti-oxidant, such as 0.05-10 mM glutathione (reduced), 0.05-10 mM glutathione (oxidized), 0.001 mM-10 mM β-mercaptoethanol, 0.001 mM-10 mM dithiothreitol, 0.01-100 mM ascorbate, 0.001-10 mM tris(2-carboxyethyl)phosphine, or any combination thereof.

The composition can comprise a stabilizer, such as 0.01%-10% human serum albumin, 0.01%-10% bovine serum albumin, 0.1%-99% human serum, 0.1%-99% fetal bovine serum, 0.01%-10% IgG, 0.1%-10% immunoglobin, 0.06%-60% trehalose, or molecular polymers like 0.1%-20% polyethylene glycol (MW 200-20,000,000), or any combination thereof.

Liquid or viscous compositions can comprise carriers, which can be a solvent or dispersing medium containing, for example, water, saline, phosphate buffered saline, polyol (for example, glycerol, propylene glycol, liquid polyethylene glycol, and the like) and suitable mixtures thereof.

Various additives which enhance the stability and sterility of the compositions, including antimicrobial preservatives, antioxidants, chelating agents, and buffers, can be added. Prevention of the action of microorganisms can be ensured by various antibacterial and antifungal agents, for example, parabens, chlorobutanol, phenol, sorbic acid, and the like.

The compositions can be isotonic, i.e., they can have the same osmotic pressure as blood and lacrimal fluid. The desired isotonicity of the compositions of this invention may be accomplished using sodium chloride, or other pharmaceutically acceptable agents such as dextrose, boric acid, sodium tartrate, propylene glycol or other inorganic or organic solutes. Sodium chloride is preferred particularly for buffers containing sodium ions.

In some embodiments, the tolerizing vaccine or preparatory regimen or a component thereof is administered with one or more adjuvant (e.g., one or more immunomodulatory molecules).

In some embodiments, the tolerizing vaccine or preparatory regimen is administered with an immunosuppressive agent (e.g., one or more immunomodulatory molecules). In some cases, the immunosuppressive agent inhibits T cell activation. The immunosuppressive agent that inhibits T cell activation can be anti-CD40 agent or anti-CD40L (CD154) agent. In some embodiments, the anti-CD40 agent can be an anti-CD40 antibody. The anti-CD40 antibody can be an antagonistic antibody. The anti-CD40 antibody can be a Fab' anti-CD40L monoclonal antibody fragment CDP7657. The anti-CD-40 antibody can be a FcR-engineered, Fc silent anti-CD40L monoclonal domain antibody. The anti-CD40 or anti-CD40L agent can be 2C10, 2C10R4, ASKP1240, 4D11, bleselumab, BI-655064, HCD122, CFZ533, ch5D12, FFP104, CDP7657, BG9588, ruplizumab, toralizumab, IDEC-131, dapirolizumab, letolizumab, BMS-986004, V1B4920, or MED14920.

In some cases, the tolerizing vaccine or preparatory regimen is administered with one or more additional immunosuppression agents described herein, such as one or more of an anti-CD40 agent or anti-CD40L (CD154) agent (e.g., an anti-CD40 antibody), a B-cell targeting agent (e.g., B cell depleting biologics, for example, a biologic targeting CD20, CD19, or CD22, and/or B cell modulating biologics, for example, a biologic targeting BAFF, BAFF/APRIL, CD40, IgG4, ICOS, IL-21, B7RP1), an mTOR inhibitor, a TNF-alpha inhibitor, a IL-6 inhibitor, a nitrogen mustard alkylating agent (e.g., cyclophosphamide), a complement C3 or C5 inhibitor, IFN-γ, an NFκB inhibitor, α1-antitrypsin, vitamin D3, siCD40, cobalt protoporphyrin, insulin B9-23, a cluster of differentiation protein (e.g., CD46, CD55, or CD59), any combination thereof, or any fragment thereof. In some cases, the NFκB inhibitor is dehydroxymethylepoxyquinomicin (DHMEQ), curcumin, triptolide, Bay-117085, or a combination thereof. In some cases B-cell targeting biologic can be Rituximab, or another anti-CD20 antibody.

In some cases, immunosuppressive drugs can be MMF (mycophenolate mofetil (Cellcept)), ATG (anti-thymocyte globulin), anti-CD154 (CD40L), alemtuzumab (Campath), B-cell targeting agent (e.g., B cell depleting biologics, for example a biologic targeting CD20, CD19, or CD22, and/or B cell modulating biologics, for example, a biologic targeting BAFF, BAFF/APRIL, CD40, IgG4, ICOS, IL-21, B7RP1), anti-IL-6R antibody (sarilumab, tocilizumab, actemra), anti-IL-6 antibody (clazakizumab, ALD518, siltuximab, elsilimomab, sirukumab, olokizumab), CTLA4-Ig (Abatacept/Orencia), belatacept (LEA29Y), mTOR inhibitor (sirolimus (e.g., Rapamune), rapamycin, everolimus), tacrolimus (Prograf), daclizumab (Ze-napax), basiliximab (Simulect), infliximab (Remicade), cyclosporin, deoxyspergualin, soluble complement receptor 1, cobra venom factor, compstatin, anti C5 antibody (eculizumab/Soliris), methylprednisolone, FTY720, everolimus, anti-CD154-Ab, leflunomide, anti-IL-2R-Ab, anti-CXCR3 antibody, anti-ICOS antibody, anti-OX40 antibody, and anti-CD122 antibody, human anti-CD154 monoclonal antibody, CD40 antagonist, and CD40L (CD154) antagonist. Non-limiting examples of B-cell targeting biologics include antagonistic anti-CD40 mAb antibody, Fc-engineered anti-CD40L antibodies, Rituximab, anti-CD20 antibody. One or more than one immunosuppressive agents/drugs can be used together or sequentially. One or more than one immunosuppressive agents/drugs can be used for induction therapy or for maintenance therapy. The same or different drugs can be used during induction and maintenance stages. For example, daclizumab (Zenapax) is used for induction therapy and tacrolimus (Prograf) and sirolimus (Rapamune), or everolimus, or any other mTOR inhibitor is used for maintenance therapy. In another example, daclizumab (Zenapax) is used for induction therapy and low dose tacrolimus (Prograf) and low dose sirolimus (Rapamune) is used for maintenance therapy. Immunosuppression can also be achieved using non-drug regimens including, but not limited to, whole body irradiation, thymic irradiation, and full and/or partial splenectomy. These techniques can also be used in combination with one or more immunosuppressive drug.

In some embodiments, one or more immunomodulatory molecules can target T cell receptor (TCR), CD3e, FK506-binding protein 12 (FKBP12), cytotoxic T lymphocyte associated protein 4 (CTLA-4), programmed cell death protein 1 (PD-1), programmed death ligand 1 (PD-L1), CD40L (CD154), CD40, inducible costimulatory (ICOS), IL-2, TNF-α, IL-6, IL-7, CD2, CD20, CD52, α-4 integrin, mTOR (mechanistic target of rapamycin, everolimus, serolimus), DNA synthesis, or any combination thereof. In some embodiments, the one or more immunomodulatory molecule can target B cell, (e.g., B cell depleting biologics, for example, a biologic targeting CD20, CD19, or CD22, and/or B cell modulating biologics, for example, a biologic targeting BAFF, BAFF/APRIL, CD40, IgG4, ICOS, IL-21, B7RP1). In some cases, the B cell targeting agent can be anti-CD20 mAb (such as rituximab) or other B-cell depleting antibody. In some embodiments, the immunosuppressive drugs can be a MHC/TCR interaction blockade, a nonselective depleting agent, calcineurin inhibitor, costimulatory signal blockade, cytokine blockade, lymphocyte depleting agent, cell adhesion inhibitor, IL-2 signaling inhibitor, cell cycle blocker, or any combination thereof. For example, the MHC/TCR interaction blockade can be anti-abTCR mAb T10B9. For example, the nonselective depleting agent can be anti-CD3 mAb (OKT3) or antithymocyte globulin (ATG). For example, the calcineurin inhibitor can be cyclosporine or tacrolimus. For example, the costimulatory signal blockade can be anti-CTLA-4 mAb, abatacept, ipilimumab, anti-PD-1 (such as pembrolizumab), anti-PD-L1 (such as MPDL3280A), anti-CD154 mAb, anti-CD40 mAb, or anti-ICOS mAb. For example, the cytokine blockade can be anti-CD25 mAb (such as daclizumab or basiliximab), anti-TNF (etanercept, infliximab, adalimumab, certolizumab pegol, and golimumab), anti-IL-6/IL-6R mAb (such as clazakizumab, ALD518, siltuximab, elsilimomab, sirukumab, olokizumab, sarilumab, tocilizumab, actemra), or anti-IL-7 mAb. For example, the lymphocyte depleting agent can be anti-CD2 mAb, fusion protein with IgG1 (such as alefacept), anti-CD20 mAb (such as rituximab), or anti-CD52 mAb (such as alemtuzumab). For example, the cell adhesion inhibitor can be anti-very large antigen 4 (VLA4) (such as natalizumab). For example, the IL-2 signaling inhibitor can be sirolimus (rapamycin) or everolimus. For example, the cell cycle blocker can be mycophenolate mofetil (MMF) or azathioprine.

Kits

In another embodiment of the disclosure, an article of manufacture which contains compositions comprising apoptotic leukocytes, an mTOR inhibitor, an anti-tumor necrosis factor agent or an anti-tumor necrosis factor receptor agent, an anti-interleukin 6 agent or an anti-interleukin 6 receptor agent, and an anti-CD40 agent or an anti-CD40 ligand agent, in a solution form or in a lyophilized form or a kit comprising an article of manufacture is provided. The kits of the instant disclosure can be for use in transplantation of a transplant in a recipient or reducing or inhibiting occurrence of GVHD in a recipient. In some embodiments, the kit is useful as a preparatory regimen prior to the transplantation. In some embodiments, the kit is useful as a tolerizing regimen post-transplantation. The kit can comprise instructions for diluting the composition or for its reconstitution and/or use. The article of manufacture comprises one or more containers. Suitable containers include, for example, bottles, vials (e.g. dual chamber vials), syringes (such as dual chamber syringes) and test tubes. The container may be formed from a variety of materials such as glass or plastic. The container holds the compositions e.g., in a lyophilized or solution form and a label on, or associated with, the container may indicate directions for reconstitution and/or use. For example, the label may indicate that the lyophilized composition is reconstituted to an effective amount as described above. The label may further indicate that the composition is useful or intended for subcutaneous administration or intravenous administration. The container holding the composition may be a multi-use vial, which allows for repeat administrations (e.g., from 2-6 administrations) of the composition. The article of manufacture may further comprise a container comprising a suitable diluent (e.g., BWFI). Upon mixing of the diluent and the composition, the final concentration in the composition can be, for example, an effective amount suitable for administration. The article of manufacture may further include other materials desirable from a commercial and user standpoint, including other buffers, diluents, filters, needles, syringes, and package inserts with instructions for use.

Kits may have a single container which contains, for example apoptotic leukocytes fixed in a crosslinking agent with or without other components (e.g., an mTOR inhibitor, an anti-tumor necrosis factor agent or an anti-tumor necrosis factor receptor agent, an anti-interleukin 6 agent or an anti-interleukin 6 receptor agent, and an anti-CD40 agent or an anti-CD40 ligand agent) or may have distinct container for each component. In some embodiments, the kit comprise a single container which contains, for example, apoptotic leukocytes fixed in a crosslinking agent, wherein the apoptotic leukocytes comprise conjugated on its surface, one or more peptides derived from a MHC class II molecule of the recipient, or one or more peptides derived from a MHC class I molecule of a donor of the cell, tissue or organ transplant; with or without other components (e.g., an mTOR inhibitor, an anti-tumor necrosis factor agent or an anti-tumor necrosis factor receptor agent, an anti-interleukin 6 agent or an anti-interleukin 6 receptor agent, and an anti-CD40 agent or an anti-CD40 ligand agent) or may have distinct container for each component.

The components of the kit may be pre-complexed or each component may be in a separate distinct container prior to administration to a patient. The components of the kit may be provided in one or more liquid solutions, preferably, an aqueous solution, more preferably, a sterile aqueous solution. The components of the kit may also be provided as solids, which may be converted into liquids by addition of suitable solvents, which are preferably provided in another distinct container. In some embodiments, kits of the disclosure include the components disclosed herein packaged for use in combination with the co-administration of an additional component (such as an anti-inflammatory agent, immunomodulating agent, anti-tumor agent, a natural product, a hormone or antagonist, an anti-angiogenesis agent or inhibitor, a apoptosis-inducing agent, or a chelator). The container of a kit may be a vial, test tube, flask, bottle, syringe, or any other means of enclosing a solid or liquid. In some embodiments, the kit will contain a second vial or other container, which allows for separate dosing. The kit may also contain another container for a pharmaceutically acceptable liquid. Preferably, a kit will contain apparatus (e.g., one or more needles, syringes, eye droppers, pipette, etc.), which enables administration of the compositions of the disclosure which are components of the present kit.

In some embodiments, the kit disclosed herein further comprises the transplant. In some embodiments, the transplant is a kidney, liver, heart, lung, pancreas, islet cell, small bowel, bone marrow, hematopoietic stem cell, embryonic or induced pluripotent stem cell-derived islet beta cell, embryonic or induced pluripotent stem cell-derived islet, embryonic or induced pluripotent stem cell-derived hepatocyte or a combination thereof. In some embodiments, the transplant can be autologous, allograft, or a xenograft.

Methods of Making Genetic Modification

In order to make a genetically modified cell or non-human animal as described above, various techniques can be used. Disclosed herein are a few examples to create genetically modified cells or animals. It is to be understood that the methods disclosed herein are simply examples, and are not meant to limiting in any way.

The methods described herein, can utilize techniques which can be used to allow a DNA or RNA construct entry into a host cell include, but are not limited to, calcium phosphate/DNA co-precipitation, microinjection of DNA into a nucleus, electroporation, bacterial protoplast fusion with intact cells, transfection, lipofection, infection, particle bombardment, sperm mediated gene transfer, or any other technique known by one skilled in the art.

Certain aspects disclosed herein can utilize vectors. Any plasmids and vectors can be used as long as they are replicable and viable in a selected host. Vectors known in the art and those commercially available (and variants or derivatives thereof) can be engineered to include one or more recombination sites for use in the methods. Vectors that can be used include, but not limited to eukaryotic expression vectors such as pFastBac, pFastBacHT, pFastBacDUAL, pSFV, and pTet-Splice (Invitrogen), pEUK-C1, pPUR, pMAM, pMAMneo, pBI101, pBI121, pDR2, pCMVEBNA, and pYACneo (Clontech), pSVK3, pSVL, pMSG, pCH110, and pKK232-8 (Pharmacia, Inc.), p3'SS, pXT1, pSG5, pPbac, pMbac, pMClneo, and pOG44 (Stratagene, Inc.), and pYES2, pAC360, pBlueBa-cHis A, B, and C, pVL1392, pBlueBac111, pCDM8, pcDNA1, pZeoSV, pcDNA3, pREP4, pCEP4, and pEBVHis (Invitrogen, Corp.), and variants or derivatives thereof.

These vectors can be used to express a gene, e.g., a transgene, or portion of a gene of interest. A gene of portion or a gene can be inserted by using known methods, such as restriction enzyme-based techniques.

Gene Disruption

Gene disruption can be performed by any methods described below, for example, by knockout, knockdown, RNA interference, dominant negative, etc. Gene disruption can be done in a non-human animal. Gene disruption can be done in a human cell (e.g., a human splenocyte, peripheral blood leukocyte, and/or stem cell-derived cell, tissue, or organ). A detailed description of the methods is disclosed below in the section regarding genetically modified non-human animals.

In some embodiments, the graft donor and/or apoptotic cells have a reduced expression of one or more genes expressing alpha 1,3 galactosyltransferase (GGTA1), putative cytidine monophosphatase-N-acetylneuraminic acid hydroxylase-like protein (CMAH), and β1,4 N-acetylgalactosaminyltransferase (B4GALNT2). In some embodiments, the graft donor and/or apoptotic cells have a disruption in one or more genes expressing GGTA1, CMAH, and B4GALNT2. This can minimize or eliminate cell-mediated immunity and cell-dependent antibody-mediated immunity to organ, tissue, cell, and cell line grafts (e.g., xenograft or allograft) from the graft donor animals that are genotypically identical with the apoptotic cell vaccine donor animal.

For example, cells can have one or more genes that can be disrupted (e.g., reduced expression) including GGTA1, CMAH, B4GALNT2, NLRC5, B2M, PD-L1 and/or any combination thereof. For example, a cell can have disrupted GGTA1 only, or disrupted CMAH only, or disrupted B4GALNT2 only. A cell can also have disrupted GGTA1 and CMAH, disrupted GGTA1 and B4GALNT2, or disrupted CMAH and B4GALNT2. A cell can have disrupted GGTA1, CMAH, and B4GALNT2. In some cases, the disrupted gene does not include GGTA1. A cell can also express HLA-G (endogenously or exogenously), while GGTA1 and/or CMAH are disrupted. A cell can also have disrupted C3.

In some embodiments, the graft donor animals and/or apoptotic cells comprise an additional genetic modification. In some embodiments, the graft donor animals and/or apoptotic cells comprise a suppression of or a disruption in one or more genes encoding: a component of a major histocompatibility complex (MHC) I-specific enhanceosome (e.g., a NOD-like receptor family CARD domain containing 5 (NLRC5)); a transporter of an MHC I-binding peptide (e.g., transporter associated with antigen processing 1 (TAP1)); complement component 3 (C3); a CXC chemokine receptor 3 ligand (CXCL3); a CXC motif chemokine ligand10 (CXCL10) gene; MHC II transactivator (MHCIITA); a MHC class I polypeptide-related sequence A (MICA) gene; a MHC class I polypeptide-related sequence B (MICB) gene; a natural killer (NK) group 2D ligand (NKG2DL); a tumor necrosis factor receptor (TNF-R); a pig endogenous retrovirus (PERV); PD-1; PD-L1 or any combination thereof In some embodiments, the graft donor animals and/or apoptotic cells comprise one or more exogenous polynucleotides encoding one or more exogenous polypeptides. In some embodiments, the exogenous polypeptides expresses one or more of an MHC I formation suppressor (e.g., an infected cell protein 47 (ICP47)); a regulator of complement activation (e.g., CD46, CD55, or CD59); an inhibitory ligand for NK cells; a B7 family member (e.g., a programmed death ligand such as PD-L1 or PD-L2); a serine protease inhibitor (e.g., Spi9); a galectin; an interleukin (e.g., IL-37); a CD40:CD40L blocking agent (e.g., a CD40 antagonist polypeptide, an anti-CD40 ligand polypeptide); a ST6 beta-galactoside alpha-2,6-sialyltransferase 1 (ST6Gal1); a Fas ligand (FasL); any functional fragment thereof, or any combination thereof. In some embodiments, an inhibitory ligand for NK cells is a human leukocyte antigen (HLA), such as human leukocyte antigen E (HLA-E), human leukocyte antigen G (HLA-G), 0-2-microglobulin (B2M) or any combination thereof. In some embodiments, the HLA-G is HLA-G1, HLA-G2, HLA-G3, HLA-G4, HLA-G5, HLA-G6, HLA-G7, or any combination thereof. In some cases, galectins is galectin-1, galectin-2, galectin-3, galectin-4, galectin-5, galectin-6, galectin-7, galectin-8, galectin-9, galectin-10, galectin-11, galectin-12, galectin-13, galectin-14, or galectin-15. For example, a galectin can be galectin-9.

In some cases, the disruptions are not limited to solely these genes. It is contemplated that genetic homologues (e.g., any mammalian version of the gene) of the genes within this applications are covered. For example, genes that are disrupted can exhibit a certain identity and/or homology to genes disclosed herein, e.g., NLRC5, TAP1, GGTA1, B4GALNT2, CMAH, CXCL10, MICA, MICB, C3, and/or MHCIITA. Therefore, it is contemplated that a gene that exhibits at least or at least about 50%, 55%, 60%, 65%, 70%, 75%, 80%, 85%, 90%, 95%, 99%, or 100% homology (at the nucleic acid or protein level) can be disrupted, e.g., a gene that exhibits at least or at least about from 50% to 60%; 60% to 70%; 70% to 80%; 80% to 90%; or 90% to 99% homology. It is also contemplated that a gene that exhibits at least or at least about 50%, 55%, 60%, 65%, 70%, 75%, 80%, 85%, 90%, 99%, or 100% identity (at the nucleic acid or protein level) can be disrupted, e.g., a gene that exhibits at least or at least about from 50% to 60%; 60% to 70%; 70% to 80%; 80% to 90%; or 90% to 99% identity. Some genetic homologues are known in the art, however, in some cases, homologues are unknown. However, homologous genes between mammals can be found by comparing nucleic acid (DNA or RNA) sequences or protein sequences using publicly available databases such as NCBI BLAST.

Gene suppression can also be done in a number of ways. For example, gene expression can be reduced by knock out, altering a promoter of a gene, and/or by administering interfering RNAs (knockdown). This can be done at an organism level or at a tissue, organ, and/or cellular level. If one or more genes are knocked down in a cell, tissue, and/or organ, the one or more genes can be reduced by administrating RNA interfering reagents, e.g., siRNA, shRNA, or microRNA. For example, a nucleic acid which can express shRNA can be stably transfected into a cell to knockdown expression. Furthermore, a nucleic acid which can express shRNA can be inserted into the genome of cell or a non-human animal, thus knocking down a gene in the cell or non-human animal.

Disruption methods can also comprise overexpressing a dominant negative protein. This method can result in overall decreased function of a functional wild-type gene. Additionally, expressing a dominant negative gene can result in a phenotype that is similar to that of a knockout and/or knockdown.

In some cases, a stop codon can be inserted or created (e.g., by nucleotide replacement), in one or more genes, which can result in a nonfunctional transcript or protein (sometimes referred to as knockout). For example, if a stop codon is created within the middle of one or more genes, the resulting transcription and/or protein can be truncated, and can be nonfunctional. However, in some cases, truncation can lead to an active (a partially or overly active) protein. In some cases, if a protein is overly active, this can result in a dominant negative protein, e.g., a mutant polypeptide that disrupts the activity of the wild-type protein.

This dominant negative protein can be expressed in a nucleic acid within the control of any promoter. For example, a promoter can be a ubiquitous promoter. A promoter can also be an inducible promoter, tissue specific promoter, and/or developmental specific promoter.

The nucleic acid that codes for a dominant negative protein can then be inserted into a cell or non-human animal. Any known method can be used. For example, stable transfection can be used. Additionally, a nucleic acid that codes for a dominant negative protein can be inserted into a genome of a cell or non-human animal.

One or more genes in a cell or non-human animal can be knocked out using any method known in the art. For example, knocking out one or more genes can comprise deleting one or more genes from a genome of a cell or non-human animal. Knocking out can also comprise removing all or a part of a gene sequence from a cell or non-human animal. It is also contemplated that knocking out can comprise replacing all or a part of a gene in a genome of a cell or non-human animal with one or more nucleotides. Knocking out one or more genes can also comprise inserting a sequence in one or more genes thereby disrupting expression of the one or more genes. For example, inserting a sequence can generate a stop codon in the middle of one or more genes. Inserting a sequence can also shift the open reading frame of one or more genes. In some cases, knock out can be performed in a first exon of a gene. In other cases, knock out can be performed in a second exon of a gene.

Knockout can be done in a human cell or any cell, organ, and/or tissue in a non-human animal. For example, knockout can be whole body knockout, e.g., expression of one or more genes is reduced in all cells of a non-human animal. Knockout can also be specific to one or more cells, tissues, and/or organs of a non-human animal. This can be achieved by conditional knockout, where expression of one or more genes is selectively reduced in one or more organs, tissues or types of cells. Conditional knockout can be performed by a Cre-lox system, where cre is expressed under the control of a cell, tissue, and/or organ specific promoter. For example, one or more genes can be knocked out (or expression can be reduced) in one or more tissues, or organs, where the one or more tissues or organs can include brain, lung, liver, heart, spleen, pancreas, small intestine, large intestine, skeletal muscle, smooth muscle, skin, bones, adipose tissues, hairs, thyroid, trachea, gall bladder, kidney, ureter, bladder, aorta, vein, esophagus, diaphragm, stomach, rectum, adrenal glands, bronchi, ears, eyes, retina, genitals, hypothalamus, larynx, nose, tongue, spinal cord, or ureters, uterus, ovary, testis, and/or any combination thereof. One or more genes can also be knocked out (or expression can be reduced) in one types of cells, where one or more types of cells include trichocytes, keratinocytes, gonadotropes, corticotropes, thyrotropes, somatotropes, lactotrophs, chromaffin cells, parafollicular cells, glomus cells melanocytes, nevus cells, merkel cells, odontoblasts, cementoblasts corneal keratocytes, retina muller cells, retinal pigment epithelium cells, neurons, glias (e.g., oligodendrocyte astrocytes), ependymocytes, pinealocytes, pneumocytes (e.g., type I pneumocytes, and type II pneumocytes), clara cells, goblet cells, G cells, D cells, Enterochromaffin-like cells, gastric chief cells, parietal cells, foveolar cells, K cells, D cells, I cells, goblet cells, paneth cells, enterocytes, microfold cells, hepatocytes, hepatic stellate cells (e.g., Kupffer cells from mesoderm), cholecystocytes, centroacinar cells, pancreatic stellate cells, pancreatic α cells, pancreatic β cells, pancreatic δ cells, pancreatic F cells, pancreatic c cells, thyroid (e.g., follicular cells), parathyroid (e.g., parathyroid chief cells), oxyphil cells, urothelial cells, osteoblasts, osteocytes, chondroblasts, chondrocytes, fibroblasts, fibrocytes, myoblasts, myocytes, myosatellite cells, tendon cells, cardiac muscle cells, lipoblasts, adipocytes, interstitial cells of cajal, angioblasts, endothelial cells, mesangial cells (e.g., intraglomerular mesangial cells and extraglomerular mesangial cells), juxtaglomerular cells, macula densa cells, stromal cells, interstitial cells, telocytes simple epithelial cells, podocytes, kidney proximal tubule brush border cells, sertoli cells, leydig cells, granulosa cells, peg cells, germ cells, spermatozoon ovums, lymphocytes, myeloid cells, endothelial progenitor cells, stem cells, embryonic stem cells, induced pluripotent stem cells, mesenchymal stem cells, endothelial stem cells, angioblasts, mesoangioblasts, pericyte mural cells, and/or any combination thereof.

Conditional knockouts can be inducible, for example, by using tetracycline inducible promoters, development specific promoters. This can allow for eliminating or suppressing expression of a gene/protein at any time or at a specific time. For example, with the case of a tetracycline inducible promoter, tetracycline can be given to a non-human animal any time after birth. If a non-human animal is a being that develops in a womb, then promoter can be induced by giving tetracycline to the mother during pregnancy. If a non-human animal develops in an egg, a promoter can be induced by injecting, or incubating in tetracycline. Once tetracycline is given to a non-human animal, the tetracycline can result in expression of cre, which can then result in excision of a gene of interest.

A cre/lox system can also be under the control of a developmental specific promoter. For example, some promoters are turned on after birth, or even after the onset of puberty. These promoters can be used to control cre expression, and therefore can be used in developmental specific knockouts.

It is also contemplated that any combinations of knockout technology can be combined. For example, tissue specific knockout can be combined with inducible technology, creating a tissue specific, inducible knockout. Furthermore, other systems such developmental specific promoter, can be used in combination with tissues specific promoters, and/or inducible knockouts.

It is also contemplated that less than all alleles of one or more genes of a cell or a non-human animal can be knocked out. For example, in diploid cells and/or non-human animals, it is contemplated that one of two alleles are knocked out. This can result in decreased expression and decreased protein levels of genes. Overall decreased expression can be less than or less than about 99%, 95%, 90%, 85%, 80%, 75%, 70%, 65%, 60%, 55%, 50%, 45%, 40%, 35%, 30%, 25%, or 20%; e.g., from or from about 99% to 90%; 90% to 80%; 80% to 70%; 70% to 60%; 60% to 50%; 50% to 40%; 40% to 30%, or 30% to 20% expression; compared to when both alleles are functioning, for example, not knocked out and/or knocked down. Additionally, an overall decrease in protein level can be the same or as the decreased in overall expression, or different. An overall decrease in protein level can be about or less than about 99%, 95%, 90%, 80%, 70%, 60%, 50%, 40%, 30%, or 20%, e.g., from or from about 99% to 90%; 90% to 80%; 80% to 70%; 70% to 60%; 60% to 50%; 50% to 40%; 40% to 30%, or 30% to 20% expression; compared to when both alleles are functioning, for example, not knocked out and/or knocked down. However, it is also contemplated that all alleles of one or more genes in a cell and/or a non-human animal can be knocked out.

Knockouts of one or more genes can be verified by genotyping. Methods for genotyping can include sequencing, restriction fragment length polymorphism identification (RFLPI), random amplified polymorphic detection (RAPD), amplified fragment length polymorphism detection (AFLPD), PCR (e.g., long range PCR, or stepwise PCR), allele specific oligonucleotide (ASO) probes, and hybridization to DNA microarrays or beads. For example, genotyping can be performed by sequencing. In some cases, sequencing can be high fidelity sequencing. Methods of sequencing can include Maxam-Gilbert sequencing, chain-termination methods (e.g., Sanger sequencing), shotgun sequencing, and bridge PCR. In some cases, genotyping can be performed by next-generation sequencing. Methods of next-generation sequencing can include massively parallel signature sequencing, colony sequencing, pyrosequencing (e.g., pyrosequencing developed by 454 Life Sciences), single-molecule rea-time sequencing (e.g., by Pacific Biosciences), Ion semiconductor sequencing (e.g., by Ion Torrent semiconductor sequencing), sequencing by synthesis (e.g., by Solexa sequencing by Illumina), sequencing by ligation (e.g., SOLiD sequencing by Applied Biosystems), DNA nanoball sequencing, and heliscope single molecule sequencing. In some cases, genotyping of a cell or non-human animal herein can comprise full genome sequencing analysis. In some cases, knocking out of a gene in a cell or animal can be validated by sequencing (e.g., next-generation sequencing) a part of the gene or the entire gene.

Homologous Recombination

Homologous recombination can also be used for any of the relevant genetic modifications as disclosed herein. Homologous recombination can permit site-specific modifications in endogenous genes and thus novel modifications can be engineered into a genome. For example, the ability of homologous recombination (gene conversion and classical strand breakage/rejoining) to transfer genetic sequence information between DNA molecules can render targeted homologous recombination and can be a powerful method in genetic engineering and gene manipulation.

Cells that have undergone homologous recombination can be identified by a number of methods. For example, a selection method can detect an absence of an immune response against a cell, for example by a human anti-gal antibody. A selection method can also include assessing a level of clotting in human blood when exposed to a cell or tissue. Selection via antibiotic resistance can be used for screening.

Random Insertion

One or more transgenes of the methods described herein can be inserted randomly to any locus in a genome of a cell. These transgenes can be functional if inserted anywhere in a genome. For instance, a transgene can encode its own promoter or can be inserted into a position where it is under the control of an endogenous promoter. Alternatively, a transgene can be inserted into a gene, such as an intron of a gene or an exon of a gene, a promoter, or a non-coding region. A transgene can be integrated into a first exon of a gene.

A DNA encoding a transgene sequences can be randomly inserted into a chromosome of a cell. A random integration can result from any method of introducing DNA into a cell known to one of skill in the art. This can include, but is not limited to, electroporation, sonoporation, use of a gene gun, lipotransfection, calcium phosphate transfection, use of dendrimers, microinjection, use of viral vectors including adenoviral, AAV, and retroviral vectors, and/or group II ribozymes.

A DNA encoding a transgene can also be designed to include a reporter gene so that the presence of the transgene or its expression product can be detected via activation of the reporter gene. Any reporter gene known in the art can be used, such as those disclosed above. By selecting in cell culture those cells in which a reporter gene has been activated, cells can be selected that contain a transgene.

A DNA encoding a transgene can be introduced into a cell via electroporation. A DNA can also be introduced into a cell via lipofection, infection, or transformation. Electroporation and/or lipofection can be used to transfect fibroblast cells.

Expression of a transgene can be verified by an expression assay, for example, qPCR or by measuring levels of RNA. Expression level can be indicative also of copy number. For example, if expression levels are extremely high, this can indicate that more than one copy of a transgene was integrated in a genome. Alternatively, high expression can indicate that a transgene was integrated in a highly transcribed area, for example, near a highly expressed promoter. Expression can also be verified by measuring protein levels, such as through Western blotting.

Site Specific Insertion

Inserting one or more transgenes in any of the methods disclosed herein can be site-specific. For example, one or more transgenes can be inserted adjacent to a promoter, for example, adjacent to or near a Rosa26 promoter.

Modification of a targeted locus of a cell can be produced by introducing DNA into cells, where the DNA has homology to the target locus. DNA can include a marker gene, allowing for selection of cells comprising the integrated construct. Homologous DNA in a target vector can recombine with a chromosomal DNA at a target locus. A marker gene can be flanked on both sides by homologous DNA sequences, a 3' recombination arm, and a 5' recombination arm.

A variety of enzymes can catalyze insertion of foreign DNA into a host genome. For example, site-specific recombinases can be clustered into two protein families with distinct biochemical properties, namely tyrosine recombinases (in which DNA is covalently attached to a tyrosine residue) and serine recombinases (where covalent attachment occurs at a serine residue). In some cases, recombinases can comprise Cre, fC31 integrase (a serine recombinase derived from *Streptomyces* phage fC31), or bacteriophage derived site-specific recombinases (including Flp, lambda integrase, bacteriophage HK022 recombinase, bacteriophage R4 integrase and phage TP901-1 integrase).

Expression control sequences can also be used in constructs. For example, an expression control sequence can comprise a constitutive promoter, which is expressed in a wide variety of cell types. For example, among suitable strong constitutive promoters and/or enhancers are expression control sequences from DNA viruses (e.g., SV40, polyoma virus, adenoviruses, adeno-associated virus, pox viruses, CMV, HSV, etc.) or from retroviral LTRs. Tissue-specific promoters can also be used and can be used to direct expression to specific cell lineages. While experiments can be conducted using a Rosa26 gene promoter, other Rosa26-related promoters capable of directing gene expression can be used to yield similar results, as can be evident to those of skill in the art. Therefore, the description herein is not meant to be limiting, but rather disclose one of many possible examples. In some cases, a shorter Rosa26 5'-upstream sequences, which can nevertheless achieve the same degree of expression, can be used. Also useful are minor DNA sequence variants of a Rosa26 promoter, such as point mutations, partial deletions or chemical modifications.

A Rosa26 promoter can be used for expression in mammals. For example, sequences that are similar to the 5' flanking sequence of a pig Rosa26 gene, including, but not limited to, promoters of Rosa26 homologues of other species (such as human, cattle, mouse, sheep, goat, rabbit and rat), can also be used. A Rosa26 gene can be sufficiently conserved among different mammalian species and other mammalian Rosa26 promoters can also be used.

The CRISPR/Cas system can be used to perform site specific insertion. For example, a nick or a double stranded break in an insertion site in the genome can be made by CRISPR/Cas to facilitate the insertion of a transgene at the insertion site.

Gene Editing Via CRISPR/Cas System

In some cases, gene editing can be useful to design a knockout. For example, gene editing can be performed using a nuclease, including CRISPR associated proteins (Cas proteins, e.g., Cas9), Zinc finger nuclease (ZFN), Transcription Activator-Like Effector Nuclease (TALEN), and maganucleases. Nucleases can be naturally existing nucleases, genetically modified, and/or recombinant. For example, a CRISPR/Cas system can be suitable as a gene editing system.

Methods described herein can take advantage of a CRISPR/Cas system. For example, double-strand breaks (DSBs) can be generated using a CRISPR/Cas system, e.g., a type II CRISPR/Cas system. A Cas enzyme used in the methods disclosed herein can be Cas9, which catalyzes DNA cleavage. Enzymatic action by Cas9 derived from *Streptococcus pyogenes* or any other Cas9 can generate double stranded breaks at target site sequences which hybridize to 20 nucleotides of a guide sequence and that have a protospacer-adjacent motif (PAM) following the 20 nucleotides of the target sequence.

A vector can be operably linked to an enzyme-coding sequence encoding a CRISPR enzyme, such as a Cas protein. Cas proteins that can be used herein include class 1 and class 2. Non-limiting examples of Cas proteins include Cas1, Cas1B, Cas2, Cas3, Cas4, Cas5, Cas5d, Cas5t, Cas5h, Cas5a, Cas6, Cas7, Cas8, Cas9 (also known as Csn1 or Csx12), Cas10, Csy1, Csy2, Csy3, Csy4, Cse1, Cse2, Cse3, Cse4, Cse5e, Cscl, Csc2, Csa5, Csn1, Csn2, Csm1, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx1S, Csf1, Csf2, CsO, Csf4, Csd1, Csd2, Cst1, Cst2, Csh1, Csh2, Csa1, Csa2, Csa3, Csa4, Csa5, C2c1, C2c2, C2c3, Cpf1, CARF, DinG, homologues thereof, or modified versions thereof. An unmodified CRISPR enzyme can have DNA cleavage activity, such as Cas9. A CRISPR enzyme can direct cleavage of one or both strands at a target sequence, such as within a target sequence and/or within a complement of a target sequence. For example, a CRISPR enzyme can direct cleavage of one or both strands within about 1, 2, 3, 4, 5, 6, 7, 8, 9, 10, 15, 20, 25, 50, 100, 200, 500, or more base pairs from the first or last nucleotide of a target sequence. A vector that encodes a CRISPR enzyme that is mutated to with respect, to a corresponding wild-type enzyme such that the mutated CRISPR enzyme lacks the ability to cleave one or both strands of a target polynucleotide containing a target sequence can be used.

Cas9 can refer to a polypeptide with at least or at least about 50%, 60%, 70%, 80%, 90%, 91%, 92%, 93%, 94%, 95%, 96%, 97%, 98%, 99%, or 100% sequence identity and/or sequence homology to a wild type exemplary Cas9 polypeptide (e.g., Cas9 from *S. pyogenes*). Cas9 can refer to a polypeptide with at most or at most about 50%, 60%, 70%, 80%, 90%, 91%, 92%, 93%, 94%, 95%, 96%, 97%, 98%, 99%, or 100% sequence identity and/or sequence homology to a wild type exemplary Cas9 polypeptide (e.g., from *S. pyogenes*). Cas9 can refer to the wild type or a modified form of the Cas9 protein that can comprise an amino acid change such as a deletion, insertion, substitution, variant, mutation, fusion, chimera, or any combination thereof.

*S. pyogenes* Cas9 (SpCas9) can be used as a CRISPR endonuclease for genome engineering. However, others can also be used. In some cases, a different endonuclease may be used to target certain genomic targets. In some cases, synthetic SpCas9-derived variants with non-NGG PAM sequences may be used. Additionally, other Cas9 orthologues from various species have been identified and these "non-SpCas9s" can bind a variety of PAM sequences that could also be useful for the present invention. For example, the relatively large size of SpCas9 (approximately 4 kb coding sequence) can lead to plasmids carrying the SpCas9 cDNA that may not be efficiently expressed in a cell. Conversely, the coding sequence for *Staphylococcus aureus* Cas9 (SaCas9) is approximately 1 kilo base shorter than SpCas9, possibly allowing it to be efficiently expressed in a cell. Similar to SpCas9, the SaCas9 endonuclease is capable of modifying target genes in mammalian cells in vitro and in mice in vivo. In some cases, a Cas protein may target a different PAM sequence. In some cases, a target gene, such as NLRC5, may be adjacent to a Cas9 PAM, 5'-NGG, for example. In other cases, other Cas9 orthologs may have different PAM requirements. For example, other PAMs such as those of *S. thermophilus* (5'-NNAGAA for CRISPR1 and 5'-NGGNG for CRISPR3) and *Neisseria meningitidis* (5'-NNNNGATT) may also be found adjacent to a target gene, such as NLRC5. A transgene of the present invention may be inserted adjacent to any PAM sequence from any Cas, or Cas derivative, protein. In some cases, a PAM can be found every, or about every, 8 to 12 base pairs in a genome. A PAM can be found every 1 to 15 base pairs in a genome. A PAM can also be found every 5 to 20 base pairs in a genome. In some cases, a PAM can be found every 5, 6, 7, 8, 9, 10, 11, 12, 13, 14, 15, 16, 17, 18, 19, 20, or more base pairs in a genome. A PAM can be found at or between every 5-100 base pairs in a genome.

For example, for a *S. pyogenes* system, a target gene sequence can precede (i.e., be 5' to) a 5'-NGG PAM, and a 20-nt guide RNA sequence can base pair with an opposite strand to mediate a Cas9 cleavage adjacent to a PAM. In some cases, an adjacent cut may be or may be about 3 base pairs upstream of a PAM. In some cases, an adjacent cut may be or may be about 10 base pairs upstream of a PAM. In some cases, an adjacent cut may be or may be about 0-20 base pairs upstream of a PAM. For example, an adjacent cut can be next to, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 base pairs upstream of a PAM. An adjacent cut can also be downstream of a PAM by 1 to 30 base pairs.

Alternatives to *S. pyogenes* Cas9 may include RNA-guided endonucleases from the Cpf1 family that display cleavage activity in mammalian cells. Unlike Cas9 nucleases, the result of Cpf1-mediated DNA cleavage is a double-strand break with a short 3' overhang. Cpf1's staggered cleavage pattern may open up the possibility of directional gene transfer, analogous to traditional restriction enzyme cloning, which may increase the efficiency of gene editing. Like the Cas9 variants and orthologues described above, Cpf1 may also expand the number of sites that can be targeted by CRISPR to AT-rich regions or AT-rich genomes that lack the NGG PAM sites favored by SpCas9.

A vector that encodes a CRISPR enzyme comprising one or more nuclear localization sequences (NLSs) can be used. For example, there can be or be about 1, 2, 3, 4, 5, 6, 7, 8, 9, 10 NLSs used. A CRISPR enzyme can comprise the NLSs at or near the ammo-terminus, about or more than about 1, 2, 3, 4, 5, 6, 7, 8, 9, 10 NLSs at or near the carboxy-terminus, or any combination of these (e.g., one or more NLS at the ammo-terminus and one or more NLS at the carboxy terminus). When more than one NLS is present, each can be selected independently of others, such that a single NLS can be present in more than one copy and/or in combination with one or more other NLSs present in one or more copies. CRISPR enzymes used in the methods can comprise at most 6 NLSs. An NLS is considered near the N- or C-terminus when the nearest amino acid to the NLS is within about 50 amino acids along a polypeptide chain from the N- or C-terminus, e.g., within 1, 2, 3, 4, 5, 10, 15, 20, 25, 30, 40, or 50 amino acids.

A method disclosed herein also can comprise introducing into a cell or embryo at least one guide RNA or nucleic acid, e.g., DNA encoding at least one guide RNA. A guide RNA can interact with a RNA-guided endonuclease to direct the endonuclease to a specific target site, at which site the 5' end of the guide RNA base pairs with a specific protospacer sequence in a chromosomal sequence.

A guide RNA can comprise two RNAs, e.g., CRISPR RNA (crRNA) and transactivating crRNA (tracrRNA). A guide RNA can sometimes comprise a single-chain RNA, or single guide RNA (sgRNA) formed by fusion of a portion (e.g., a functional portion) of crRNA and tracrRNA. A guide RNA can also be a dualRNA comprising a crRNA and a tracrRNA. Furthermore, a crRNA can hybridize with a target DNA.

As discussed above, a guide RNA can be an expression product. For example, a DNA that encodes a guide RNA can be a vector comprising a sequence coding for the guide RNA. A guide RNA can be transferred into a cell or organism by transfecting the cell or organism with an isolated guide RNA or plasmid DNA comprising a sequence coding for the guide RNA and a promoter. A guide RNA can also be transferred into a cell or organism in other way, such as using virus-mediated gene delivery.

A guide RNA can be isolated. For example, a guide RNA can be transfected in the form of an isolated RNA into a cell or organism. A guide RNA can be prepared by in vitro transcription using any in vitro transcription system known in the art. A guide RNA can be transferred to a cell in the form of isolated RNA rather than in the form of plasmid comprising encoding sequence for a guide RNA.

A guide RNA can comprise three regions: a first region at the 5' end that can be complementary to a target site in a chromosomal sequence, a second internal region that can form a stem loop structure, and a third 3' region that can be single-stranded. A first region of each guide RNA can also be different such that each guide RNA guides a fusion protein to a specific target site. Further, second and third regions of each guide RNA can be identical in all guide RNAs.

A first region of a guide RNA can be complementary to sequence at a target site in a chromosomal sequence such that the first region of the guide RNA can base pair with the target site. In some cases, a first region of a guide RNA can comprise from or from about 10 nucleotides to 25 nucleotides (i.e., from 10 nts to 25 nts; or from about 10 nts to about 25 nts; or from 10 nts to about 25 nts; or from about 10 nts to 25 nts) or more. For example, a region of base pairing between a first region of a guide RNA and a target site in a chromosomal sequence can be or can be about 10, 11, 12, 13, 14, 15, 16, 17, 18, 19, 20, 22, 23, 24, 25, or more nucleotides in length. Sometimes, a first region of a guide RNA can be or can be about 19, 20, or 21 nucleotides in length.

A guide RNA can also comprise a second region that forms a secondary structure. For example, a secondary structure formed by a guide RNA can comprise a stem (or hairpin) and a loop. A length of a loop and a stem can vary. For example, a loop can range from or from about 3 to 10 nucleotides in length, and a stem can range from or from about 6 to 20 base pairs in length. A stem can comprise one or more bulges of 1 to 10 or about 10 nucleotides. The overall length of a second region can range from or from about 16 to 60 nucleotides in length. For example, a loop can be or can be about 4 nucleotides in length and a stem can be or can be about 12 base pairs.

A guide RNA can also comprise a third region at the 3' end that can be essentially single-stranded. For example, a third region is sometimes not complementarity to any chromosomal sequence in a cell of interest and is sometimes not complementarity to the rest of a guide RNA. Further, the length of a third region can vary. A third region can be more than or more than about 4 nucleotides in length. For example, the length of a third region can range from or from about 5 to 60 nucleotides in length.

A guide RNA can target any exon or intron of a gene target. In some cases, a guide can target exon 1 or 2 of a gene, in other cases; a guide can target exon 3 or 4 of a gene. A composition can comprise multiple guide RNAs that all target the same exon or in some cases, multiple guide RNAs that can target different exons. An exon and an intron of a gene can be targeted.

A guide RNA can target a nucleic acid sequence of or of about 20 nucleotides. A target nucleic acid can be less than or less than about 20 nucleotides. A target nucleic acid can be at least or at least about 5, 10, 15, 16, 17, 18, 19, 20, 21, 22, 23, 24, 25, 30, or anywhere between 1-100 nucleotides in length. A target nucleic acid can be at most or at most about 5, 10, 15, 16, 17, 18, 19, 20, 21, 22, 23, 24, 25, 30, 40, 50, or anywhere between 1-100 nucleotides in length. A target nucleic acid sequence can be or can be about 20 bases immediately 5' of the first nucleotide of the PAM. A guide RNA can target a nucleic acid sequence. A target nucleic acid can be at least or at least about 1-10, 1-20, 1-30, 1-40, 1-50, 1-60, 1-70, 1-80, 1-90, or 1-100.

A guide nucleic acid, for example, a guide RNA, can refer to a nucleic acid that can hybridize to another nucleic acid, for example, the target nucleic acid or protospacer in a genome of a cell. A guide nucleic acid can be RNA. A guide nucleic acid can be DNA. The guide nucleic acid can be programmed or designed to bind to a sequence of nucleic acid site-specifically. A guide nucleic acid can comprise a polynucleotide chain and can be called a single guide nucleic acid. A guide nucleic acid can comprise two polynucleotide chains and can be called a double guide nucleic acid. A guide RNA can be introduced into a cell or embryo as an RNA molecule. For example, a RNA molecule can be transcribed in vitro and/or can be chemically synthesized. An RNA can be transcribed from a synthetic DNA molecule, e.g., a gBlocks® gene fragment. A guide RNA can then be introduced into a cell or embryo as an RNA molecule. A guide RNA can also be introduced into a cell or embryo in the form of a non-RNA nucleic acid molecule, e.g., DNA molecule. For example, a DNA encoding a guide RNA can be operably linked to promoter control sequence for expression of the guide RNA in a cell or embryo of interest. A RNA coding sequence can be operably linked to a promoter sequence that is recognized by RNA polymerase III (Pol III). Plasmid vectors that can be used to express guide RNA include, but are not limited to, px330 vectors and px333 vectors. In some cases, a plasmid vector (e.g., px333 vector) can comprise at least two guide RNA-encoding DNA sequences. A px333 vector can be used, for example, to introduce GGTA1-10 and Gal2-2, or GGTA1-10, Gal2-2, and NLRC5-6. In other cases, NLRC5-6 and Gal2-2 can be introduced with a px333 vector.

A DNA sequence encoding a guide RNA can also be part of a vector. Further, a vector can comprise additional expression control sequences (e.g., enhancer sequences, Kozak sequences, polyadenylation sequences, transcriptional termination sequences, etc.), selectable marker sequences (e.g., antibiotic resistance genes), origins of replication, and the like. A DNA molecule encoding a guide RNA can also be linear. A DNA molecule encoding a guide RNA can also be circular.

When DNA sequences encoding an RNA-guided endonuclease and a guide RNA are introduced into a cell, each DNA sequence can be part of a separate molecule (e.g., one vector containing an RNA-guided endonuclease coding sequence and a second vector containing a guide RNA coding sequence) or both can be part of a same molecule (e.g., one vector containing coding (and regulatory) sequence for both an RNA-guided endonuclease and a guide RNA).

Guide RNA can target a gene in a pig or a pig cell. In some cases, guide RNA can target a pig NLRC5 gene. In some cases, guide RNA can be designed to target pig GGTA1, CMAH, or B4GALNT2 gene. In some cases, at least two guide RNAs are introduced. At least two guide RNAs can each target two genes. For example, in some cases, a first guide RNA can target GGTA1 and a second guide RNA can target CMAH. In some cases, a first guide RNA can target GGTA1 and a second guide RNA can target B4GALNT2. In other cases, a first guide RNA can target GGTA1, a second guide RNA can target CMAH, and a third guide RNA can target B4GALNT2. In some cases, a guide RNA can target a gene in a human or non-human animal cell.

A guide nucleic acid can comprise one or more modifications to provide a nucleic acid with a new or enhanced feature. A guide nucleic acid can comprise a nucleic acid affinity tag. A guide nucleic acid can comprise synthetic nucleotide, synthetic nucleotide analog, nucleotide derivatives, and/or modified nucleotides.

In some cases, a gRNA can comprise modifications. A modification can be made at any location of a gRNA. More than one modification can be made to a single gRNA. A gRNA can undergo quality control after a modification. In some cases, quality control may include PAGE, HPLC, MS, or any combination thereof.

A modification of a gRNA can be a substitution, insertion, deletion, chemical modification, physical modification, stabilization, purification, or any combination thereof. A gRNA can also be modified by 5' adenylate, 5' guanosine-triphosphate cap, 5'N7-Methylguanosine-triphosphate cap, 5' triphosphate cap, 3' phosphate, 3' thiophosphate, 5' phosphate, 5' thiophosphate, Cis-Syn thymidine dimer, trimers, C12 spacer, C3 spacer, C6 spacer, dSpacer, PC spacer, rSpacer, Spacer 18, Spacer 9,3'-3' modifications, 5'-5' modifications, abasic, acridine, azobenzene, biotin, biotin BB, biotin TEG, cholesteryl TEG, desthiobiotin TEG, DNP TEG, DNP-X, DOTA, dT-Biotin, dual biotin, PC biotin, psoralen C2, psoralen C6, TINA, 3'DABCYL, black hole quencher 1, black hole quencher 2, DABCYL SE, dT-DABCYL, IRDye QC-1, QSY-21, QSY-35, QSY-7, QSY-9, carboxyl linker, thiol linkers, 2' deoxyribonucleoside analog purine, 2' deoxyribonucleoside analog pyrimidine, ribonucleoside analog, 2'-O-methyl ribonucleoside analog, sugar modified analogs, wobble/universal bases, fluorescent dye label, 2' fluoro RNA, 2'O-methyl RNA, methylphosphonate, phosphodiester DNA, phosphodiester RNA, phosphothioate DNA, phosphorothioate RNA, UNA, pseudouridine-5'-triphosphate, 5-methylcytidine-5'-triphosphate, or any combination thereof.

In some cases, a modification is permanent. In other cases, a modification is transient. In some cases, multiple modifications are made to a gRNA. A gRNA modification may alter physio-chemical properties of a nucleotide, such as their conformation, polarity, hydrophobicity, chemical reactivity, base-pairing interactions, or any combination thereof.

A modification can also be a phosphorothioate substitute. In some cases, a natural phosphodiester bond may be susceptible to rapid degradation by cellular nucleases and; a modification of internucleotide linkage using phosphorothioate (PS) bond substitutes can be more stable towards hydrolysis by cellular degradation. A modification can increase stability in a gRNA. A modification can also enhance biological activity. In some cases, a phosphorothioate enhanced RNA gRNA can inhibit RNase A, RNase T1, calf serum nucleases, or any combinations thereof. These properties can allow the use of PS-RNA gRNAs to be used in applications where exposure to nucleases is of high probability in vivo or in vitro. For example, phosphorothioate (PS) bonds can be introduced between the last 3-5 nucleotides at the 5'- or 3'-end of a gRNA which can inhibit exonuclease degradation. In some cases, phosphorothioate bonds can be added throughout an entire gRNA to reduce attack by endonucleases.

Transgene

Transgenes, or exogenous nucleic acid sequences, can be useful for overexpressing endogenous genes at higher levels than without the transgenes. Additionally, exogenous nucleic acid sequences can be used to express exogenous genes. Transgenes can also encompass other types of genes, for example, a dominant negative gene.

A transgene of protein X can refer to a transgene comprising an exogenous nucleic acid sequence encoding protein X. As used herein, in some cases, a transgene encoding protein X can be a transgene encoding 100% or about 100% of the amino acid sequence of protein X. In some cases, a transgene encoding protein X can encode the full or partial amino sequence of protein X. For example, the transgene can encode at least or at least about 99%, 95%, 90%, 80%, 70%, 60%, 50%, 40%, 30%, 20%, 10%, or 5%, e.g., from or from about 99% to 90%; 90% to 80%; 80% to 70%; 70% to 60%; or 60% to 50%; of the amino acid sequence of protein X. Expression of a transgene can ultimately result in a functional protein, e.g., a partially or fully functional protein. As discussed above, if a partial sequence is expressed, the ultimate result can be in some cases a nonfunctional protein or a dominant negative protein. A nonfunctional protein or dominant negative protein can also compete with a functional (endogenous or exogenous) protein. A transgene can also encode an RNA (e.g., mRNA, shRNA, siRNA, or microRNA). In some cases, where a transgene encodes for an mRNA, this can in turn be translated into a polypeptide (e.g., a protein). Therefore, it is contemplated that a transgene can encode for protein. A transgene can, in some instances, encode a protein or a portion of a protein. Additionally, a protein can have one or more mutations (e.g., deletion, insertion, amino acid replacement, or rearrangement) compared to a wild-type polypeptide. A protein can be a natural polypeptide or an artificial polypeptide (e.g., a recombinant polypeptide). A transgene can encode a fusion protein formed by two or more polypeptides.

Where a transgene, or exogenous nucleic acid sequence, encodes for an mRNA based on a naturally occurring mRNA (e.g., an mRNA normally found in another species), the mRNA can comprise one or more modifications in the 5' or 3' untranslated regions. The one or more modifications can comprise one or more insertions, on or more deletions, or one or more nucleotide changes, or a combination thereof. The one or more modifications can increase the stability of the mRNA. The one or more modifications can remove a binding site for an miRNA molecule, such as an miRNA molecule that can inhibit translation or stimulate mRNA degradation. For example, an mRNA encoding for a HLA-G protein can be modified to remove a binding site for an miR148 family miRNA. Removal of this binding site can increase mRNA stability.

Transgenes can be placed into an organism, cell, tissue, or organ, in a manner which produces a product of the transgene. For example, disclosed herein is a non-human animal comprising one or more transgenes. One or more transgenes can be in combination with one or more disruptions as described herein. A transgene can be incorporated into a cell. For example, a transgene can be incorporated into an organism's germ line. When inserted into a cell, a transgene can be either a complementary DNA (cDNA) segment, which is a copy of messenger RNA (mRNA), or a gene itself residing in its original region of genomic DNA (with or without introns).

A transgene can comprise a polynucleotide encoding a protein of a species and expressing the protein in an animal of a different species. For example, a transgene can comprise a polynucleotide encoding a human protein. Such a polynucleotide can be used express the human protein (e.g., CD47) in a non-human animal (e.g., a pig). In some cases, the polynucleotide can be synthetic, e.g., different from any native polynucleotide in sequence and/or chemical characteristics.

The polynucleotide encoding a protein of species X can be optimized to express the protein in an animal of a species Y. There may be codon usage bias (e.g., differences in the frequency of occurrence of synonymous codons in coding DNA). A codon can be a series of nucleotides (e.g., a series of 3 nucleotides) that encodes a specific amino acid residue in a polypeptide chain or for the termination of translation (stop codons). Different species may have different preference in the DNA codons. The optimized polynucleotide can encode a protein of species X, in some cases with codons of a species Y, so that the polynucleotide can express the protein more efficiently in the species Y, compared to the native gene encoding the protein of species X. In some cases, an optimized polynucleotide can express a protein at least 5%, 10%, 20%, 40%, 80%, 90%, 1.5 folds, 2 folds, 5 folds, or 10 folds more efficiently in species Y than a native gene of species X encoding the same protein.

A combination of transgenes and gene disruptions can be used. A non-human animal can comprise one or more reduced genes and one or more transgenes. For example, one or more genes whose expression is reduced can comprise any one of NLRC5, TAP1, GGTA1, B4GALNT2, CMAH, CXCL10, MICA, MICB, C3, MHCIITA, and/or any combination thereof, and one or more transgene can comprise ICP47, CD46, CD55, CD 59, any functional fragments thereof, and/or any combination thereof. For example, solely to illustrate various combinations, one or more genes whose expression is disrupted can comprise NLRC5 and one or more transgenes comprise ICP47. One or more genes whose expression is disrupted can also comprise TAP1, and one or more transgenes comprise ICP47. One or more genes whose expression is disrupted can also comprise NLRC5 and TAP1, and one or more transgenes comprise ICP47. One or more genes whose expression is disrupted can also comprise NLRC5, TAP1, and GGTA1, and one or more transgenes comprise ICP47. One or more genes whose expression is disrupted can also comprise NLRC5, TAP1, B4GALNT2, and CMAH, and one or more transgenes comprise ICP47. One or more genes whose expression is disrupted can also comprise NLRC5, TAP1, GGTA1, B4GALNT2, and CMAH, and one or more transgenes comprise ICP47. One or more genes whose expression is disrupted can also comprise NLRC5 and one or more transgenes comprise CD59. One or more genes whose expression is disrupted can also comprise TAP1, and one or more transgenes comprise CD59. One or more genes whose expression is disrupted can also comprise NLRC5 and TAP1, and one or more transgenes comprise CD59. One or more genes whose expression is disrupted can also comprise NLRC5, TAP1, and GGTA1, and one or more transgenes comprise CD59. One or more genes whose expression is disrupted can also comprise NLRC5, TAP1, B4GALNT2, and CMAH, and one or more transgenes comprise CD59. One or more genes whose expression is disrupted can also comprise NLRC5, TAP1, GGTA1, B4GALNT2, B2M, PD-L1 and CMAH, and one or more transgenes comprise CD59.

In some cases, a first exon of a gene is genetically modified. For example, one or more first exons of a gene that can be genetically modified can be a gene selected from a group consisting of NLRC5, TAP1, GGTA1, B4GALNT2, CMAH, CXCL10, MICA, MICB, C3, MHCIITA, B2M and any combination thereof.

In some cases, a transgene encodes all or part of one or more MHC alleles. For example, a transgene can encode all or part of an MHC class I or MHC class II allele (e.g., a class I A, class I B, class I C, class II DRA, class II DRB, class II DPA, class II DPB, class II DQA, class II DQB allele of a transplant donor or recipient, a fragment thereof, a peptide thereof, or a combination thereof).

Transgenes that can be used and are specifically contemplated can include those genes that exhibit a certain identity and/or homology to genes disclosed herein, for example, ICP47, CD46, CD55, CD59, HLA-E, HLA-G (e.g., HLA-G1, HLA-G2, HLA-G3, HLA-G4, HLA-G5, HLA-G6, or HLA-G7), B2M, Spi9, PD-L1, PD-L2, CD47, galectin-9, any functional fragments thereof, and/or any combination thereof. Therefore, it is contemplated that if gene that exhibits at least or at least about 60%, 70%, 80%, 90%, 95%, 98%, or 99% homology, e.g., at least or at least about 99% to 90%; 90% to 80%; 80% to 70%; 70% to 60% homology; (at the nucleic acid or protein level), it can be used as a transgene. It is also contemplated that a gene that exhibits at least or at least about 60%, 65%, 70%, 75%, 80%, 85%, 90%, 95%, 98%, or 99%, identity e.g., at least or at least about 99% to 90%; 90% to 80%; 80% to 70%; 70% to 60% identity; (at the nucleic acid or protein level) can be used as a transgene.

A cell or a non-human animal can also comprise 1, 2, 3, 4, 5, 6, 7, 8, 9, 10, 11, 12, 13, 14, 15, 16, 17, 18, 19, 20, or more dominant negative transgenes. Expression of a dominant negative transgenes can suppress expression and/or function of a wild type counterpart of the dominant negative transgene. Thus, for example, a cell or non-human animal comprising a dominant negative transgene X, can have similar phenotypes compared to a different cell or non-human animal comprising an X gene whose expression is reduced. One or more dominant negative transgenes can be dominant negative NLRC5, dominant negative TAP1, dominant negative GGTA1, dominant negative CMAH, dominant negative B4GALNT2, dominant negative CXCL10, dominant negative MICA, dominant negative MICB, dominant negative MHCIITA, dominant negative C3, or any combination thereof.

Also provided is a cell or non-human animal comprising one or more transgenes that encodes one or more nucleic acids that can suppress genetic expression, e.g., can knockdown a gene. RNAs that suppress genetic expression can comprise, but are not limited to, shRNA, siRNA, RNAi, and microRNA. For example, siRNA, RNAi, and/or microRNA can be given to a non-human animal to suppress genetic expression. Further, a non-human animal can comprise one or more transgene encoding shRNAs. shRNA can be specific to a particular gene. For example, a shRNA can be specific to any gene described in the application, including but not limited to, NLRC5, TAP1, GGTA1, B4GALNT2, CMAH, CXCL3, CXCL10, MICA, MICB, B4GALNT2, MHCIITA, C3, B2M and/or any combination thereof.

When transplanted to a subject, genetically modified cells, tissues, or organs can trigger lower immune responses (e.g., transplant rejection) in the subject compared to non-genetically-modified cells, tissues, or organs. In some cases, the immune responses can include the activation, proliferation and cytotoxicity of T cells (e.g., CD8+ T cells and/or CD4+ T cells) and NK cells. Thus, phenotypes of genetically modified cells disclosed herein can be measured by co-culturing the cells with NK cells, T cells (e.g., CD8+ T cells or CD4+ T cells), and testing the activation, proliferation and cytotoxicity of the NK cells or T cells. In some cases, the T cells or NK cells activation, proliferation and cytotoxicity induced by the genetically modified cells can be lower than that induced by non-genetically modified cells. In some cases, phenotypes of genetically modified cells herein can be measured by Enzyme-Linked ImmunoSpot (ELISPOT) assays.

When transplanted to a subject, genetically modified cells, tissues, or organs can trigger a tolerogenic immune response. For example, genetically modified cells that express all or part of a transplant recipient MHC class I or MHC class II allele as disclosed herein (e.g., a class I DRB allele) can promote a tolerogenic immune response (e.g., an immune response that comprises Treg cells, natural suppressor cells, Tr1 cells, tTreg cells, anti-inflammatory cytokines, or a combination thereof), One or more transgenes can be from different species. For example, one or more transgenes can comprise a human gene, a mouse gene, a rat gene, a pig gene, a bovine gene, a dog gene, a cat gene, a monkey gene, a chimpanzee gene, or any combination thereof. For example, a transgene can be from a human, having a human genetic sequence. One or more transgenes can comprise human genes. In some cases, one or more transgenes are not adenoviral genes.

A transgene can be inserted into a genome of a non-human animal in a random or site-specific manner. For example, a transgene can be inserted to a random locus in a genome of a non-human animal. These transgenes can be fully functional if inserted anywhere in a genome. For instance, a transgene can encode its own promoter or can be inserted into a position where it is under the control of an endogenous promoter. Alternatively, a transgene can be inserted into a gene, such as an intron of a gene or an exon of a gene, a promoter, or a non-coding region. A transgene can be integrated into a first exon of a gene.

Sometimes, more than one copy of a transgene can be inserted into more than a random locus in a genome. For example, multiple copies can be inserted into a random locus in a genome. This can lead to increased overall expression than if a transgene was randomly inserted once. Alternatively, a copy of a transgene can be inserted into a gene, and another copy of a transgene can be inserted into a different gene. A transgene can be targeted so that it could be inserted to a specific locus in a genome of a non-human animal.

Expression of a transgene can be controlled by one or more promoters. A promoter can be a ubiquitous, tissue-specific promoter or an inducible promoter. Expression of a transgene that is inserted adjacent to a promoter can be regulated. For example, if a transgene is inserted near or next to a ubiquitous promoter, the transgene can be expressed in all cells of a non-human animal. Some ubiquitous promoters can be a CAGGS promoter, an hCMV promoter, a PGK promoter, an SV40 promoter, or a Rosa26 promoter.

A promoter can be endogenous or exogenous. For example, one or more transgenes can be inserted adjacent to an endogenous or exogenous Rosa26 promoter. Further, a promoter can be specific to a non-human animal. For example, one or more transgenes can be inserted adjacent to a porcine Rosa26 promoter.

Tissue specific promoter (which can be synonymous with cell-specific promoters) can be used to control the location of expression. For example, one or more transgenes can be inserted adjacent to a tissue-specific promoter. Tissue-specific promoters can be a FABP promoter, a Lck promoter, a CamKII promoter, a CD19 promoter, a Keratin promoter, an Albumin promoter, an aP2 promoter, an insulin promoter, an MCK promoter, an MyHC promoter, a WAP promoter, or a Col2A promoter. For example, a promoter can be a pancreas-specific promoter, e.g., an insulin promoter.

Inducible promoters can be used as well. These inducible promoters can be turned on and off when desired, by adding or removing an inducing agent. It is contemplated that an inducible promoter can be a Lac, tac, trc, trp, araBAD, phoA, recA, proU, cst-1, tetA, cadA, nar, PL, cspA, T7, VHB, Mx, and/or Trex.

A non-human animal or cells as described herein can comprise a transgene encoding insulin. A transgene encoding insulin can be a human gene, a mouse gene, a rat gene, a pig gene, a cattle gene, a dog gene, a cat gene, a monkey gene, a chimpanzee gene, or any other mammalian gene. For example, a transgene encoding insulin can be a human gene. A transgene encoding insulin can also be a chimeric gene, for example, a partially human gene.

Expression of transgenes can be measured by detecting the level of transcripts of the transgenes. For example, expression of transgenes can be measured by Northern blotting, nuclease protection assays (e.g., RNase protection assays), reverse transcription PCR, quantitative PCR (e.g., real-time PCR such as real-time quantitative reverse transcription PCR), in situ hybridization (e.g., fluorescent in situ hybridization (FISH)), dot-blot analysis, differential display, Serial analysis of gene expression, subtractive hybridization, microarrays, nanostring, and/or sequencing (e.g., next-generation sequencing). In some cases, expression of transgenes can be measured by detecting proteins encoded by the genes. For example, expression of one or more genes can be measured by protein immunostaining, protein immunoprecipitation, electrophoresis (e.g., SDS-PAGE), Western blotting, bicinchoninic acid assay, spectrophotometry, mass spectrometry, enzyme assays (e.g., enzyme-linked immunosorbent assays), immunohistochemistry, flow cytometry, and/or immunocytochemistry. In some cases, expression of transgenes can be measured by microscopy. The microscopy can be optical, electron, or scanning probe microscopy. In some cases, optical microscopy comprises use of bright field, oblique illumination, cross-polarized light, dispersion staining, dark field, phase contrast, differential interference contrast, interference reflection microscopy, fluorescence (e.g., when particles, e.g., cells, are immunostained), confocal, single plane illumination microscopy, light sheet fluorescence microscopy, deconvolution, or serial time-encoded amplified microscopy.

Insertion of transgenes can be validated by genotyping. Methods for genotyping can include sequencing, restriction fragment length polymorphism identification (RFLPI), random amplified polymorphic detection (RAPD), amplified fragment length polymorphism detection (AFLPD), PCR (e.g., long range PCR, or stepwise PCR), allele specific oligonucleotide (ASO) probes, and hybridization to DNA microarrays or beads. In some cases, genotyping can be performed by sequencing. In some cases, sequencing can be high fidelity sequencing. Methods of sequencing can include Maxam-Gilbert sequencing, chain-termination methods (e.g., Sanger sequencing), shotgun sequencing, and bridge PCR. In some cases, genotyping can be performed by next-generation sequencing. Methods of next-generation sequencing can include massively parallel signature sequencing, colony sequencing, pyrosequencing (e.g., pyrosequencing developed by 454 Life Sciences), single-molecule rea-time sequencing (e.g., by Pacific Biosciences), Ion semiconductor sequencing (e.g., by Ion Torrent semiconductor sequencing), sequencing by synthesis (e.g., by Solexa sequencing by Illumina), sequencing by ligation (e.g., SOLiD sequencing by Applied Biosystems), DNA nanoball sequencing, and heliscope single molecule sequencing. In some cases, genotyping of a non-human animal herein can comprise full genome sequencing analysis.

In some cases, insertion of a transgene in an animal can be validated by sequencing (e.g., next-generation sequencing) a part of the transgene or the entire transgene. For example, insertion of a transgene adjacent to a Rosa26 promoter (e.g., in a cell and/or in a pig) can be validated by next generation sequencing of Rosa exons 1 to 4, e.g., using the forward primer 5'-cgcctagagaagaggctgtg-3' (SEQ ID NO: 45) and reverse primer 5'-ctgctgtggctgtggtgtag-3' (SEQ ID NO: 46).

EXAMPLES

These examples are provided for illustrative purposes only and not to limit the scope of the claims provided herein.

Example 1. Suppression of T Cell Activation with a Tolerizing Vaccine or Preparatory Regimen To determine whether the tolerizing vaccine or preparatory regimen from a donor can suppress the rejection of a graft by a recipient, the tolerizing vaccine or preparatory regimen (e.g., ECDI-treated apoptotic splenocytes from the xenograft or allograft donor) is administered to the recipient before and after transplant. After the transplant and administration of tolerizing vaccine or preparatory regimen, T cell activation in the recipient's PBMCs is examined.

Donor islets (e.g., wild-type allogeneic, genetically modified porcine islets and/or non-genetically modified porcine islets) are transplanted to one or more allogeneic or xenogeneic recipients, for instance diabetic mammalian subjects (e.g., human or a non-human primate). Apoptotic splenocytes prepared from the same donor as the islets are administered to the recipients at different time points, for instance: (1) 7 day before the transplant; (2) 7 day before the transplant and concomitantly with the transplant on day 0; or (3) 7 day before and 1 day after the transplant (FIG. 3). PBMCs are collected from each allogeneic or xenogeneic recipient before the transplantation, and 7, 14, 28, 49, 77, and 91 days after the transplantation. Direct and indirect T cell activation in the PBMCs are examined by ELISPOT. PBMCs from non-transplanted recipients are used as a negative control. PBMCs from recipients transplanted with non-genetically modified porcine islet are used as a positive control. T cell activation in following groups are analyzed: (1) non-transplanted recipients (no tolerizing vaccine or preparatory regimen); (2) allogeneic or xenogeneic recipients transplanted with e.g., genetically modified porcine islet+tolerizing vaccine or preparatory regimen; (3) allogeneic or xenogeneic recipients transplanted with e.g., genetically modified porcine islet+no tolerizing vaccine or preparatory regimen; (4) allogeneic or xenogeneic recipients transplanted with e.g., non-genetically modified porcine islet+ tolerizing vaccine or preparatory regimen; and (5) allogeneic or xenogeneic recipients transplanted with e.g., non-genetically modified porcine islet+no tolerizing vaccine or preparatory regimen. It is expected that administration of the tolerizing vaccine or preparatory regimen can significantly reduce T cell activation induced by the grafted allogeneic or xenogeneic porcine islet in the allogeneic or xenogeneic recipients.

Example 2. Inducing Transplant Tolerance in a Transplant Recipient

This example shows exemplary methods for tolerizing a transplant recipient for instance mammalian subjects (e.g., human or a non-human primate) with the tolerizing vaccine or preparatory regimen described herein (e.g., ECDI-fixed splenocytes, ECDI-fixed B lymphocytes, ECDI-fixed genetically modified cells). The transplant can be cells, tissues, and/or organ from human or non-human animals, including but not limited to ungulates. For example, islet cells can be extracted from cadaveric or live human donors including for instance MHC-mismatched donors, haploidentical donors, or genetically modified or genetically unmodified ungulates (e.g., pigs) and transplanted into human recipients, for instance a subject suffering from diabetes.

The cells of the tolerizing vaccine or preparatory regimen can be prepared using cells the same donor as the transplant. In some cases, the MHC-mismatched or haploidentical donor is partially MHC matched to the transplant recipient. In some cases the partially matched donor can share at least one MHC class II allele (e.g., MHC class II DR allele, MHC class II DQ allele, MHC class II DP allele) with the transplant recipient. In some cases the partially matched donor can share at least one MHC class I allele (e.g., MHC class I A allele, MHC class I B allele, MHC class I C allele) with the transplant recipient. In some cases the partially matched donor can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with the transplant recipient. In some cases, the one or more shared MHC alleles does not include MHC class I C.

The cells of the tolerizing vaccine or preparatory regimen can be prepared using cells from a different donor than the transplant donor. For example, the tolerizing vaccine or preparatory regimen can be prepared using cells from a donor of cells, and a transplant can be from a separate transplant donor. In some cases, the MHC-mismatched or haploidentical donor of cells is partially MHC matched to a transplant donor. In some cases the partially matched donor of cells can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with a transplant donor. In some cases, the one or more shared MHC alleles does not include MHC class I C. In some cases, the partially matched donor of cells can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with a transplant donor, and at least one MHC class II allele (e.g., MHC class II DR allele MHC class II DQ allele, MHC class II DP) with the transplant recipient, wherein the MHC class II allele shared with the transplant donor and transplant recipient is the same MHC class II allele. In some cases, the one or more shared MHC alleles does not include MHC class I C.

Cells (e.g., splenocytes) from a donor are fixed by ECDI and used to suppress graft rejection in the transplant recipient. The tolerizing vaccine or preparatory regimen (e.g., ECDI-treated apoptotic splenocytes from a xenograft or allograft donor) is administered to the recipient before and after transplant to determine whether the tolerizing vaccine or preparatory regimen from the xenograft or allograft donor can suppress rejection of the xenograft or allograft by the recipient. T cell activation in the recipient's PBMCs is examined after the transplant and administration of the tolerizing vaccine or preparatory regimen, as described in Example 1.

For example, human recipients in need of transplantation are treated with ECDI fixed cells (e.g., ECDI fixed splenocytes) to tolerize the recipient to transplantation. The ECDI fixed cells can be genetically modified, for example, having a disruption in one or more genes encoding GGTA1, CMAH, and B4GALNT2. For example, the cells can have disrupted GGTA1 only, or disrupted CMAH only, or disrupted B4GALNT2 only. The cells can also have disrupted GGTA1 and CMAH, disrupted GGTA1 and B4GALNT2, or disrupted CMAH and B4GALNT2. The cells can have disrupted GGTA1, CMAH, and B4GALNT2. In some cases, the cell can have an additional disruption in one or more genes encoding: NLRC5, TAP1, C3, CXCL3, CXCL10, MHCIITA, MICA, MICB, NKG2DL, TNFR, PERV, or any combination thereof. In some cases, the cells can have one or more exogenous polynucleotides encoding ICP47, CD46, CD55, CD59, HLA-G, HLA-E, B2M, PD-L1, PD-L2, Spi9, a galectin, IL-37, a CD40:CD40L blocking agent, ST6Gal1, FasL, any functional fragment thereof, or any combination thereof. In some cases, the cells can be coated with CD47 on its surface.

The ECDI fixed cells can be given to the recipient about 7 days before transplantation, concomitantly with the transplantation on day 0, and/or again at about 1 day after transplantation (FIG. 3 and FIG. 4). A dose of a CD40/CD40L pathway blocking agent (e.g., antagonistic anti-CD40 antibody, antagonistic anti-CD154 (CD40L) antibody, antagonistic anti-CD40 mAb antibody, Fc-engineered antagonistic anti-CD40L antibodies, antagonistic anti-gp39 antibody, 2C10, 2C10R4, ASKP1240, 4D11, bleselumab, BI-655064, HCD122, CFZ533, ch5D12, FFP104, CDP7657, BG9588, ruplizumab, toralizumab, IDEC-131, dapirolizumab, letolizumab, BMS-986004, VIB4920, or MED14920), rapamycin, compstatin, α-IL-6R, sTNFR, or any combination thereof can also be given to the recipient about 8 days before transplantation and 7 and 14 days after transplantation (FIG. 4). The dose of the CD40/CD40L pathway blocking agent can be at least about 30 mg antagonistic anti-CD40 antibody per kg recipient body weight. In some cases, the dose of the CD40/CD40L pathway blocking agent can be about 5-10 mg/kg.

Optionally, a B-cell targeting agent, (e.g., a B-cell depleting biologic, for example, a biologic targeting CD20, CD19, or CD22, and/or B cell modulating biologic, for example, a biologic targeting BAFF, BAFF/APRIL, CD40, IgG4, ICOS, IL-21, B7RP1) or any combination thereof can also be given to the recipient about 8 days before transplantation and 7 and 14 days after transplantation. A B-cell targeting biologic can be Rituximab, or anti-CD20 antibody.

Example 3. Treating Diabetes by Transplanting Islets and with Tolerizing Vaccines (or Preparatory Regimen) from the Same Donor in Human or Non-Human Primates without Maintenance of Immunosuppression This example examines the immunosuppression effect of ECDI-fixed donor cells in vivo. ECDI-fixed splenocytes from a xenogeneic or allogeneic source are administered to a human or a non-human primate transplanted with islets, thereby minimizing the possibility of graft rejection in the human or non-human primate.

In an illustrative example, a diabetic mammalian subject, for instance a human or non-human primate, is transplanted with an allograft or xenograft of islets, for instance porcine islets. The human or non-human primate is given ECDI-fixed donor splenocytes by intravenous infusion 7 days before and optionally 1 day after the transplantation. Immunosuppression drugs are given from the day of transplantation through day 21 after the transplantation (FIG. 3). The ECDI-treated splenocytes are expected to promote tolerance to the transplant, reducing the risk of transplant rejection and allowing the islets to remain functional despite withdrawal of immunosuppression. Small doses of exogenous insulin can be administered through day 21 after transplantation. The exogenous insulin needed to maintain normal blood glucose level can be reduced on the day of transplantation and can be completely stopped on day 21.

The blood glucose and C-peptide levels are measured and compared with controls. For example, for treatment of non-human primates, a streptozotocin-induced diabetes model can be used with the groups outlined in Table 1.

TABLE 1 example treatment groups for testing the efficacy of islet transplant with a tolerizing preparatory regimen a non-human primate streptozotocin-induced model of diabetes.

| Group # | Streptozotocin | Regimen | Islet transplant |
| --- | --- | --- | --- |
| 1 | + | + | + |
| 2 | + | + | − |
| 3 | + | − | + |
| 4 | + | − | − |
| 5 | − | − | − |

+ denotes that a treatment is administered, − denotes that the treatment is not administered.

For group 1, blood glucose levels are expected to become normal immediately after transplantation and continue to be normal despite discontinuation of insulin on day 21. The blood glucose level for group 1 is expected to remain normal without exogenous insulin past day 100 after transplantation. The blood C-peptide levels including the peak value after transplantation, the random level, and the level under fasting and glucose-stimulation conditions can be tested, and are expected to increase after transplantation and remain above baseline in the long term for group 1, indicating that the transplanted islets are functioning.

The glucose metabolism of the human or non-human primate can be examined by, for example, an intravenous glucose tolerance test (IVGTT), a mixed meal tolerance test (MMTT), or any other metabolic test established for monitoring pancreatic islet beta cell function. In IVGTT, exogenous glucose is injected to the human or non-human primate, and the blood glucose level is measured over time after the injection. IVGTT can be performed on the human or non-human primate on day 28 and day 90 after transplantation. Subjects in group 1 are expected to more rapidly reduce blood glucose levels after injection, and exhibit reduced area under the glucose concentration curve.

Example 4. Suppression of Circulating Immune Cell Levels with Tolerizing Vaccines (or Preparatory Regimens) and Anti-CD40/CD40L Agent This example examines the effect of tolerizing vaccines or preparatory regimens (e.g., ECDI-fixed cells) and anti-CD40/CD40L agents (e.g., antagonistic α-CD40 antibodies) on the level of circulating immune cells after xenotransplantation or allotransplantation. The levels of circulating immune cells can be an indicator of transplant rejection. ECDI-fixed cells and antagonistic α-CD40 antibodies can modulate the levels of circulating immune cells in recipients after xenotransplantation or allotransplantation. The circulating immune cells are tested for $CD8^+$ $CD2^{hi}$ $CD28^-$ effector memory T cells, $CD4^+$ $CD25^{hi}$ $Foxp3^+$ $CD127^{low}$ regulatory T cells, and $CD8^+$ $CD122^+$ natural suppressor cells. ECDI-fixed cells and α-CD40 antibodies are expected to inhibit the post-transplant expansion of $CD8^+$ $CD2^{hi}$ $CD28^-$ effector memory cells, increase the percentage and/or absolute numbers of $CD4^+$ $CD25^{hi}$ $Foxp3^+$ $CD127^{low}$ regulatory T cells, increase the percentage and/or absolute numbers of $CD8^+$ $CD122^+$ natural suppressor cells, or a combination thereof.

$CD8^+$ $CD2^{hi}$ $CD28^-$ Effector Memory T Cells

Human or non-human primates are transplanted with xenogeneic or allogeneic islets, and the level of circulating $CD8^+$ $CD2^{hi}$ $CD28^-$ effector memory T cells is determined by flow cytometry. If no tolerizing vaccine is given, the level of circulating $CD8^+$ $CD2^{hi}$ $CD28^-$ effector memory T cells in the human or non-human primate undergoing transplantation is expected to increase compared with baseline control (no transplant). The $CD8^+$ $CD2^{hi}$ $CD28^-$ effector memory T cells should have high prevalence within the $CD8^+$ T cell compartment in liver mononuclear cells at the time of sacrifice.

Two groups of humans or non-human primates are transplanted with xenogeneic or allogeneic islets. The first group is a control group and is not given a tolerizing vaccine. The second group receives peritransplant infusion of a tolerizing vaccine (e.g., ECDI-fixed splenocytes) and anti-CD40/CD40L agent. Circulating $CD8^+$ $CD2^{hi}$ $CD28^-$ effector memory T cells in both groups are measured by flow cytometry.

The peritransplant infusion of a tolerizing vaccine reduces the post-transplant expansion of circulating $CD8^+$ $CD2^{hi}$ $CD28^-$ effector memory T cells compared with the control group (not given a tolerizing vaccine). In some cases, the level of suppression of post-transplant expansion of $CD8^+$ effector memory T cells is comparable with that observed from prolonged administration of immunosuppressive agents, anti-CD40 antibodies, and/or rapamycin after islet transplantation.

$CD4^+CD25^{hi}$ $Foxp3^+$ $CD127^{low}$ Regulatory T Cells

The effects of tolerizing vaccines (e.g., ECDI-fixed splenocytes) and antagonistic α-CD40 antibodies on the level of circulating $CD4^+$ $CD25^{hi}$ $Foxp3^+$ $CD127^{low}$ regulatory T cells after xenotransplantation or allotransplantation are examined. A low level of circulating CD4+ CD25$^{hi}$ Foxp3+ CD127$^{low}$ regulatory T cells can be an indicator of transplant rejection.

Two groups of humans or non-human primates are transplanted with xenogeneic or allogeneic islets. The first group is a control group and is not given a tolerizing vaccine. The second group receives peritransplant infusion of a tolerizing vaccine (e.g., ECDI-fixed splenocytes) and anti-CD40/CD40L agent. Circulating CD4+CD25$^{hi}$ Foxp3+ CD127$^{low}$ regulatory T cells are measured by flow cytometry on the day of transplantation, day 7, day 50, and day 100 after transplantation. The level of circulating CD4+CD25$^{hi}$ Foxp3+ CD127$^{low}$ regulatory T cells from a naïve mammalian subject such as a human or non-human primate is used as an additional control.

Flow cytometry results are expected to show that the peritransplant infusion of a tolerizing vaccine (e.g., ECDI-fixed splenocytes) and anti-CD40/CD40L agent promotes an increase in circulating CD4+ CD25$^{hi}$ Foxp3+ CD127$^{low}$ regulatory T cells compared with control recipients that did not receive the tolerizing vaccine and anti-CD40/CD40L agent. The post-transplant increase in these regulatory T cells in humans or non-human primates that were given tolerizing vaccines is in some cases expected to be comparable with the increases observed for subjects that receive maintenance immunosuppression with anti-CD40 antibodies and rapamycin after islet transplantation.

CD8+ CD122+ Natural Suppressor Cells

The effects of tolerizing vaccines (e.g., ECDI-fixed splenocytes) and antagonistic α-CD40 antibodies on the level of circulating CD8+ CD122+ natural suppressor cells after xenotransplantation or allotransplantation are examined. A low level of circulating CD8+ CD122+ natural suppressor cells can be an indicator of transplant rejection.

Two groups of humans or non-human primates are transplanted with xenogeneic or allogeneic islets. The first group is a control group and is not given a tolerizing vaccine. The second group receives peritransplant infusion of a tolerizing vaccine (e.g., ECDI-fixed splenocytes) and anti-CD40/CD40L agent. Circulating CD8+ CD122+ natural suppressor cells are measured by flow cytometry on the day of xenotransplantation or allotransplantation, and on day 7, day 50, and day 100 after xenotransplantation or allotransplantation. The level of circulating CD8+ CD122+ natural suppressor cells from naïve human or non-human primate is used as an additional control.

Flow cytometry results are expected to show that the peritransplant infusion of the tolerizing vaccine and anti-CD40/CD40L agent promotes an increase in circulating CD8+CD122+ natural suppressor cells compared with control recipients that do not receive tolerizing vaccination and anti-CD40/CD40L agent. The post-transplant increase of these natural suppressor cells in the tolerizing vaccine recipients is in some cases comparable with the increase observed in recipients that receive maintenance immunosuppression with anti-CD40 antibodies and rapamycin after islet transplantation.

Example 5. Prolonging Islet Xenograft and/or Allograft Survival in Mammalian Subjects Such as Humans and Non-Human Primates with Tolerizing Vaccines and Additional Immunosuppressive Agents This example shows exemplary methods for suppressing immuno-rejection using ECDI-fixed donor cells (tolerizing vaccines) in combination with other immunosuppression drugs (FIG. 4). The tolerogenic efficacy of a novel preparatory regimen is studied in the setting of intraportal transplantation of islets in mammalian subjects such as humans or non-human primates (for instance, xenotransplant or allotransplant islets, porcine islets or stem cell derived islets). The regimen includes peritransplant administration of: (1) antigen, delivered on ECDI-fixed cells (tolerizing vaccine); (2) rapamycin, soluble TNF receptor (sTNFR), and antagonistic anti-IL-6R antibody, with or without rituximab; and (3) antagonistic anti-CD40 Ab 2C10 or 2C10R4.

ECDI-fixed donor splenocytes are prepared from cytokine-mobilized splenic B cells from e.g., cloned porcine donors. Donor spleen is freshly obtained from e.g., cloned porcine donors using splenectomy. Donor spleen B cells are expanded ex vivo. About 0.25×10$^9$/kg ECDI-fixed donor splenocytes are administered intravenously to the recipients (e.g., human or non-human primate) 7 days prior to transplant. Donor spleen B cells are also administered to recipients 1 day after transplant.

Recipients are administered rapamycin (e.g., orally) on day −7 through day +21 relative to transplant, with a target trough level of 5 to 12 ng/ml. Soluble TNF receptor (sTNFR) is subcutaneously administered on day −6 through day +21 (e.g., at a dose of 0.5-1 mg/kg). Antagonistic anti-IL-6R antibody is administered intravenously on day −7, 0, 7, 14 and 21 (e.g., at a dose of 10 mg/kg).

For some recipients, B cell depletion is initiated with rituximab 10 days prior to islet transplantation (xenogeneic or allogeneic), which is also prior to the first infusion of ECDI-fixed donor cells. Four doses of 20 mg/kg rituximab are administered to the recipients intravenously on day −10, −3, +5, and +12 relative to transplant.

For some recipients, three doses of 50 mg/kg antagonistic anti-CD40 Ab 2C10 or 2C10R4 are administered intravenously on day −1, +7, and +14. For other recipients, four doses of 50 mg/kg anti-CD40 Ab 2C10 or 2C10R4 are administered intravenously on day −8, −1, +7, and +14.

In some cases, adult pig islet products from cloned porcine donors can be used for the transplant. For example, pig islet products can be cultured for 7 days, and upon meeting all release criteria, can be infused intraportally via a portal venous vascular access port at a dose of 25,000 islet equivalents per kilogram of the recipient's body weight.

The recipients (e.g., human or non-human primate) are tested to determine the efficacy of using pharmaceutically active agents together with ECDI-fixed donor cells in a xenotransplant or allotransplant setting. For example, T cell activation and the levels of circulating T regulatory cells, effector memory T cells, and natural suppressor T cells can be monitored over time. The peritransplant regimen of ECDI-treated splenocytes, rapamycin, sTNFR, antagonistic anti-IL-6R antibody, and antagonistic anti-CD40 Ab (with or without rituximab) is expected to prolong graft survival, limit activation and expansion of effector memory T cells, and promote activation and expansion of T regulatory and natural suppressor T cells relative to subjects who do not receive the ECDI-treated splenocytes.

Example 6. Clinical Translation of Tolerance Induction to Kidney and Islet Allograft Cadaveric Graft Donor Cadaveric (e.g., deceased) donor allotransplantation (e.g., kidney or islet allograft) presents additional challenges for tolerance induction using the tolerizing vaccines and protocols of the disclosure. Some of the protocols disclosed herein involve the peri-transplant infusion of apoptotic donor leukocytes both on days −7 and +1 relative to transplantation on day 0, and these protocols have proven to be effective in small and large non-human animal experimental models. However, direct translation of this protocol for deceased donor allotransplantation is challenging because (1) the identity and availability of the prospective donor may not be not known until the time of the donor's death; and (2) some type of grafts (e.g., kidney or pancreas) cannot be stored extracorporeally for 7 days after retrieval from the donor (e.g., deceased donor). FIG. 2 is a schematic process overview of how these limitations can be overcome.

If a prospective cadaveric donor is identified in advance (e.g., a brain dead, heart beating donor (BDD)), a tolerance induction protocol using a tolerizing vaccine as described herein can be translated to the clinical setting by identifying a second suitable donor as a source of tolerance-inducing leukocytes prior to cadaveric donor allotransplantation (e.g., of kidney). Leukocytes from the second donor can be used for inducing donor-specific tolerance for the prospective allograft. For example, B lymphocytes can be taken from a second living donor in one or more blood draws and/or apheresis procedures and expanded ex vivo, or splenocytes can be obtained from a second cadaveric donor, and optionally expanded ex vivo. The second donor can be fully MHC-matched or partially MHC-matched with the first (prospective allotransplantation) donor. In some cases, a partially matched donor of tolerogenic cells used in preparation of a tolerizing vaccine or preparatory regimen is haploidentical to the transplant donor. In some cases, the partially matched donor of tolerogenic cells used in preparation of a tolerizing vaccine or preparatory regimen shares one or more MHC alleles with the transplant donor. For example, the partially matched donor of tolerogenic cells can share one or more of a MHC class I A allele, a MHC class I B allele, a MHC class I C allele, a MHC class II DR allele, a MHC class II DQ allele, a MHC class II DP allele, or a combination thereof with a transplant donor. The partially matched donor of tolerogenic cells used in preparation of a tolerizing vaccine or preparatory regimen can share one DR allele with the transplant donor. In some cases, the partially matched donor of cells can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with a transplant donor. In some cases, the partially matched donor of cells can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with a transplant donor, and at least one MHC class II allele (e.g., MHC class II DR allele, MHC class II DQ allele, MHC class II DP allele) with the transplant recipient. In some cases, the MHC class II allele is shared between the donor of tolerogenic cells, the transplant donor, and the recipient. In some cases, the one or more shared MHC alleles does not include MHC class I C.

For a living second donor, ex vivo expansion of donor B lymphocytes (expressing both MHC class I and II antigens) obtained via repeated blood draws or via a single or few apheresis procedures can provide sufficient donor leukocytes for induction of tolerance to the cadaveric donor (e.g., kidney allografts). A protocol enabling massive expansion of human B lymphocytes ex vivo is reported in Su K Y et al. (J Immunol Nov. 15, 2016, 197 (10) 4163-4176).

Upon availability of a matched, partially-matched, or haploidentical spleen from a cadaveric second donor, the protocol can be initiated with the infusion of tolerance-inducing splenocytes on day −7, followed by the transplant (e.g., kidney transplant) on day 0, and the infusion of ex vivo expanded splenic B cells on day +1 (FIG. 2 and FIG. 3). A large proportion of splenocytes are B lymphocytes which express both MHC class I and MHC class II, thus ECDI-fixed donor splenocytes can be used successfully for the purpose of tolerance induction to allografts (e.g., kidney, islet, heart). Tolerance induction enabled by the peritransplant infusion of splenocytes and expanded splenic B cells prepared from cadaveric donors who share one MHC class I allele and one MHC class II allele with the living donor depends on linked suppression. The phenomena of linked suppression and infectious tolerance have been described in the experimental transplant tolerance literature (reviewed by Waldmann H in Nature Immunology 2008).

Figure 5:
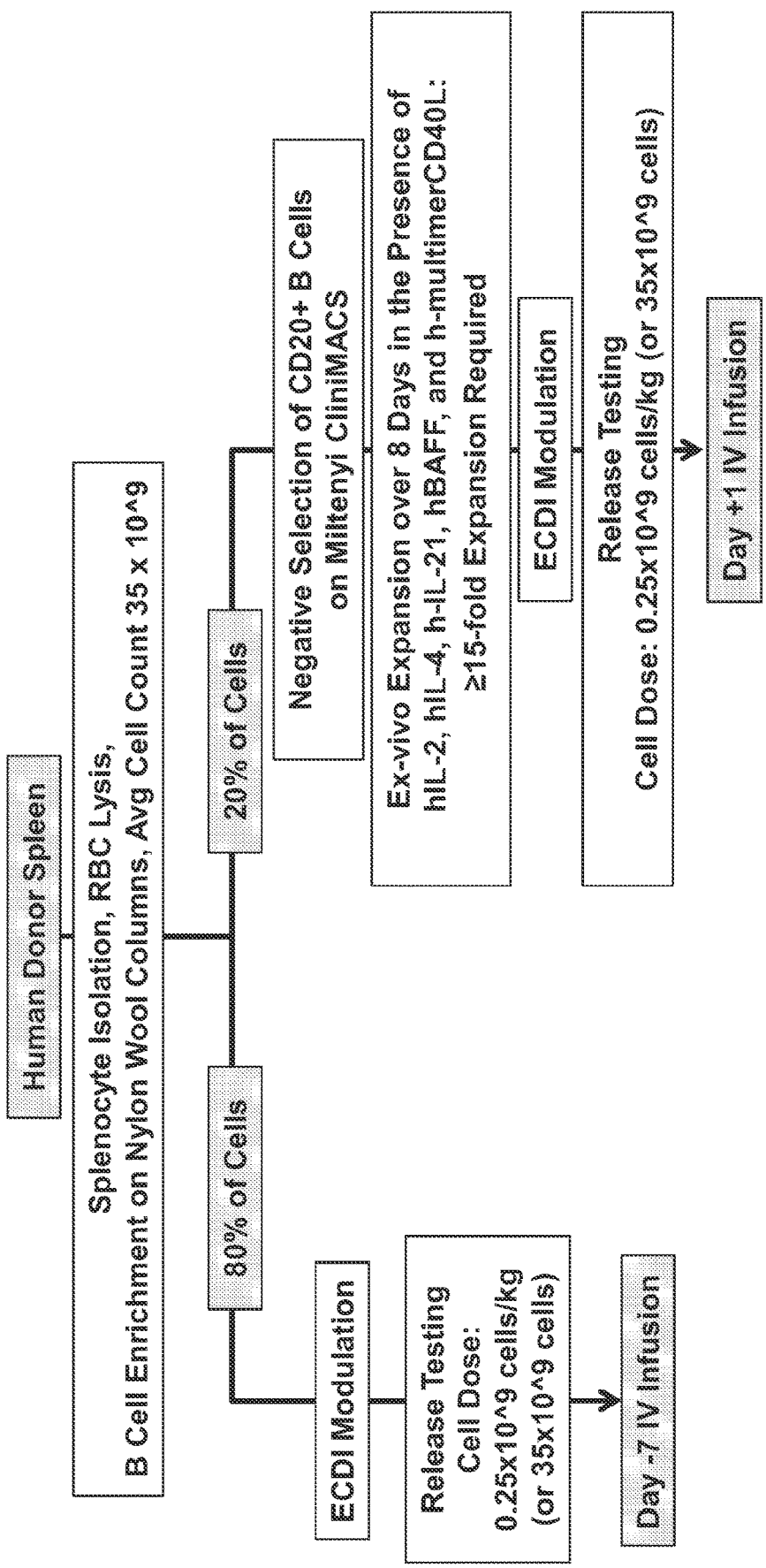
FIG. 5 illustrates an exemplary protocol for expansion of leukocytes for preparation of apoptotic donor leukocytes (ADLs) for use in preparatory or tolerizing regimen such as splenic B cells from cadaveric human donors. Splenocytes are isolated and subjected to RBC lysis and B cell enrichment on nylon wool columns. A first fraction of the isolated splenocytes (e.g., about 80%) can be used to generate a dose of apoptotic donor leukocytes (ADLs) for infusion at a first time point (e.g., day −7) relative to transplant. The splenocytes can be ECDI-treated as disclosed herein, subjected to release testing, and infused into the recipient. A second fraction of the isolated splenocytes (e.g., about 20%) can be set aside and used to generate a second dose of ADLs for infusion on day +1. The second fraction can undergo selection to enrich for B cells (e.g., positive or negative selection using Miltenyi CliniMACS), and can be ex vivo expanded (e.g., over 8 days in the presence of hIL-2, hIL-4, h-IL-21, hBAFF, and h-multimerCD40L). The enriched B cells can undergo at least 15 fold expansion prior to ECDI treatment, release testing, and infusion into the transplant recipient (e.g., on day 1).

For islet transplant recipients, the day −7 tolerizing vaccine can be prepared from the cadaveric donor spleen and infused the same day into the prospective islet transplant recipient. This is possible in the context of islet transplantation because isolated islets can be kept in culture for 7 days prior to transplant. The day +1 tolerizing vaccine can be based on ex vivo expanded B cells that are derived from an aliquot of the cadaveric donor spleen (e.g., as shown in FIG. 5). Clinical translation of tolerizing vaccination for use in islet transplantation can thus closely follow an approach that can be explored in preclinical studies of islet or kidney allografts in nonhuman primates.

Living Graft Donor

The tolerance induction protocol using a tolerizing vaccine as described herein can be translated to the clinical setting of living donor allotransplantation (e.g., kidney or islet) by identifying a clinically appropriate source of donor leukocytes. Alternatively or additionally, a suitable source of surrogate leukocytes can be identified and used for inducing donor-specific tolerance for the prospective allograft. Retrieving a living donor's spleen as a source of donor leukocytes may compromise the donor's ability to thwart infection, therefore alternative sources of donor leukocytes may be preferred. For example, B lymphocytes can be taken from the donor in one or more blood draws and/or apheresis procedures and expanded ex vivo, or a separate cell donor can be identified that is a suitable match or partial match to the transplant donor.

Separate donors can be used for the tolerogenic leukocytes and the allograft. For example, splenocytes from a cadaveric donor who is fully matched or partially matched with the prospective living transplant donor are a clinically viable source of tolerogenic leukocytes. In some cases, the partially matched donor of tolerogenic cells used in preparation of a tolerizing vaccine or preparatory regimen is haploidentical to the transplant donor. In some cases, the partially matched donor of tolerogenic cells used in preparation of a tolerizing vaccine or preparatory regimen shares one or more MHC alleles with the transplant donor. For example, the partially matched donor can share one or more of a MHC class I A allele, a MHC class I B allele, a MHC class I C allele, a MHC class II DR allele, a MHC class II DQ allele, a MHC class II DP allele, or a combination thereof with a transplant donor. The partially matched donor of tolerogenic cells used in preparation of a tolerizing vaccine or preparatory regimen can share one DR allele with the transplant donor. In some cases, the partially matched donor of cells can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with a transplant donor. In some cases, the partially matched donor of cells can share at least one MHC class I allele (e.g., MHC class I A allele, MHC class I B allele, MHC class I C allele) and at least one MHC class II allele (e.g., MHC class II DR allele, MHC class II DQ allele, MHC class II DP allele) with a transplant donor, and at least one MHC class II allele (e.g., MHC class II DR allele, MHC class II DQ allele, MHC class II DP allele) with the transplant recipient, wherein the MHC class II allele is shared between the donor of tolerogenic cells, the transplant donor, and the recipient. In some cases, the one or more shared MHC alleles does not include MHC class I C.

For a transplant from a living donor, ex vivo expansion of donor B lymphocytes (expressing both MHC class I and II antigens) obtained via repeated blood draws or via a single or few apheresis procedures can provide sufficient donor leukocytes for induction of tolerance to same-donor allografts (e.g., kidney allografts). A protocol enabling massive expansion of human B lymphocytes ex vivo is reported in Su K Y et al. (J Immunol Nov. 15, 2016, 197 (10) 4163-4176).

Upon availability of a matched, partially-matched, or haploidentical spleen from a cadaveric donor, the protocol can be initiated with the infusion of tolerance-inducing splenocytes on day −7, followed by the living donor transplant (e.g., kidney transplant) on day 0, and the infusion of ex vivo expanded splenic B cells on day +1 (FIG. 2 and FIG. 3). Tolerance induction enabled by the peritransplant infusion of splenocytes and expanded splenic B cells prepared from cadaveric donors who share one MHC class I allele and one MHC class II allele with the living donor depends on linked suppression. The phenomena of linked suppression and infectious tolerance have been described in the experimental transplant tolerance literature (reviewed by Waldmann H in Nature Immunology 2008).

Example 7. Preventing Rejection or Extending Survival of Islet Allografts or Xenografts in Human Recipients in the Clinical Setting in the Absence of Chronic and Generalized Immunosuppression This example shows an exemplary approach to preventing rejection and/or extending survival of xenografts (cell, tissue, or organ xenografts, e.g., islets) in human recipients in the clinical setting in the absence of chronic and generalized immunosuppression of the xenograft recipient. This approach includes and integrates three components: (1) islets; optionally genetically engineered islets that have deficient and/or reduced expression of αGal, MHC class I, complement C3, and CXCL10, and/or that transgenically express HLA-G and/or HLA-E; (2) genetically engineered tolerizing vaccines (e.g., donor apoptotic and non-apoptotic mononuclear cells such as splenocytes) that have deficient/reduced expression of αGal, Neu5Gc, and Sda/CAD, and/or that transgenically express HLA-G and/or HLA-E with or without human CD47, human PD-L1, human PD-L2 (the genetically engineered vaccine); and (3) the administration of transient immunosuppression including any combination of antagonistic anti-CD40 mAb, Fc-engineered antagonistic anti-CD40L antibodies, antagonistic anti-gp39 mAb, B-cell targeting agent (e.g., B cell depleting biologic, for example, a biologic targeting CD20, CD19, or CD22, and/or B cell modulating biologic, for example, a biologic targeting BAFF, BAFF/APRIL, CD40, IgG4, ICOS, IL-21, B7RP1), rapamycin, and transient anti-inflammatory therapy (for example, any combination of antagonistic anti-IL-6 receptor mAb, soluble TNF receptor, NFκB inhibitor (e.g., dehydroxymethylepoxyquinomicin (DHMEQ)) and/or alpha 1 anti-trypsin). (FIG. 4). Non-limiting examples of B-cell targeting biologics include Rituximab and other anti-CD20 antibodies.

Tolerizing vaccine donors comprising disrupted GGTA1, CMAH, and B4GALNT2 and transgenes expressing HLA-G (or HLA-E and/or B2M), human CD47, human PD-L1 and human PD-L2 are generated. These vaccine donors can provide mononuclear cells (e.g., splenocytes) with αGal-, Neu5Gc-, Sda/CAD-deficiencies and expression of HLA-G and/or HLA-E, human CD47, human PD-L1, and human PD-L2. Some of the mononuclear cells (e.g., splenocytes) can be made apoptotic by ECDI fixation. Apoptotic and non-apoptotic mononuclear cells (e.g., splenocytes) can be mixed to make tolerizing vaccines. The graft donors can be made by further disrupting NLRC5 (or TAP1), C3, and CXCL10 genes in the vaccine donors. The graft donors can provide cells, tissues or organs (e.g., islets) for transplant to a human recipient. The populations of vaccine donors and graft donors can be expanded by cloning, e.g., using somatic nuclear transfer.

A graft from a graft donor (e.g., a human or a pig) is transplanted to a recipient. Tolerizing vaccines comprising cells provided by vaccine donors (e.g., vaccine donor pig(s)) are administered to the recipient 7 days before and 1 day after transplant. In some cases, the vaccine donor and graft donor are the same. In some cases, the graft donor and vaccine donor are genetically identical. In some cases, the vaccine donor and/or graft donor is cadaveric. In some cases, the vaccine donor and graft donor are different. In some cases, the graft donor and vaccine donor are not genetically identical. In some cases, the vaccine donor and/or graft donor is not cadaveric. Immunosuppression agents are administered from a time point before transplant through day 21 after transplant. Immunosuppression agents can include any combination of antagonistic α-CD40 antibodies, antagonistic anti-CD40 mAb antibody, Fc-engineered antagonistic anti-CD40L antibodies, B-cell targeting agent (e.g., B cell depleting biologics, for example, a biologic targeting CD20, CD19, or CD22, and/or B cell modulating biologics, for example, a biologic targeting BAFF, BAFF/APRIL, CD40, IgG4, ICOS, IL-21, B7RP1), Rapamycin, and/or anti-inflammatory agents such as compstatin, α-IL-6R antibodies, sTNFR, and NFκB inhibitor (e.g., dehydroxymethylepoxyquinomicin (DHMEQ)). Non-limiting examples of B-cell targeting agents include Rituximab and other anti-CD20 antibodies. This approach can prevent rejection and/or extend survival of xenografts (e.g., porcine islets) in a human recipient in the absence of chronic and generalized immunosuppression of the recipient.

Example 8. Ex Vivo Expansion of Human and/or Porcine ADL Products for Clinical Trials The target dose of apoptotic donor leukocytes (ADLs) to be infused on days −7 and +1 relative to kidney and/or islet transplantation on day 0 in nonhuman primates and in humans can be approximately equivalent to the number of splenocytes present in a spleen of the recipient species, or about 80% thereof. For example, the target dose of apoptotic donor leukocytes to be infused on days −7 and +1 relative to kidney and/or islet transplantation on day 0 in a human recipient can be approximately the number of splenocytes available from one human spleen, or 80% thereof. In another example, the target dose can be about $1 \times 10^8$ for a mouse, as suggested by studies in murine models. In another example, the target dose can be about $0.25 \times 10^9$/kg or higher, as suggested by studies in non-human primate allotransplantation models. A substantial ex vivo expansion can be required to provide this many cells.

Ex Vivo Expansion from Spleen

Apoptotic donor leukocytes can be generated from splenocytes (e.g., from a cadaveric donor spleen). An exemplary protocol is illustrated in FIG. 5. Splenocytes are isolated and subjected to RBC lysis and B cell enrichment on nylon wool columns.

A first fraction of the isolated splenocytes (e.g., about 80%) can be used to generate a dose of apoptotic donor leukocytes (ADLs) for infusion at a first time point (e.g., day −7) relative to transplant. The splenocytes can be ECDI-treated as disclosed herein, subjected to release testing, and infused into the recipient.

A second fraction of the isolated splenocytes (e.g., about 20%) can be set aside and used to generate a second dose of ADLs for infusion on day +1. The second fraction can undergo selection to enrich for B cells (e.g., positive or negative selection using Miltenyi CliniMACS), and can be ex vivo expanded (e.g., over 8 days in the presence of hIL-2, hIL-4, h-IL-21, hBAFF, and h-multimerCD40L). The enriched B cells can undergo at least 15 fold expansion prior to ECDI treatment, release testing, and infusion into the transplant recipient (e.g., on day 1).

Ex Vivo Expansion from Peripheral Blood

Assuming that approximately 200 $CD19^+$ B cells are present per μL of peripheral blood in human individuals (e.g., living kidney donors) aged 25-50 years, corresponding to $1 \times 10^8$ B cells per 500 mL blood, and that B cells are lost in the initial enrichment process and during ECDI-fixation (up to 50%), a ≥200 fold ex vivo expansion (e.g., 400-fold) may be needed to provide sufficient numbers of cells for tolerance induction in a recipient. For example, for a recipient weighing 80 kg, about $4 \times 10^{10}$ B cells may be required to provide $2 \times 10^{10}$ B cells after ECDI-fixation, both for day −7 and day +1 ADL infusions.

Figure 7:
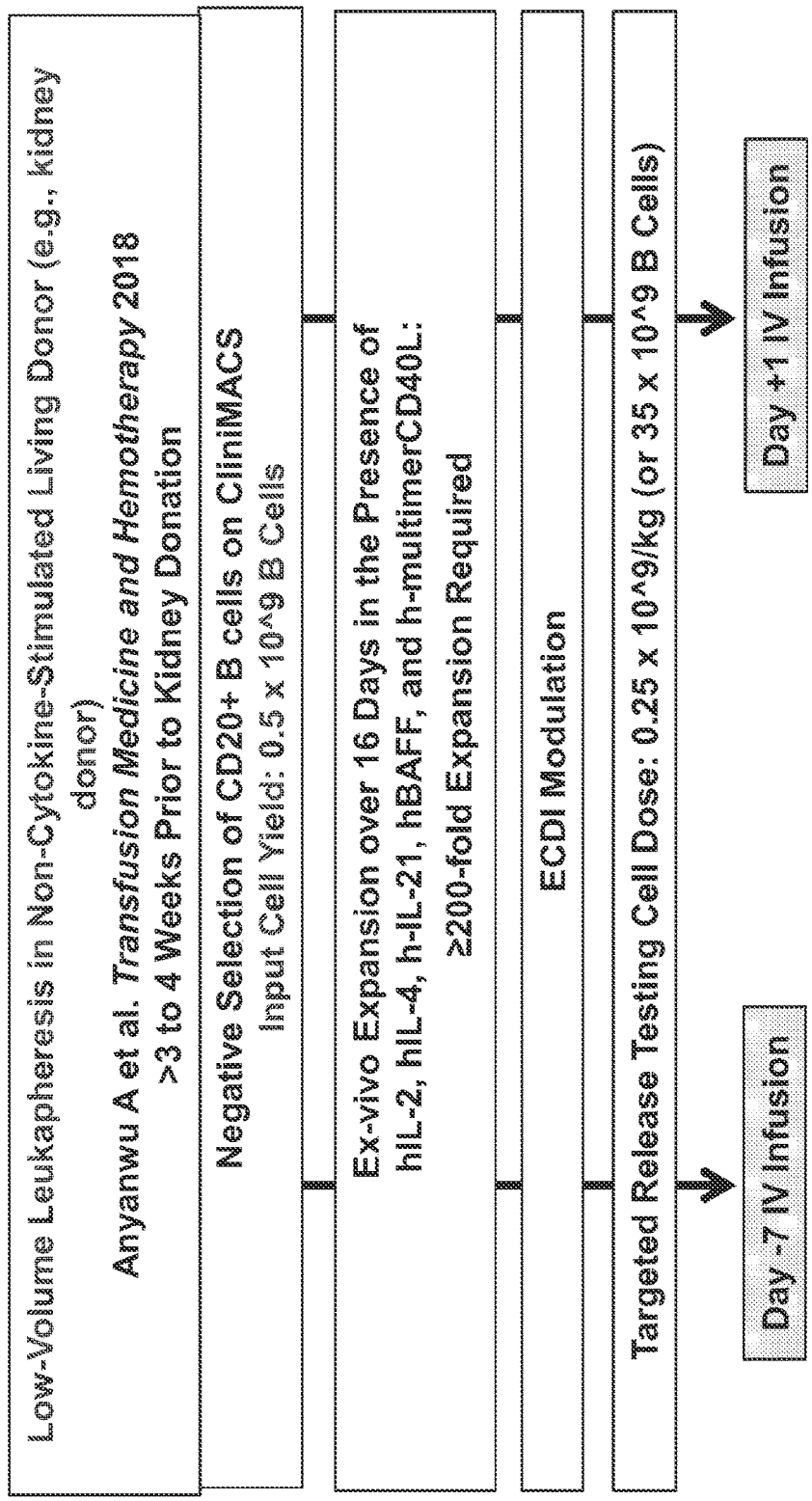
FIG. 7 illustrates an exemplary protocol for generating patient doses of tolerizing apoptotic donor B cells obtained from peripheral blood of the donor and expanded ex vivo for infusions on days −7 and +1 relative to transplant. The protocol can be initiated at least about 3-4 weeks prior to transplant. One or more low volume leukapheresis procedures are conducted for a non-cytokine-stimulated living donor (e.g., kidney donor). B cells are enriched (e.g., via positive or negative selection using CliniMACS), to provide an input cell yield of approximately $0.5 \times 10^9$ B Cells. The enriched B cells are ex vivo expanded at least 200 fold to provide a target cell dose (e.g., expanded over about 16 Days, in the Presence of hIL-2, hIL-4, h-IL-21, hBAFF, and h-multimerCD40L). After expansion, the B cells are ECDI treated as disclosed herein, subjected to release testing, and infused into the recipient (e.g., on day −7 and day +1 relative to transplant).

An exemplary protocol is illustrated in FIG. 7. The protocol can be initiated at least about 3-4 weeks prior to transplant. One or more low volume leukapheresis procedures are conducted for a non-cytokine-stimulated living donor (e.g., kidney donor). B cells are enriched via positive or negative selection using CliniMACS, to provide an input cell yield of approximately $0.5 \times 10^9$ B Cells. The enriched B cells ex vivo are expanded at least 200 fold to provide a target cell dose (e.g., over about 16 Days, in the Presence of hIL-2, hIL-4, h-IL-21, hBAFF, and h-multimerCD40L). After expansion, the B cells are ECDI treated as disclosed herein, subjected to release testing, and infused into the recipient (e.g., on day −7 and day +1 relative to transplant).

Expansion protocols can also comprise enriching circulating B cells from peripheral blood via magnetic sorting using CD20 beads, expanding ex vivo in a GREX100M flask in the presence of rhIL-10, rIL-4, rhBAFF, rhTLR9a, rhCD40L-multimeric, and rhAPRIL. Expanded cells can be stimulated with rhIL-21 for 24 hours prior to harvest.

Establishing Standard Operating Procedures for Cell Expansion

An exemplary standard-of-care standard operating procedure (SOP) can be established as follows.

Mononuclear cells are isolated from blood samples on Ficoll-Paque PLUS density gradients, cryopreserved/thawed, or used freshly, and human mature naïve B ($CD19^+$ $CD27^-$ $IgM^+IgD^+$) cells are enriched by negative selection with the EasySep Human Naïve B Cell Enrichment Kit. B cells are cultured at varying densities in RPMI 1640 medium containing 5% human AB serum (R5 medium) supplemented with rh IL-2 (50 ng/ml), IL-4 (10 ng/ml), IL-21 (10 ng/ml), and BAFF (10 ng/ml) for between 8 and 16 days. Culture plates or dishes are either pre-seeded overnight with CD154-expressing cells (e.g., a $CD40^{low}$ stromal cell line) or cultured in the presence of CD40L-multimer (500 ng/ml). On days 4 and 6 (and on days 12 and 14 if cells are split and cultured for 16 days), 50% of the medium is replaced with fresh, pre-warmed R5 medium containing cytokines. At the end of the ex vivo expansion period, cells are harvested, counted, aliquoted, and cryopreserved in liquid nitrogen until use. Using these conditions, low input cell numbers ($1-10 \times 10^3$ per condition or fewer) and densities (100 B cells/cm$^2$), and either six-well plates or 10-cm tissue culture dishes, the fold-expansion and viability over 8 and 16 days are compared for peripheral blood-derived B cells from healthy human volunteers, non-human primates, and neonatal porcine donors (n=3 each), and spleen-derived B cells from deceased human donors and neonatal porcine donors (n=3 each).

Using Design of Experiments (DOE) statistical methods, the following parameters are evaluated: (1) three input cell densities; (2) three different culture vessels (culture dishes, T-flasks, and GREX100M flasks); (3) CD40L-multimer (absent, low, medium, and high concentrations) and $CD40^{low}$ stromal cell; (4) IL-2 vs IL-10 (each absent or at low, medium, or high concentrations); (5) IL-4 (absent, low, medium, and high concentrations); (6) IL-21 either absent or at 10 ng/ml only during the last day of culture, or at low, medium, or high concentrations throughout the entire culture period; (7) BAFF (absent, low, medium, and high concentrations); (8) APRIL (absent, low, medium, and high concentrations); and (9) rhTLR9 (absent, low, medium, and high concentrations). Experimental conditions are identified that provide robust B cells expansion.

Suitable experimental conditions identified in the DOE study are evaluated using appropriate culture vessels for expansion of large input cell numbers, such as $1 \times 10^8$ B cells isolated from 500 ml of blood. The expanded B cell products are subjected to complete quality control (for example, flow cytometry for expression of B cell markers and MHC class II gene products, endotoxin content, viability, enumeration of viable, apoptotic, and necrotic cells, release of IL-1 beta and IL-6 from co-cultured human PBL, etc.).

SOPs are developed for ex vivo expansion of B cells from five sources: a) human peripheral blood-derived B lymphocytes, b) neonatal porcine peripheral blood-derived B lymphocytes, c) deceased human organ donor spleen-derived B lymphocytes, d) neonatal porcine donor spleen-derived B lymphocytes, and e) Non-human primate peripheral blood-derived B lymphocytes.

The scalability of the protocol is tested by utilizing the optimized seeding density and cytokine concentrations in a full-scale expansion of B cells isolated from peripheral blood in the setting of living donor kidney transplant. Twenty-one days before the intended day of transplant, 500 mL peripheral blood is obtained, and B cells are purified using positive or negative selection. The purified B cells are expanded in 2 G-Rex®500M-CS for 10 days in 5 L of media supplemented with cytokine and growth factors to yield $44 \times 10^9$ B cells on day 14 of expansion, of which $40 \times 10^9$ B cells are used for the day −7 vaccine, while the remaining $4 \times 10^9$ B cells are further expanded ex vivo to $40 \times 10^9$ B cells for use as the day +1 vaccine.

Figure 6:
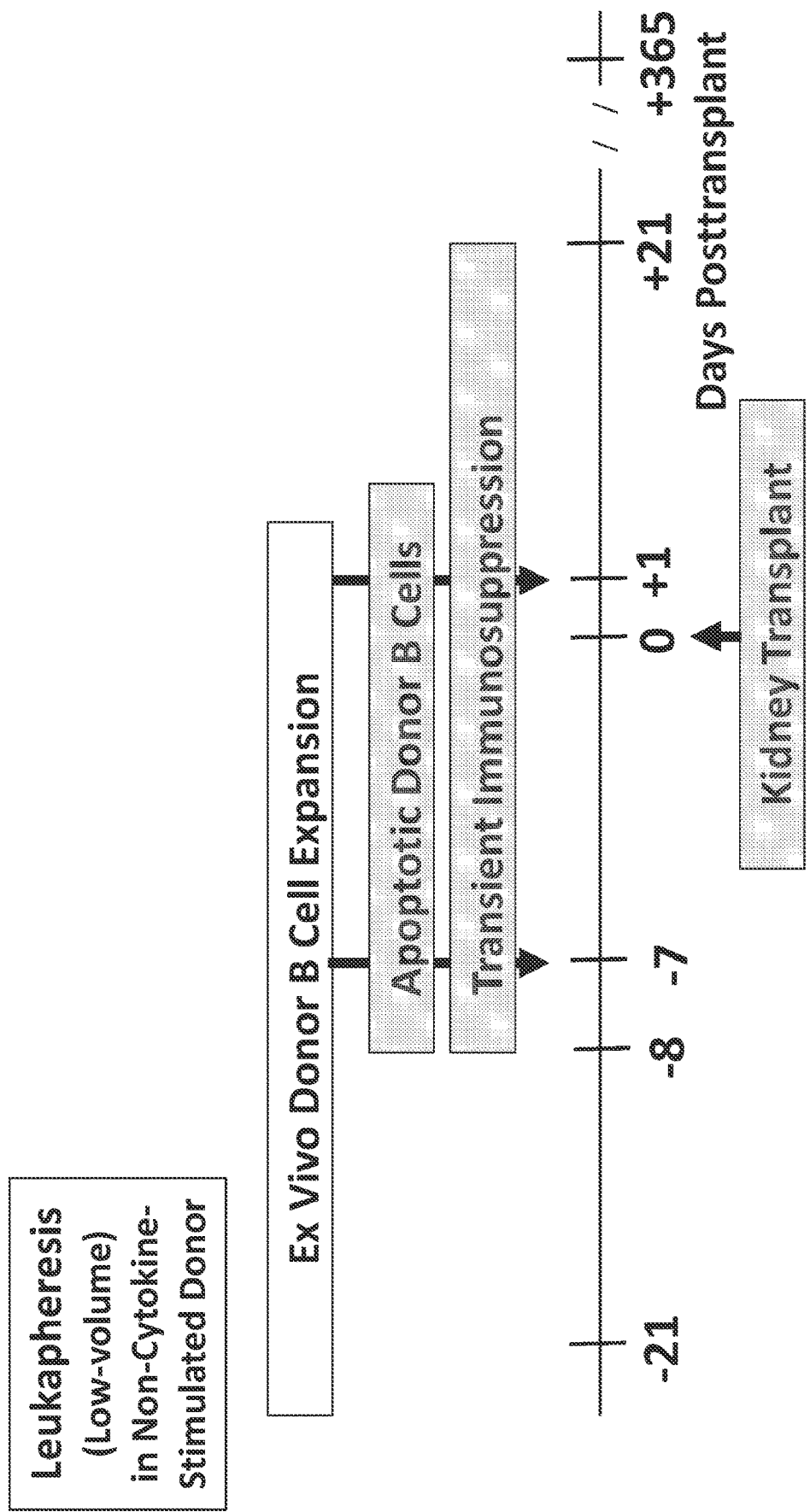
FIG. 6 illustrates an exemplary protocol for tolerance induction to living donor kidney allografts. B cells are obtained from blood draws or leukapheresis on day −22 or −21 (±2 days) relative to planned renal transplant. Ex vivo expanded and ECDI-fixed donor B cells are infused IV into recipients on days −7 and +1 relative to renal transplant on day 0. Short term immunosuppression and anti-inflammatory therapies are administered to transplant recipients as disclosed herein.

Example 9. Efficacy of Peri-Transplantation Infusions of Ex Vivo Expanded ADLs in Inducing Donor Specific Tolerance to Kidney Allograft Preemptive negative vaccination with ADLs is safe and its efficacy unmatched for induction of robust tolerance in a translational model of islet allotransplantation in non-human primates. Extending its application to kidney allotransplantation in nonhuman primates with a clinically translatable ADL product can have important ramifications for initiation of transplantation tolerance trials in the clinical setting. ADL products comprising ex vivo expanded B cells are expected to induce stable alloantigen-specific tolerance to kidney allografts in short-term immunosuppressed (SI) mammalian recipients (e.g., humans or non-human primates that are matched for one MHC class II DRB allele (one DRB-matched)). An exemplary protocol is illustrated in FIG. 6.

The efficacy of pen-transplantation infusions of ADL products for inducing stable renal allograft tolerance is evaluated in one DRB-matched, SI non-human primates. An experimental group receives ADL products comprising ex vivo expanded donor B cells, while a control group receives saline infusions. Group sizes of n=5 are studied; up to 2 additional non-human primates are added per group to replace non-informative recipients (e.g., recipients that contract unrelated diseases). SI mammalian recipients are identical in both groups and long-term maintenance drugs are not given to any recipient. Renal allograft failure is defined by serum creatinine >2.5 mg/dL and confirmed by graft histology.

Purpose-bred, qualified non-human primate donors and recipients (exam, labs, microbial screen, vaccination, etc.) are selected from qualified vendors. The donors and recipients have a defined MHC disparity (MHC class I-disparate and one MHC class II DRB allele-matched donor-recipient pairs, based on high-resolution MHC class I and II genotyping using Fluidigm Access Arrays to generate amplicons for deep sequencing).

Recipients with evidence of existing allo-reactive memory can be excluded from the study. Eligibility criteria for recipients can include ABO compatibility, low memory alloreactivity as defined by negative panel reactive antibodies (PRA; OneLambda Bead assay), negative donor-specific antibodies (DSA) by flow, and IFN-γ ELISPOT ≤12 SFC/$10^6$ PBMC (B cell ELISPOT) against donor non-human primate. Male or female non-human primate recipients are trained for cooperation and instrumented with indwelling central and intraportal vascular access.

Kidney transplantation in non-human primates follows established procedures. Briefly, following systemic heparinization of both donor and recipient, the donor organ is excised and the vessels are anastomosed to the recipient's infrarenal aorta and vena cava. Typically, this is performed in a left-to-right fashion owing to the longer length of the left renal vessels. The donor ureter is tunneled through the retroperitoneum and a primary ureteroneocystostomy is formed typically on the posterior wall of the bladder using a modified Leadbetter-Politano approach. Particular attention is paid to avoid urine leakage and ureteral stenosis. Bilateral native nephrectomy is completed prior to closure.

Ex vivo expanded and ECDI-fixed donor B cells are infused IV into experimental recipients on days −7 and +1 at a dose of $0.25 \times 10^9$/kg recipient body weight. Approximately 60 ml of blood (corresponding to 1% of body weight) is drawn from donors on day −21 or −22 (±2 days) relative to planned renal transplant, and B cells are purified by magnetic sorting using non-human primate CD20 beads. Alternatively or additionally, B cells can be enriched from leukapheresis products. A B cell expansion protocol is adapted from the culture system reported by Su et al (J Immunol 2016, 197:4163-76). Purified B cells (approximately $24 \times 10^6$ B cells from 60 ml of blood) are expanded ex vivo in a GREX100M flask (Wilson Wolf) until day −7 in RPMI 1640 medium with added 5% rhesus macaque serum, 55 μM 2-ME, 2 mM L-glutamine, 100 U/ml penicillin, 100 μg/ml streptomycin, 10 mM HEPES, 1 mM sodium pyruvate, and 1% MEM nonessential amino acids. The culture medium is supplemented with recombinant human CD40L-multimeric, IL-2 (50 ng/ml), IL-4 (10 ng/ml), IL-21 (10 ng/ml), and BAFF (10 ng/ml). Input cell numbers, medium volume, and the concentration of CD40L-multimeric are optimized in feasibility studies. Cells are counted after 7 and 14 days, split after 14 days (day −7), and the cells not infused on day −7 are expanded for another 8 days for infusion on day +1. On the day of infusion, cells are agitated on ice for 1 hour with ECDI (30 mg/mL per $3.2 \times 10^8$ cells) in DPBS, washed, cleaned to remove necrotic cells and microaggregates, and assessed for viability/necrosis by AO/PI fluorescent microscopy. ECDI-fixed B cells, meeting all release criteria, are loaded into cold syringes for IV infusion with a maximum concentration of $20 \times 10^6$ cells/mL; the cells remain on ice until recipient administration. Induction of apoptosis is monitored in vitro by incubating an aliquot of ECDI-fixed cells at 37° C. for 4-6 hours, labelling with Annexin V/PI, and analyzing via fluorescent microscopy or flow cytometry.

Identical short-term immunosuppression and anti-inflammatory therapies are administered to control and experimental subjects. The first dose of each drug is given on day −8 or −7 relative to transplantation on day 0. The antagonistic anti-CD40 mAb 2C10R4 is given IV at 50 mg/kg on days −8, −1, 7, and 14. Rapamycin (Rapamune®) is given orally (PO) from day −7 through day 21 post-transplant; the target trough level is 5 to 12 ng/ml. Concomitant anti-inflammatory therapy is with i) α-IL-6R (tocilizumab, Actemra®) at 10 mg/kg IV on days −7, 0, 7, 14, and 21, and ii) sTNFR (etanercept, Enbrel®) at 1 mg/kg IV on days −7 and 0 and 0.5 mg/kg subcutaneously on days 3, 7, 10, 14, and 21.

The primary efficacy outcome is the proportion of transplanted non-human primate with rejection-free allograft survival (confirmed by histopathology) at day 365 post-transplant. Accordingly, follow-up is to day 365 or graft failure, whichever occurs first. The group experimental group that received ADLs is expected to exhibit enhanced rejection-free allograft survival compared to the control group that received only the short-term immunosuppression and anti-inflammatory therapies.

Example 10. Dendritic and T Cell Immunomodulatory Effects of MHC-Defined Apoptotic Donor B Cells In Vitro Using MHC-Defined Human Responders ECDI-fixed B cell products generated under different experimental conditions are compared for their ability to induce maturation-arrest in dendritic cells (DC). Human monocyte-derived DC are generated with IL-4 and GCSF. These DC are incubated in the presence or absence of various ECDI-fixed B cell products. The standard ECDI-fixed B cell products are compared with enhanced products in which inhibitors of DC maturation are added to the culture prior to ECDI-fixation. Inhibitors of DC maturation that are coupled to the surface of B cells with ECDI can include e.g., rapamycin, curcumin, vitamin D3, Bay-117085, siCD40, cobalt protoporphyrin, and α1-antitrypsin. IFN-γ is examined as well, as early exposure to IFN-γ inhibits STAT-6 and NF-kB activation in DC. Readouts of DC maturation arrest include i) expression of DC phenotypic markers (CD83, CD80, CD86, MHC class II, CD40), ii) STAT-6 phosphorylation, iii) RELP nuclear translocation, iv) IL-12p70 production, v) allostimulatory capacity, and vi) priming of T cells with regulatory phenotypes (CD4+ CD25$^{hi}$CD127$^{low}$Foxp3+ Tregs and CD4+CD49b+Lag-3+ CD45RA− Tr1 cells). ECDI-treated B cell products are identified that induce maturation-arrest in DC.

The effects of the precise composition (antigen specificity, cytokines/molecules conjugated to surface, MHC disparity, etc.) of ECDI-fixed donor B lymphocytes on immune profiles in responder peripheral blood lymphocytes (PBL) is evaluated. ECDI-fixed donor B cells are generated, including B cells with various cytokines/molecules conjugated to their surface by ECDI (e.g., rapamycin, curcumin, defined MHC class II antigens). One-way mixed lymphocyte reactions (MLRs) are performed using PBL from fully mismatched, one DRB-matched, or one-DQ matched donor-recipient pairs, with or without the addition of increasing doses of ECDI-fixed donor B cells.

Cells are phenotyped and proliferation evaluated at various time points by multi-parametric flow cytometry (e.g., including CFSE dilution and staining for markers that differentiate cell subsets of interest). Blocking antibodies are added and distinct cell subsets are depleted to dissect underlying mechanisms and to determine how the enhanced ECDI-fixed B cell products influence T cell immunity (e.g., B cell products with or without coupled rapamycin, curcumin, defined MHC class II antigens). Readouts include i) fold-proliferation of CD4+ and CD8+ T cells with effector phenotypes as determined by surface markers, intracellular cytokines, and/or transcription factors; ii) fold-proliferation of CD4+ and CD8+ T cells with regulatory phenotypes as determined by surface markers, intracellular cytokines, and/or transcription factors; and iii) CD8+ T cell-mediated cytotoxicity against target cells in the MLR.

Example 11. Effects of ADL Infusions and Secondary Lymphoid Organ (SLO) Donor Specific Effector and Regulatory Immune Cell Subsets To determine how preparatory regimens and tolerizing vaccines of the disclosure induce transplant tolerance, and identify correlates of transplant tolerance and/or rejection, the following assays can be conducted.
Durable Deletion of Allo-Reactive T cells In naïve animals, about 1-10% of circulating T cells may be allo-reactive, and their expansion and/or contraction may dictate the fate of the transplant graft. Shortly after ADL infusions, abortive expansion of allo-reactive T and B cells, including CD4+ T cells with indirect donor specificity, is observed. For example, allo-reactive T and B cells can exhibit an initial expansion, followed by sharp decline in numbers. To track allo-reactive T cells long term in response to a tolerizing vaccine of the disclosure, the following four studies are performed in parallel:

First, proliferating T cells in circulation are serially enumerated by Ki67 staining at various time points after ADL infusion. Ki67+ T cells are expected to exhibit an initial increase in numbers after ADL infusion, followed by a sharp decline. These cells are co-stained for naïve, effector, and memory phenotypic markers to identify the specific subsets that undergo abortive expansion after ADL infusion. Effector memory T cells are expected to undergo the initial expansion followed by the sharp decline. To determine whether deletion of donor-specific T cell following ADL infusion is mediated by apoptosis, the expression of apoptotic markers (e.g., FASL, TRAF, phosphatidyl serine) by T cells are analyzed by flow cytometry using specific antibodies and Annexin V. Donor-specific effector memory T cells are expected to undergo apoptosis after their initial expansion following ADL infusion.

Second, to determine the effect of ADL infusion on indirect immunity to mismatched donor antigens presented by self-MHC class II, recipient PBL (serial samples) and spleen cells (SPLC; at termination) are incubated with autologous DC pulsed with lysates from donor PBL. Readouts include CD4+ T cell proliferation (CFSE), intracellular IFN-γ, IL-10, and TGF-β staining, cytokines in supernatants, and CD40L-upregulation on CD4+ T cells. ADL infusion is expected to result in reduced T cell proliferation in response to autologous DC pulsed with lysates from donor PBL, while proliferation in response to third party PBL is unchanged. ADL infusion is expected to result in a decrease in the number and/or proportion of CD4+ T cells that express IFN-γ and/or CD40L in response to DCs pulsed with lysates from donor PBLs. ADL infusion is expected to result in an increase or no change in the number and/or proportion of CD4+ T cells that express IL-10 and TGF-β in response to DCs pulsed with lysates from donor PBLs.

Third, MHC class II tetramers are used to track anti-donor CD4+ T cells with indirect specificity in ADL-treated and control mammalian subject (e.g., human or non-human primate). Because of the high degree of similarity in the peptide binding motifs of MHC class II molecules in non-human primate and humans, a t-BLAST analysis of the Mamu DRB1*03:03:01 sequence with the human genome at the NCBI website is performed to determine the human homolog. Mamu DRB1*03:03:01 is 94% identical and 95% positive with 0% gaps to the HLA class II DRB1-13 beta chain (Acc. No. PO1912) with an e-value of 1e-177. Thus, HLA DRB1-13 tetramers available at the NIH tetramer facility are used. HLA DRB1-13 tetramers are loaded with class I allo-peptides and shared class II peptides that have high affinity for Mamu DRB1*03:03:01/HLA DRB1-13. The Immune Epitope Database (IEDB) and Analysis Resource help identify epitopes in the hypervariable region of donor MHC class I Mamu A and B allo-peptides with high binding affinity to Mamu DRB1*03:03:01 using the IEDB recommended prediction method (e.g., Mamu-A4*01:01 shows very high affinity for DRB1*10.01; its sequence is TQFVRFDSDAASQRM_(SEQ ID NO: 47) with a percentile rank of 9.6). These tetramers can be used to track CD4+ T cells with indirect allopeptide and self-peptide specificities. CD4+ T cells with indirect allopeptide specificity are expected to exhibit an initial expansion, followed by a sharp decline in numbers in mammalian subjects infused with ADLs.

Fourth, high-throughput sequencing of the TCR β chain CDR3 region is employed to track donor-reactive T cell clones in transplanted monkey. Donor reactive T cell clones are expected to undergo an initial abortive expansion in response to ADL infusion, followed by a decline in numbers. RNA-based high-throughput TCR sequencing techniques are utilized to both (i) compare the entire repertoire of T cell clones at intervals before and after ADL infusions and transplantation; and (ii) monitor post-ADL and post-transplantation selective T cell clones with direct and indirect donor-specificity by using their predetermined molecular fingerprints. This approach has the advantage over other methods that start with genomic DNA. This approach does not require the demanding step of designing and optimizing multiplex primer sets that span the entire V gene segment. Instead, the entire TCR repertoire in human or non-human primate before and after ADL infusions is sequenced using primers of the 5' UTR and the constant region of the VDJ segment 2 days after the first ADL infusion and 6 days after the second ADL infusion. To extend these studies and to track the magnitude and kinetics of post-transplantation expansion of donor-reactive cells at a clonal level, TCR sequencing is used to determine whether post-transplantation expanded CD4+ Tfh cells, CD4+ TEM, CD8+ TEM, and CD107a+ CD8+ T cells are derived from clones present at baseline or from de novo emerging clones. To discern the effect of ADL infusion on donor-reactive T cells with direct and indirect specificity, their molecular fingerprints are determined. For fingerprints of T cells with direct specificities, one-way mixed lymphocyte reactions (MLR) are performed with pre-transplantation, pre-ADL, APC-depleted recipient PBL as responders. Proliferating (CFSE-low) CD4+ and CD8+ T cells are sorted, and their TCR β chain CDR3 region sequenced. For fingerprints of CD4+ T cells with indirect donor-specificity, self-restricted, alloantigen-specific CD4+ T cell clones pre-ADL are generated by culturing PBL from recipient rhesus macaques at baseline with donor PBL lysates followed by limiting dilution after 3 cycles of stimulation, then sequencing their TCR β chain CDR3 region. Analysis of direct and indirect TCR fingerprints within the entire TCR repertoire at intervals before and after ADL infusion and transplantation can enable the isolated tracking of directly and indirectly primed T cell clones.

Induction of Anergy in Allo-Reactive T Cells

To determine the functional state of the T cells in non-human primates treated with ADLs, the expression of Bcl-xL and NFAT transcripts are analyzed by quantitative RT-PCR and protein by western blot. Anergic T cells are expected to exhibit an altered expression profile of Bcl-xL and NFAT. Anergy is associated with reduced IL-2 and other effector functions and can be primarily mediated via CTLA4 and PD-1 inhibitory signals. PD-1 ligation inhibits the induction of Bcl-xL, an important cell survival factor. Upon engagement of its ligand, PD-1 is phosphorylated, allowing recruitment of SHP1/2 and downstream dephosphorylation of key TCR signaling molecules, leading to T cell anergy. In some cases, T cell anergy does not contribute to tolerance induction via tolerizing vaccines of the disclosure. In some cases, T cell anergy contributes to tolerance induction via tolerizing vaccines of the disclosure.

Allo-Reactive B Cell Repertoire

Naïve (CD3–CD19+CD21+CD27–), transitional (CD3–CD19+CD27–IgD+), regulatory (CD3–CD19+CD24hiCD38hi), and activated memory (CD3–CD19+CD21+CD27+) B cell subsets are serially analyzed to determine i) the importance of pre-transplantation subsets for tolerance or rejection; and ii) the effects of regimens of the disclosure on post-transplantation changes in the B cell repertoire. Results can also reveal the effects of ADLs+SI on CD4+ T cells and their (missing) help from recovering B cells.

The B cell ELISPOT assay can provide insights into the frequency and antigen specificity of circulating and graft-infiltrating memory B cells. Serial serum samples are tested for their reactivity against donor PBL to study the effect of ADL products on the de novo development of donor specific antibodies, which again can also be an indirect readout of tolerance induced in CD4+ T cells with indirect donor specificity. Serum reactivity to purified T and B cells are used to distinguish development of antibodies against the mismatched MHC class I and class II antigens, respectively. Regimens of the disclosure comprising ADLs are expected to reduce the de novo development of donor-specific antibodies in recipients.

Somatic recombination of VDJ segments in the B cell receptor (BCR) results in receptor diversity, similar to TCR. Whether ADL infusion is associated with deletion of donor-reactive effector B cell clones and favors expansion of regulatory clones is tested. Effector and regulatory B cells are sorted by fluorescence activated cell soring, and BCR sequencing conducted using the 5'-RACE approach and BCR network analysis. Regimens of the disclosure comprising ADLs are expected to be associated with reduced expansion and/or deletion of donor-reactive effector B cell clones. Regimens of the disclosure comprising ADLs are expected to be associated with increased expansion of regulatory B cell clones.

Regulation of Donor-Specific Responses

Whether ADLs+short term immunosuppression (SI) suppresses post-transplantation expansion of effector/activated CD4+ (TEM, Tbet+, CD40+, Tfh) and CD8+(TEM, Tbet+, CD40+, CD107+) T cell subsets, and activated memory CD20+ (Tbet+, CD21+CD27+) B cell subsets is tested in ADL-treated kidney transplantation recipients, and compared to control non-ADL-treated kidney recipients.

To determine whether ADL infusions negatively regulate T cell immune responses by upregulating their expression of PD-1, a negative regulator of activated T cells, PD-1+ CD4+ and PD-1+ CD8+ T cells are serially monitored in human or non-human primate kidney recipients given ADLs and SI. The effects of ADLs on PD-1 expression and T cell exhaustion phenotypes are examined. ADL administration is expected to increase PD-1 expression by donor-reactive T cells. Intracellular cytokine staining is used to analyze the cytokine secretion profile of PBL in response to stimulation with donor antigens. ADL administration is expected to be associated with reduced production of pro-inflammatory cytokines in response to stimulation with donor antigens, and increased expression of cytokines associated with tolerance in response to stimulation with donor antigens. The ability of the ADL infusions to suppress the priming of IFN-γ secreting T cells is assessed by one-way ELISPOT. In some cases, ADL administration is expected to be associated with reduced priming of IFN-γ secreting T cells. In some cases, ADL administration is not associated with reduced priming of IFN-γ secreting T cells.

Whether ADLs+SI increases the numbers and/or frequencies of regulatory immune cell subsets is examined. Analysis of the immune subsets in human or non-human primate kidney transplant models can reveal expansion of Tr1, Treg, natural suppressor (NS), Breg, and other regulatory immune cell subsets post-ADL infusion. The kinetics and frequency of the development and expansion of these subsets in ADL-infused and control recipients are examined by flow cytometry, and the effect of ADLs is determined. ADL infusion is expected to be associated with expansion of Tr1, Treg, natural suppressor (NS), Breg, and/or other regulatory immune cell subsets in the recipient. The increase in frequency of these regulatory cells in the circulation can be short-lived or sustained. Studies in murine models suggest that presentation of alloantigen-derived peptides by shared self MHC class II is essential for the beneficial effect of haplotype-shared donor-specific transfusion (DST). Whether the loss of tolerance, if present, is preceded by the loss of one or more regulatory subsets are examined.

Whether circulating cells with regulatory phenotypes suppress the donor antigen-specific proliferation of CD4+, CD8+, and CD20+ cells is evaluated. Proliferation of recipient CD4+, CD8+, and CD20+ cells in response to donor antigens is compared to proliferation in response to third party antigens. Regulatory cells can mediate peripheral tolerance through active suppression of antigen-specific effector cells that exert their suppression via direct contact and/or cytokines including IL-10 and TGF-β. Depletion and passive transfer studies are performed to examine whether tolerance of kidney or islet allografts is associated with increased frequencies of circulating and intragraft Tr1, Treg, and Breg cells that effectively suppress the proliferation of donor-specific CD4+ and CD8+ T cells. Additional studies determine whether donor-reactive T and B cell clones remain present in tolerant recipients at 1 yr post-transplantation, but their activation and proliferation is suppressed by regulatory cells. Tregs can induce linked suppression as long as a single MHC is shared between the donor and the antigen used to expand the Tregs. To study the impact of ADLs on the potency of regulatory subsets for suppressing donor-specific proliferation, Tr1, Treg, NS, and Breg cells from recipients are purified and their ability to suppress proliferation of CD4+ and CD8+ T cells in response to donor and third party PBL is tested in a CFSE-mixed lymphocyte reaction (MLR). Preparatory regimens of the disclosure that induce transplant tolerance are expected to suppress donor-specific proliferation of CD4+ and CD8+ T cells via Tr1, Treg, NS, or Breg subsets, or a combination thereof.

To elucidate molecular mechanisms that contribute to the regulatory profile of cells that are specific for donor antigens, single cell proteomics is undertaken to identify intracellular phosphorylation events following exposure to donor antigen. Studies in mice revealed a multi-pronged interplay between different regulatory subsets in the maintenance of peripheral tolerance. To study the cooperation between different regulatory subsets in the presently disclosed model, regulatory subsets are studied in various combinations in suppression assays. Antigen recognition and signaling through TCR are obligatory to the antigen specificity of regulatory T cells.

Establishing and Sustaining Tolerogenic Regulatory Mechanisms in ADLs+SI Treated Non-Human Primates AhR and PD-1 signaling play key roles in the immune system. Analysis of AhR and PD-1 in naïve, effector, and regulatory T cell subsets can clarify whether regulatory T cell subsets in the presently described model originate from activation and expansion of regulatory cells or from trans-differentiation/conversion of effector cells. Canonical activation of TGFβ signaling and increased expression of AhR in T cells result in conversion of effector cells to the regulatory phenotype. AhR, through transactivation, regulates the production of IL-10, a critical element in the function of Tr1 cells. Analysis of AhR transcription and protein expression in CD4+ T cells from ADL-infused non-human primates can help unravel its role in the development of Tr1 and Treg cells in the presently described model (e.g., via flow cytometry and/or immunoprecipitation with AhR Ab MA1-513). Serial monitoring of AhR is also performed to determine whether loss of its expression is associated with loss of tolerogenic regulatory cell subsets and effector cell expansion.

Apoptotic cells, via activation of the PD-1/PD-L1 pathway, contribute to the development of regulatory T cell subsets. Serial monitoring of PD-L1 expression by APCs and PD-1 by T cells can decipher the role of this pathway in the development of regulatory subsets. TCR sequencing of regulatory and effector cells before and after rejection identify whether new effector clones emerge de novo and/or convert from regulatory cells in fully mismatched recipients undergoing rejection.

The association of T cell subsets that differentiate from recent thymic emigrants (RTE) with tolerance or rejection are evaluated. Recent thymic emigrants (RTE) form the major precursor for regulatory cells induced in the periphery and the microenvironment determines their fate. CD4+ RTE (CD4+CD31+PKT7+) and CD8+ RTE (CD8+CD103+) cells are analyzed longitudinally in PBL and cross-sectionally at termination in liver and secondary lymphoid organs. RTE and mature naïve T cells can adopt a number of different fates after encountering antigen, including polarization into effector, anergic, or Treg (Tr1, NS) subsets, or deletion. Transcripts of flow-sorted CD4/CD8 RTE cells are analyzed. Transcriptome profiles (e.g., NFAT and associated partner AP-1 (Fos/Jun) and other anergy associated genes) can indicate the commitment of RTE cells to a lineage or fate. Tolerance induced by preparatory regimens of the disclosure is expected to be associated with differentiation of RTE into T cells with regulatory and/or anergic phenotypes. Thymus-dependent peripheral regulation is thought to be critical to induction of high dose calcineurin inhibitor (CNI)-based renal transplant tolerance in MHC class I-disparate pigs.

Transcriptomes of Regulatory Cells as Tolerance Biomarkers

The transcriptomes of flow-sorted immune regulatory cell subsets in tolerant non-human primate kidney and islet transplant recipients are examined to test whether an increase in the expression of immune regulators and activators of mitochondrial respiration is present, indicating that the regulatory cells are functionally and metabolically activated in tolerant recipients when compared to controls. Regulatory cells in recipients that received a tolerance-inducing preparatory regimen of the disclosure are expected to exhibit increased expression of genes associated with increased mitochondrial respiratory activity and immune regulatory signaling.

To further understand the mechanisms involved in the induction, expansion, and maintenance of immune regulatory cell subsets following ADL-infusion, the transcriptomes of flow-sorted cells isolated from PBL at 14, 90, and 180 days post-transplantation are analyzed to discern the transcriptional programs that determine the fate of regulatory T cells. The transcriptomes of regulatory cells induced in ADL-treated and control recipients are examined to further define the role of ADLs in induction and maintenance of regulation in the presently described model.

Example 12. The Role of Graft in Induction and Maintenance of Antigen Specific Tolerance to Kidney Allograft in ADL-Treated, One DRB-Matched and Mismatched SI Mammalian Recipients Examples of ways ADLs+short term immunosuppression (SI) can potentially sustain tolerance by modulating an allograft include: (i) changing the ratio of effector to regulatory immune cell subsets, (ii) affecting the recruitment/generation of plasmacytoid (p) DC and the phenotype of renal tubular epithelial cells (RTEC), both of which contribute to the generation of regulatory immune cells, and (iii) altering the composition of allograft-derived circulating exosomes. Studies are conducted in non-human primate renal allograft recipients. Recipients that receive a preparatory regimen comprising ADLs are compared to recipients that do not receive ADLs. Kidney tissue obtained at necropsy is processed for standard histopathology, RNA transcript expression studies, and phenotyping of retrieved kidney mononuclear cells (KMNC).

ADL and Effector: Regulatory Immune Cell Subset Ratio in Kidney Allograft

To ascertain how ADL infusions affect the recruitment and prevalence of graft infiltrating leukocytes (GIL), KMNC are retrieved from kidney biopsies, and absolute numbers and frequencies of the following cell subsets are determined by flow cytometry: (i) effector/activated CD4+ T cells (TEM, Tbet+, CD40+, Tfh), effector/activated CD8+ T cells (TEM, Tbet+, CD40+, CD107+), and activated memory CD20+ B cells (Tbet+, CD21+CD27+); (ii) host DC; (iii) myeloid derived suppressor cells (MDSC), Treg, Tr1, NS, and Breg cells; and (iv) tissue-resident lymphocytes (Trm, iNKT, etc.). Flow cytometric evaluation of GIL phenotypes can complement immunopathology studies. Recipients that receive a preparatory regimen comprising ADLs are expected to exhibit fewer graft-infiltrating effector/activated T cells and/or fewer activated memory B cells. Recipients that receive a preparatory regimen comprising ADLs are expected to exhibit more MDSC, Treg, Tr1, NS, and/or Breg cells.

Upregulation of mRNAs for chemokines IP-10, MIP-1α, MIP-1β, and lymphotactin, as well as chemokine receptors CCR2, CXCR4, and CCR5 has been shown during allograft rejection. Biopsies are taken from ADL-treated and non-ADL-treated renal allograft recipients. Protein and transcript profiling are undertaken to determine the expression levels of chemokines and chemokine receptors implicated in recruitment of effector and regulatory immune subsets. Recipients that receive a preparatory regimen comprising ADLs are expected to exhibit lower expression levels of IP-10, MIP-1α, MIP-1β, lymphotactin, CCR2, CXCR4, and/or CCR5.

The presence of T cell-rich lymphoid structures (TOL) showing periarterial lymphoid sheaths containing nodules of CD3+Foxp3+ T cells, CD4+ T cells, DC, B cells and indoleamine-pyrrole 2,3 dioxygenase (IDO)-positive cells are examined in kidneys.

Effect of ADL Infusions on the Recruitment of pDC to Allografts and the Phenotype of Renal Tubular Epithelial Cells (RTEC)

Cell populations that are adept at inducing tolerance to vascularized allografts include: (i) plasmacytoid dendritic cells (pDC); and (ii) renal tubular epithelial cells (RTEC; in the presence of IFN-γ). pDC and RTEC have been identified in transplanted kidneys. Both are capable of mediating Treg development and suppression of alloreactive cells through expression of distinct molecules including IDO, TGFβ, ICOS-L, and PD-L1. IFN-γ treated human RTEC induce allo-specific tolerance via a class II pathway.

Experiments are conducted to determine whether ADL infusion promotes allo-peptide presentation by RTEC on shared MHC class II, and whether this is associated with maintenance of tolerance. Allo-peptide presentation by shared MHC class II can promote the conversion of non-Tregs to Tregs. Experiments are conducted to determine whether allo-peptide presentation by shared MHC class II expressed on renal allograft endothelium is associated with enrichment of Tregs and other regulatory subsets in renal allografts.

Recipients that receive a preparatory regimen comprising ADLs are expected to exhibit increased allo-peptide presentation by RTEC on shared MHC class II, and this is expected to be associated with enrichment of Tregs and other regulatory subsets in renal allografts.

Effect of ADL Infusions on Graft-Derived, Circulating Exosome Profile

Exosomes are extracellular vesicles that are released into the circulation by cells. Exosomes can indicate the conditional state of a tissue through their proteomic, RNA, and DNA cargo. Exosome size, proteome, and RNA profile can modulate immune responses, and a donor MHC exosome signal can serve as a biomarker of rejection in islet, kidney, and cardiac transplantation. Donor MHC molecules present in exosomes can cross-dress recipient APC, and antigen presentation by these allo-MHC cross-dressed cells can contribute to T cell activation after transplantation. How exosomes derived from a tolerized allograft mediate and sustain tolerance remains poorly understood.

Serum-purified exosomes are obtained from ADL-treated and non-ADL-treated human or non-human primate transplant recipients. The size, quantity, renal tissue specificity, RNA profiles, and proteomic cargoes (including allo-MHC/peptide complexes) of exosomes with donor MHC and renal tissue specificity are characterized, for example, using NanoSight fluorescence. Recipients that receive a preparatory regimen comprising ADLs are expected to exhibit altered exosome size, quantity, renal tissue specificity, RNA profiles, and/or proteomic cargoes compared to recipients that do not receive ADLs.

Example 13. Treating Diabetes by Transplanting Islets and Providing a Preparatory Regimen with Short Term Immunosuppression This example examines the tolerogenic effect of ECDI-treated donor cells for islet transplantation in vivo. ECDI-treated splenocytes from a xenogeneic or allogeneic source are administered to a human or a non-human primate transplanted with islets, thereby minimizing the possibility of graft rejection in the human or non-human primate. The preparatory regimen of this example can readily be adapted to allotransplantation or xenotransplantation in human recipients (for example, transplant of islets, kidneys, or other cells, tissues, or organs).

In an illustrative example, a streptozotocin-induced model of diabetes is utilized with non-human primate subjects. Diabetes is induced by intravenous treatment with streptozotocin. Recipient subjects are transplanted with islets from a MHC-I disparate, one MHC-II DRB-allele matched donor. Recipients are treated with a short term immunosuppressive regimen comprising: (i) an antagonistic anti-CD40 antibody, given intravenously at a dose of 50 mg/kg on day −8, −1, 7, and 14 relative to transplant; (ii) rapamycin, given orally from day −7 to day 21 relative to transplant with a target trough level of 5-12 ng/mL; (iii) soluble TNF receptor, given intravenously at a dose of 1 mg/kg on days −7 and 0 relative to transplant and subcutaneously at a dose of 0.5 mg/kg on days 3, 7, 10, 14, and 21 relative to transplant; and (iv) antagonistic anti-IL-6 receptor antibody, given intravenously at a dose of 10 mg/kg on days −7, 0, 7, 14, and 21 relative to transplant.

Transplant recipients in experimental groups receive an intravenous infusion of ECDI-treated apoptotic donor leukocytes (ADLs) before and optionally after transplantation. In some cases, ADLs are administered about 8 days before transplantation. In some cases, ADLs are administered about 7 days before transplantation. In some cases, ADLs are administered about 1 day after transplantation. In some cases, ADLs are administered about 7 days after transplantation. In some cases, ADLs are administered about 14 days after transplantation. In some cases, ADLs are administered about 7 or 8 days before transplantation, and about 1, 7, and/or 14 days after transplantation. ADLs can be from the same donor as the islets or a different donor as disclosed herein.

Transplant recipients in a control group do not receive ADLs.

Small doses of exogenous insulin can be administered through day 21 after transplantation.

Transplant recipients that receive ADLs are expected to exhibit improved survival compared to the group that do not receive ADLs. Transplant recipients that receive ADLs are expected to exhibit improved rejection-free survival compared to the group that do not receive ADLs. Transplant recipients that receive ADLs are expected to exhibit long-term functional survival of islet allografts. For example, transplant recipients that receive ADLs are expected to exhibit improved blood glucose control after transplant (e.g., become normoglycemic), including after they stop receiving exogenous insulin (e.g., past day 100 or day 365 post-transplant). Blood glucose control can be evaluated, for example, by intravenous glucose tolerance test (IVGTT), a mixed meal tolerance test (MMTT), or any other metabolic test established for monitoring pancreatic islet beta cell function. In IVGTT, exogenous glucose is injected intravenously, and the blood glucose level is measured over time after the injection. Transplant recipients that receive ADLs are expected to exhibit rapid decreases in blood glucose levels and reduced area under the glucose concentration curve after IVGTT (e.g., comparable levels to those prior to streptozotocin treatment). Transplant recipients that receive ADLs are expected to exhibit decreased hemoglobin A1C levels after transplant. Transplant recipients that receive ADLs are expected to exhibit increased C-peptide levels after transplant that are maintained over time, indicating the transplanted islets are functional (e.g., fasted C-peptide levels, glucose-stimulated C-peptide levels, and/or increase in C-peptide levels upon glucose stimulation).

Example 14. Conjugation of Recipient-Type MHC-II to Fully Mismatched Apoptotic Donor Leukocytes (ADLs) for Tolerance Induction This example demonstrates that conjugating recipient-type MHC class II molecules to apoptotic donor leukocytes (ADLs) can enhance the tolerance-inducing efficacy of a preparatory regimen. For example, for donor-recipient pairs that are fully MHC class I and class II mismatched, conjugating recipient-type MHC class II molecules to ADLs can enhance ADL efficacy in inducing tolerance to a transplanted cell, tissue, or organ.

Coupling one or more peptides derived from one (or more) of the transplant recipient's MHC class II molecules to the surface of fully mismatched ADLs can provide abundant amounts of recipient-type MHC class II peptides for presentation by recipient MHC class II molecules after uptake of ADLs (for example, by recipient spleen marginal zone antigen presenting cells or liver sinusoidal endothelial cells). Recognition of self MHC class II can promote tolerance in the recipient, for example, via regulatory T cell subsets.

An additional example of a means through which tolerance can be induced is via activation of thymus-derived CD4+ Tregs (tTregs). tTregs are selected through recognition of their own MHC class II peptides, presented by their own MHC class II molecules. A substantial fraction of self-peptides bound to and presented by MHC class II complexes are derived from MHC class II itself. Accordingly, many of the circulating (t)Tregs have specificity for self MHC class II peptides. When this complex is presented on the surface of activated effector T cells, it can serve as a potent activation signal for tTregs, leading to tTreg activation and thus promotion of immune tolerance.

One way that tTregs can be activated is by trogocytosis of MHC class II peptides, presented by MHC class II, to activated T cells. Trogocytosis involves the exchange of entire MHC class II molecules presenting MHC class II peptides. Trogocytosis of MHC class II complexes with bound self MHC class II (e.g., DRB) peptides to activated T cells can turn these T cells into potent activators of tTregs that have specificity for the same self MHC class II peptides. Therefore, if recipient-type MHC class II molecules presenting recipient MHC class II peptides are delivered to and presented by activated recipient T cells, this can serve as potent activation signals to tTregs. The activation of tTregs requires antigen specificity, but their regulatory function does not require antigen specificity. As such, activated tTregs can directly down-regulate anti-donor immunity, including donor-specific CD4+ and CD8+ T cells of direct and indirect specificities, and also down-regulate anti-donor immunity through expansion of other immune cell subsets with regulatory capabilities, including Tr1 cells.

Self MHC class II peptides (e.g., DRB peptides) bound to self MHC class II may also contribute to the induction of tolerance via LAG-3 receptor signaling. Self MHC class II peptides (e.g., DRB peptides) bound to the MHC class II complex they are derived from can stabilize the peptide:MHC class II conformation required for recognition by and signaling through LAG-3 receptors on T cells. LAG-3 is a TCR co-receptor that can distinguish stable from unstable peptide: MHC class II complexes. The specificity of the peptide bound to self MHC class II may thus regulate the specificity of the immune response via LAG-3. Therefore, LAG-3 expression and function is associated with tolerance induction. For example, co-expression of LAG3 and CD49b can be used to identify Tr1 cells, and blockade of LAG3 on Tr1 cells abrogates Tr1-induced tolerance. LAG3 is also transiently expressed on activated tTregs and at significantly lower levels on activated Teff cells, suggesting that LAG3 may be a reliable marker of cells with regulatory potential. Additionally, LAG3 crosslinking of MHC class II on DCs tolerizes DCs. Considering self-MHC class II peptides stabilize self-MHC class II that are presenting the peptides in a conformation associated with LAG-3 recognition, the delivery of abundant amounts of self MHC class II peptides (e.g., DRB peptides) may boost the presence of stable self-peptide MHC class II complexes on DCs, and thereby contribute to tolerance (e.g., via expansion of Tr1 cells). This is supported by data showing that apoptotic donor leukocytes that are matched at one MHC class II DRB allele promote tolerance in allotransplant recipients.

Mixed Lymphocyte Reactions

To determine the ability of apoptotic donor leukocytes coupled via ECDI with recipient-type DRB peptide to promote immune regulation and transplantation tolerance, a mixed lymphocyte reaction (MLR) was performed in vitro with MHC-defined stimulator (donor) and responder (recipient) peripheral blood mononuclear cells (PBMCs). It was hypothesized that conjugation of recipient (responder)-type MHC class II peptide (e.g., antigen derived from a Rhesus Monkey tested positive for the Mamu DR3 allele or from a Mauritian Cynomolgus Monkey tested positive for the Mafa DRB*w501 allele) with ECDI to the surface of apoptotic donor leukocytes (ADLs) would increase in the recipient (responder) the activation and expansion of (t)Treg cells and Tr1 cells with indirect specificity for recipient/responder-type MHC class II peptide (e.g., DR3 or DRB*W005:01 peptides).

The following fully mismatched monkey recipient/donor pair and experimental conditions were selected: Recipient PBMCs were Mauritian Cynomolgus Monkey (Mafa M4A, M4A, M4B, M4B, M4DR, M1DR). Apoptotic donor leukocytes were Mauritian Cynomolgus Monkey (M3A, M3A, M3B, M3B, M3DR, M3DR), with 14 µg of synthetic DRB*W005:01 peptide (aa 32-46, TRPRFLEQAKSECHF, SEQ ID NO: 44) conjugated to the cell surface via ECDI.

In the MLR assay, 3×10⁶ apoptotic donor leukocytes with and without conjugated DRB peptide were used to stimulate 3×10⁶ recipient PBMCs at 37° C. in a C02 incubator. Serial samples collected post stimulation on day 1 and day 3 were analyzed for the induction of DC-10 (CD141+CD163+ of CD14+CD16+), Treg cells (CD25hi CD127−FoxP3+ of CD4+) and Tr1 cells (CD49b+ LAG-3+ of CD4+) by flow cytometry. Analysis of the stimulated cells showed that in comparison to PBLs stimulated with control apoptotic donor leukocytes alone, there was a 6.8 fold increase in the frequency of Tregs on day 1 and a 44.3-fold increase on day 3 following stimulation with peptide-conjugated apoptotic donor leukocytes. Similarly, a gradual increase in the frequency of Tr1 cells (36% on day 1 and 80% on day 3) was observed following stimulation with DRB peptide-conjugated versus control apoptotic donor leukocytes. For DC-10 cells, 0.98- and 1.23-fold increases were observed on days 1 and 3, respectively. For Bregs, 2.16- and 2.52 fold increases were observed on days 1 and 3, respectively.

These results demonstrate that conjugating recipient type MHC-class II peptides (e.g., DRB) to apoptotic donor leukocytes can promote expansion of tolerance-promoting immune regulatory cell subsets.

Identification of Suitable MHC Class H Peptides

Additional studies are conducted to identify MHC class II peptides (e.g., DRB peptides) that are effective in activating and expanding immune regulatory cell subsets (e.g., tTregs and Tr1 cells). Peptides of interest can be evaluated, for example, via mixed lymphocyte reactions as disclosed above. Readouts can include enumeration of the frequencies of tTregs, Tr1 cells, DC-10, B10, and Breg cells by flow cytometry and/or CyTOF on days 1, 3, 4 and 7 post each stimulation. The specificity of the expanded T cell clones can be studies by flow using tetramers (e.g., DR3 and DRB*w501 tetramers) loaded with synthesized responder-type MHC class II and mismatched donor MHC class I peptides. Peptides of interest can also be evaluated using other techniques known or disclosed herein.

Peptides with high, medium, and low binding affinity to the responder-type MHC class II molecules (e.g., DRB molecules) will be identified. The most effective amount of peptide to be coupled to apoptotic donor leukocytes will be determined in dose titration studies.

One or more peptides derived from one (or more) of the transplant recipient's MHC class II molecules (e.g., DR α-chain, DR β-chain, DQ α-chain, DQ β-chain, DP α-chain, or DP β-chain) is conjugated with ECDI (or with any other process) to the surface of the fully mismatched ADLs. The DR α-chain can be functionally monomorphic, thus in some cases peptides derived from the R-chain of MHC class II DR, DQ, and DP molecules are preferred for tolerance induction.

The peptides derived from a recipient's MHC class II molecule may comprise an entire MHC class II molecule. The peptides derived from a recipient's MHC class II molecule may comprise an entire α chain of DR, DQ or DP. The peptides derived from a recipient's MHC class II molecule may comprise entire 1 chain of DR, DQ, or DP. The peptides derived from a recipient's MHC class II molecule may comprise entire α1 and/or α2 domains of DR, DQ or DP. The peptides derived from a recipient's MHC class II molecule may comprise entire β1 and/or β2 domains of DR, DQ, or DP. The peptides derived from a recipient's MHC class II molecule may comprise MHC-DR1, MHC-DR2, MHC-DR3, MHC-DR4, and/or MHC-DR5. The peptides derived from a recipient's MHC class II molecule may comprise a sequence from a hypervariable region. The peptides derived from a recipient's MHC class II molecule can comprise an in silico-identified high, medium, or low affinity peptides from the hypervariable region of the DRB molecule (e.g., a 10, 11, 12, 13, 14, 15, 16, 17, 18, 19, or 20 amino acid peptide). The peptides derived from a recipient's MHC class II molecule can comprise a variable region spanning the peptide binding region (e.g., about a 20, 25, 26, 27, 28, 29, 30, 31, 32, 33, 34, 35, or 40 amino acid peptide). The peptides derived from a recipient's MHC class II molecule can comprise dimeric peptides with cathepsin S cleavable linkers with varying affinity to the DRB binding grove. The peptides derived from a recipient's MHC class II molecule may between about 10 and 30 amino acids in length. The peptides derived from a recipient's MHC class II molecule may be at least 10 to 30 amino acids in length. The peptides derived from a recipient's MHC class II molecule may be synthesized or recombinant.

In some cases, the peptides derived from a recipient's MHC class II molecule can have high affinity for binding to the peptide binding grooves of HLA DR3 and DR4 molecules, which are the most prevalent MHC class II alleles in patients with type 1 diabetes. The candidate MHC class II peptides discussed and the MHC class II alleles presented serve as an example with relevance to transplant recipients positive for HLA DR3 and/or DR4, and the findings will have significance for the selection of MHC class II peptides for the purpose of tolerance induction in patients with different MHC class II alleles, including transplant recipients undergoing kidney transplantation for the treatment of end-stage renal failure caused by type 1 diabetes, type 2 diabetes, and other diseases including hypertension, glomerulonephritis, interstitial nephritis, polycystic kidney disease, pyelonephritis.

Examples of MHC class II DR3 and DR4 peptides that have high affinity for binding to MHC class II DR3 and MHC class II DR4 molecules in humans are presented below.

TABLE 2 exemplary peptides derived from HLA DR3 that are capable of binding HLA DR3 complex.

| SEQ ID NO: | HLA DR3 binding HLA DR3 peptide | | |
|---|---|---|---|
| | Start | end | peptide |
| 1 | 22 | 36 | LSSPLALAGDTRPRF |
| 2 | 14 | 28 | VLTVTLMVLSSPLAL |
| 3 | 182 | 196 | WTFQTLVMLETVPRS |
| 4 | 139 | 153 | QHHNLLVCSVSGFYP |
| 5 | 66 | 80 | NVRFDSDVGEFRAVT |
| 6 | 108 | 122 | CRHNYGVVESFTVQR |

TABLE 2-continued exemplary peptides derived from HLA DR3 that are capable of binding HLA DR3 complex.

| SEQ ID NO: | Start | end | peptide |
|---|---|---|---|
| 7 | 210 | 224 | TSPLTVEWRARSESA |
| 8 | 47 | 61 | FNGTERVRYLDRYFH |
| 9 | 144 | 158 | LVCSVSGFYPGSIEV |
| 10 | 245 | 259 | GLFIYFRNQKGHSGL |

TABLE 3 exemplary peptides derived from HLA DR3 that are capable of binding HLA DR4 complex.

| SEQ ID NO: | start | end | peptide |
|---|---|---|---|
| 11 | 22 | 36 | LSSPLALAGDTRPRF |
| 12 | 14 | 28 | ALTVTLMVLSSPLAL |
| 13 | 138 | 152 | LQHHNLLVCSVSGFY |
| 14 | 185 | 199 | QTLVMLETVPQSGEV |
| 15 | 210 | 224 | TSPLTVEWRARSESA |
| 16 | 61 | 75 | HNQEELVRFDSDVGE |
| 17 | 243 | 257 | GAGLFIYFRNQKGPS |
| 18 | 46 | 60 | FFNGTERVRFLERYF |
| 19 | 90 | 104 | WNSQKDILEQKRAQV |

TABLE 4 exemplary peptides derived from HLA DR4 that are capable of binding HLA DR3 complex.

| SEQ ID NO | start | end | peptide |
|---|---|---|---|
| 20 | 14 | 28 | ALTVTLMVLSSPLAL |
| 21 | 185 | 199 | QTLVMLETVPRSGEV |
| 22 | 244 | 258 | AGLFIYFRNQKGHSG |
| 23 | 60 | 74 | FYHQEEYVRFDSDVG |
| 24 | 233 | 247 | GGFVLGLLFLGAGLF |
| 25 | 109 | 123 | RHNYGVGESFTVQRR |
| 26 | 248 | 262 | IYFRNQKGHSGLQPT |
| 27 | 65 | 79 | EYVRFDSDVGEYRAV |

MHC class II peptides can also be identified in in rhesus macaques. Peptides with high, medium, and low binding affinity to the responder-type DRB molecules can be identified by using the human homologs of these DRB molecules and the Immune Epitope Database (IEDB).

Analysis of the MHC class II DRB locus in the rhesus macaque population used in preclinical studies shows that 14.39% of the colony are of haplotype DR3a and 19.9% are of haplotype DR4. t-BLAST alignment of the Mamu DRB sequence with the human genome was performed to determine the human homologs. HLA DRB1*03 (Acc. No. CDP32905.1) was 92% identical, with 96% positives and 0% gaps to the Mamu DRB03a with an e value of 5e-178. HLA DRB1*14 (Acc. No. ABN54683.1) was 92% identical, with 95% positives and 0% gaps to the Mamu DRB04 with an e value of 2e-174. Peptides from Mamu class II sequences with high binding affinity for HLA DRB1*13 or HLA DRB1*14 were identified using the Immune Epitope Database Analysis resource to identify the DR binding peptides. Peptides that have high affinity for binding to the selected MHC class II molecules in rhesus macaques are presented below.

TABLE 5 exemplary peptides derived from Mamu DR3 that are capable of binding Mamu DR03a complex.

| SEQ ID NO: | start | end | peptide |
|---|---|---|---|
| 28 | 22 | 36 | LSSPLALAGDTRPRF |
| 29 | 14 | 28 | ALTVTLMVLSSPLAL |
| 30 | 93 | 107 | QKDILEDQRASVDTF |
| 31 | 138 | 152 | LQHHTLLVCSVNGFY |
| 32 | 185 | 199 | QTLVMLETVPQSGEV |
| 33 | 210 | 224 | TSPLTVEWRARSESA |
| 34 | 243 | 257 | GAGLFIYFRNQKGHS |

TABLE 6 exemplary peptides derived from Mamu DR4 that are capable of binding Mamu DR03a complex

| SEQ ID NO: | start | end | peptide |
|---|---|---|---|
| 35 | 22 | 36 | LSSPLALAGDTRPRF |
| 36 | 14 | 28 | ALTVTLMVLSSPLAL |
| 37 | 138 | 152 | LQHHNLLVCSVSGFY |
| 38 | 185 | 199 | QTLVMLETVPQSGEV |
| 39 | 210 | 224 | TSPLTVEWRARSESA |
| 40 | 61 | 75 | HNQEELVRFDSDVGE |
| 41 | 243 | 257 | GAGLFIYFRNQKGPS |
| 42 | 46 | 60 | FFNGTERVRFLERYF |
| 43 | 90 | 104 | WNSQKDILEQKRAQV |

The preparatory regimen of this example can readily be adapted to allotransplantation or xenotransplantation in mammalian recipients (for example, transplant of islets, kidneys, or other cells, tissues, or organs, such as embryonic stem cell, induced pluripotent stem cell (iPS)-derived, or mesenchymal stem cell-derived cells, tissues and organs).

In an illustrative example, recipient type MHC class II chains, domains, and/or or peptides are conjugated to ADLs, and the ADLs are used to induce tolerance to a human islet transplant recipient that is fully MHC-I and MHC-II mismatched to a xenogeneic or allogeneic donor.

Splenocytes are obtained from a fully MHC-I and MHC-II mismatched xenogeneic or allogeneic source. The MHC class II chains, domains, and/or peptides are conjugated during ECDI treatment to generate MHC-II-conjugated (ADLs). The MHC-II-conjugated ADLs are administered to human subjects that receive islet transplants, thereby reducing the possibility of graft rejection. Transplant recipients receive an intravenous infusion of MHC-II-conjugated ADLs before and optionally after transplantation, for example, on day −7 and day +1 relative to transplantation. ADLs can be from the same donor as the islets or a different donor as disclosed herein.

Recipient subjects are transplanted with islets from the fully MHC class I and MHC class II mismatched donor.

Recipients are treated with a short term immunosuppressive regimen comprising: (i) an antagonistic anti-CD40 antibody, given intravenously at a dose of 50 mg/kg on day −8, −1, 7, and 14 relative to transplant; (ii) rapamycin, given orally from day −7 to day 21 relative to transplant with a target trough level of 5-12 ng/mL; (iii) soluble TNF receptor, given intravenously at a dose of 1 mg/kg on days −7 and 0 relative to transplant and subcutaneously at a dose of 0.5 mg/kg on days 3, 7, 10, 14, and 21 relative to transplant; and (iv) antagonistic anti-IL-6 receptor antibody, given intravenously at a dose of 10 mg/kg on days −7, 0, 7, 14, and 21 relative to transplant.

Small doses of exogenous insulin can be administered through day 21 after transplantation.

Transplant recipients in control groups do not receive ADLs, or receive ADLs without recipient-type MHC class II conjugated. Transplant recipients that receive MHC-II-conjugated ADLs are expected to exhibit improved survival compared to recipients that do not receive MHC-II-conjugated ADLs. Transplant recipients that receive MHC-II-conjugated ADLs are expected to exhibit improved rejection-free survival compared to recipients that do not receive MHC-II-conjugated ADLs. Transplant recipients that receive ADLs are expected to exhibit long-term functional survival of islet allografts compared to recipients that do not receive MHC-II-conjugated ADLs. For example, transplant recipients that receive MHC-II conjugated ADLs are expected to exhibit improved blood glucose control after transplant (e.g., become normoglycemic), including after they stop receiving exogenous insulin (e.g., past day 100 or day 365 post-transplant). Blood glucose control can be evaluated, for example, by intravenous glucose tolerance test (IVGTT), a mixed meal tolerance test (MMTT), or any other metabolic test established for monitoring pancreatic islet beta cell function. In IVGTT, exogenous glucose is injected intravenously, and the blood glucose level is measured over time after the injection. Transplant recipients that receive MHC-II conjugated ADLs are expected to exhibit rapid decreases in blood glucose levels and reduced area under the glucose concentration curve after IVGTT (e.g., comparable levels to a healthy subject). Transplant recipients that receive MHC-II conjugated ADLs are expected to exhibit decreased hemoglobin A1C levels after transplant. Transplant recipients that receive MHC-II conjugated ADLs are expected to exhibit increased C-peptide levels after transplant that are maintained over time, indicating the transplanted islets are functional (e.g., fasted C-peptide levels, glucose-stimulated C-peptide levels, and/or increase in C-peptide levels upon glucose stimulation).

Example 15. Stem Cell-Derived B Cells as a Source of Donor MHC-I and MHC-II Antigen for Tolerance Induction to Cells, Tissues, or Organs Derived from the Same Stem Cell Donor Stem cells from one donor can be differentiated into a first population of cells for use as apoptotic donor leukocytes (ADLs), and separately differentiated into a second population of cells for transplant. This technique can be used to induce tolerance to any universal cell-derived cell, tissue, or organ transplant.

The stem cells can be embryonic stems cells, induced pluripotent stem cells (iPSCs), and/or mesenchymal stem cells. The stem cells are differentiated into a first population of cells that express both MHC class I and MHC class II antigens. For example, iPSCs from a transplant donor are differentiated into B lymphocytes that express both MHC class I and II antigens. Methods of differentiating iPSCs into B cells are described, for example, in French A et al. (2015), Stem Cells and Development 24(9):1082-95.

Preferably, for increased tolerogenic efficacy, the donor stem cell-derived B cells share one MHC class II antigen with the recipient (e.g., at least one MHC class II DR allele, MHC class II DQ allele, or MHC class II DP allele). If grafts and B cells matching one recipient-type MHC class II antigen are not available, B cells can be conjugated with recipient-type MHC class II chains, domains, or peptides as described in Example 14, or any stem-cell-derived, MHC class I expressing cells (e.g., T cells) can be conjugated with recipient-type MHC class II antigens using ECDI or any other method.

Separately, the iPSCs are differentiated into a second population of cells to be transplanted.

The stem-cell derived B cells and/or MHC-II conjugated cells are treated with ECDI to generate apoptotic donor leukocytes (ADLs).

The stem cell-derived ADLs are administered to a subject that receives a transplant of cells, tissues, or organs derived from the same stem cell donor, thereby reducing the possibility of transplant rejection. The transplant recipient receives an intravenous infusion of stem cell-derived ADLs before and optionally after transplantation, for example, on day −7 and day +1 relative to transplantation.

The recipients can optionally be treated with a short term immunosuppressive regimen comprising: (i) an antagonistic anti-CD40 antibody, given intravenously at a dose of 50 mg/kg on day −8, −1, 7, and 14 relative to transplant; (ii) rapamycin, given orally from day −7 to day 21 relative to transplant with a target trough level of 5-12 ng/mL; (iii) soluble TNF receptor, given intravenously at a dose of 1 mg/kg on days −7 and 0 relative to transplant and subcutaneously at a dose of 0.5 mg/kg on days 3, 7, 10, 14, and 21 relative to transplant; and (iv) antagonistic anti-IL-6 receptor antibody, given intravenously at a dose of 10 mg/kg on days −7, 0, 7, 14, and 21 relative to transplant.

The recipient is expected to exhibit improved rejection-free survival compared to the recipients that do not receive the stem-cell derived ADLs.

This technique can be used to induce tolerance to any universal cell-derived cell, tissue, or organ transplant.

Example 16. Conjugation of Recipient-Type MHC Class II DRA to Mismatched Apoptotic Donor Leukocytes (ADLs) for Tolerance Induction This example demonstrates that conjugating recipient-type MHC class II DRA molecules to apoptotic donor leukocytes (ADLs) can enhance the tolerance-inducing efficacy of a preparatory regimen. In some cases, recipient-type MHC class II presenting peptides from the monomorphic DR alpha chain may serve as an activation signal to the subset of tTreg cells that are selected in the thymus for that cognate specificity. Any cell, such as any easily expandable T cell derived from a universal cell, can be conjugated with the same chain, domain, or peptide derived from the monomorphic DRA antigen and processed to generate ADLs that can be used for promoting tolerance to a transplant. This method can be broadly applicable to a range of transplant scenarios where the recipient is positive for the DRA antigen. For example, this method can be used to induce tolerance using a universal donor cell.

For donor-recipient pairs that are partially or fully MHC class I and class II mismatched, conjugating recipient-type MHC class II DRA molecules to apoptotic donor leukocytes (ADLs) can enhance ADL efficacy in inducing tolerance to a transplanted cell, tissue, or organ.

Coupling one or more peptides derived from one (or more) of the transplant recipient's MHC class II DRA molecules to the surface of ADLs can provide abundant amounts of recipient-type MHC class II DRA peptides for presentation by recipient MHC class II molecules after uptake of ADLs (for example, by recipient spleen marginal zone antigen presenting cells or liver sinusoidal endothelial cells).

Recognition of self MHC class II DRA can promote tolerance in the recipient, for example, via thymus-derived CD4+ Tregs (tTregs). tTregs are selected through recognition of their own MHC class II peptides, presented by their own MHC class II molecules. When this complex is presented on the surface of activated effector T cells, it can serve as a potent activation signal for tTregs, leading to tTreg activation and thus promotion of immune tolerance. Activated effector T cells can present such MHC complexes by the process of trogocytosis, which involves the exchange of entire MHC class II molecules presenting MHC class II peptides. Therefore, if recipient-type MHC class II molecules presenting recipient MHC class II DRA peptides are delivered to and presented by activated recipient T cells, this can serve as potent activation signals to tTregs. The activation of tTregs requires antigen specificity, but their regulatory function does not require antigen specificity. As such, activated tTregs can directly down-regulate anti-donor immunity, including donor-specific CD4+ and CD8+ T cells of direct and indirect specificities, and also down-regulate anti-donor immunity through expansion of other immune cell subsets with regulatory capabilities, including Tr1 cells.

The DR α-chain can be functionally monomorphic, which may make it a convenient target for tolerance induction. One or more chains, domains, or peptides derived from one (or more) of the transplant recipient's MHC class II DR α-chains is conjugated with ECDI (or with any other process) to the surface of the mismatched ADLs. The chains, domains, or peptides derived from a recipient's MHC class II molecule may comprise an entire DR alpha chain. The chains, domains, or peptides derived from a recipient's MHC class II molecule may comprise entire α1 and/or α2 domains of DR. The peptides derived from a recipient's MHC class II DRA may between about 10 and 30 amino acids in length. The peptides derived from a recipient's MHC class II DRA may be at least 10 to 30 amino acids in length. The peptides derived from a recipient's MHC class II DRA may be synthesized or recombinant.

The preparatory regimen of this example can readily be adapted to allotransplantation or xenotransplantation in mammalian recipients (for example, transplant of islets, kidneys, or other cells, tissues, or organs, such as embryonic stem cell derived and induced pluripotent stem cell (iPS) derived grafts of cells, tissues and organs). The ADLs can be prepared from splenocytes, peripheral blood, or differentiated stem cells as disclosed herein.

In an illustrative example, recipient type MHC class II DRA chains, domains, and/or or peptides are conjugated to stem cell-derived cells and treated to generate ADLs, and the ADLs are used to induce tolerance to a separately differentiated second population of stem cell-derived cells for transplant. This technique can be used to induce tolerance to any universal cell-derived cell, tissue, or organ transplant.

The stem cells can be embryonic stems cells or induced pluripotent stem cells (iPSCs). The stem cells are differentiated into a first population of cells. In some cases, the first population of cells expresses both MHC class I and MHC class II antigens. For example, iPSCs from a transplant donor are differentiated into B lymphocytes that express both MHC class I and II antigens. Methods of differentiating iPSCs into B cells are described, for example, in French A et al. (2015), Stem Cells and Development 24(9):1082-95. In some cases, for increased tolerogenic efficacy, the donor stem cell-derived B cells share one MHC class II antigen with the recipient (e.g., at least one MHC class II DR allele, MHC class II DQ allele, or MHC class II DP allele). In some cases, the donor stem cells do not share one MHC class II antigen with the recipient. In some cases, the donor stem-cell derived tolerance-inducing cells are T cells.

The stem cell-derived cells are conjugated with recipient-type MHC class II DRA chains, domains, or peptides, and are made into apoptotic donor leukocytes (ADLs) via treatment with ECDI or any other method.

Separately, the iPSCs are differentiated into a second population of cells to be transplanted.

The MHC class II DRA-conjugated ADLs are administered to a subject that receives a transplant of cells, tissues, or organs derived from the same stem cell donor, thereby reducing the possibility of transplant rejection. The transplant recipient receives an intravenous infusion of MHC class II DRA-conjugated ADLs before and optionally after transplantation, for example, on day −7 and day +1 relative to transplantation.

The recipients can optionally be treated with a short term immunosuppressive regimen comprising: (i) an antagonistic anti-CD40 antibody, given intravenously at a dose of 50 mg/kg on day −8, −1, 7, and 14 relative to transplant; (ii) rapamycin, given orally from day −7 to day 21 relative to transplant with a target trough level of 5-12 ng/mL; (iii) soluble TNF receptor, given intravenously at a dose of 1 mg/kg on days −7 and 0 relative to transplant and subcutaneously at a dose of 0.5 mg/kg on days 3, 7, 10, 14, and 21 relative to transplant; and (iv) antagonistic anti-IL-6 receptor antibody, given intravenously at a dose of 10 mg/kg on days −7, 0, 7, 14, and 21 relative to transplant.

The recipient is expected to exhibit improved rejection-free survival compared to the recipients that do not receive the MHC class II DRA-conjugated ADLs.

This technique can be used to induce tolerance to any universal cell-derived cell, tissue, or organ transplant.

Example 17. Conjugating a Common Donor MHC Class I Antigen to Ex Vivo Expanded, Recipient-Derived B Cells Via ECDI While conjugating recipient-type MHC class II peptides to donor apoptotic donor leukocytes as disclosed herein can be effective for inducing tolerance to a transplant, MHC class II can be a challenging molecule to manufacture. To circumvent the difficulties associated with the manufacture of large quantities of recipient-type MHC class II DRB (or DP and DQ) peptides for coupling to apoptotic donor leukocytes of MHC class II-disparate donors, B lymphocytes can be taken from a recipient, expanded, and coupled via ECDI with a MHC class I α chain, domain, or peptide of an allele that is very common in the donor population (e.g., HLA-A*02, 24, 01 or HLA-B*35, 44, 51). For example, B lymphocytes can be obtained from a transplant recipient approximately 3 weeks before a planned organ or islet cell transplant from a MHC class I- and II-mismatched cadaveric donor, expanded, and coupled via ECDI with a MHC class I α chain of an allele that is very common in the donor population (e.g., HLA-A*02, 24, 01 or HLA-B*35, 44, 51).

B cells as carriers of antigen can be obtained by low-volume leukapheresis in a non-cytokine-stimulated recipient, providing an input yield of naïve B cells of approximately $0.5 \times 10^9$ cells. These cells express copious amounts of self MHC class II molecules before and after ex vivo expansion in the presence of IL-2, IL-4, IL-21, BAFF, and CD40L-multimeric (or in the presence of other cytokine and growth factor combinations). A $\geq$120-fold ex vivo expansion of B cells in 2 weeks would provide, considering cell losses due to exposure to ECDI and setting aside 5 to $10 \times 10^9$ B cells as input cell yield for the day +1 cell therapy product, a dose of apoptotic autologous leukocytes of $35 \times 10^9$ cells for IV infusion on day −7, and a similar dose after continued expansion for infusion on day +1. Any cadaveric donor (e.g., organ or islet cell donor) that expresses the MHC class I allele that was coupled to autologous B cells via ECDI would be considered a suitable donor for tolerance induction, as long as linked suppression and infectious tolerance will extend tolerization to T cells with specificities for other mismatched antigens. An immunosuppression regimen (e.g., a short-term immunosuppression regimen as disclosed herein) can be administered to the recipient.

Example 18. Tolerance Induction Using Ex Vivo Expanded, Recipient-Derived B Cells Via a Shared MHC Class I Antigen Using ex vivo expanded, recipient-derived B cells may allow tolerance induction to living unrelated donor grafts that don't share a MHC class II allele with the recipient. The peritransplant infusion of apoptotic autologous B cells is expected to activate and expand tTregs in the recipient.

B lymphocytes can be taken from a recipient and expanded. For example, B lymphocytes can be obtained from a transplant recipient approximately 3 weeks before a planned transplant. B cells as carriers of antigen can be obtained by low-volume leukapheresis in a non-cytokine-stimulated recipient, providing an input yield of mature naïve B cells of approximately $0.5 \times 10^9$ cells. These cells express copious amounts of self MHC class II molecules before and after ex vivo expansion in the presence of IL-2, IL-4, IL-21, BAFF, and CD40L-multimeric (or in the presence of other cytokine and growth factor combinations). A $\geq$120-fold ex vivo expansion of B cells in 2 weeks would provide, considering cell losses due to exposure to ECDI and setting aside 5 to $10 \times 10^9$ B cells as input cell yield for the day +1 cell therapy product, a dose of apoptotic autologous leukocytes of $35 \times 10^9$ cells for IV infusion on day −7, and a similar dose after continued expansion for infusion on day +1.

In some cases, the B lymphocytes can be coupled via ECDI with a MHC class I a chain, domain, or peptide of an allele that is shared with a donor. Any donor (e.g., organ or islet cell donor) that expresses the MHC class I allele that was coupled to autologous B cells via ECDI would be considered a suitable donor for tolerance induction, as long as linked suppression and infectious tolerance will extend tolerization to T cells with specificities for other mismatched antigens.

In some cases, if the MHC class II-mismatched unrelated living donor shares at least one MHC class I antigen with the recipient, it might not be necessary to couple a mismatched MHC class I donor antigen to the surface of expanded, autologous apoptotic donor B cells for tolerance induction.

An immunosuppression regimen (e.g., a short-term immunosuppression regimen as disclosed herein) can be administered to the recipient.

Example 19. Apoptotic Donor Leukocytes Promote Stable Islet Allograft Tolerance

This example shows that a preparatory regimen or tolerizing vaccine of the disclosure can induce long term tolerance to islet allografts. Two peritransplant infusions of apoptotic donor leukocytes under short-term immunotherapy with antagonistic anti-CD40 antibody 2C10R4, rapamycin, soluble tumor necrosis factor receptor, and anti-interleukin 6 receptor antibody induce long-term ($\geq$1 year) tolerance to islet allografts in nonsensitized, MHC class I-disparate, and one MHC class II DRB allele-matched rhesus macaques.

Study Animals

Cohorts of purpose-bred monkey (*Macaca mulatta*) donors and recipients were obtained from a qualified vendor. Demographics of the recipient monkeys are presented in Table 7.

TABLE 7 demographics of recipient monkeys.

| Cohort | n | STZ-induced diabetes | Islet transplant | ADL infusions |
|---|---|---|---|---|
| A (exploratory) | 3 | No | No | Yes |
| B (control, no ADLs) | 7 | Yes | Yes | NO |
| C (exptl, ADLs) | 5 | Yes | Yes | Yes |

The exploratory group (cohort A) included 3 males aged 7.3±0.1 years and weighed 12.5±1.5 kg. The control cohort (B) included 8 males aged 4.3±2.1 years and weighed 6.2±1.6 kg. The experimental cohort (C) included 7 males and 1 female aged 4.1±1.7 years and weighed 5.2±1.2 kg. The donor cohort included 19 males aged 6.7±3.3 years and weighed 11.7±3.6 kg.

Animals were free of herpes virus-1 (B virus), simian immunodeficiency virus, type D simian retrovirus, and simian T-lymphotropic virus. Eligibility additionally included ABO compatibility and study-defined MHC matching (MHC-I-disparate and one MHC-II DRB allele-matched donor-recipient pairs). All animals underwent high-resolution MHC-I and -II genotyping by 454 pyrosequencing. In cohorts B and C, diabetes was induced with STZ (100 mg/kg IV) and was confirmed by basal C-peptide <0.3 ng/mL and negative C-peptide responses to IV glucose challenge.

ADL Processing

On day −7 relative to islet transplantation, splenocytes were isolated from donor monkey spleens, red blood cells lysed, and remaining cells enriched for B cells with nylon wool columns. The cells (80%) were agitated on ice for 1 h with ECDI (30 mg/mL per $3.2 \times 10^8$ cells) in Dulbecco's phosphate-buffered saline (PBS), washed, cleaned of necrotic cells and microaggregates, and assessed for viability/necrosis by acridine orange/propidium iodide (PI) fluorescent microscopy. ECDI-fixed splenocytes were loaded into cold syringes (n=9) or IV bags (n=2) for IV infusion at a target dose of $0.25 \times 10^9$ cells per kilogram recipient body weight with a maximum concentration of $20 \times 10^6$ cells/mL and remained on ice until recipient administration. Induction of apoptosis was monitored in vitro by incubating ECDI-fixed cells at 37° C. for 4-6 hours, labelling with Annexin V/PI, and analyzing by fluorescent microscopy.

To meet the target dose of ECDI-fixed ADLs for day +1 infusion, blood drawn from donor monkeys on days −15 and −7 relative to islet transplant, and the remaining 20% of splenic cells, were enriched for B cells via magnetic sorting using NHP CD20 beads and expanded ex vivo in a GREX100M flask until day +1 in the presence of rhIL-10 (10 ng/mL), rIL-4 (10 ng/mL), rhBAFF (30 ng/mL), rhTLR9a (10 ng/mL), and either rhCD40L-MEGA or both rhCD40L multimeric (500 ng/mL) and rhAPRIL (50 ng). Expanded cells were stimulated with rhIL-21 (5 ng/mL), 24 h prior to harvest. Recipients were pretreated prior to infusion with a combination of diphenhydramine 12.5 mg, acetaminophen 160 mg, and ondansetron 4 mg per os (PO).

Short-Term Immunosuppression

Immunosuppression was administered to all recipient monkeys in Cohorts A-C. To cover all ADL infusions in Cohorts A and C monkeys, a first dose of each drug was given to all recipients in Cohorts A-C on day −8 or −7 relative to islet transplant on day 0. Antagonistic anti-CD40 mAb 2C10R4, was given IV at 50 mg/kg on days −8, −1, 7, and 14. Rapamycin (Rapamune®) was given PO from day −7 through day 21 posttransplant; the target trough level was 5-12 ng/mL. Concomitant anti-inflammatory therapy consisted of: (i) αIL-6R (tocilizumab, Actemra®) at 10 mg/kg IV on days −7, 0, 7, 14, and 21, and (ii) sTNFR (etanercept, Enbrel®) at 1 mg/kg IV on days −7 and 0 and 0.5 mg/kg subcutaneous on days 3, 7, 10, 14, and 21. Exploratory cohort monkeys were terminated at day +7, accordingly the last dose of immunosuppression was given to these monkeys on day +7.

Islet Processing, Transplantation, and Function

Donor monkeys underwent total pancreatectomy, and islets were isolated, purified, cultured for 7 days to minimize direct pathway stimulatory capacity, and subjected to quality control. On day 0, a target number of ≥5000 IE/kg by DNA with endotoxin contents of ≤1.0 EU/kg recipient body weight were transplanted non-surgically using the indwelling intraportal vascular access port into STZ diabetic monkeys. Protective exogenous insulin was stopped at day 21 posttransplant in animals with full graft function. Metabolic monitoring included daily a.m./p.m. blood glucose, weekly C-peptide, monthly HbA1c, mixed meal testing, and bimonthly IV glucose tolerance tests with determination of acute C-peptide response to glucose and glucose disappearance rate (Kg).

Histopathology of Islet Grafts

Liver specimens were obtained from 10 different anatomical areas in each recipient, fixed in 10% formalin, and processed for routine histology. Sections from each of the ten blocks were stained with hematoxylin & eosin or immunostained for insulin to score transplanted islets. Rejection-free islet allograft survival was confirmed by demonstrating at necropsy on graft histopathology a considerable number of intact A-type and mildly infiltrated B-type islets with no or very few C- to F-type islets (moderately to markedly infiltrated islets and islets partially or completely replaced by infiltrates or fibrosis).

Flow Cytometric Analysis of Immune Cell Phenotypes

Multicolor flow cytometric analyses were performed on cryopreserved PBL, LMNC, and LN samples of Cohort B-C monkeys. In all, $1 \times 10^6$ cells were stained with viability dye to discriminate viable cells from cell debris. The cells were stained for 25 min at room temperature (RT) with antibodies, fluorescence-minus-one, and/or isotype controls, followed by fixation and wash. To assess regulatory T cells and proliferating T and B cells and intracellular cytokines, PBLs were stained with antibodies recognizing extracellular epitopes (CD3, CD4, CD8, CD25, and CD127), followed by fixation/permeabilization with the FoxP3 Fixation/Permeabilization Kit and staining with anti-FoxP3, Ki67, IFN-γ, IL-10, and TGF-β antibodies. A minimum of 200,000 events were acquired on three-laser BD Canto II (BD Bioscience) with FACSDIVA 6.1.3. Relative percentages of each of these subpopulations were determined using the FlowJo 10.1. software (TreeStar).

Gating Strategies

First, cells were gated on FSC-H vs. FSC-A and then on SSC-H vs. SSC-A to discriminate doublets. Lymphocytes were then gated based on well-characterized SSC-A and FSC-A characteristics. Dead cell were excluded based on viability dye. The following phenotypic characteristics were used to define immune cell populations: T cells: CD3+ lymphocytes; CD4+ T cells: CD4+/CD3+/CD8−; CD8+ T cells: CD8+/CD3+/CD4−; CD4 or CD8 TEM cells were determined as CD2hi/CD28− within CD4 or CD8 T cells. Expression of PD-1, Tbet, CD40 and Ki67 were determined on both CD4+, CD8+ T cells and CD20+ B cells. Chemokines receptor (CXCR-5) expression was examined on CD4 T cells to enumerate Tfh cells: CXCR5+CD4+ T cells. Treg cells: CD127-FoxP3+ of gated $CD4^+$ CD25+ lymphocytes. NS cells: CD8+CD122+ of gated CD8 lymphocytes. Breg cells: regulatory B cells (CD24hiCD38hi), B10 cells: (CD24hiCD27+) within CD3−CD19+/CD20+ lymphocytes based on the expression of CD24, CD27, and CD38 antigens. Gated Lin−(CD3−CD20−) HLA-DR-CD14+ cells were analyzed to enumerate MDSC: CD11bhiCD33hi of CD14+Lin−HLA-DR− cells.

Donor-Specific T and B Cell Responses

MLRs were performed on cryo-banked PBL samples from islet donors and transplant recipients. Responder PBLs (300,000 cells) samples from recipient monkeys were labeled with 2.5 µM CFSE and were cocultured with irradiated (3000 cGy) VPD-450-labeled stimulator PBLs (300,000 cells) from islet donors (donor).

ADLs Promote Stable Islet Allograft Tolerance

Figure 8A:
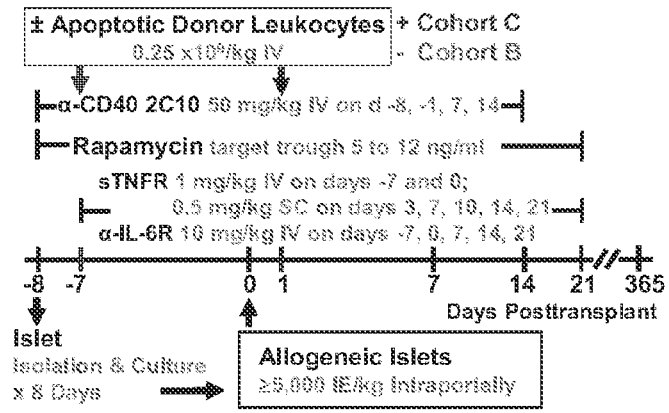
FIG. 8A illustrates a preparatory regimen used in an example of the disclosure. Cohort B were administered short term immunosuppression, while cohort C were administered short term immunosuppression and apoptotic donor leukocytes.
Figure 8B:
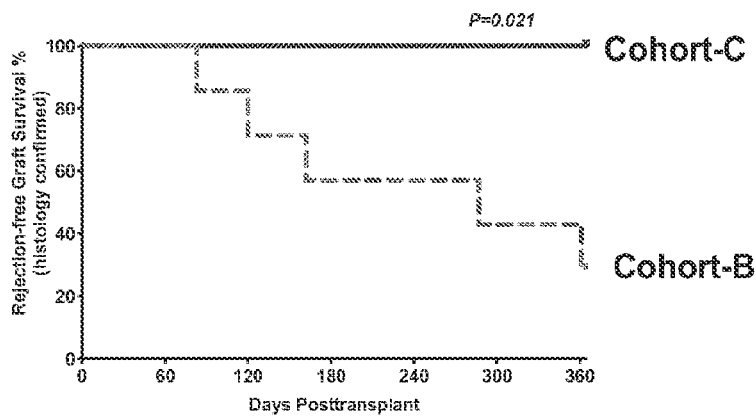
FIG. 8B provides a Kaplan-Meir estimate of rejection-free islet allograft survival. The administration of preparatory and tolerizing regimen comprising apoptotic leukocytes as described herein was associated with significantly improved survival. P=0.021, Mantel-Cox.

Monkeys in Cohorts B and C received one DRB-matched islet transplants after streptozotocin (STZ)-induced diabetes. Both cohorts received short term immunosuppression, while only cohort C received apoptotic donor leukocytes (ADLs) (FIG. 8A). ADL infusion was associated with significantly improved survival (FIG. 8B). All cohort C monkeys exhibited operational tolerance of islet allografts for ≥365 days posttransplant. 2 of the 7 cohort B monkeys accepted the intraportal transplants for ≥365 days.

Figure 9A:
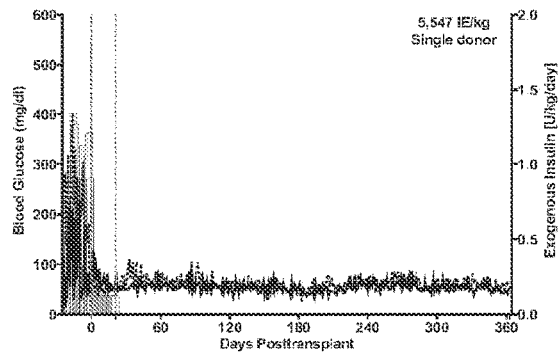
FIGS. 9A-F illustrate that administration of preparatory and tolerizing regimen comprising apoptotic leukocytes as described herein facilitate stable tolerance of islet allografts.
Figure 9B:
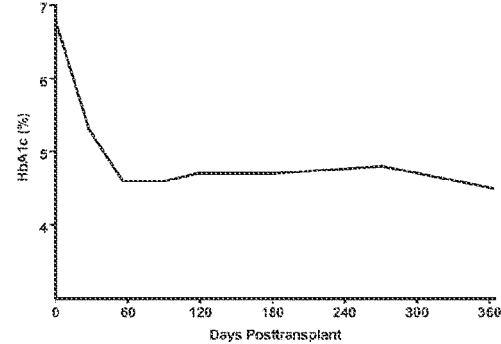
Figure 9C:
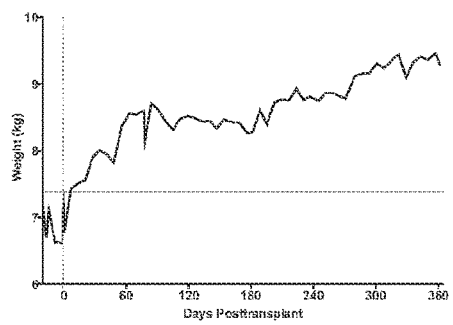
Figure 9D:
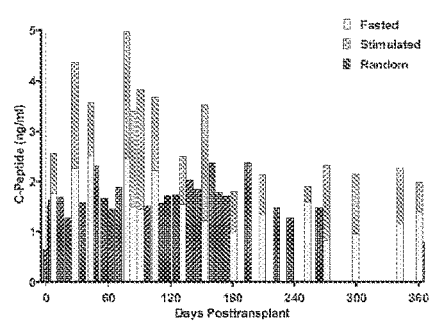
Figure 9E:
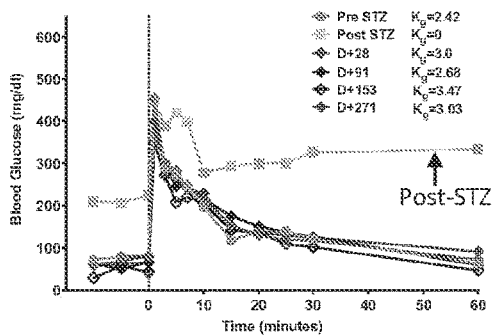
Figure 9F:
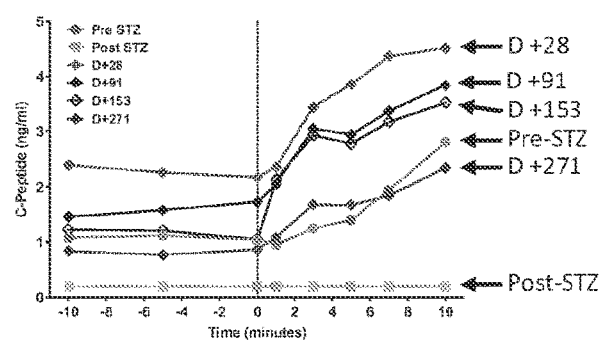

A monkey from cohort C became normoglycemic immediately posttransplant and remained so, even after discontinuation of immunosuppression and exogenous insulin on day 21 posttransplant (FIG. 9A). That recipient's glycated hemoglobin (HbA1c) level became and remained normal posttransplant (FIG. 9B). The continued weight gain posttransplant (FIG. 9C), also observed in other Cohort C monkeys, is consistent with the overall safety of the treatment regimen. Pretransplant serum C-peptide levels and responses to glucose stimulation were negative in all five recipients. In a monkey from cohort C, the strongly positive posttransplant fasting and random serum C-peptide levels and their increase after stimulation throughout the 1-year follow-up confirmed stable islet allograft function (FIG. 9D). That recipient showed stable posttransplant blood glucose disappearance rates (Kg) after IV challenge with glucose that were comparable with the pre-STZ rate (FIG. 9E); the C-peptide levels derived from matching tests showed substantial increases of >1 ng/mL throughout the posttransplant course (FIG. 9F). Histopathologic analysis of that recipient's liver at necropsy revealed numerous intact islets, with no or minimal periislet infiltration (FIG. 10A). The transplanted, intrahepatic islets showed strongly positive staining for insulin (FIG. 10B); the absence of insulin-positive islet beta cells in the native pancreas at necropsy (FIG. 10C) indicated that posttransplant normoglycemia reflected graft function and was not due to remission after STZ-induced diabetes.

Figure 11A:
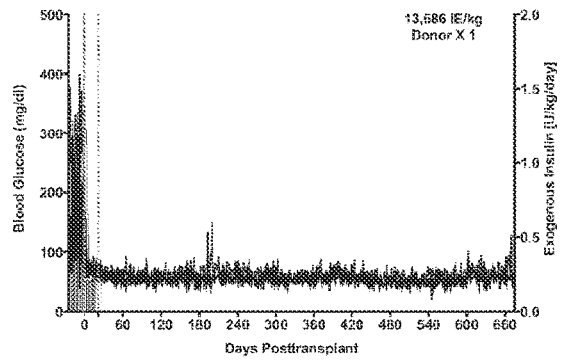
FIGS. 11A-F demonstrates that a transplant recipient that received a preparatory regimen of the disclosure, that was not sacrificed at 1 year posttransplant, exhibited continued islet allograft function for >2 years after discontinuation of immunosuppression.
Figure 11B:
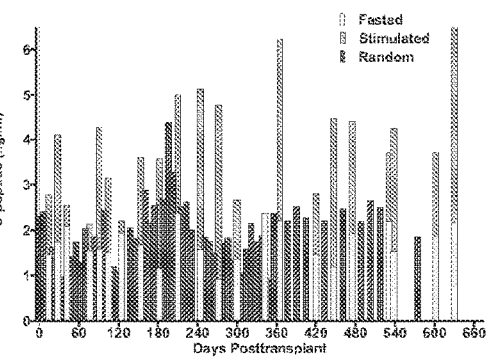
Figure 11C:
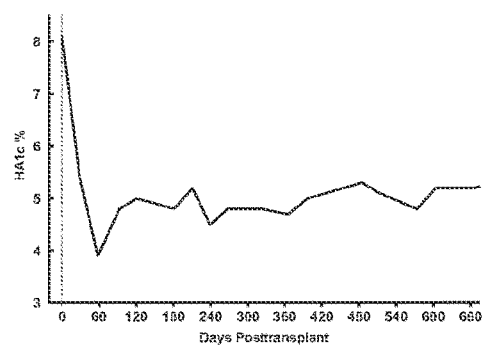
Figure 11D:
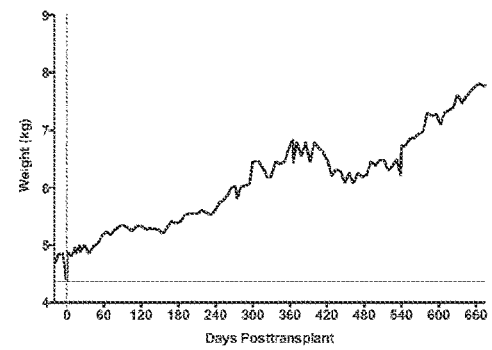
Figure 11E:
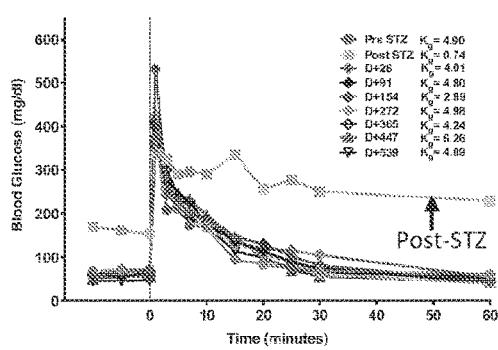
Figure 11F:
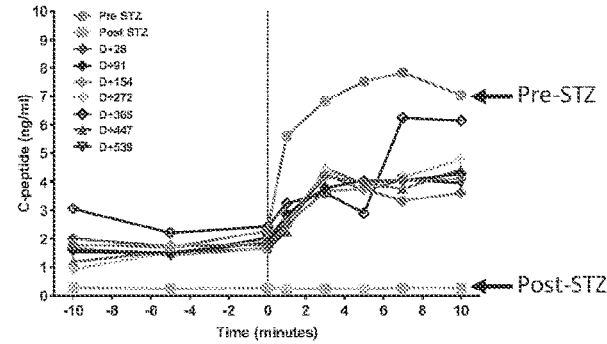

A cohort C monkey that was not sacrificed at 1 year posttransplant exhibited continued islet allograft function for >2 years after discontinuation of immunosuppression (FIGS. 11A-F). FIG. 11A provides pre- and postprandial blood glucose (solid and dashed lines, respectively) and daily insulin (bars). FIG. 11B demonstrates positive and stable C-peptide levels (fasted, random, and mixed meal-stimulated) throughout follow-up. FIG. 11C shows restoration of near-normal HbA1c levels throughout follow-up. FIG. 11D shows continued weight gain posttransplant, indicating that posttransplant euglycemia is not due to a malabsorptive state. FIG. 11E shows blood glucose before and after IV infusion of 0.5 g glucose kg-1 (IVGTT) and Kg levels before and after diabetes induction and posttransplant. FIG. 11F shows Acute C-peptide response to IV glucose (0.5 g kg-1).

Figure 13A:
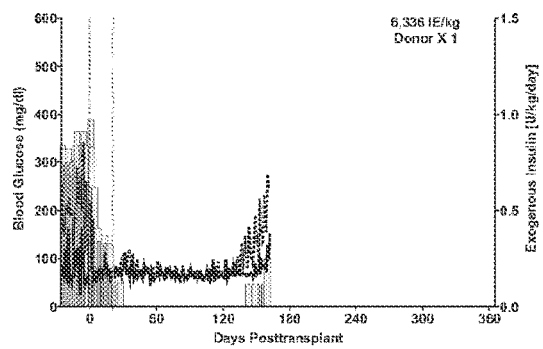
FIGS. 13A-F show that a monkey that did not receive administration of preparatory and tolerizing regimen comprising apoptotic leukocytes as described herein displayed gradual deterioration of graft function, especially as was evident 4 months posttransplant.
Figure 13B:
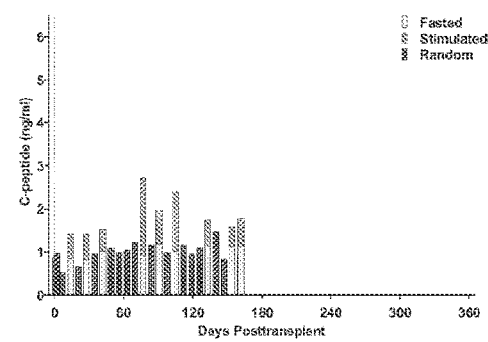
Figure 13C:
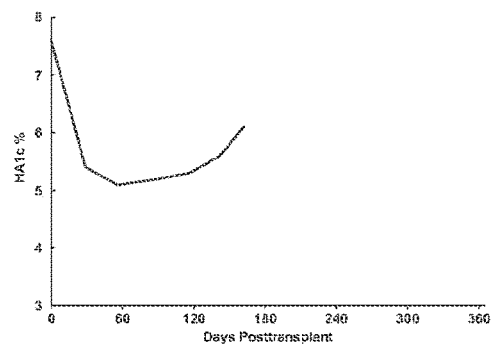
Figure 13D:
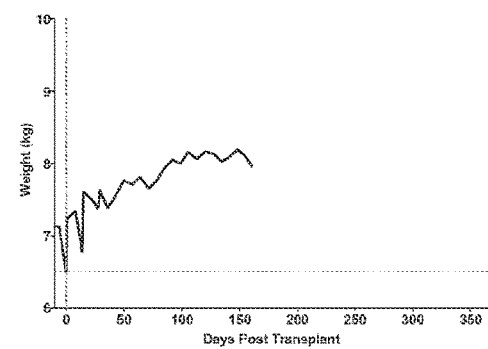
Figure 13E:
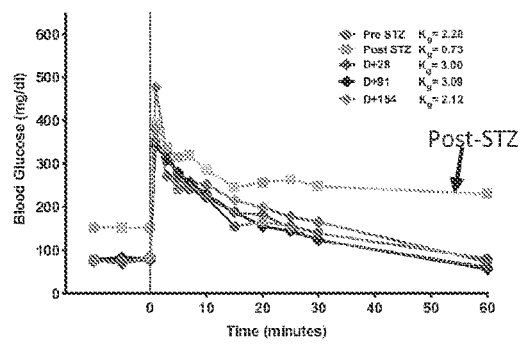
Figure 13F:
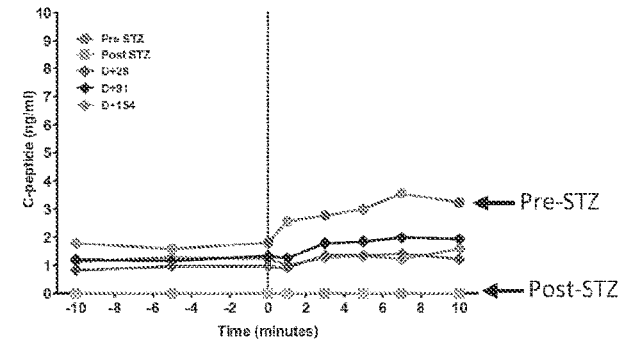

At necropsy, histopathology confirmed rejection-free islet allograft survival in that monkey (FIG. 12). By comparison, a cohort B monkey (that did not receive ADLs) became normoglycemic posttransplant, but deterioration of graft function was evident starting 4 months posttransplant (FIGS. 13A-F). FIG. 13A shows pre- and postprandial blood glucose levels (solid and dashed lines, respectively) and daily insulin (bars). Postprandial instability was apparent starting day 133 post-transplant with an upward trend, suggestive of allograft loss due to rejection. FIG. 13B shows C-peptide levels (fasted, random, and mixed meal-stimulated) became positive posttransplant and basal levels remained at approximately 1 ng mL-1 through day 161 posttransplant. FIG. 13C shows restoration of near-normal HbA1c levels, then increased levels beginning around day 140 with a continued upward trend. FIG. 13D shows continued weight gain posttransplant, indicating that posttransplant euglycemia is not due to a malabsorptive state. FIG. 13E shows blood glucose levels before and after IV infusion of 0.5 g glucose kg-1 (IVGTT) and Kg levels before and after diabetes induction and post-transplant. FIG. 13F shows acute C-peptide responses to IV glucose (0.5 g kg-1). Necropsy 1 month later confirmed rejection.

These results demonstrated the long-term functional and histologic survival of one DRB-matched islet allografts in ADL-treated monkeys, even after discontinuation of immunosuppression, indicating robust tolerance in a stringent, translational model. These results demonstrate that a preparatory regimen or tolerogenic vaccine of the disclosure can promote long-term functional and histologic survival of allografts.

ADLs Suppress Effector Cell Expansion and Function

Figure 14A:
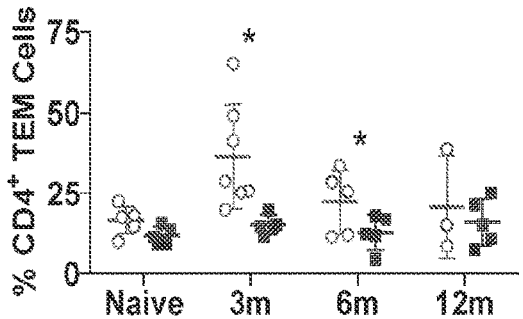
FIGS. 14A-F show effector cell responses in cohorts B and C before and at various times after transplant.
Figure 14D:
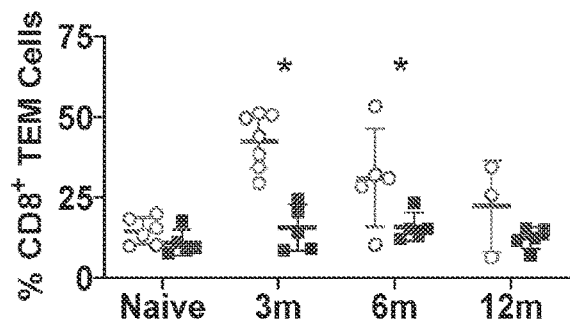
Figure 14B:
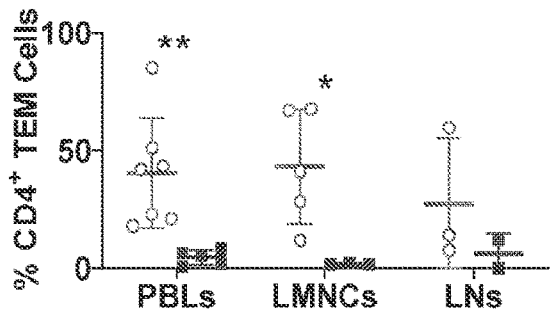
Figure 14E:
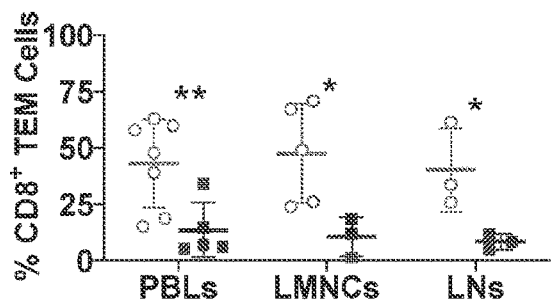
Figure 14C:
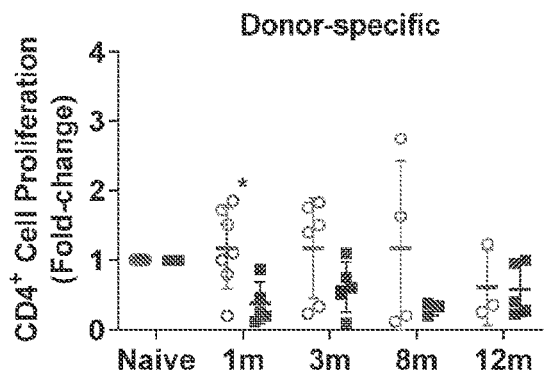
Figure 14F:
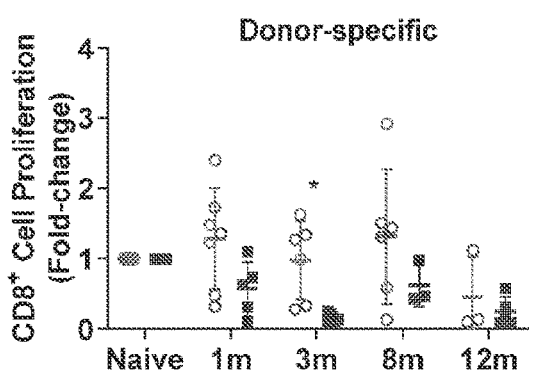

Effector cell responses in cohorts B and C were compared. Peritransplant ADL infusions (cohort C) were associated with prolonged suppression of expansion of circulating liver mononuclear cells (LMNCs), mesenteric lymph node (LNs), and antidonor CD4+ (FIGS. 14A-C) and CD8+ (FIGS. 14D-F) T effector memory (TEM) cells. The analysis of LMNCs and LNs was performed at the time of rejection or scheduled termination, which varied for Cohort B but not for Cohort C animals. The percentages of CD4+ and CD8+ TEM cells within LMNCs and LNs were low at 1 year or later posttransplant in tolerant Cohort C monkeys as shown in FIG. 14B and FIG. 14E; those percentages would presumably have been equally low had the tolerant animals been sacrificed earlier before 1 year posttransplant as Cohort B monkeys that had lost graft function.

Figure 15A:
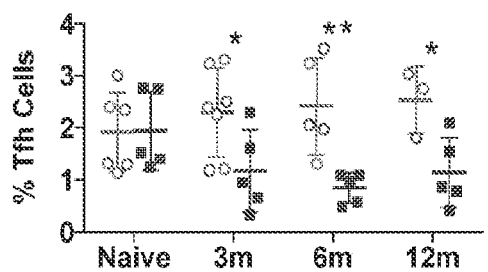
FIGS. 15A-D show the frequency of immune cell subsets in cohorts B and C before and at various times after transplant. Percentages are shown for circulating follicular helper cells (Tfh, FIG. 15A), PD-1+CD4+ T cells (FIG. 15B), PD-1+CD8+ T cells (FIG. 15C), and CD20+B cells (FIG. 15D).
Figure 15B:
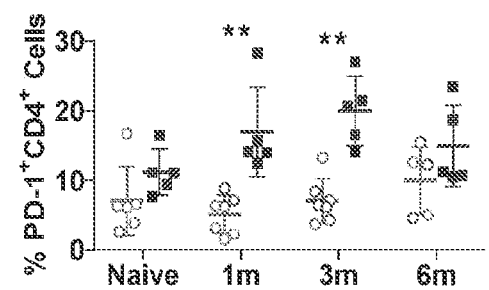
Figure 15C:
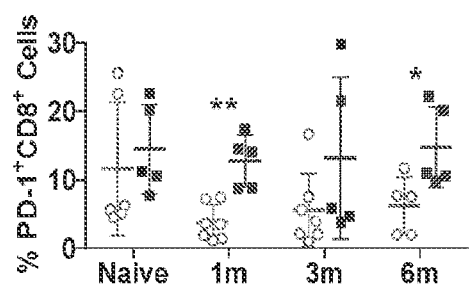
Figure 15D:
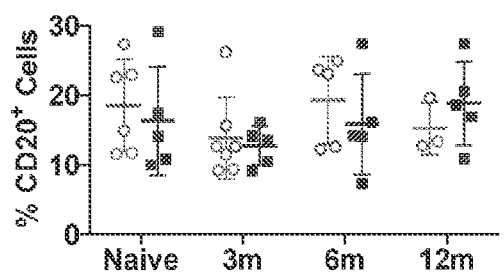

Throughout the 12-month posttransplant follow-up, ADL infusions were associated with a low frequency of circulating T follicular helper (Tfh) cells in Cohort C compared with Cohort B monkeys (FIG. 15A). The proportions of PD-1+ CD4+ T cells (FIG. 15B) and PD-1+CD8+ T cells (FIG. 15C) was higher posttransplant in Cohort C vs. Cohort B, suggesting T cell-exhausted phenotype induction by ADLs. The frequency of circulating CD20+ B cells was similar in Cohorts B and C (FIG. 15D).

Collectively, peritransplant ADL infusions impeded the posttransplant activation and expansion of effector T and B cells, as well as their recruitment to allografts in one DRB-matched monkeys on short-term immunosuppression. These results demonstrate that a preparatory regimen or tolerogenic vaccine of the disclosure can suppress effector immune cell expansion and function in transplant recipients.

ADLs Expand Immune Regulatory Cells in Transplant Recipients

The frequency of lymphoid and myeloid cells with regulatory phenotypes in Cohorts B and C were compared.

Figure 16A:
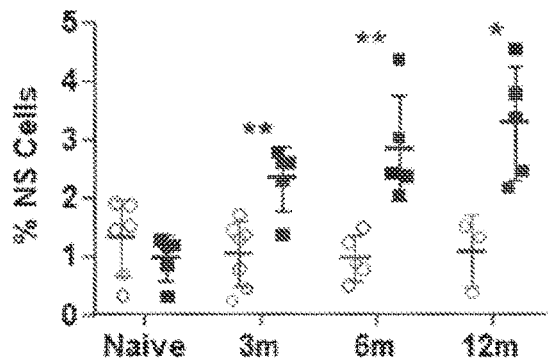
FIGS. 16A-D demonstrate the percentage of immune regulatory cell subsets in cohorts B and C.
Figure 16B:
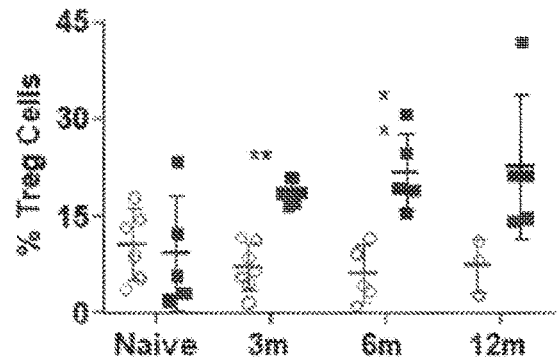
Figure 16C:
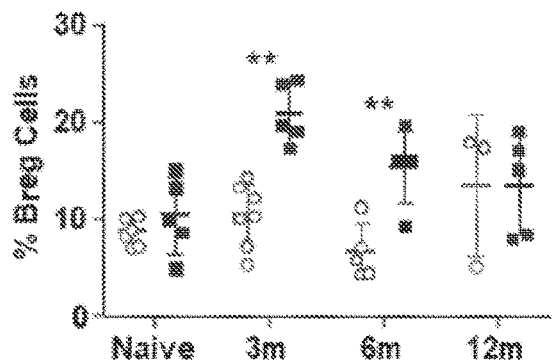
Figure 16D:
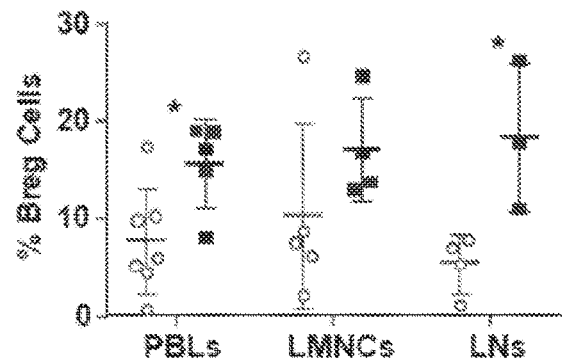

A significantly higher percentage of circulating natural suppressor (NS) and Treg cells were observed in ADL-treated animals throughout the posttransplant follow-up period (FIG. 16A and FIG. 16B). Regulatory B cells (Breg) were also significantly more abundant in the circulation (FIG. 16C) during the posttransplant follow-up period, and in the liver and LNs at sacrifice (FIG. 16D) in Cohort C than in Cohort B monkeys.

Figure 17A:
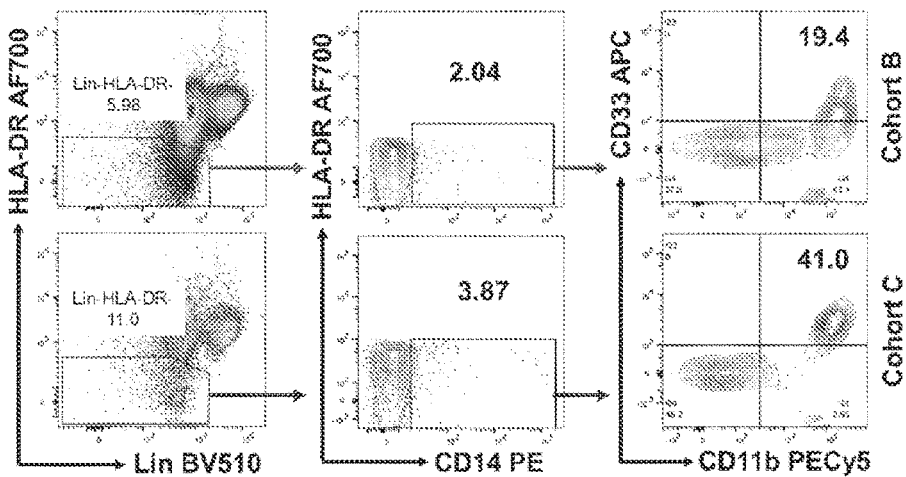
FIGS. 17A-E show ADLs as part of tolerizing and preparatory regimen induces expansion of MDSC and tolerogenic APCs.

Myeloid derived suppressor cells (MDSCs) were also significantly more abundant in the circulation during the posttransplant follow-up period. FIG. 17A shows a gating strategy for identification of MDSC. Singlets were gated first to eliminate doublets and dead cells were excluded. Based on CD33+ and CD11b+ coexpression, MDSCs were identified in gated CD14+ cells within the Lin−HLA-DR− population and with Lin depicting CD3−CD20− cells. Representative FACS profiles from one Cohort B (upper) and one Cohort C (lower) monkeys are shown.

Figure 17B:
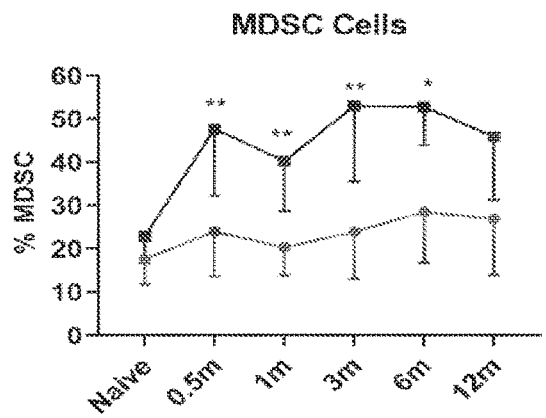

Additional studies on the effect of ADL infusions on circulating MDSCs on day 14 posttransplant shows a substantial increase in Cohort C (from 22.86±6.20% to 47.74±15.48% of CD14+Lin−HLA-DR− cells) and only a small increase in Cohort B (from 17.65±5.80% to 24.01±10.45% of CD14+Lin−HLA-DR− cells). FIG. 17B shows a significant increase in percentage of circulating MDSC among Cohort C monkeys compared to Cohort B monkeys.

Figure 17C:
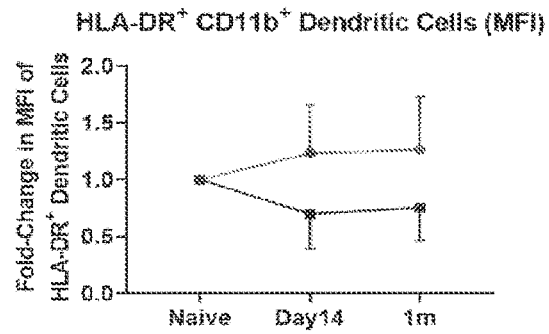
Figure 17D:
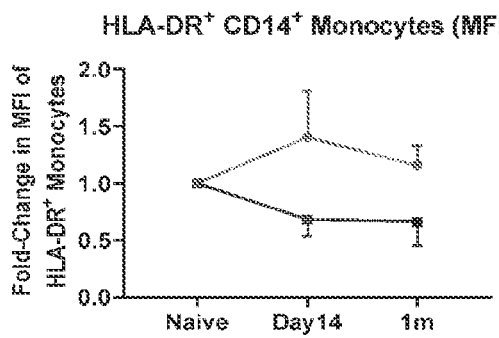
Figure 17E:
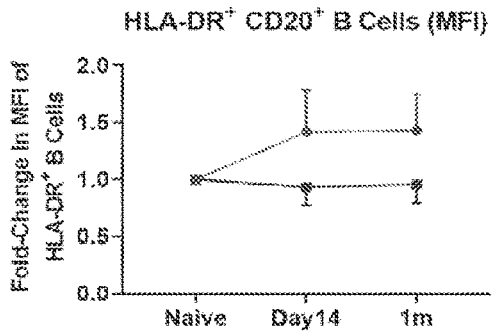

The effects of ADL infusions on APC subsets were also analyzed. Interestingly, when comparing Cohorts B and C, ADL infusions were associated with downregulation of HLA-DR expression in CD11b+ DCs, CD14+ monocytes, and only marginally in CD20+ B cells at 2 and 4 weeks posttransplant, whereas HLA-DR expression increased in all three APC subsets in control Cohort B subsets (FIG. 17C-E). FIG. 17C shows the fold-change in MFI of circulating HLA-DR+ CD11b+ dendritic cells. FIG. 17D shows the fold-change in MFI of circulating HLA-DR+ CD14+ monocytes. FIG. 17E shows the fold-change in MFI of circulating HLA-DR+ CD20+ B cells.

These data indicate that peritransplant ADL infusions promote the posttransplant expansion of regulatory immune cell subsets in one DRB-matched monkeys that receive short-term immunosuppression. These results demonstrate that a preparatory regimen or tolerogenic vaccine of the disclosure can promote regulatory immune cell expansion and function in transplant recipients.

What is claimed is:

1. A method of tolerizing a subject to a cell, organ, or tissue transplant, said method comprising:
   (a) administering to said subject at least one dose of a pre-transplant preparatory regimen at least 7 days prior to the cell, organ, or tissue transplant, wherein the pre-transplant preparatory regimen comprises:
      (i) apoptotic leukocytes fixed in a crosslinking agent;
      (ii) an mTOR inhibitor;
      (iii) an anti-tumor necrosis factor agent or an anti-tumor necrosis factor receptor agent;
      (iv) an anti-interleukin 6 agent or an anti-interleukin 6 receptor agent; and
      (v) an anti-CD40 agent or an anti-CD40 ligand agent; and
   (b) administering to the subject 1 day after transplantation apoptotic B cells, wherein the apoptotic B cells comprise B cells that are enriched from a population of leukocytes by negative selection, ex vivo-expanded in the presence of cytokines, and fixed in a crosslinking agent, wherein the apoptotic B cells are administered to the subject 1 day after transplantation of the cell organ, or tissue transplant; and
   (c) administering to the subject at least 7 days after transplantation immunosuppressive agents, wherein the immunosuppressive agents comprise:
      (i) an mTOR inhibitor;
      (ii) an anti-tumor necrosis factor agent or an anti-tumor necrosis factor receptor agent;
      (iii) an anti-interleukin 6 agent or an anti-interleukin 6 receptor agent; and
      (iv) an anti-CD40 agent or an anti-CD40 ligand agent, thereby tolerizing the subject to the cell, organ, or tissue transplant.

2. The method of claim 1, wherein a target trough level of said mTOR inhibitor in said subject is about 5-12 ng per mL.

3. The method of claim 1, wherein said anti-interleukin 6 receptor agent is an antagonistic anti-interleukin 6 receptor antibody or antigen-binding fragment thereof.

4. The method of claim 1, wherein said subject and a donor of said cell, tissue, or organ transplant are MHC class I mismatched or MHC class II mismatched.

5. The method of claim 1, wherein said subject and a donor of said cell, tissue, or organ transplant are haploidentical.

6. The method of claim 1, wherein said subject and a donor of said cell, tissue, or organ transplant are matched for at least one MHC class I A allele, MHC class I B allele, MHC class II DR allele, MHC class II DQ allele, or MHC class II DP allele.

7. The method of claim 1, wherein the apoptotic leukocytes or the apoptotic B cells and the subject are matched for at least one of MHC class I A allele, MHC class I B allele, MHC class II DR allele, MHC class II DQ allele, or MHC class II DP allele.

8. The method of claim 1, wherein the apoptotic leukocytes or the apoptotic B cells and the subject are completely MHC mismatched.

9. The method of claim 1, wherein the apoptotic leukocytes or the apoptotic B cells and the cell, tissue, or organ transplant are matched for at least one MHC class I A allele, MHC class I B allele, MHC class II DR allele, MHC class II DQ allele, or MHC class II DP allele.

10. The method of claim 1, wherein the apoptotic leukocytes or the apoptotic B cells and the cell, tissue, or organ transplant are haploidentical.

11. The method of claim 1, wherein the apoptotic leukocytes or the apoptotic B cells are from a donor of said cell, tissue, or organ transplant.

12. The method of claim 1, wherein the apoptotic leukocytes or the apoptotic B cells comprise conjugated on its surface one or more peptides derived from a MHC class II molecule of the subject.

13. The method of claim 1, wherein the apoptotic leukocytes or the apoptotic B cells are derived from the subject or derived upon differentiation of stem cells from the subject, and wherein the apoptotic leukocytes or the apoptotic B cells comprise one or more peptides derived from a MHC class I molecule conjugated to its surface.

14. The method of claim 1, wherein said crosslinking agent comprises a carbodiimide.

15. The method of claim 1, wherein said crosslinking agent comprises genipin, acrylic aldehyde, diformyl, osmium tetroxide, a diimidoester, mercuric chloride, zinc sulphate, zinc chloride, trinitrophenol (picric acid), potassium dichromate, ethanol, methanol, acetone, acetic acid, or a combination thereof.

16. The method of claim 1, wherein said apoptotic leukocytes or the apoptotic B cells have been fixed in the crosslinking agent for a predetermined amount of time.

17. The method of claim 1, wherein said apoptotic leukocytes or the apoptotic B cells have further been contacted with an amount of one or more immunomodulatory molecules.

18. The method of claim 1, wherein said anti-tumor necrosis factor agent or said anti-tumor necrosis factor receptor agent is administered to said subject at a dose of between about 0.1 mg/kg and about 10 mg/kg.

19. The method of claim 1, wherein said anti-interleukin 6 receptor agent is an antagonistic anti-interleukin 6 receptor antibody or antigen-binding fragment thereof.

20. The method of claim 1, wherein said anti-interleukin 6 agent or said anti-interleukin 6 receptor agent is administered to said subject at a dose of between about 1 mg/kg and about 100 mg/kg.

21. The method of claim 1, wherein said anti-CD40 agent or said anti-CD40 ligand agent is administered to said subject at a dose of between about 1 mg/kg and 100 mg/kg.

* * * * *